(12) United States Patent
Nishikawa et al.

(10) Patent No.: US 8,571,207 B2
(45) Date of Patent: Oct. 29, 2013

(54) HASH VALUE CALCULATION APPARATUS AND METHOD THEREOF

(75) Inventors: Shigeru Nishikawa, Fujisawa (JP); Akemi Kikuchi, Yokohama (JP); Akihiko Yushiya, Tokyo (JP); Shiori Wakino, Yokohama (JP)

(73) Assignee: Canon Kabushiki Kaisha (JP)

( * ) Notice: Subject to any disclaimer, the term of this patent is extended or adjusted under 35 U.S.C. 154(b) by 605 days.

(21) Appl. No.: 12/625,687

(22) Filed: Nov. 25, 2009

(65) Prior Publication Data

US 2010/0135484 A1 Jun. 3, 2010

(30) Foreign Application Priority Data

Nov. 28, 2008 (JP) ................................ 2008-305624

(51) Int. Cl.
*H04L 29/06* (2006.01)
(52) U.S. Cl.
USPC ........................................................ 380/28
(58) Field of Classification Search
USPC ........................................................ 380/28
See application file for complete search history.

(56) References Cited

U.S. PATENT DOCUMENTS

| | | | |
|---|---|---|---|
| 7,177,421 B2* | 2/2007 | Buer et al. | 380/28 |
| 7,184,549 B2* | 2/2007 | Sorimachi et al. | 380/37 |
| 7,275,176 B2* | 9/2007 | Stone-Kaplan et al. | 714/4.4 |
| 7,299,355 B2* | 11/2007 | Qi | 713/168 |
| 7,599,489 B1* | 10/2009 | Spracklen | 380/28 |
| 7,697,682 B2* | 4/2010 | Tsuruga | 380/28 |
| 7,720,219 B1* | 5/2010 | Olson et al. | 380/28 |
| 7,908,411 B2* | 3/2011 | Kitagawa | 710/33 |
| 8,000,469 B2* | 8/2011 | Buer et al. | 380/29 |
| 2002/0191791 A1* | 12/2002 | Anand | 380/255 |
| 2003/0065933 A1* | 4/2003 | Hashimoto et al. | 713/194 |
| 2005/0089160 A1* | 4/2005 | Crispin et al. | 380/28 |
| 2005/0188216 A1* | 8/2005 | Crispin et al. | 713/190 |

(Continued)

FOREIGN PATENT DOCUMENTS

| EP | 886399 A2 * | 12/1998 |
|---|---|---|
| JP | 5487130 A | 7/1979 |

(Continued)

OTHER PUBLICATIONS

Kang et al., "An efficient implementation of hash function processor for IPSEC", in Proc. 3rd IEEE Asia-Pacific Conf. ASIC, Taipei, Aug. 6-8, 2002, pp. 93-96.*

(Continued)

*Primary Examiner* — Michael S McNally
(74) *Attorney, Agent, or Firm* — Rossi, Kimms & McDowell LLP

(57) ABSTRACT

A hash value calculation apparatus, which calculates a hash value of a message, includes: an input unit adapted to input an extended block obtained from a message to be processed; a hash value calculation unit adapted to execute a hash value calculation of the input block and to output a hash intermediate value; a plurality of intermediate value storage units adapted to store the hash intermediate value output by the hash value calculation unit for the message to be processed; an output unit adapted to output a hash intermediate value associated with all blocks of the message to be processed as a hash value of the message; and a hash value calculation control unit adapted to control hash value calculations for a plurality of messages by switching the intermediate value storage units used to store the hash intermediate value output from the hash value calculation unit.

10 Claims, 98 Drawing Sheets

(56) References Cited

U.S. PATENT DOCUMENTS

| | | | |
|---|---|---|---|
| 2006/0023877 A1* | 2/2006 | Tsuruga | 380/28 |
| 2006/0259848 A1* | 11/2006 | Blevins | 714/763 |
| 2007/0245159 A1* | 10/2007 | Youn | 713/187 |
| 2008/0107259 A1* | 5/2008 | Satou | 380/28 |
| 2009/0006864 A1* | 1/2009 | Hashimoto et al. | 713/190 |
| 2009/0022307 A1* | 1/2009 | Torla | 380/28 |
| 2010/0031052 A1* | 2/2010 | Kim et al. | 713/181 |
| 2010/0217897 A1* | 8/2010 | Kitagawa | 710/33 |

FOREIGN PATENT DOCUMENTS

| | | | |
|---|---|---|---|
| JP | 60134940 A | | 7/1985 |
| JP | 03280132 A | | 12/1991 |
| JP | 2004-053716 A | | 2/2004 |
| JP | 2006-039000 A | | 2/2006 |
| WO | WO 2008035616 A1 | * | 3/2008 |

OTHER PUBLICATIONS

Akashi Satoh, et al., "Hardware Performance Comparison for Hash Functions",Computer Security Symposium 2004, Oct. 20, 2004, vol. II of II, p. 613-618 (Cited in JP OA Jun. 14, 2013 for corres. JP 2008-305624).

JP Office Action issued Jun. 14, 2013 for corres. JP 2008-305624.

Hirose, "Hash-Function Constructions and Their Provable Security", The Journal of the Institute of Electronics, Information and Communication Engineers, vol. 90, No. 6, pp. 447-450, Tokyo.

JP OA issued Aug. 26, 2013 for corres. JP 2008-305624.

* cited by examiner

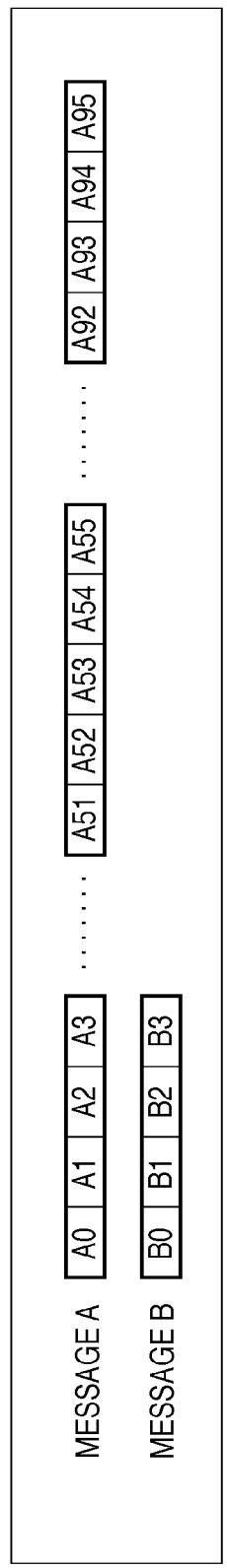
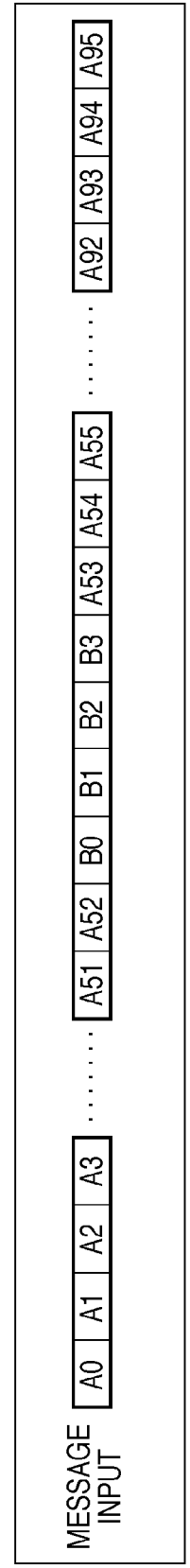

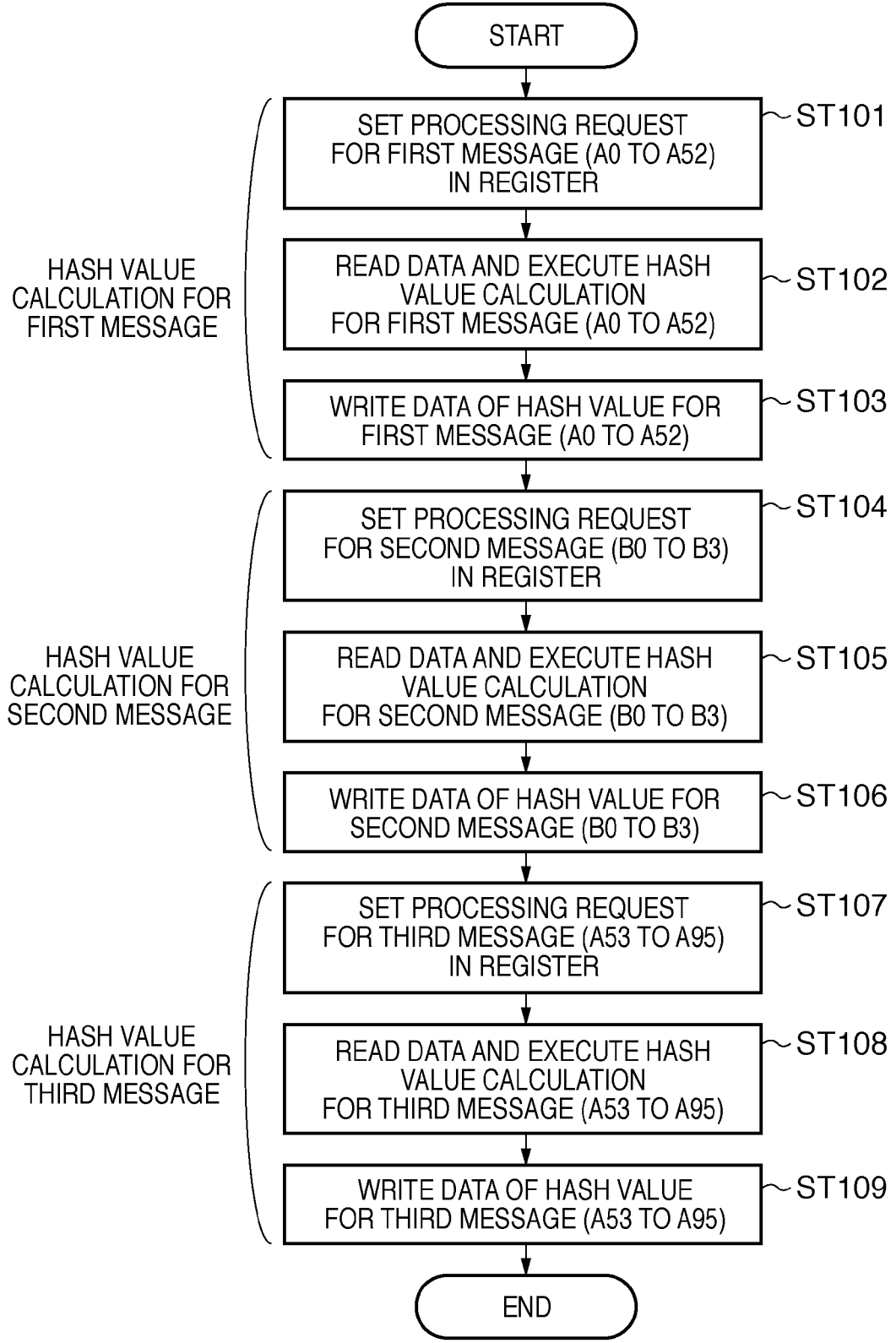

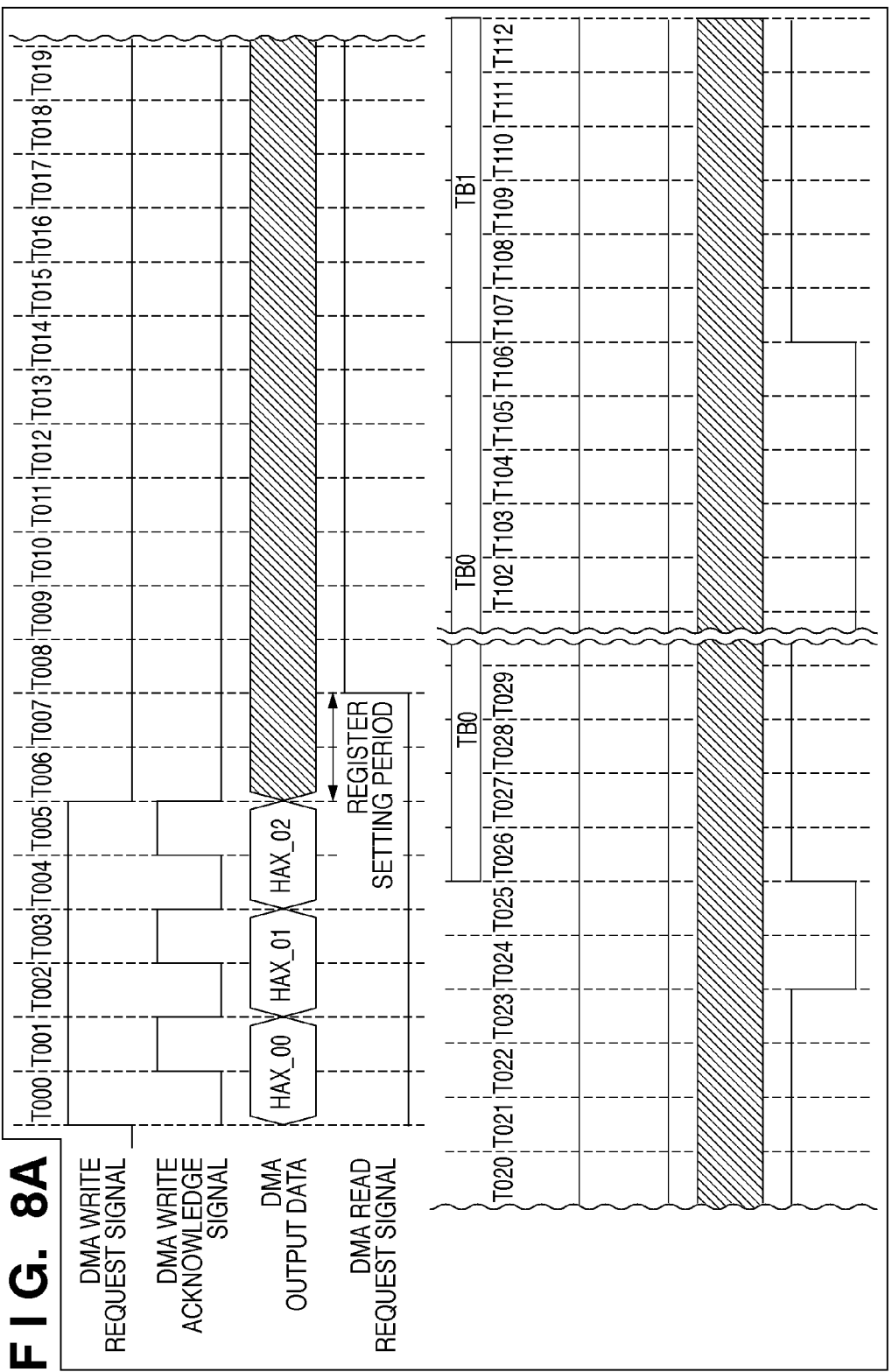

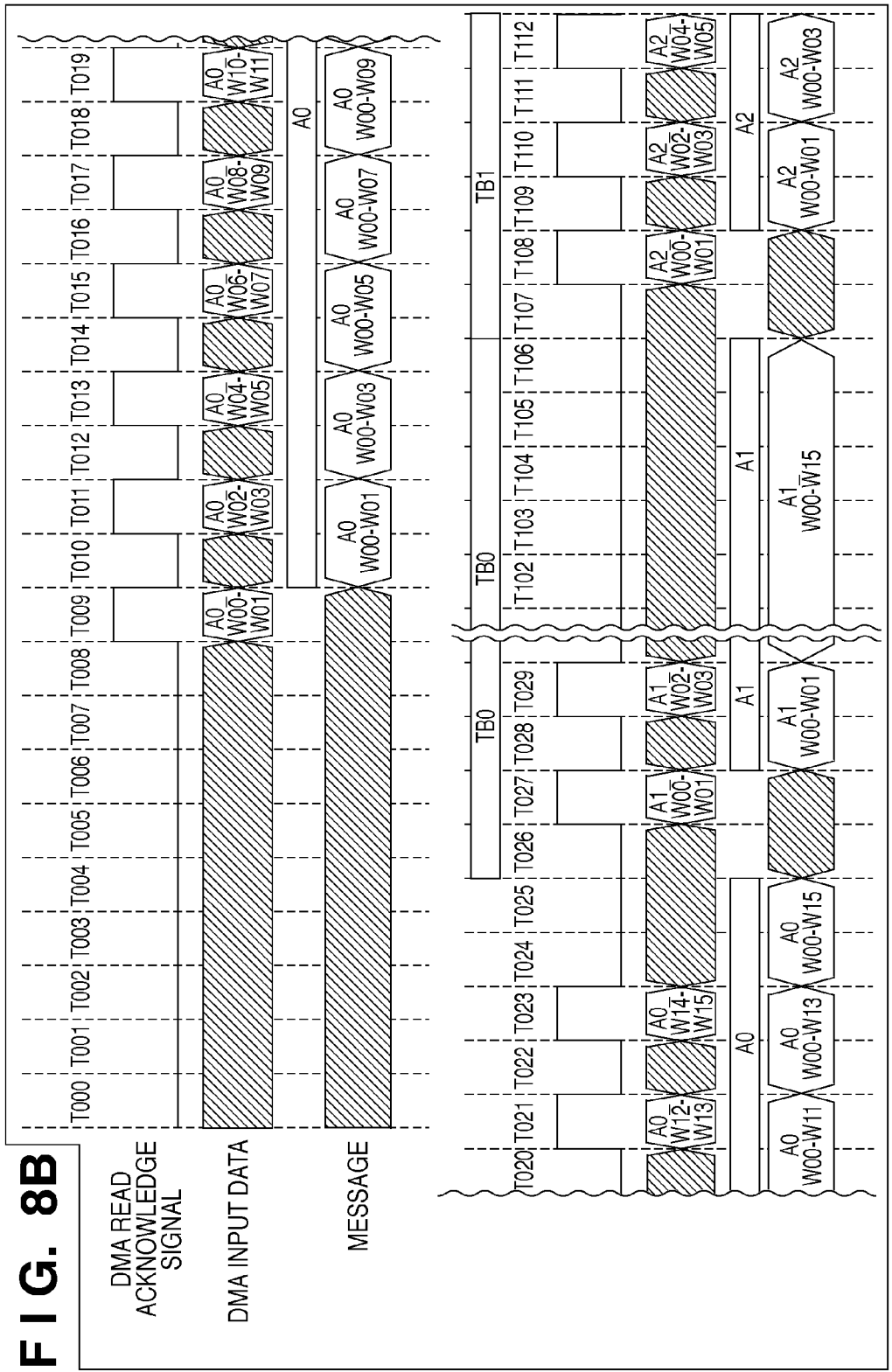

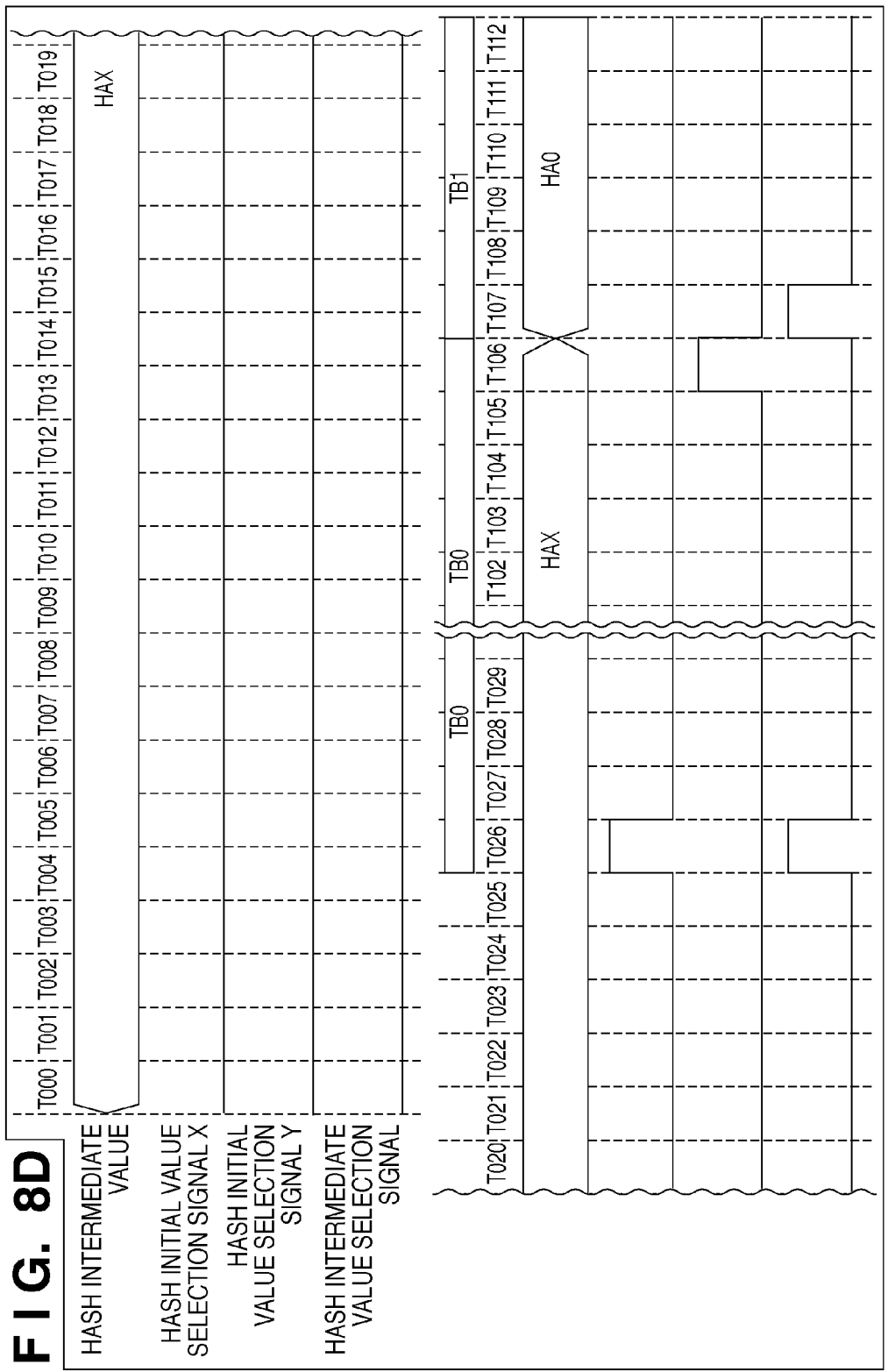

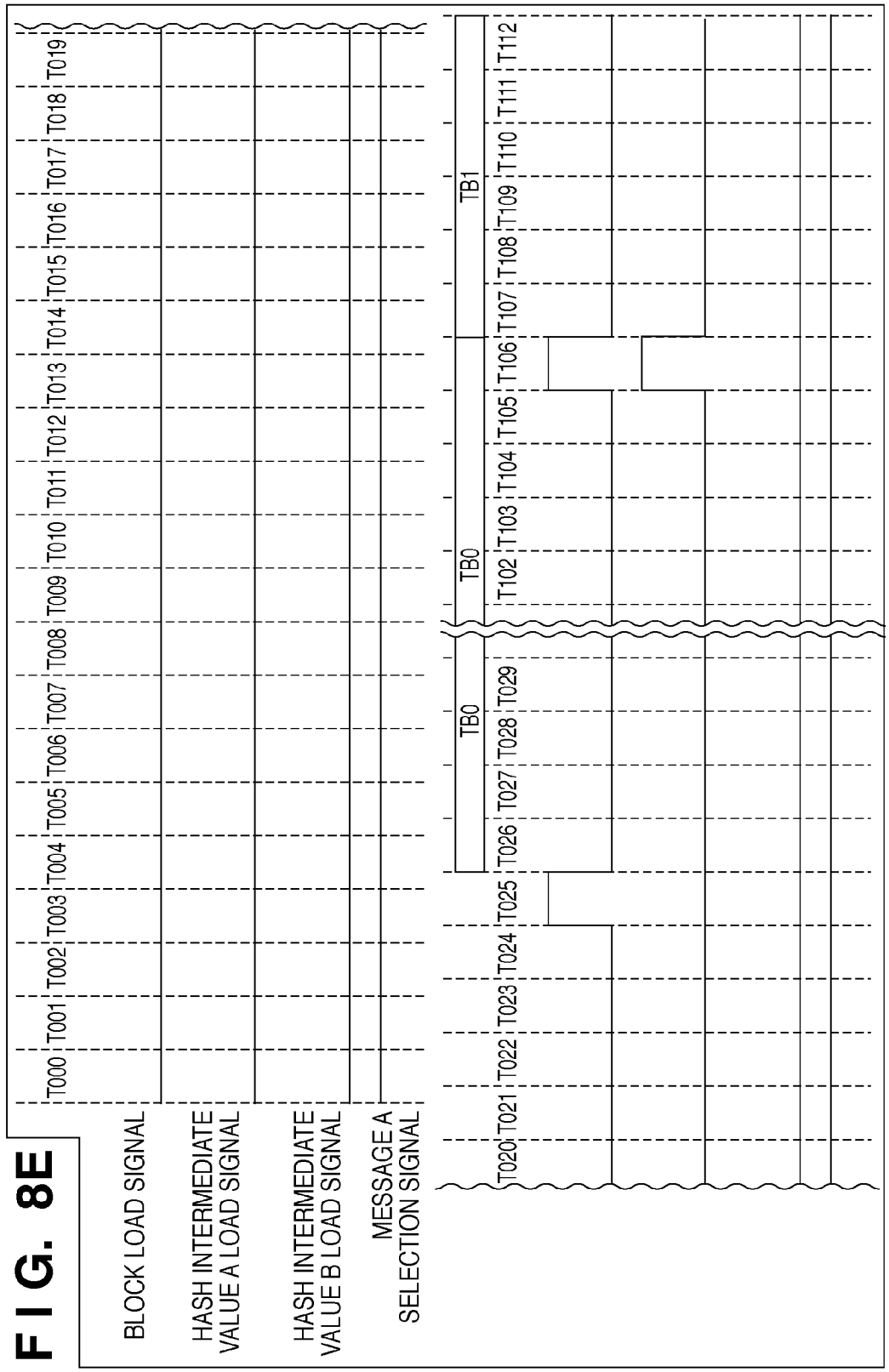

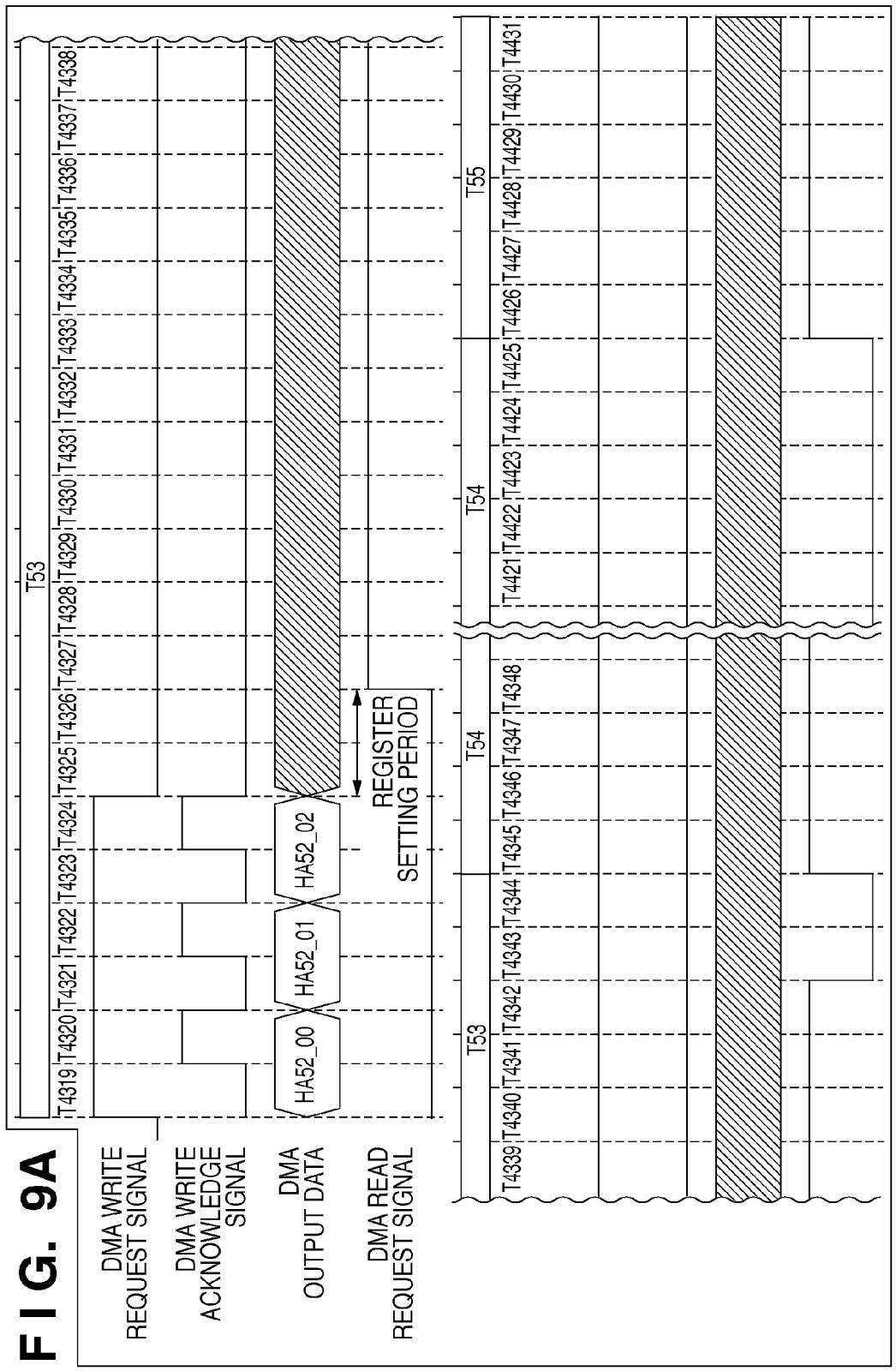

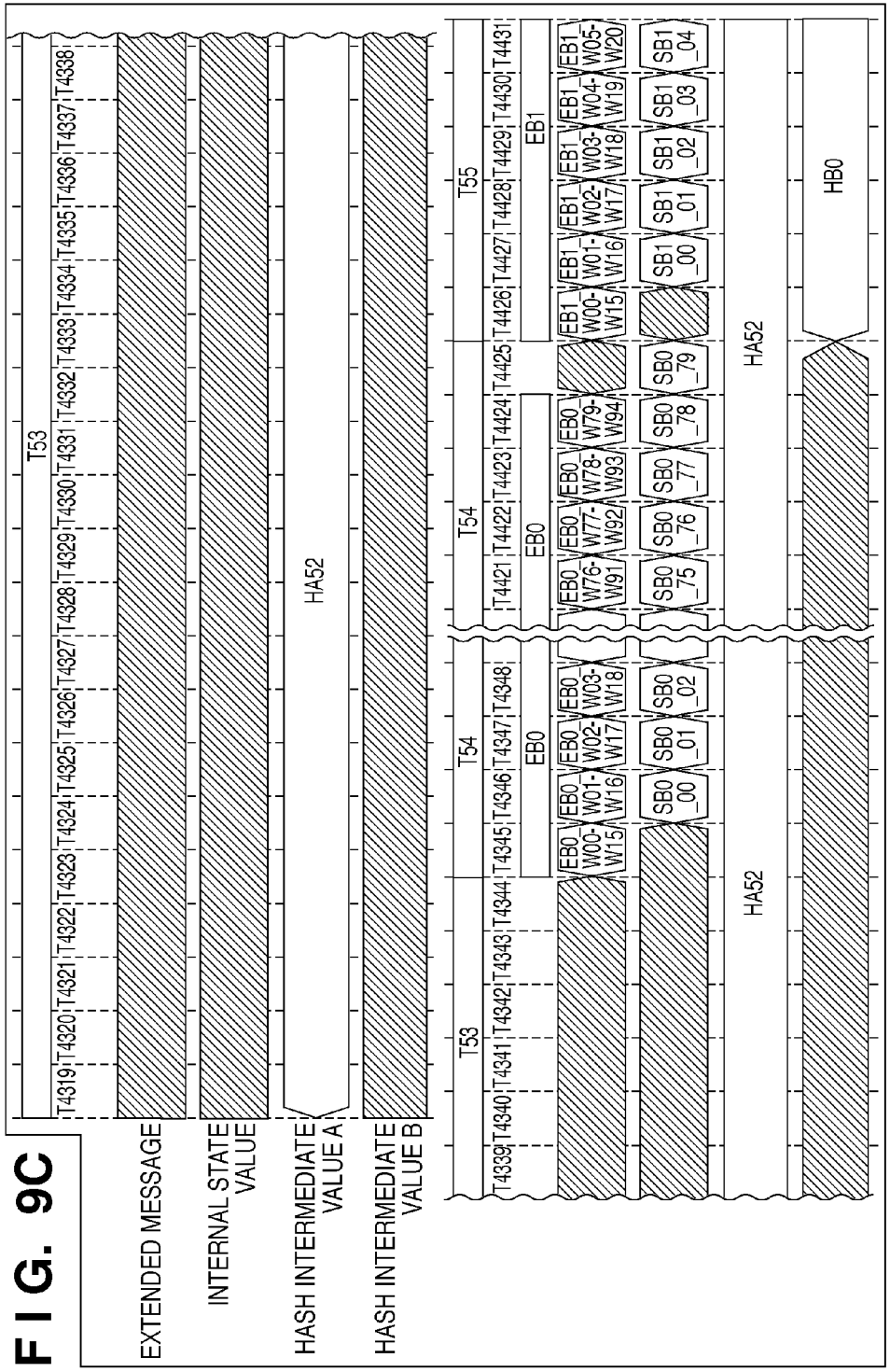

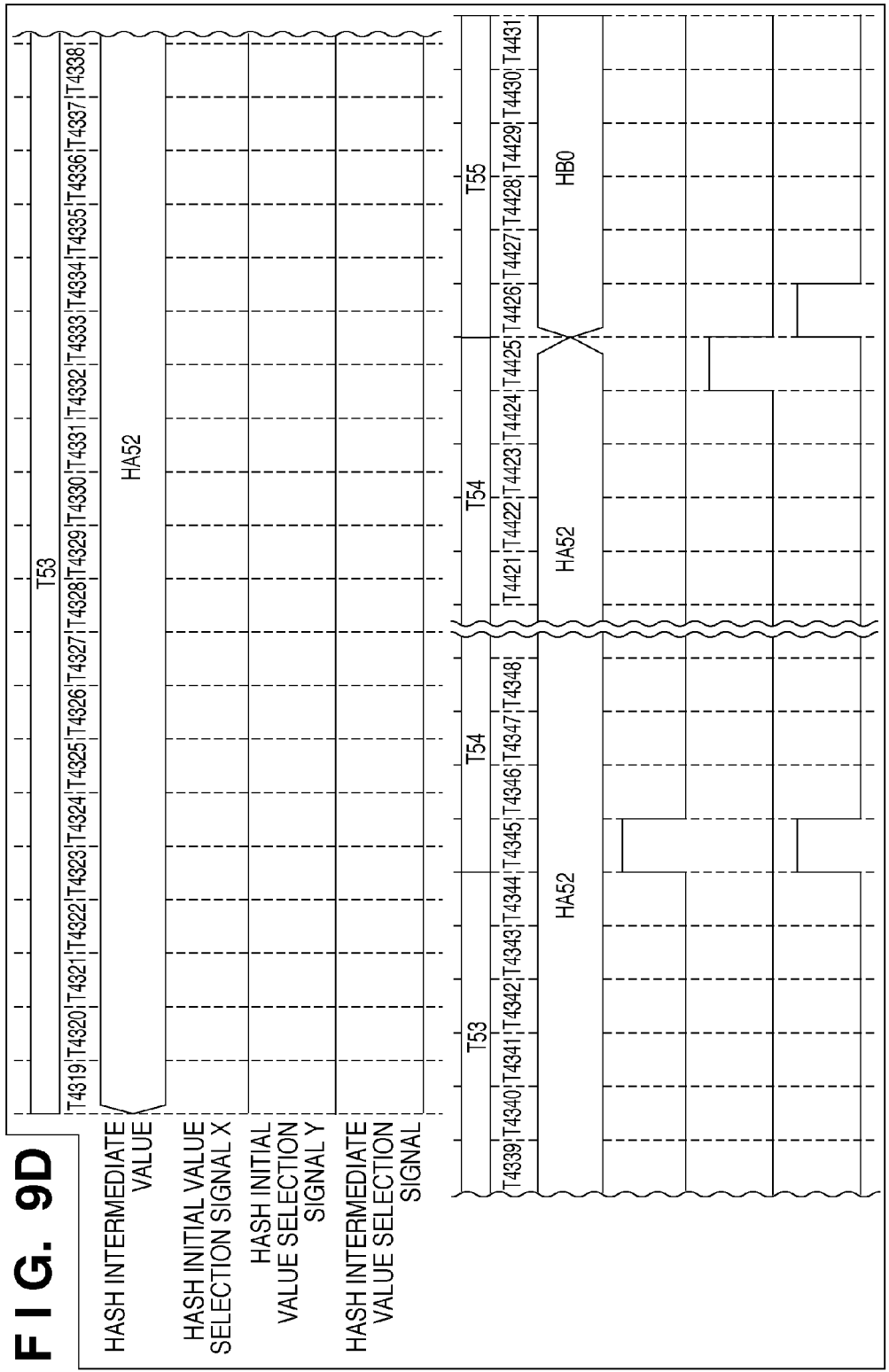

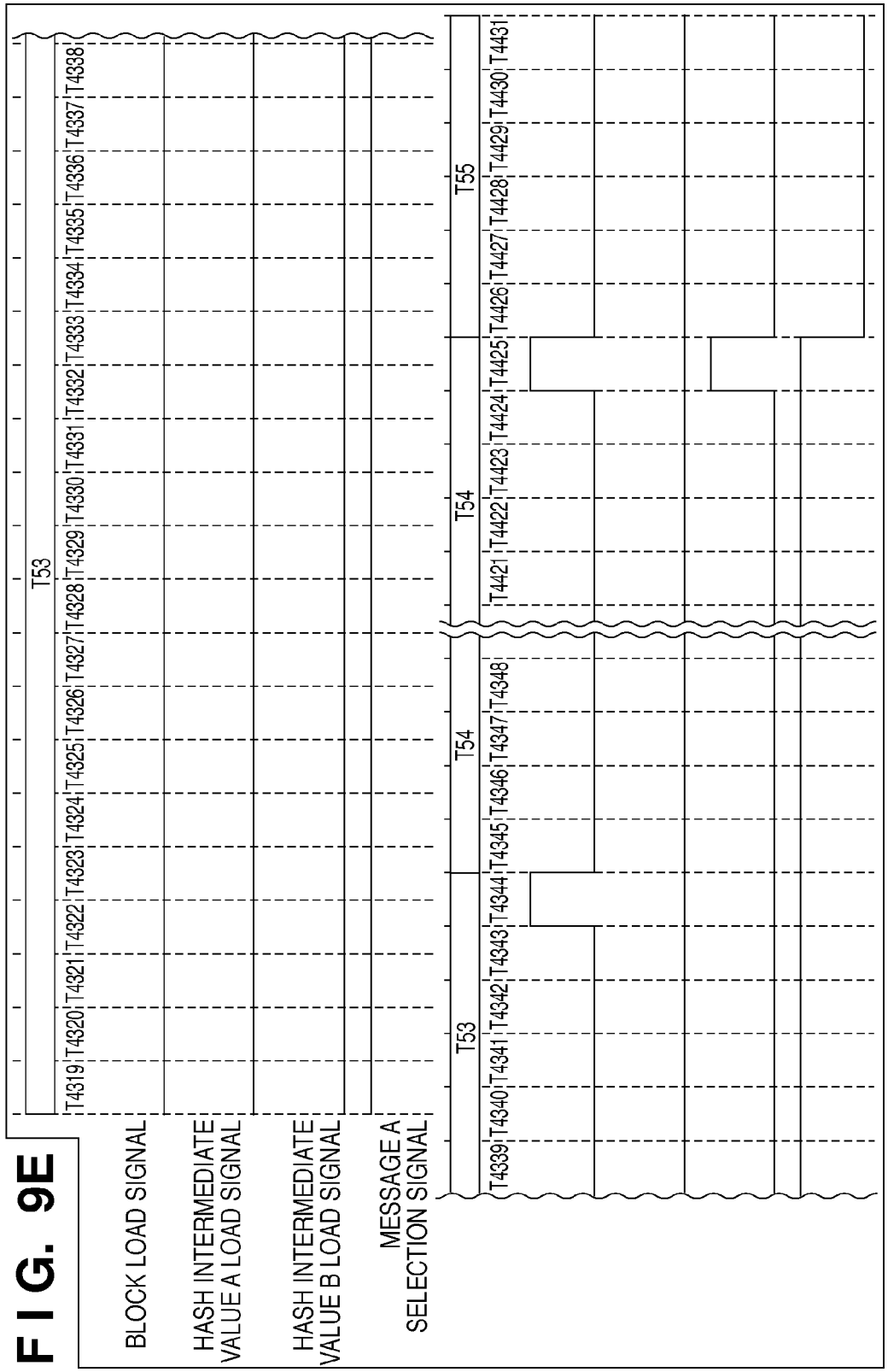

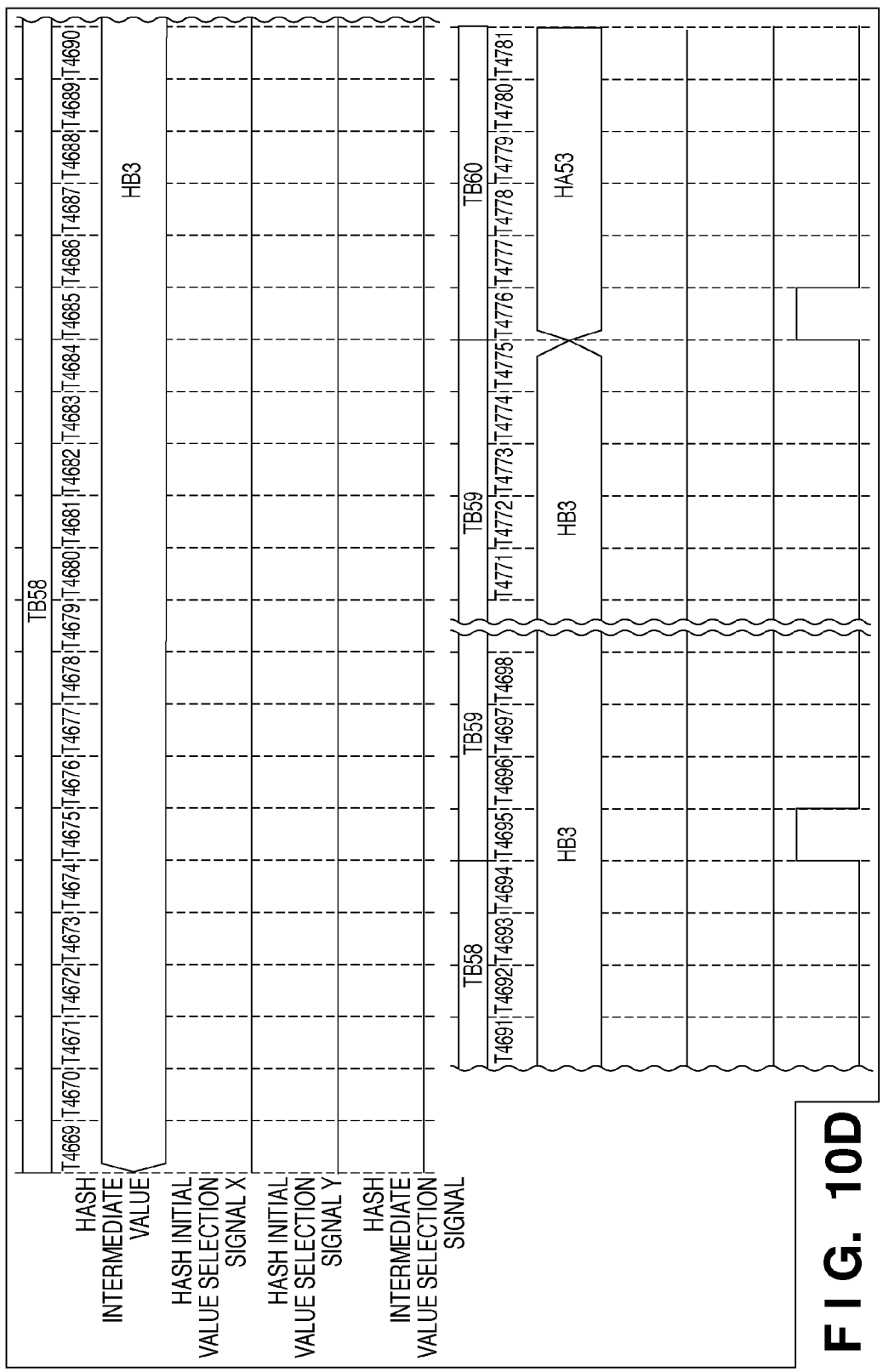

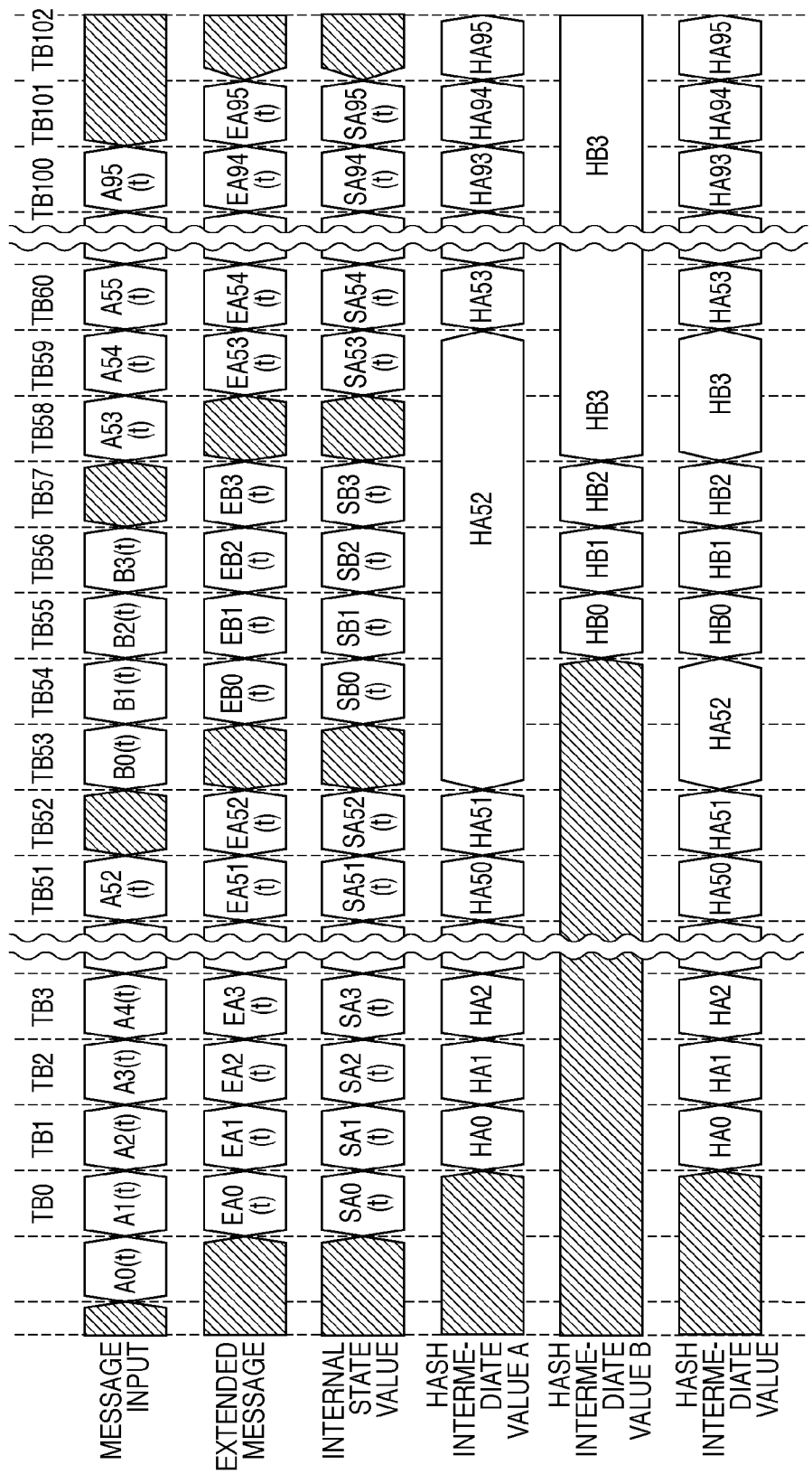

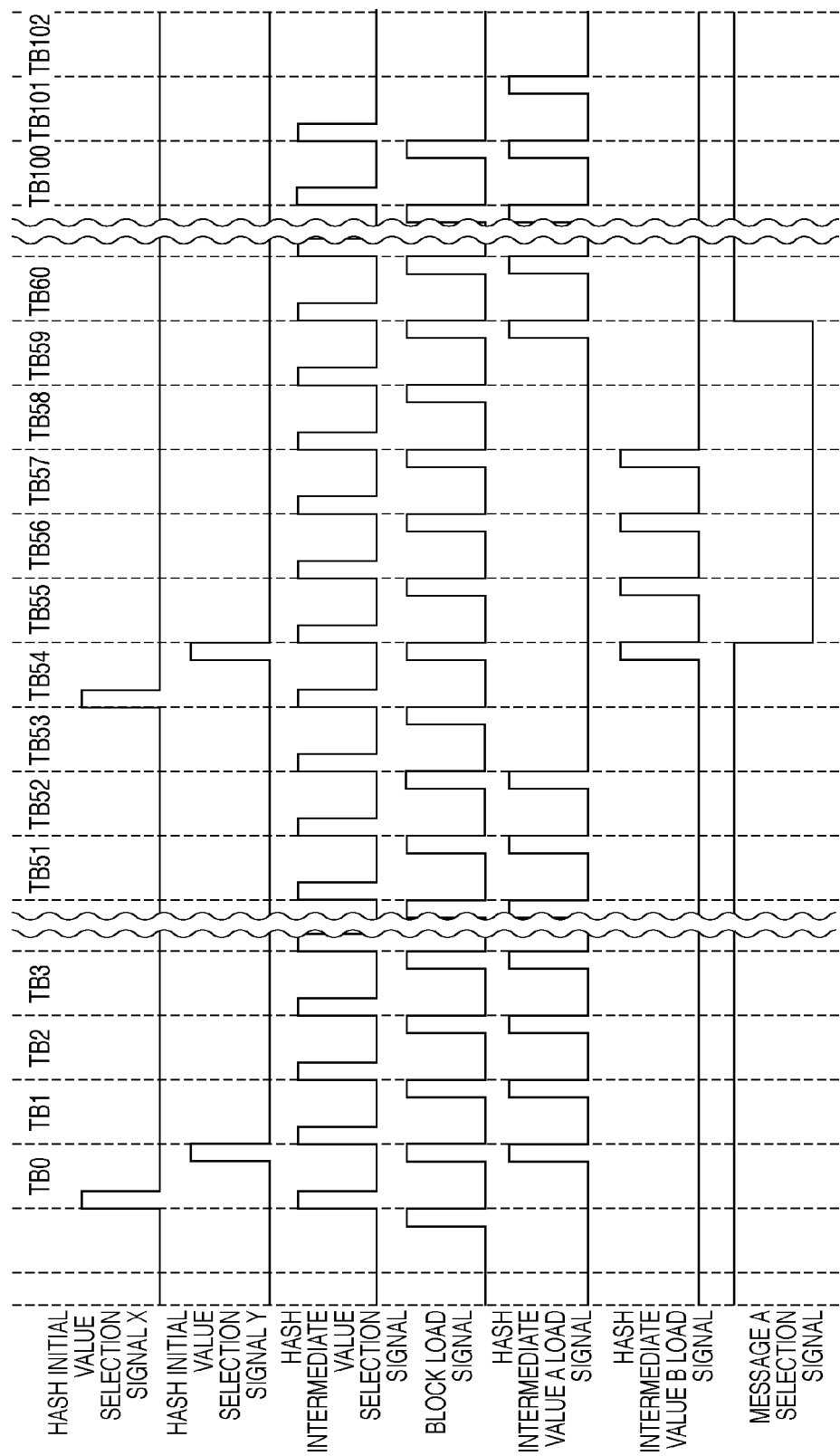

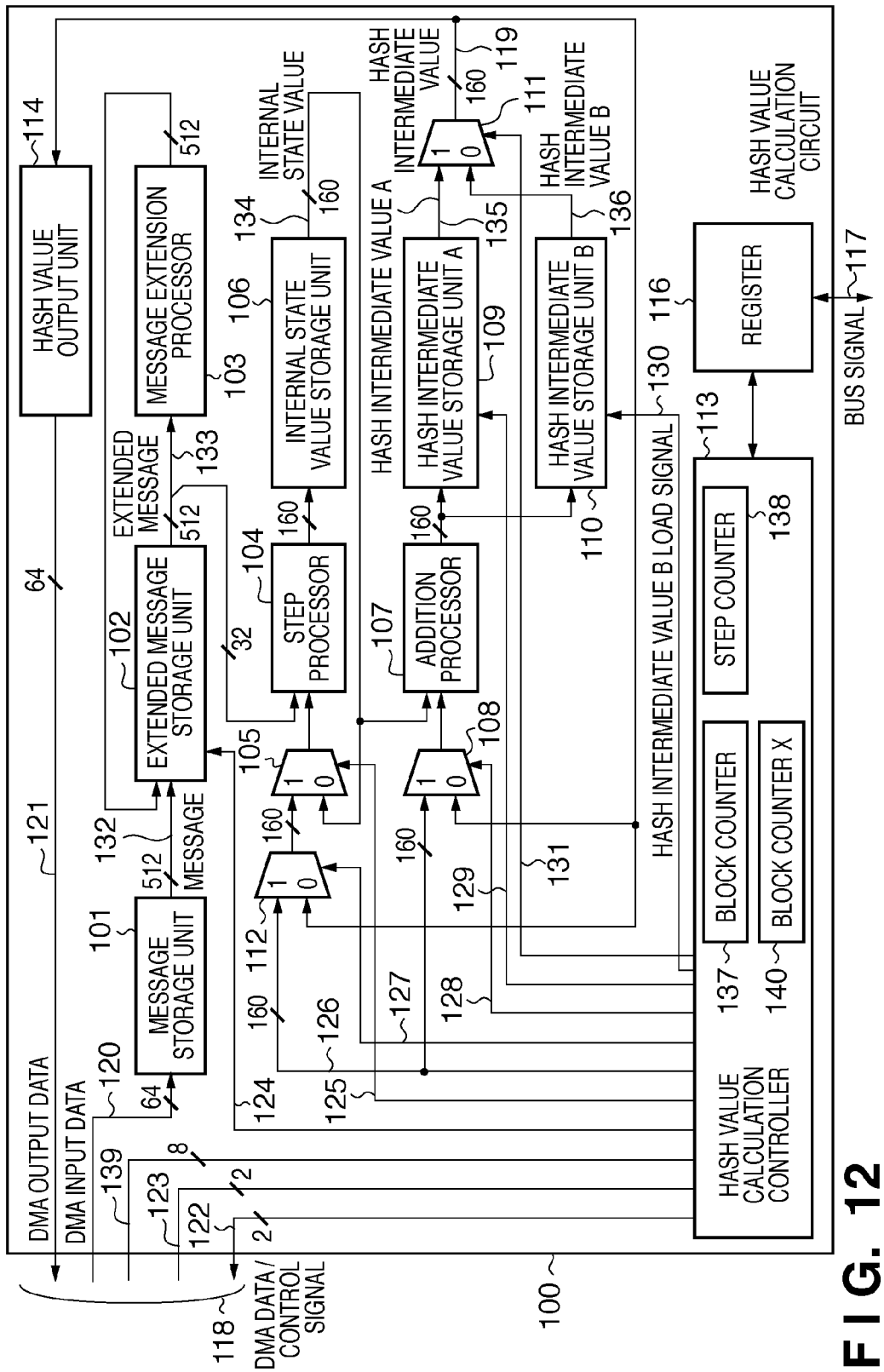
F I G. 12

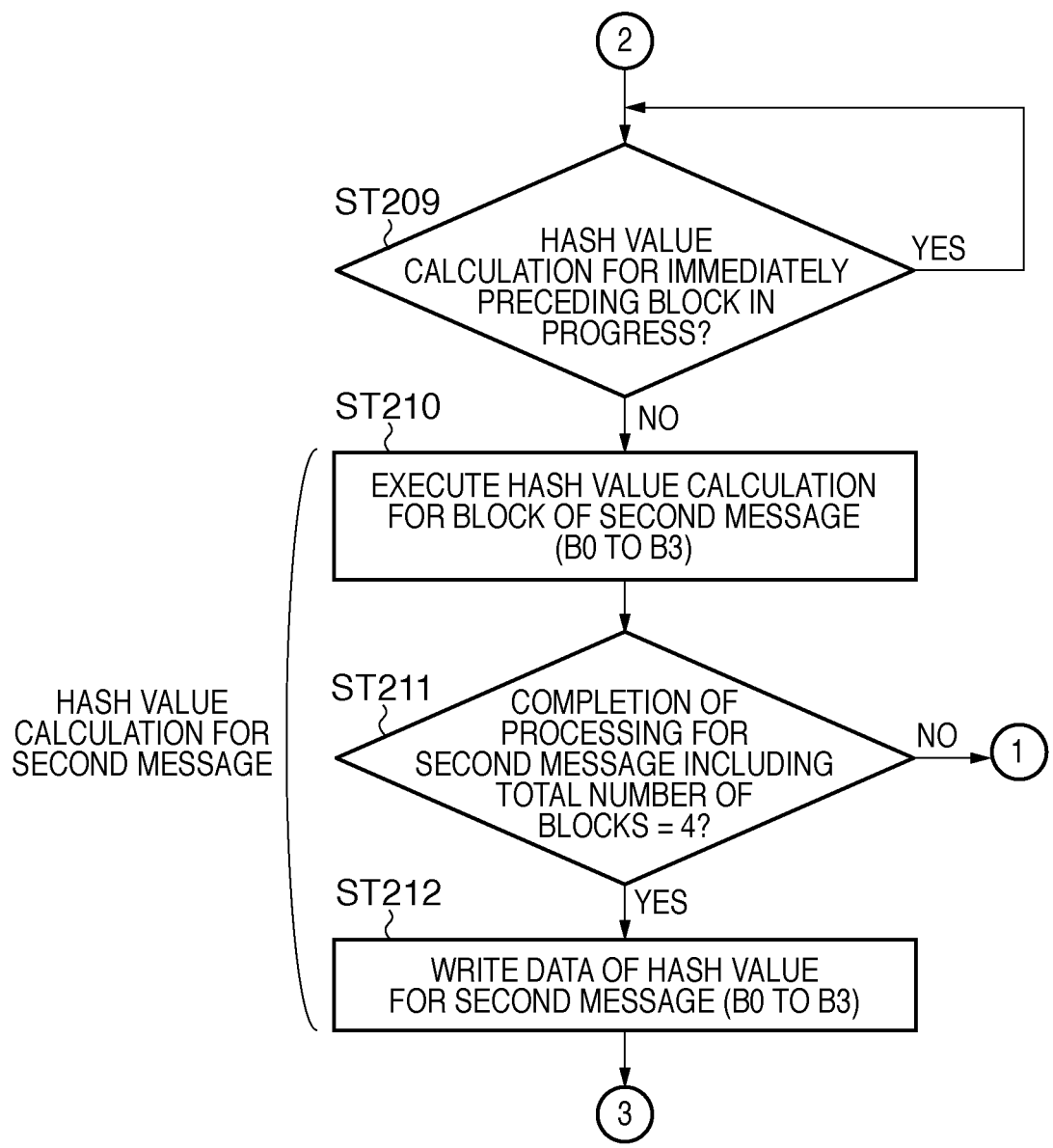
F I G. 14B

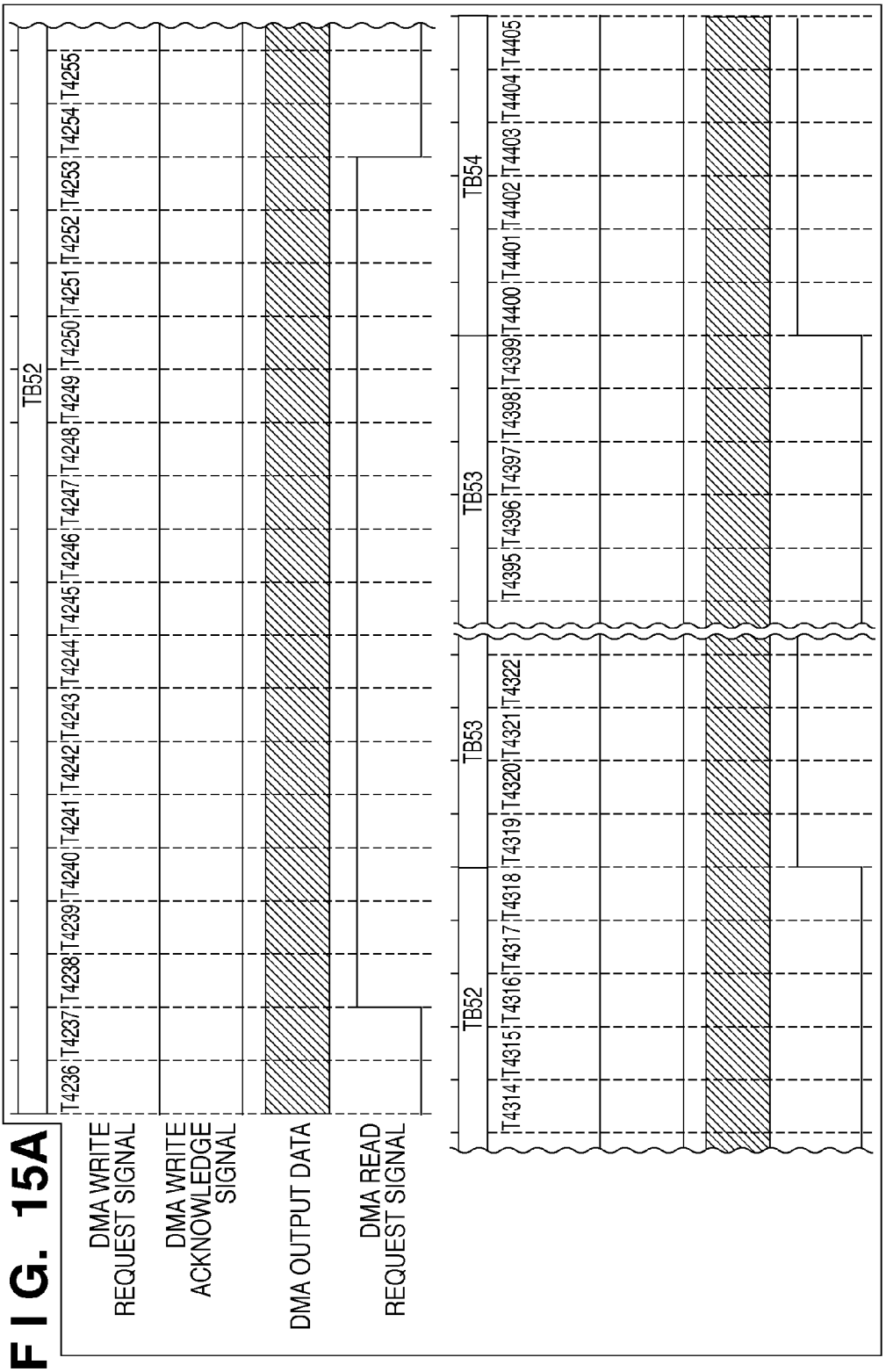

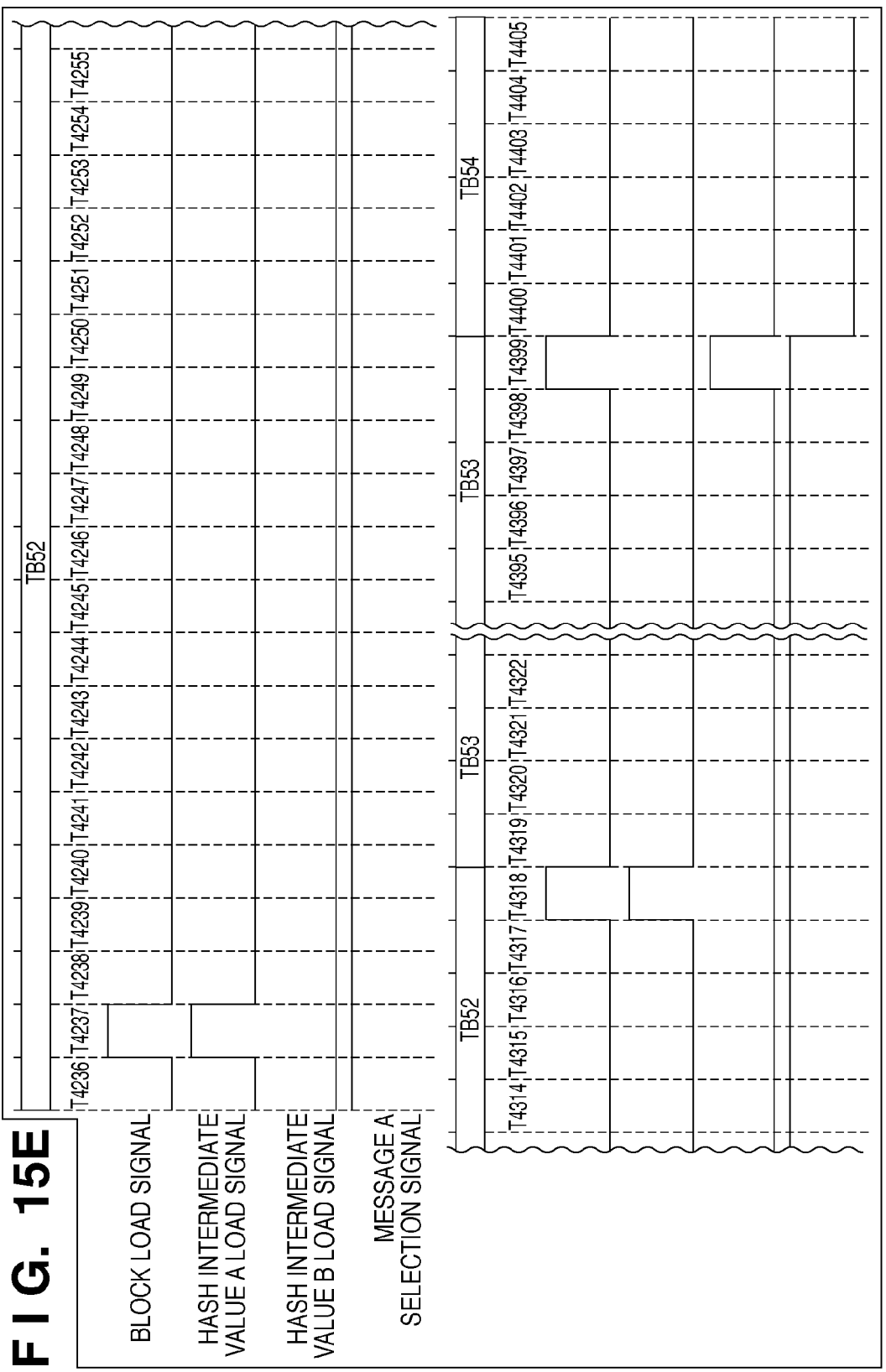

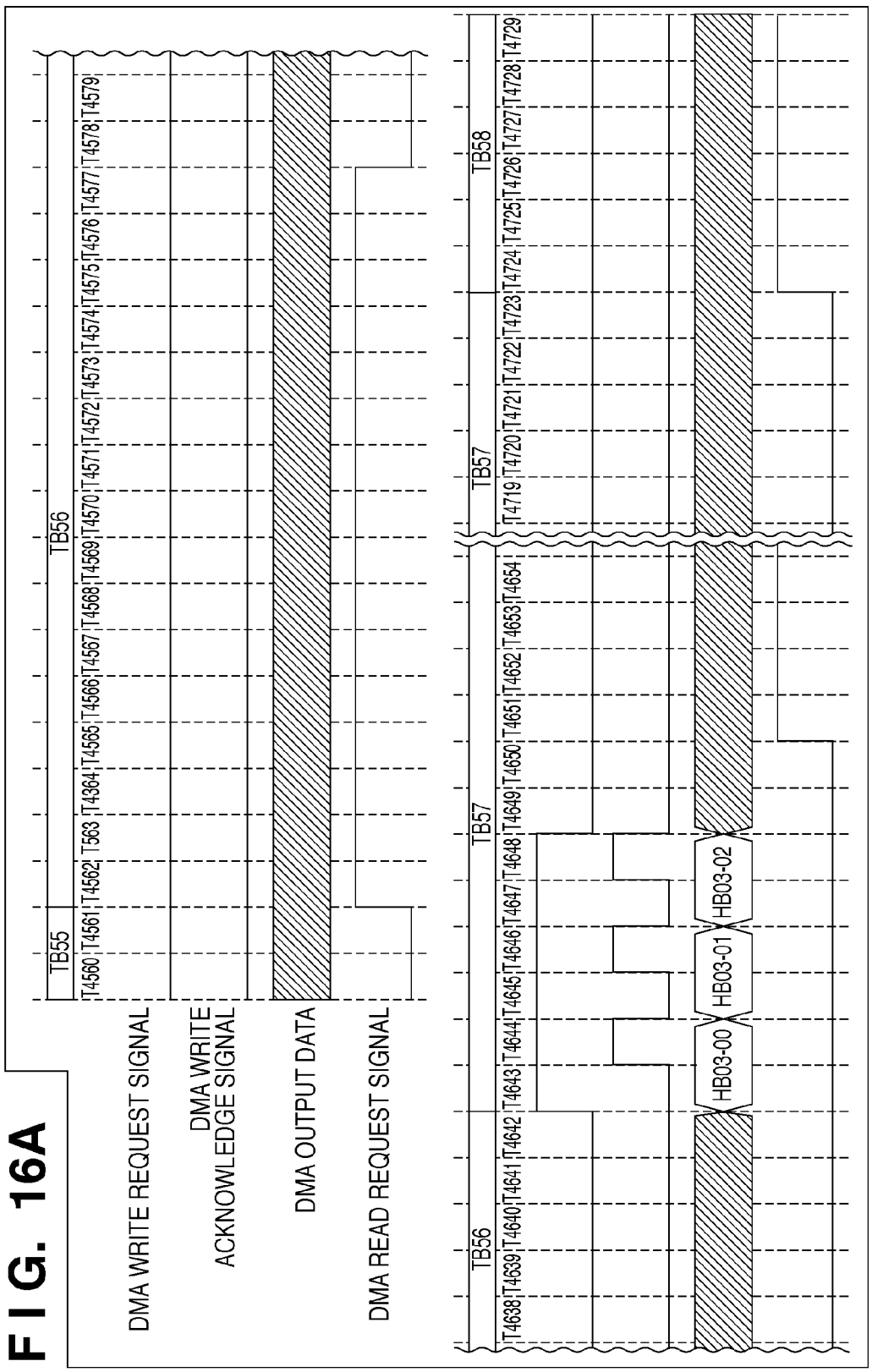

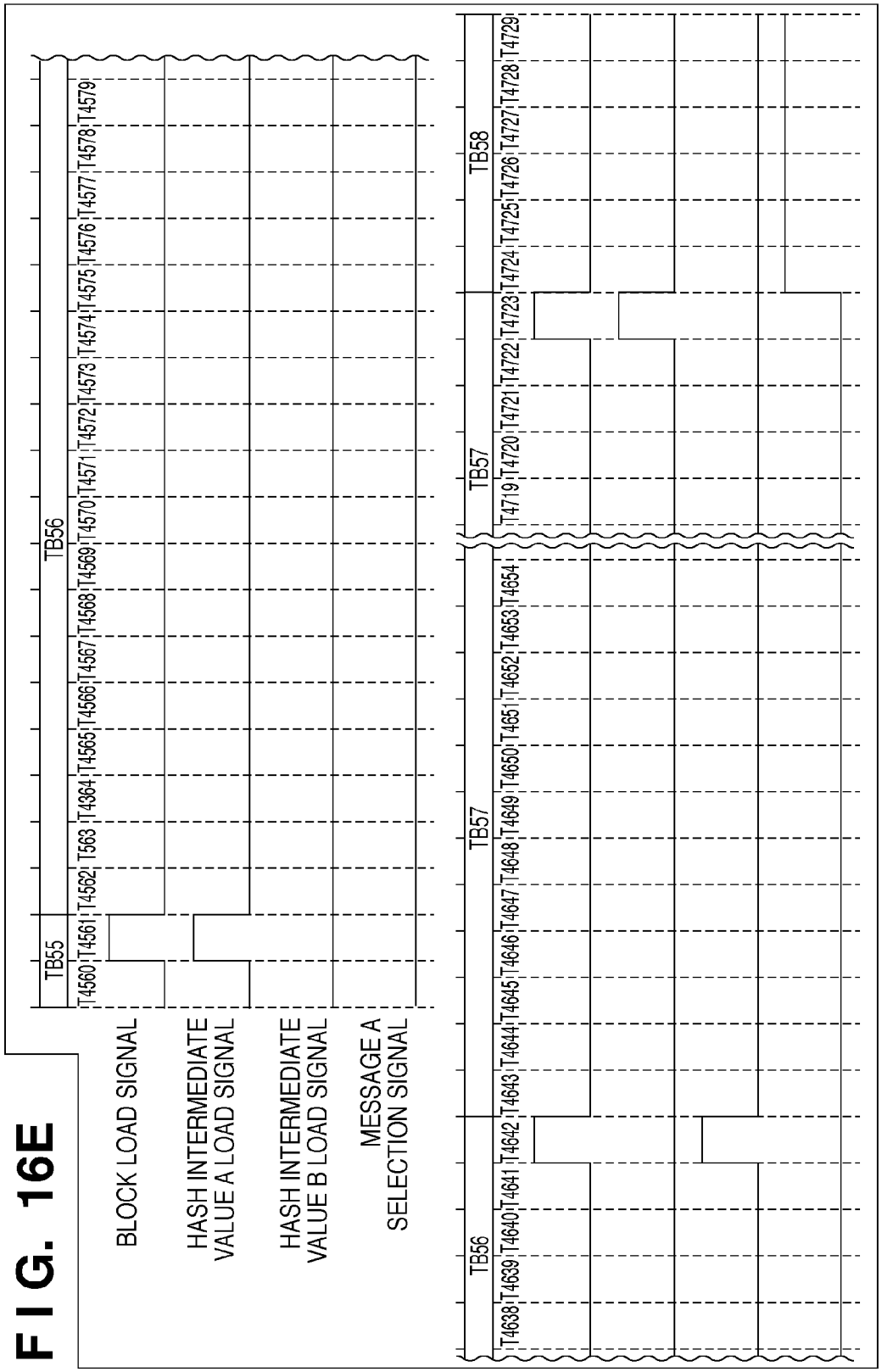

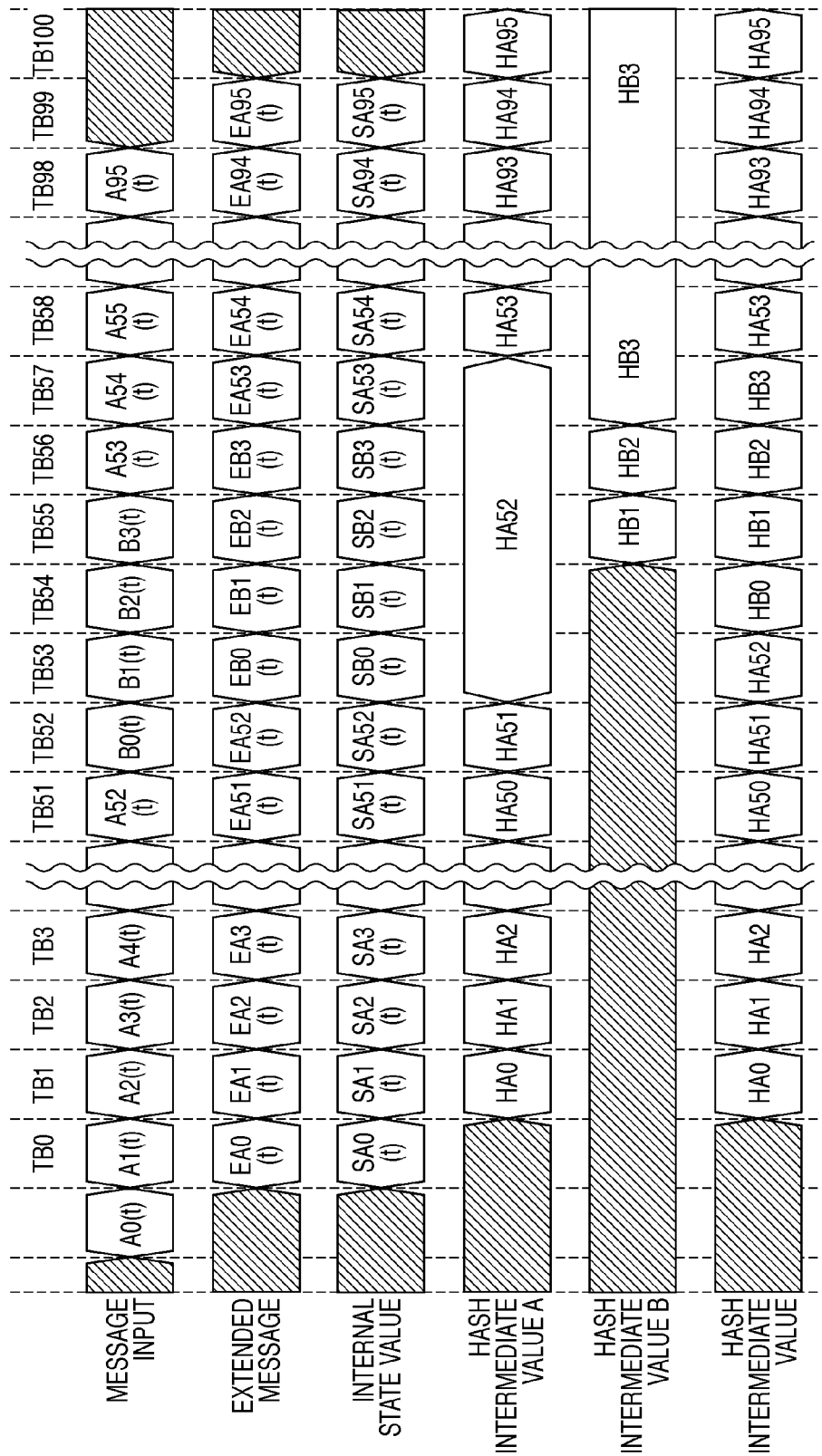

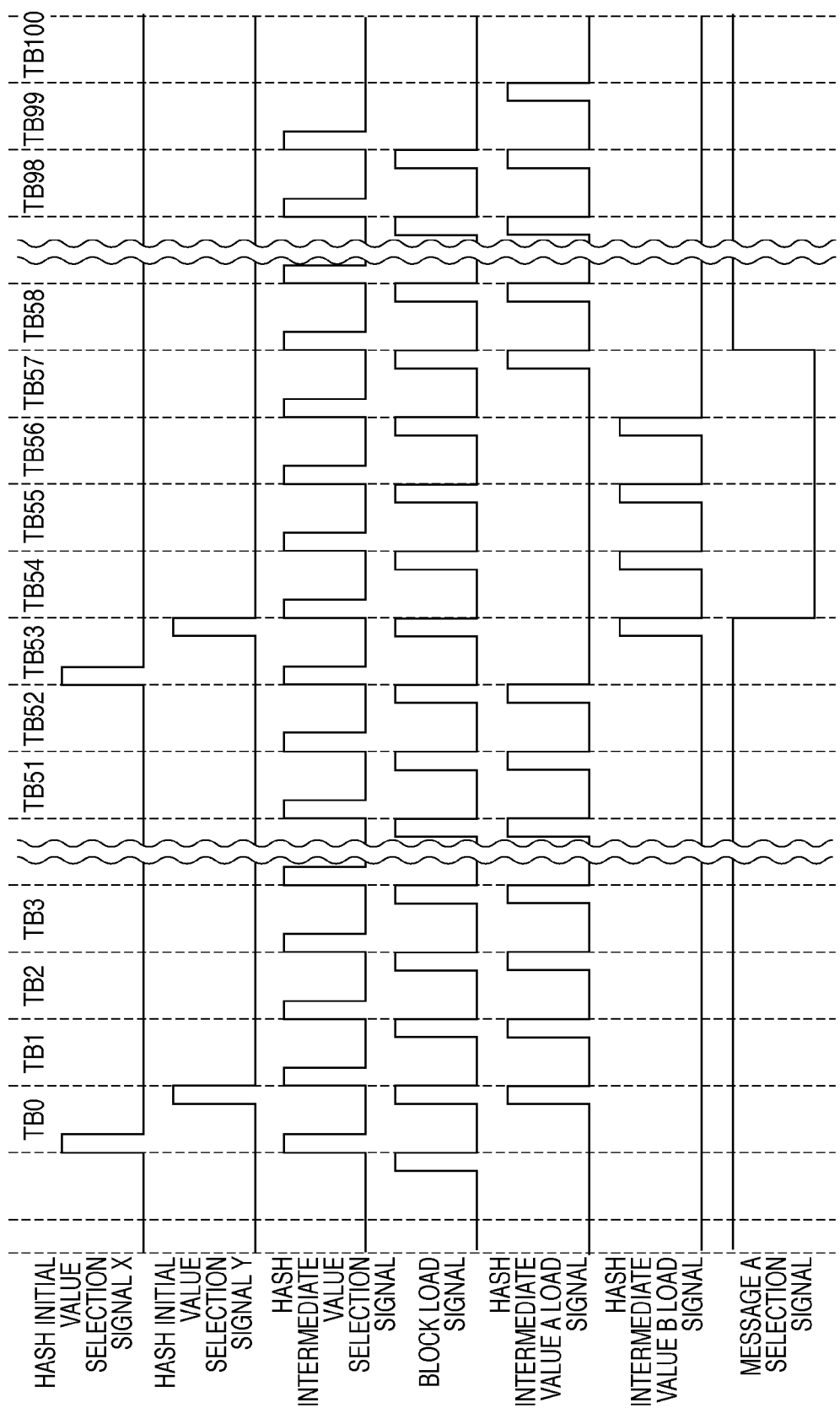

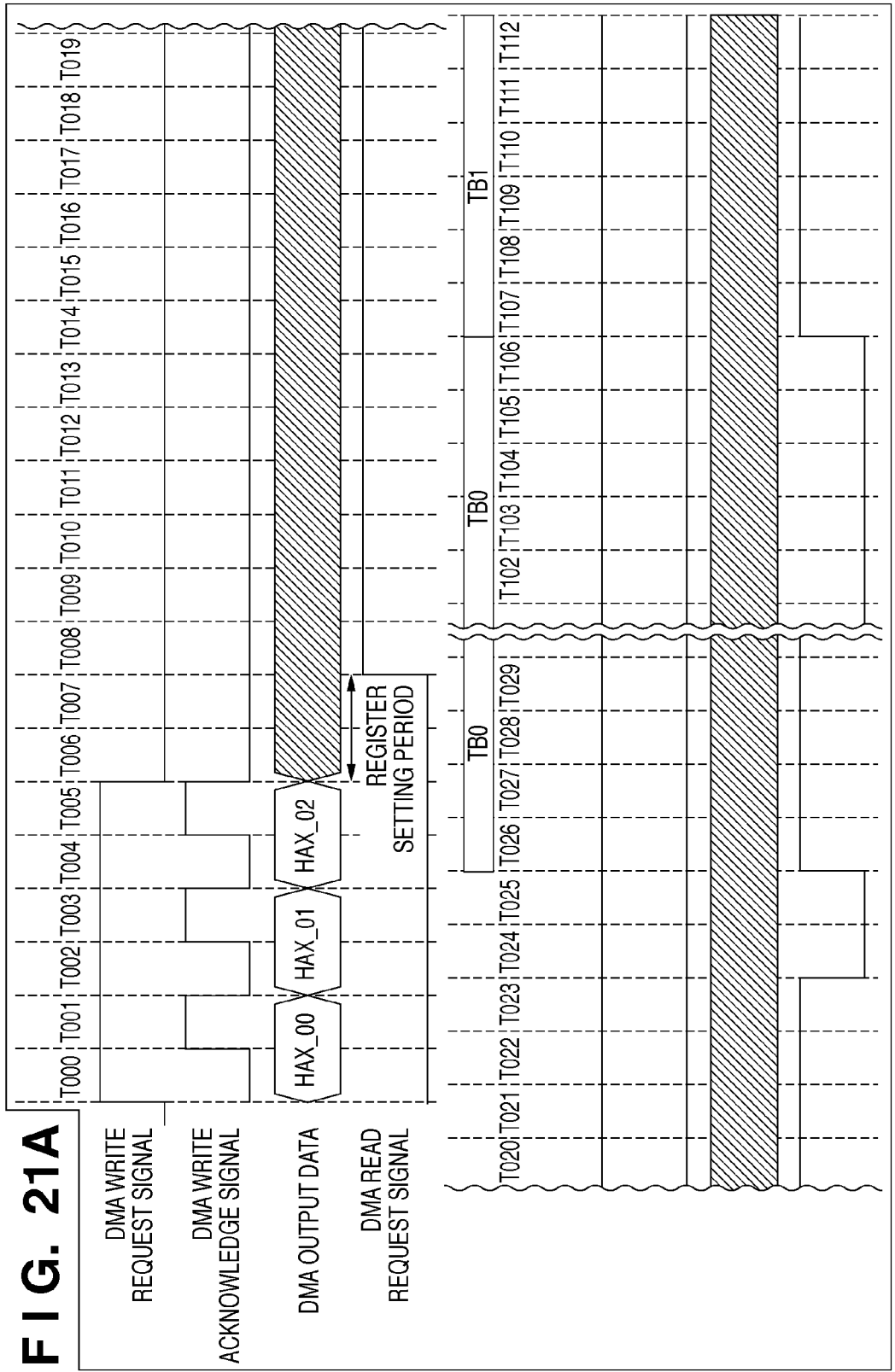

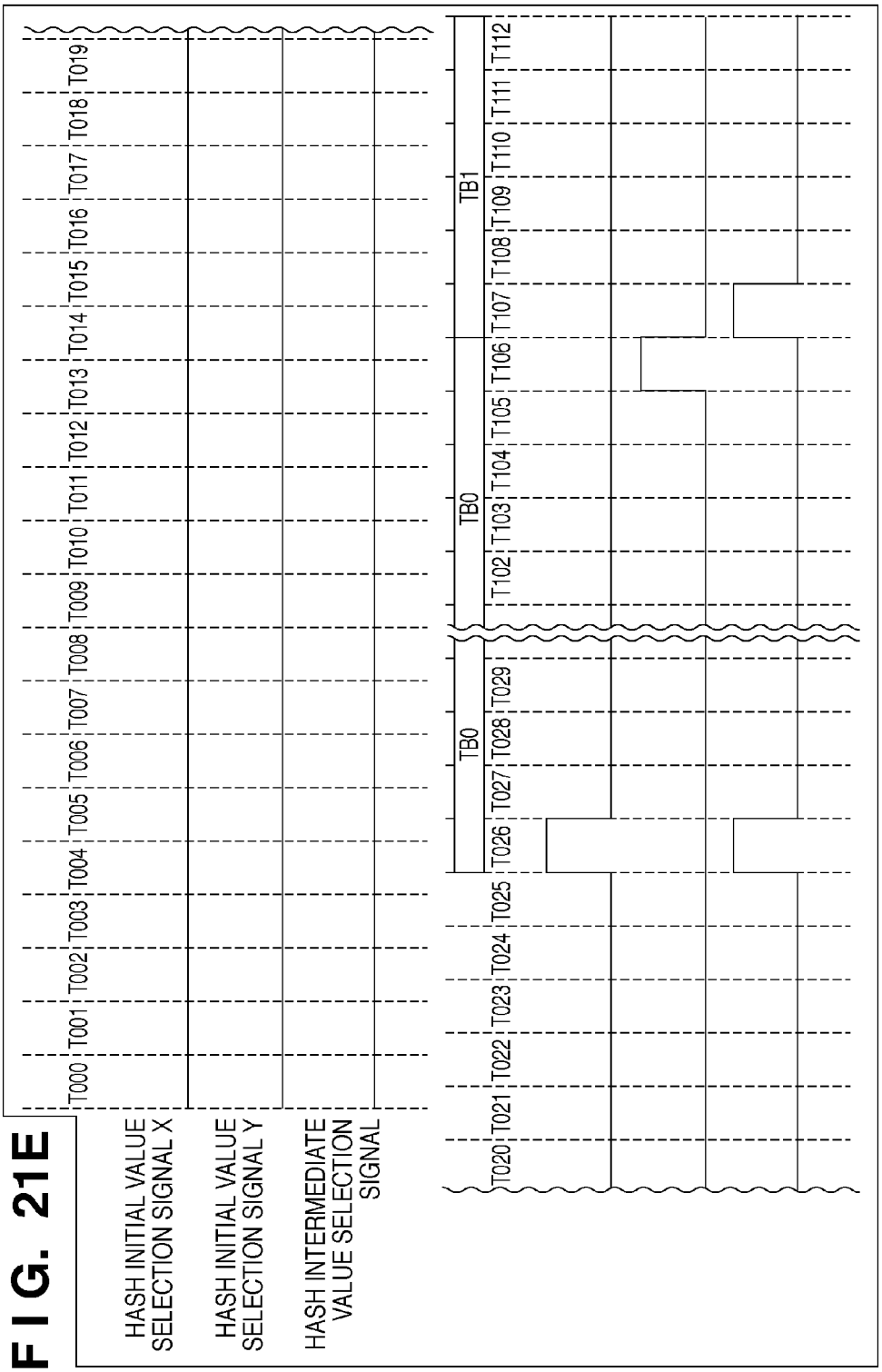

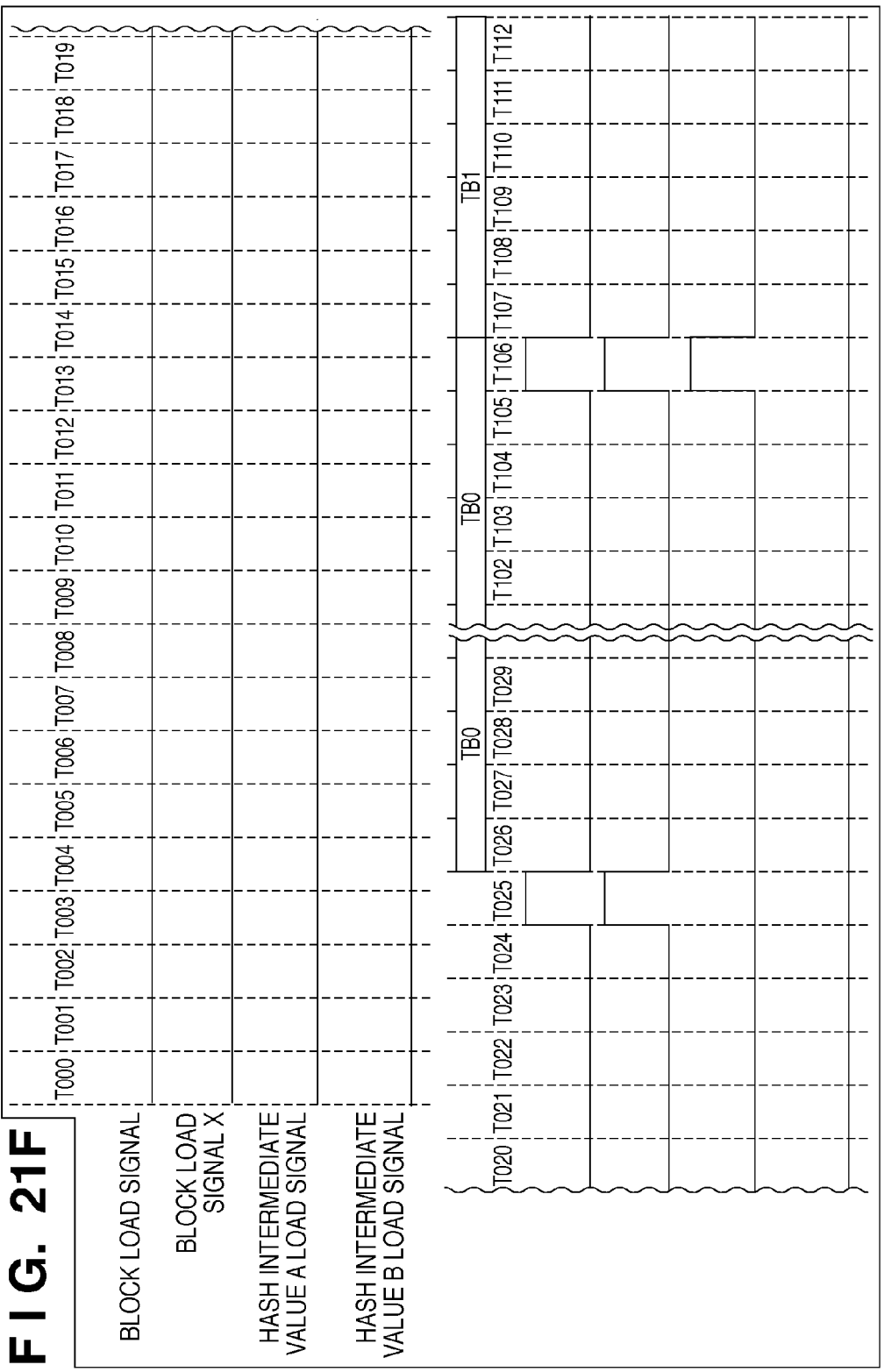

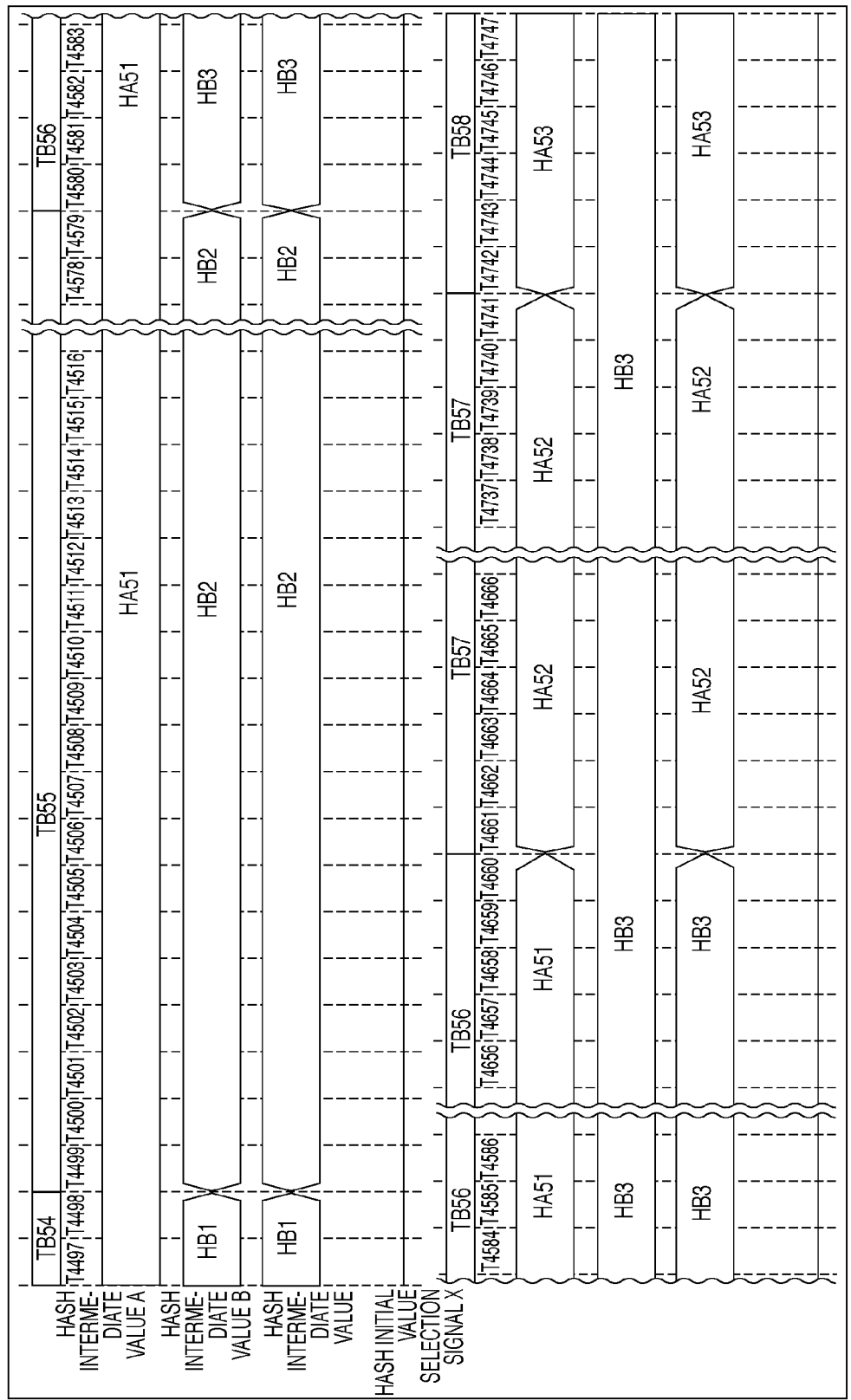

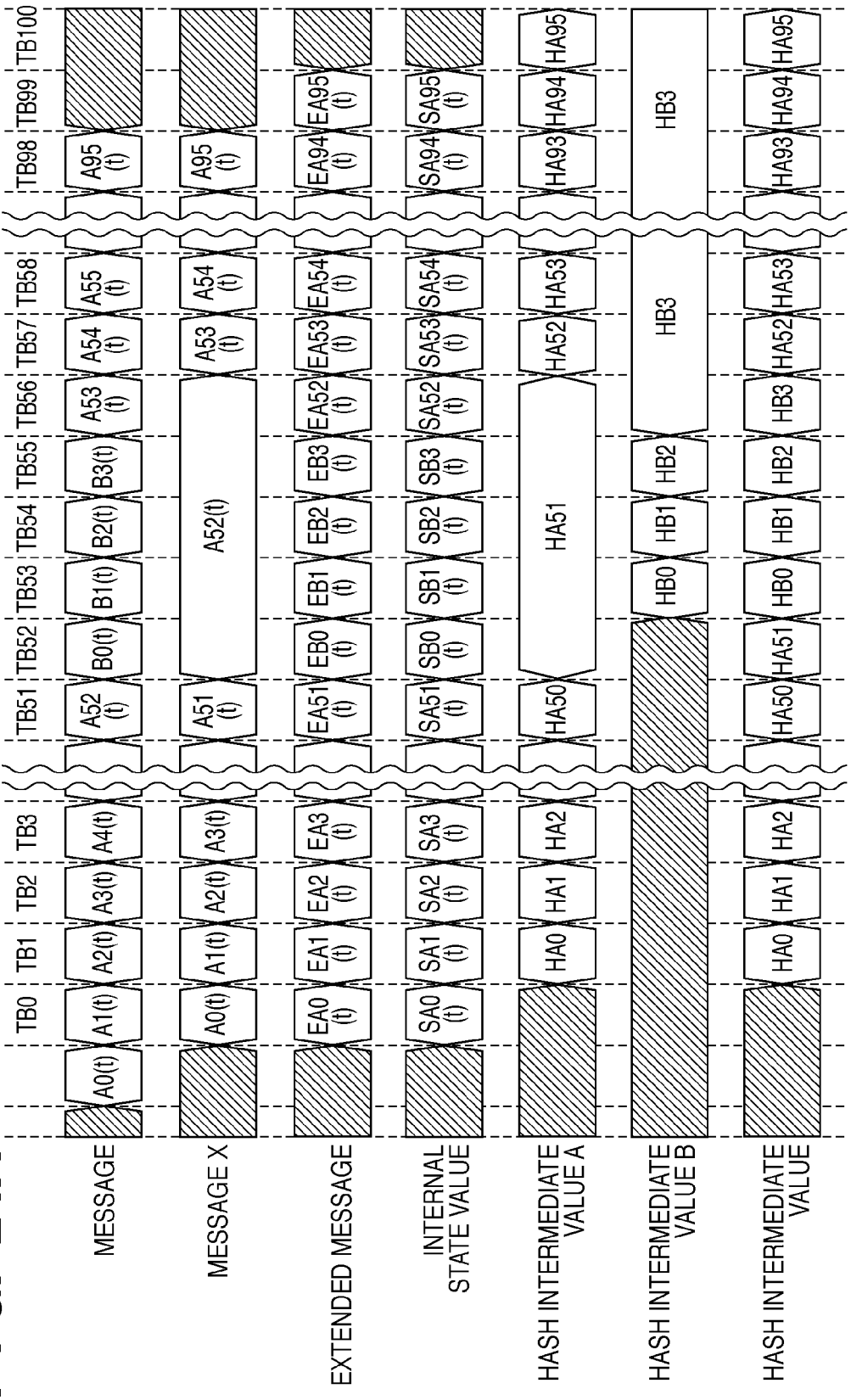

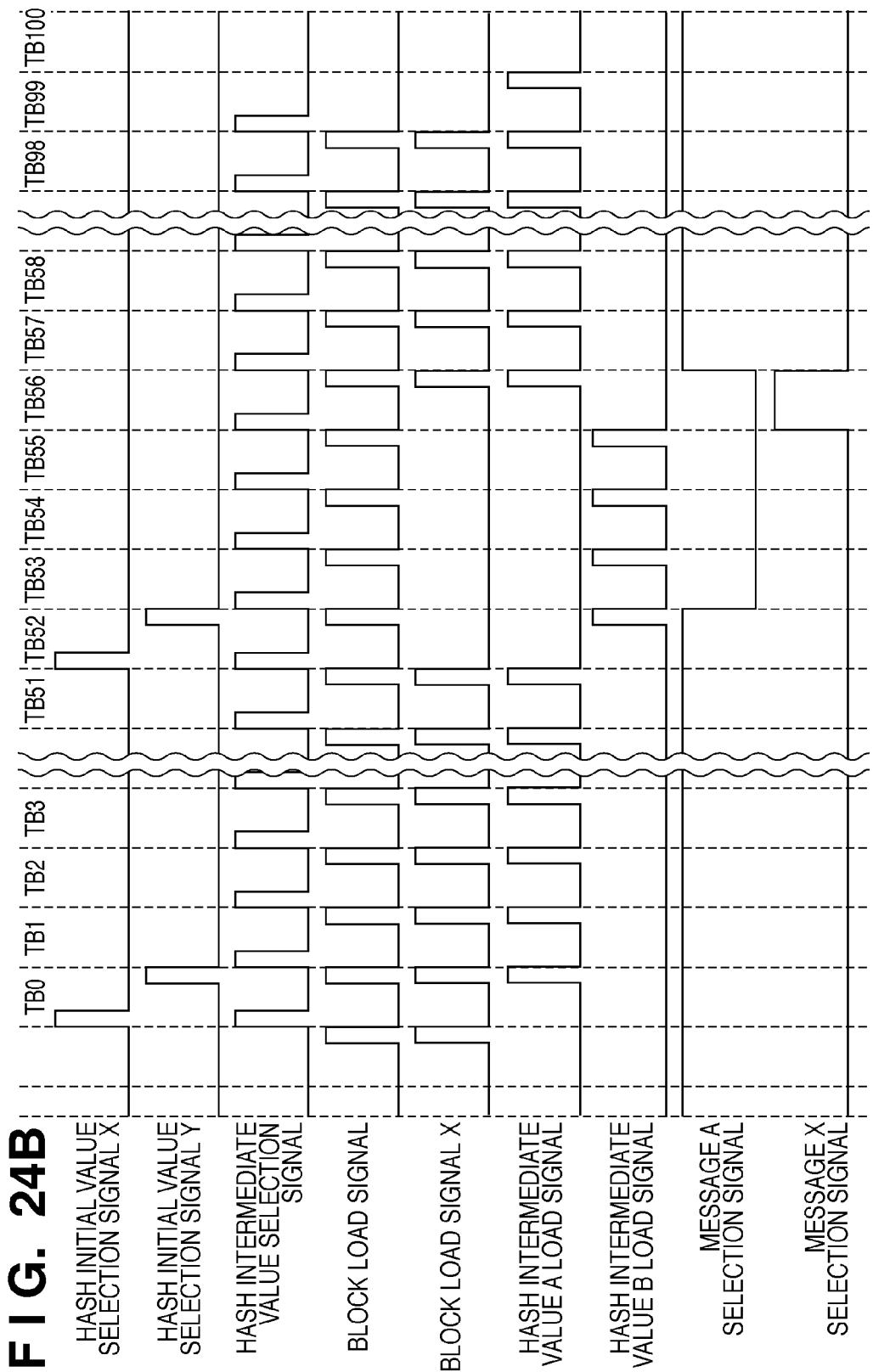

F I G. 27

PROCESS A JOB START SETTING REGISTER

301
| Bits | Name | Access | Function |
|---|---|---|---|
| 0 | A_ENB | R/W | START OF JOB<br>AUTOMATICALLY CLEARED AT JOB END<br>1 : start |

PROCESS A HASH ALGORITHM SETTING REGISTER

302
| Bits | Name | Access | Function |
|---|---|---|---|
| 1:0 | A_ALG | R/W | SELECT HASH ALGORITHM<br>"00" : MD5<br>"01" : SHA1<br>"10" : SHA512 |

PROCESS A BLOCK SETTING REGISTER

303
| Bits | Name | Access | Function |
|---|---|---|---|
| 15:0 | A_BLK | R/W | NUMBER OF BLOCKS OF MESSAGE DATA |

PROCESS A INITIAL VALUE SETTING REGISTER

304
| Bits | Name | Access | Function |
|---|---|---|---|
| 511:0 | A_IV | R/W | INITIAL VALUE |

PROCESS B JOB START SETTING REGISTER

305
| Bits | Name | Access | Function |
|---|---|---|---|
| 0 | B_ENB | R/W | START OF JOB; AUTOMATICALLY<br>CLEARED AT JOB END<br>1 : start |

PROCESS B HASH ALGORITHM SETTING REGISTER

306
| Bits | Name | Access | Function |
|---|---|---|---|
| 1:0 | B_ALG | R/W | SELECT HASH ALGORITHM<br>"00" : MD5<br>"01" : SHA1<br>"10" : SHA512 |

PROCESS B BLOCK SETTING REGISTER

307
| Bits | Name | Access | Function |
|---|---|---|---|
| 15:0 | B_BLK | R/W | NUMBER OF BLOCKS OF MESSAGE DATA |

PROCESS B INITIAL VALUE SETTING REGISTER

308
| Bits | Name | Access | Function |
|---|---|---|---|
| 511:0 | B_IV | R/W | INITIAL VALUE |

F I G. 29A
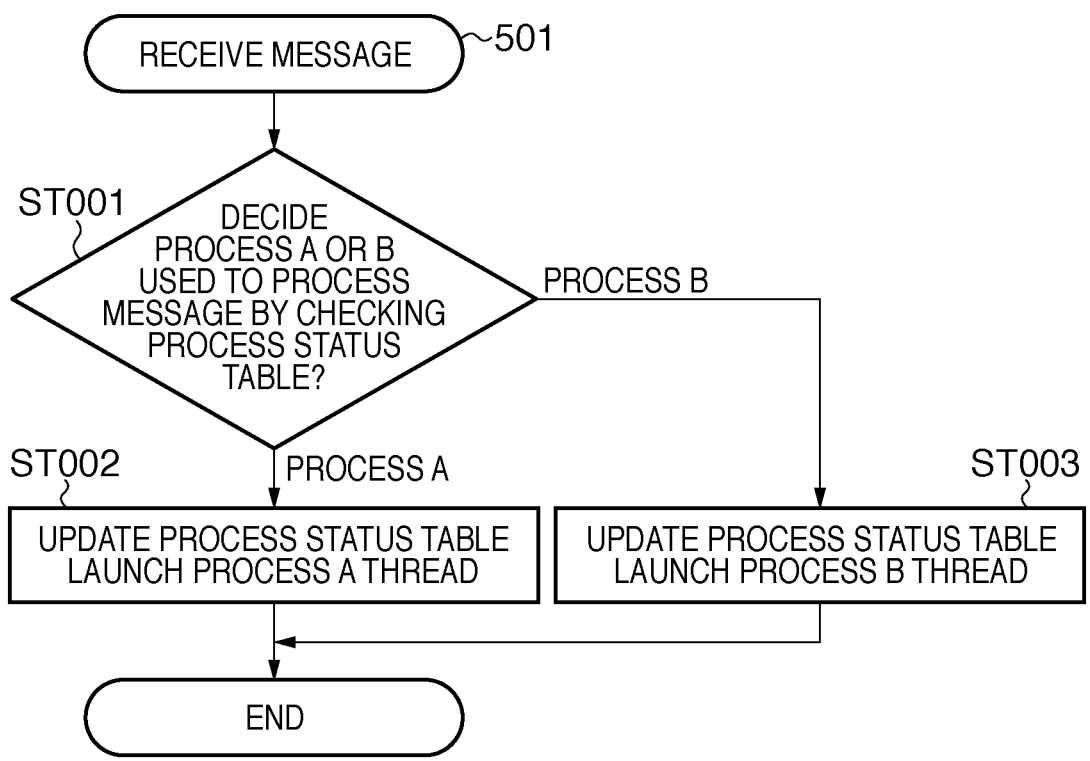

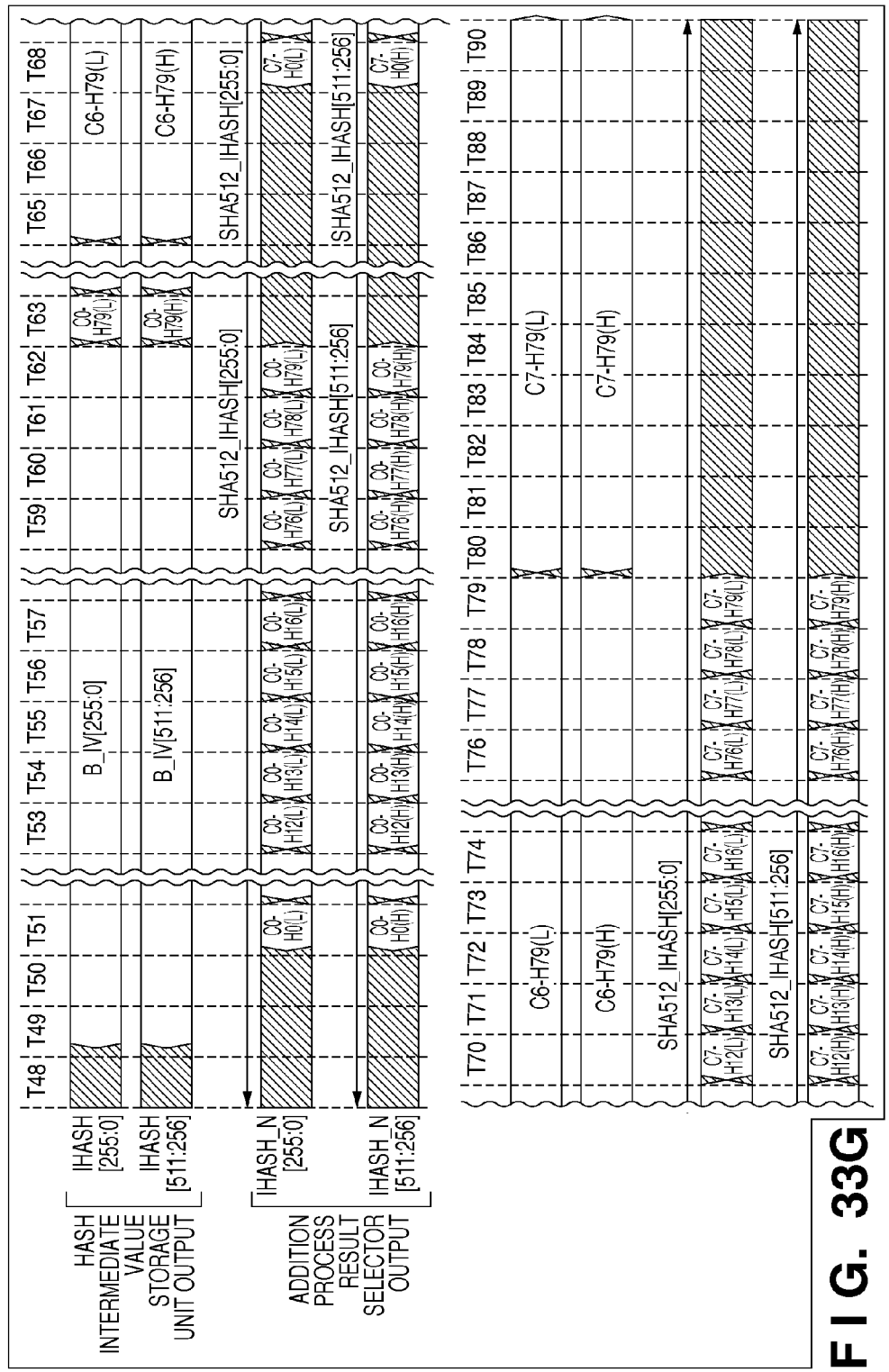
F I G. 33G

| | | SELECTION CONDITION | | | | OUTPUT |
|---|---|---|---|---|---|---|
| | A_EXE | A_ALG | A_STP_CNT | B_EXE | B_ALG | B_STP_CNT | |
| 1001-a | 1 | MD5 | 0~15 | | Don't care | | ExMSG_0[31:0] |
| 1001-b | 1 | SHA512 | 0~15 | | Don't care | | A_MSG[31:0] |
| 1001-c | 0 | Don't care | | 1 | MD5 | 0~15 | B_MSG[31:0] |
| 1001-d | 0 | Don't care | | 1 | SHA512 | 0~15 | |
| 1001-e | | | OTHER THAN ABOVE | | | | ExMSG_N[31:0] |

1002

| | | SELECTION CONDITION | | | | OUTPUT |
|---|---|---|---|---|---|---|
| | A_EXE | A_ALG | A_STP_CNT | B_EXE | B_ALG | B_STP_CNT | |
| 1002-a | 1 | SHA1 | 0~15 | | Don't care | | ExMSG_0[31:0] |
| 1002-b | 1 | SHA512 | 0~15 | | Don't care | | A_MSG[31:0] |
| | | | | | | | A_MSG[63:32] |
| 1002-c | 0 | Don't care | | 1 | SHA1 | 0~15 | B_MSG[31:0] |
| 1002-d | 0 | Don't care | | 1 | SHA512 | 0~15 | B_MSG[63:32] |
| 1002-e | | | OTHER THAN ABOVE | | | | ExMSG_N[63:32] |

| | SELECTION CONDITION | | | OUTPUT |
|---|---|---|---|---|
| | A_EXE | A_ALG | B_EXE | B_ALG | |
| 1201-a | 1 | MD5 | Don't care | | ExMSG_N[31:0] |
| 1201-b | 0 | Don't care | 1 | MD5 | MD5_ExMSG[31:0] |
| 1201-c | OTHER THAN ABOVE | | | | SHA512_ExMSG[31:0] |

1202

| | SELECTION CONDITION | | | OUTPUT |
|---|---|---|---|---|
| | A_EXE | A_ALG | B_EXE | B_ALG | |
| 1202-a | 1 | SHA1 | Don't care | | ExMSG_N[63:32] |
| 1202-b | 0 | Don't care | 1 | SHA1 | SHA1_ExMSG[31:0] |
| 1202-c | OTHER THAN ABOVE | | | | SHA512_ExMSG[63:32] |

| | A_EXE | A_ALG | A_STP_CNT | A_BLK_CNT | B_EXE | B_ALG | B_STP_CNT | B_BLK_CNT | OUTPUT |
|---|---|---|---|---|---|---|---|---|---|
| 1301-a | 1 | MD5 | 0 | 0 | | | Don't care | Don't care | TEMP_0[255:0] |
| 1301-b | 1 | SHA512 | 0 | 0 | | | Don't care | Don't care | A_IV[255:0] |
| 1301-c | 1 | MD5 | 0 | ≠0 | | | Don't care | Don't care | IHASH[255:0] |
| 1301-d | 1 | SHA512 | 0 | ≠0 | | | Don't care | Don't care | IHASH[255:0] |
| 1301-e | 0 | | Don't care | | 1 | MD5 | 0 | 0 | B_IV[255:0] |
| 1301-f | 0 | | Don't care | | 1 | SHA512 | 0 | 0 | B_IV[255:0] |
| 1301-g | 0 | | Don't care | | 1 | MD5 | 0 | ≠0 | IHASH[255:0] |
| 1301-h | 0 | | Don't care | | 1 | SHA512 | 0 | ≠0 | IHASH[255:0] |
| 1301-i | | | | | | OTHER THAN ABOVE | | | TEMP_N[255:0] |

1302

| | A_EXE | A_ALG | A_STP_CNT | A_BLK_CNT | B_EXE | B_ALG | B_STP_CNT | B_BLK_CNT | OUTPUT |
|---|---|---|---|---|---|---|---|---|---|
| 1302-a | 1 | SHA1 | 0 | 0 | | | Don't care | Don't care | TEMP_1[255:0] |
| 1302-b | 1 | SHA512 | 0 | 0 | | | Don't care | Don't care | A_IV[511:256] |
| 1302-c | 1 | SHA1 | 0 | ≠0 | | | Don't care | Don't care | A_IV[511:256] |
| 1302-d | 1 | SHA512 | 0 | ≠0 | | | Don't care | Don't care | IHASH[511:256] |
| 1302-e | 0 | | Don't care | | 1 | SHA1 | 0 | 0 | B_IV[511:256] |
| 1302-f | 0 | | Don't care | | 1 | SHA512 | 0 | 0 | B_IV[511:256] |
| 1302-g | 0 | | Don't care | | 1 | SHA1 | 0 | ≠0 | IHASH[511:256] |
| 1302-h | 0 | | Don't care | | 1 | SHA512 | 0 | ≠0 | IHASH[511:256] |
| 1302-i | | | | | | OTHER THAN ABOVE | | | TEMP_N[511:256] |

| | SELECTION CONDITION | | | OUTPUT |
|---|---|---|---|---|
| | A_EXE | A_ALG | B_EXE | B_ALG | |
| 1401-a | 1 | MD5 | Don't care | | TEMP_N [255:0] |
| 1401-b | 0 | Don't care | 1 | MD5 | SHA512_TEMP [255:128] | MD5_TEMP [127:0] |
| 1401-c | OTHER THAN ABOVE | | | | SHA512_TEMP [255:0] |

1402

| | SELECTION CONDITION | | | OUTPUT |
|---|---|---|---|---|
| | A_EXE | A_ALG | B_EXE | B_ALG | |
| 1402-a | 1 | SHA1 | Don't care | | TEMP_N [511:256] |
| 1402-b | 0 | Don't care | 1 | SHA1 | SHA512_TEMP [511:416] | SHA1_TEMP [159:0] |
| 1402-c | OTHER THAN ABOVE | | | | SHA512_TEMP [511:256] |

| | A_EXE | A_ALG | A_BLK_CNT | A_STP_CNT | B_EXE | B_ALG | B_BLK_CNT | B_STP_CNT | OUTPUT |
|---|---|---|---|---|---|---|---|---|---|
| | | | | SELECTION CONDITION | | | | | |
| 1501-a | 1 | MD5 | 0 | ≠ 65 | Don't care | | | | IHASH_0[255:0] |
| 1501-b | 1 | SHA512 | 0 | ≠ 81 | Don't care | | | | A_IV[255:0] |
| 1501-c | 0 | | Don't care | | 1 | MD5 | 0 | ≠ 65 | B_IV[255:0] |
| 1501-d | 0 | | Don't care | | 1 | SHA512 | 0 | ≠ 81 | |
| 1501-e | | | | | OTHER THAN ABOVE | | | | IHASH_N[255:0] |

1502

| | A_EXE | A_ALG | A_BLK_CNT | A_STP_CNT | B_EXE | B_ALG | B_BLK_CNT | B_STP_CNT | OUTPUT |
|---|---|---|---|---|---|---|---|---|---|
| | | | | SELECTION CONDITION | | | | | |
| 1502-a | 1 | SHA1 | 0 | ≠ 65 | Don't care | | | | IHASH_0[255:0] |
| 1502-b | 1 | SHA512 | 0 | ≠ 81 | Don't care | | | | A_IV[511:256] |
| 1502-c | 0 | | Don't care | | 1 | SHA1 | 0 | ≠ 65 | A_IV[511:256] |
| 1502-d | 0 | | Don't care | | 1 | SHA512 | 0 | ≠ 81 | B_IV[511:256] |
| 1502-e | | | | | OTHER THAN ABOVE | | | | IHASH_N[511:250] |

| | SELECTION CONDITION | | | OUTPUT |
|---|---|---|---|---|
| A_EXE | A_ALG | B_EXE | B_ALG | |
| 1601-a | 1 | MD5 | Don't care | | IHASH_N [255:0] |
| 1601-b | 0 | Don't care | 1 | MD5 | SHA512_IHASH [255:128] | MD5_IHASH [127:0] |
| 1601-c | OTHER THAN ABOVE | | | | SHA512_IHASH [255:0] |

1602

| | SELECTION CONDITION | | | OUTPUT |
|---|---|---|---|---|
| A_EXE | A_ALG | B_EXE | B_ALG | |
| 1602-a | 1 | SHA1 | Don't care | | IHASH_N [511:256] |
| 1602-b | 0 | Don't care | 1 | SHA1 | SHA512_IHASH [511:416] | SHA1_IHASH [159:0] |
| 1602-c | OTHER THAN ABOVE | | | | SHA512_IHASH [511:256] |

HASH VALUE CALCULATION APPARATUS AND METHOD THEREOF

BACKGROUND OF THE INVENTION

1. Field of the Invention

The present invention relates to a hash value calculation apparatus and a method thereof.

2. Description of the Related Art (About Hash Function)

In recent years, since, for example, general home users can connect optical fiber networks with low cost, the infrastructures that support the Internet have been put into place, and communications have been rapidly sped up. Various digital devices can be connected to networks, and communications between digital devices via the Internet are frequently made.

As an indispensable function in such communications between digital devices, authentication of communication partners and messages is demanded in addition to encryption of messages to be exchanged. In this authentication of communication partners and messages between digital devices, an algorithm called a hash function is normally used.

The hash function is an algorithm (function), which inputs a message of an arbitrary bit length and outputs a hash value of a fixed bit length. This hash function calculates a hash value by the following processes.

1) Predetermined data is appended to the rearmost position of an input message of an arbitrary bit length to be an integer multiple of a bit length of a block specified in the algorithm (padding process).

2) The message that has undergone the padding process is extended for respective blocks to generate extended messages (message extension process).

3) A process for changing an internal state value from an initial value using the extended messages (extended blocks) corresponding to blocks is repeated the number of times specified in the algorithm. Note that as the initial value of the internal state value, a predetermined fixed value (to be referred to as a hash initial value hereinafter) which is specified in the algorithm is used for the first block. For the second and subsequent blocks, a hash intermediate value (to be described later) for a block immediately before the block of interest is used (step process).

4) An internal state value after the step processes for the predetermined number of times is added to this addition process result for the immediately preceding block (to be referred to as a hash intermediate value hereinafter) to calculate a new hash intermediate value. Note that for the first block, an internal state value after the step processes for the predetermined number of times is added to a hash initial value to calculate a hash intermediate value (addition process).

5) The processes 2) to 4) are sequentially executed for all blocks. A hash intermediate value obtained upon completion of the processes of all extended messages is output as a hash value.

A combination of the processes 1) to 5) of the hash function will be referred to as a hash value calculation. Note that the processes 3) and 4) of the hash function for a certain block can be executed if the hash initial value is available for the first block or if the hash intermediate value of the immediately preceding block is available for the second and subsequent blocks. Therefore, the hash value calculation is interrupted when a hash intermediate value from the first block to a certain block is calculated, and the process from the next block can be resumed using that hash intermediate value.

There are the following three principal features of the hash function. As the first feature, a hash value can be calculated from a message, but it is practically impossible to calculate back an input message from an output hash value (one-way). As the second feature, when a hash value of a certain message is given, it is very difficult to find out another message having that hash value (weak collision resistance). As the third feature, it is very difficult to find out two different messages whose hash values match (strong collision resistance).

The hash function having such properties is used in various communication protocols such as SSL/TLS and IPSec. A hash function algorithm that can be used is determined by the specification for each communication protocol. In communications between digital devices, a hash algorithm installed in both the digital devices is selected from those which can be used in communication protocols adopted by the digital devices, and is used in an authentication process.

As communications are sped up, needs to guarantee the communication speed in encryption communications are increasing, and required response times are different depending on data to be processed. For example, a long response time of the hash value calculation to some extent is allowed for large-capacity image data for alteration detection. However, a very short response time of the hash value calculation is expected for a short password required for personal authentication. Therefore, it is also demanded for the hash value calculation to speed up the processes and to shorten a response time for data with high priority as much as possible. It is indispensable to implement processes by hardware to speed up the hash value calculation. In case of hardware implementation, since the circuit scale directly relates to cost, one hardware resource such as a hash value calculation circuit that implements the hash value calculation is prepared per system, and the hash value calculations for a plurality of messages are implemented by sharing the one hardware resource.

As described above, the hash value calculation divides a message of an arbitrary bit length into blocks each having a fixed bit length, and processes these blocks. Upon completion of the hash value calculations for all blocks, a hash value for that message can be obtained.

(Switching of Message to be Processed)

A case will be examined below wherein under the condition that the hash value calculations for a plurality of messages are executed using one hardware resource, after the hash value calculation for a very long message starts, a hash processing request for a short message with high priority is received. In such a case, the hash value calculation for the first message requires a lot of time, and a given response time cannot be guaranteed in association with the hash value calculation for the short message with high priority. Hence, in order to guarantee a given response time, a mechanism for speeding up the hash value calculation itself, assigning priority levels to messages to be processed, and processing a message with high priority first is required. For example, the following mechanism is required. That is, the hash value calculation of the long message which is input first is temporarily interrupted, that for the short message with high priority is executed first, and after completion of the process for the short message, the hash value calculation for the long message is resumed.

Conventionally, an encryption processing apparatus which can efficiently interrupt and resume an encryption process such as a hash value calculation independently of various encryption algorithm differences and encryption process mode differences is known (Japanese Patent Laid-Open No. 2006-39000). In this arrangement, a descriptor of a DMA controller includes a format that instructs to interrupt and resume a hash value calculation. When a message is transferred while being appended with interrupt information, an internal state value stored as the calculation result of the hash value calculation up to a certain block in the middle of the message is written out to an external memory. On the other hand, when a message is transferred while being appended with resume information, the internal state value stored in the external memory is read out, and the hash value calculation is resumed from the next block in the message.

(Support of Plural Hash Functions)

On the other hand, hash algorithms that can be used in encryption communication protocols are respectively prescribed. In communications between digital devices, a hash algorithm that can be commonly executed by both communication devices is selected from those installed in the respective communication devices. Hash algorithms that can be executed by partner communication devices may often be different, and a device which is required to make encryption communications with many communication devices has to execute many different hash algorithms.

Furthermore, in recent years, the vulnerability of SHA-1 and MD5, which have been popularly used as the standards of hash algorithms, has been pointed out, and a transition to hash algorithms with higher security, which are generically named as SHA-2, is recommended. Even in standard encryption communication protocols, it is presumed to adopt hash algorithms with a multi-bit length such as SHA-2 in the near future. However, new products can adopt new hash algorithms, but there are many digital devices which support only old hash algorithms and are difficult to undergo running changes. Therefore, both old hash algorithms which have been conventionally used as standards, and new hash algorithms with high security have to be supported so as to make secure communications with various digital devices. Japanese Patent Laid-Open No. 2004-53716 discloses a hash function processing circuit which implements a plurality of hash functions as hardware.

In case of a hash value calculation circuit which sequentially executes hash value calculations for respective messages, when the hash value calculation for a certain message starts, that for another message has to wait for completion of this hash value calculation. When the currently processed message is very long, and another waiting message is very short, the processing performance within a predetermined response time for all messages cannot be guaranteed. In order to solve such problem, it is desired to provide a mechanism that can simultaneously process a message during processing of another message.

(Problems About Switching of Message to be Processed)

However, in the arrangement of Japanese Patent Laid-Open No. 2006-39000, data stored as an intermediate arithmetic result of the hash value calculation is an internal state value before the addition process, and a hash intermediate value after the addition process required to resume the hash value calculation is not stored. Therefore, only this arrangement cannot actually resume the hash value calculation. In order to interrupt and resume the hash value calculation, a hash intermediate value of the immediately preceding block has to be separately stored in addition to the aforementioned arrangement. Alternatively, in order to generate a hash intermediate value of the immediately preceding block, a hash intermediate value of a block before the immediately preceding block has to be separately stored, and has to be added to an internal state value stored in the external memory. In this manner, in the framework of the conventional arrangement, the amount of data to be stored increases, and a temporal overhead about the addition process also increases.

With an arrangement by adding a hash intermediate value storing or generating apparatus to the arrangement of Japanese Patent Laid-Open No. 2006-39000, hash value calculations may be executed by switching a plurality of messages in the middle of processing. However, with this arrangement, of a plurality of blocks which form a message, a hash value calculation intermediate value up to an intermediate block is written out to the external memory to interrupt the process, and is read out from the external memory upon resuming the process. For this reason, an extra time is required to read/write the hash value calculation intermediate value from/in the memory.

For example, the bit length of a hash intermediate value amounts to 160 bits for SHA-1, 256 bits for SHA-256, and 512 bits for SHA-512. Memory read/write accesses are normally made in 32-bit or 64-bit units, and the intermediate arithmetic result of the hash value calculation is written in or read out from the memory to require several to several ten cycles. Since the memory read/write accesses of data further require an extra time such as a waiting time required to assure the bus right, a large temporal overhead other than the hash value calculation itself is required to interrupt and resume the hash value calculation based on the aforementioned related art.

When the hash value calculations for a plurality of messages are switched in the middle of the processing in the above arrangement, an internal state value obtained as a result of the hash value calculation up to an intermediate block in the hash value calculation for one message has to be written in the external memory connected to a bus. However, leaking the internal state value outside a hash value calculator means an increase in risk of theft, thus posing a security problem.

Upon interrupting and resuming the hash value calculation, it is desired to reduce read/write overheads of not only the intermediate arithmetic result of the hash value calculation, but also the message itself on the external memory. For example, in case of SHA-1, the bit length of a block as a processing unit of a message is 512 bits, and memory read/write accesses in 32-bit or 64-bit units require 16 or 8 cycles. When the hash value calculation is applied to data of blocks of a new message or to blocks of a temporarily discarded message, a time required to read out the blocks of the message from the external memory imposes a large overhead of the hash value calculation.

As described in Japanese Patent Laid-Open No. 2006-39000, the descriptor format of the DMA controller which can give the instruction to interrupt and resume the hash value calculation is provided to eliminate the intervention of software required to make condition determination at the time of interrupt/resume control, thus efficiently interrupting and resuming the hash value calculation. However, Japanese Patent Laid-Open No. 2006-39000 discloses only a technique in which after a CPU recognizes in advance a part to be interrupted and resumed of data of a message before transfer of data to the hash value calculator, the CPU transfers that data to the hash value calculator together with information indicating the presence/absence of interruption/resuming. That is, this reference does not disclose any technique for interrupting and resuming processing of a message after a hash processing request for data of the message is temporarily issued to the hash value calculator.

(Problem about Support of Plural Hash Functions)

In case of hardware implementation to speed up the hash value calculation, not only hash algorithm circuits but also storage units which respectively store data that has undergone the message extension process, data that has undergone the step process, and data that has undergone the addition process are required. The circuit scale increases when hardware components which process many different hash algorithms and a new hash algorithm with high security are respectively arranged. Especially, the new hash algorithm with high security requires a larger-capacity storage unit since the bit length of its hash value is large. However, the circuit scale of the hardware is required to be suppressed as much as possible so as to generally attain power and cost savings.

A conventional hash apparatus includes a plurality of dedicated circuits which process different hash algorithms, and a storage unit which is commonly used by these plurality of dedicated circuits, and executes a hash value calculation by selecting one of the hash algorithms. In this case, since the plurality of hash algorithms commonly use the storage unit, it is impossible to simultaneously execute hash value calculations for a plurality of messages, and the processing performance within a predetermined response time for all messages consequently cannot be guaranteed.

As in the arrangement described in Japanese Patent Laid-Open No. 2004-53716, a plurality of dedicated circuits which process different hash algorithms are arranged, and only a dedicated circuit corresponding to the requested hash algorithm is operated. However, in this case, not only the circuit scale increases considerably, but also variations of consumption power of the entire hash value calculation apparatus become large. Hence, it becomes easy to externally analyze internal information of the circuit by power analysis. For this reason, such arrangement is not preferable also in terms of tamper resistance (security).

SUMMARY OF THE INVENTION

First, the present invention aims to provide a hash value calculation technique which can switch hash value calculations for a plurality of messages in the middle of the processing without any processing performance drop, and can assure high security.

Second, the present invention aims to provide a hash value calculation technique which allows simultaneously executing a plurality of hash algorithms, and can assure a small circuit scale and high security.

According to one aspect of the present invention, a hash value calculation apparatus, which calculates a hash value of a message, includes:

an input unit adapted to input an extended block obtained from a message to be processed;

a hash value calculation unit adapted to execute a hash value calculation of the input block and to output a hash intermediate value;

a plurality of intermediate value storage units adapted to store the hash intermediate value output by the hash value calculation unit for the message to be processed;

an output unit adapted to output a hash intermediate value associated with all blocks of the message to be processed as a hash value of the message; and a hash value calculation control unit adapted to control hash value calculations for a plurality of messages by switching the intermediate value storage units used to store the hash intermediate value output from the hash value calculation unit.

According to another aspect of the present invention, a hash value calculation apparatus, which calculates a hash value of a message, includes:

an input unit adapted to input an extended block obtained from a message to be processed;

a plurality of hash value calculation units adapted to execute a hash value calculation of the input block and to output a hash intermediate value, the plurality of hash value calculation units being arranged in correspondence with different hash algorithms;

a switching unit adapted to switch the hash value calculation unit to be activated, based on a hash algorithm to be used;

an intermediate value storage unit adapted to store a hash intermediate value output from the active hash value calculation unit in association with a message to be processed; and an output unit adapted to output a hash intermediate value associated with all blocks of the message to be processed as a hash value of the message.

According to still another aspect of the present invention, a hash value calculation method for a hash value calculation apparatus, which calculates a hash value of a message, includes:

an input step of inputting an extended block obtained from a message to be processed;

a hash value calculation step of executing a hash value calculation of the input block and outputting a hash intermediate value;

a storage step of storing the hash intermediate value output in the hash value calculation step for the message to be processed in one of a plurality of intermediate value storage units;

an output step of outputting a hash intermediate value associated with all blocks of the message to be processed as a hash value of the message; and a hash value calculation control step of controlling hash value calculations for a plurality of messages by switching the intermediate value storage units used to store the hash intermediate value output in the hash value calculation step.

According to yet another aspect of the present invention, a hash value calculation method for a hash value calculation apparatus, which calculates a hash value of a message, includes:

an input step of inputting an extended block obtained from a message to be processed;

a hash value calculation step of executing, in one of a plurality of hash value calculation units arranged in correspondence with different hash algorithms, a hash value calculation of the input block and outputting a hash intermediate value;

a switching step of switching the hash value calculation unit to be activated based on a hash algorithm to be used;

an intermediate value storage step of storing, in a storage unit, a hash intermediate value output in the active hash value calculation step in association with a message to be processed; and an output step of outputting a hash intermediate value associated with all blocks of the message to be processed as a hash value of the message.

Further features of the present invention will become apparent from the following description of exemplary embodiments with reference to the attached drawings.

BRIEF DESCRIPTION OF THE DRAWINGS

FIG. 5 is a view showing the block configurations of messages A and B;

FIG. 6 is a view showing the transfer order of blocks of messages A and B;

FIG. 7 is a flowchart showing the operation sequence of hash value calculations for a plurality of messages in the hash value calculation system;

FIGS. 8A to 8E are timing charts showing the hash value calculations for respective steps;

FIGS. 9A to 9E are timing charts showing the hash value calculations for respective steps;

FIGS. 10A to 10E are timing charts showing the hash value calculations for respective steps;

FIGS. 11A and 11B are timing charts showing the hash value calculations for respective blocks;

FIG. 12 is a block diagram showing the internal arrangement of a hash value calculation circuit;

FIGS. 14A and 14B are flowcharts showing the operation sequence of the hash value calculations for a plurality of messages in the hash value calculation system;

FIGS. 15A to 15E are timing charts showing the hash value calculations for respective steps;

FIGS. 16A to 16E are timing charts showing the hash value calculations for respective steps;

FIGS. 17A and 17B are timing charts showing the hash value calculations for respective blocks;

FIGS. 21A to 21G are timing charts showing the hash value calculations for respective steps;

FIGS. 23A to 23F are timing charts showing the hash value calculations for respective steps;

FIGS. 24A and 24B are timing charts showing the hash value calculation for respective blocks;

FIG. 27 is a view showing an example of the specifications of registers;

FIGS. 29A to 29C are flowcharts showing the operation sequence of a CPU for each message reception in the hash value calculation system;

FIGS. 33A to 33H are timing charts showing an example of details of the hash value calculations;

FIG. 35 is a view showing an example of the selection policies of data ExMSG_0 and ExMSG_1;

FIG. 37 is a view showing an example of the selection policies of data ExMSG_N[31:0] and ExMSG_N[63:32];

FIG. 38 is a view showing an example of the selection policies of data TEMP_0 and TEMP_1;

FIG. 39 is a view showing an example of the selection policies of data TEMP_N[255:0] and TEMP_N[511:256];

FIG. 40 is a view showing an example of the selection policies of data IHASH_0 and IHASH_1; and FIG. 41 is a view showing an example of the selection policies of data IHASH_N[255:0] and IHASH_N[511:256].

DESCRIPTION OF THE EMBODIMENTS

Figure 1:
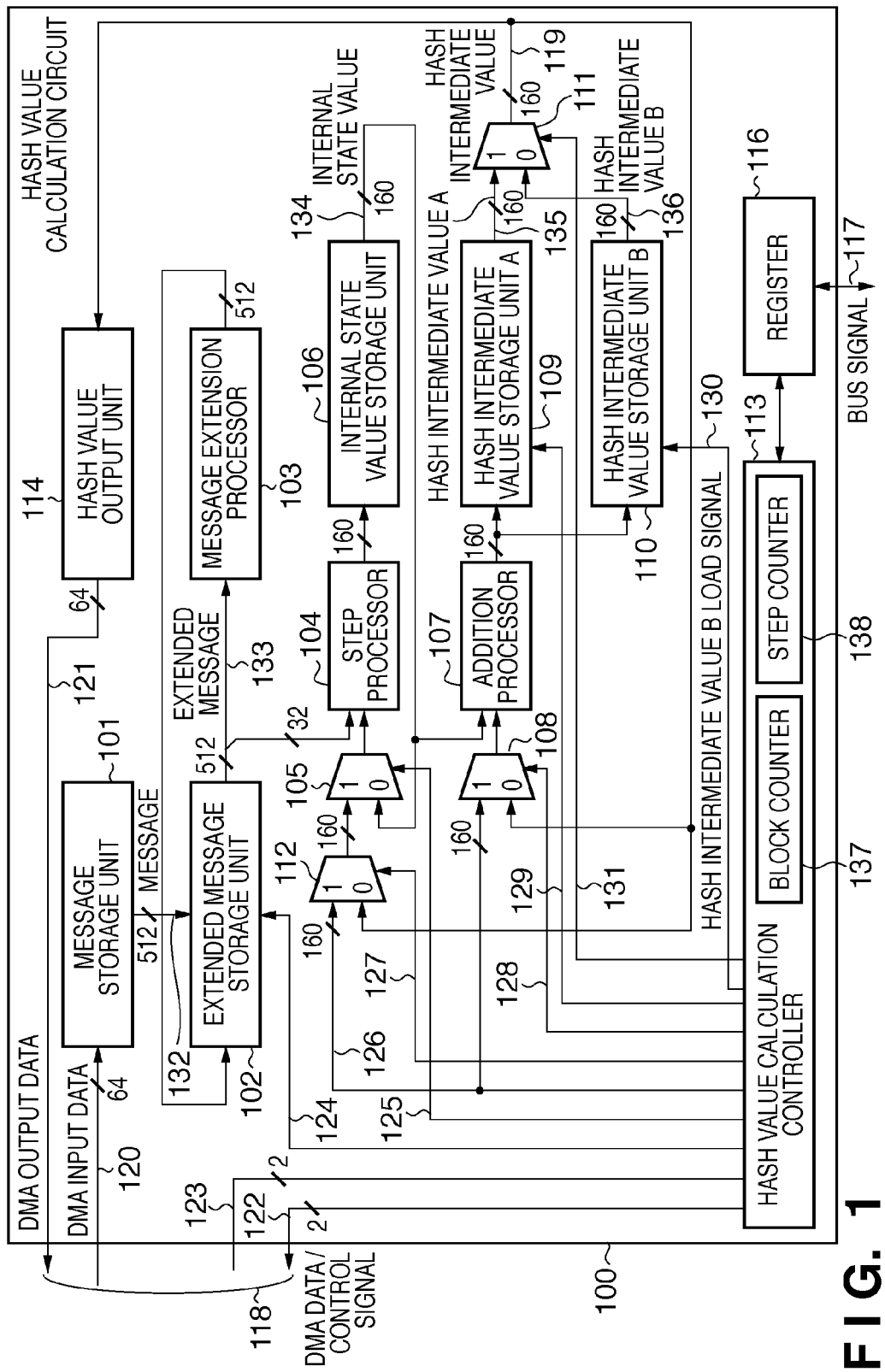
FIG. 1 is a block diagram showing the internal arrangement of a hash value calculation circuit.

Embodiments according to the present invention will be described in detail hereinafter with reference to the accompanying drawings. However, components described in these embodiments are merely examples, which do not limit the scope of the present invention. All combinations of characteristic features described in the embodiments are not always indispensable to the solving means of the present invention.

First Embodiment

This embodiment will exemplify an arrangement in which SHA-1 is applied as a hash function used to calculate a hash value. In SHA-1, a message is processed for respective 512-bit blocks, and a 160-bit hash value is output as the final result of a hash value calculation. The hash value calculation of SHA-1 includes a series of processes as follows.

A message is divided into 512-bit blocks, and predetermined data is added to the rearmost position of the message so that the last block has 512 bits (to be referred to as a padding process hereinafter).

A message extension process, step processes of 80 steps, and an addition process to be described later are applied to each 512-bit block to generate a hash intermediate value.

The message extension process generates 80 32-bit extended messages (extended blocks) based on 512-bit block data. The source 512-bit block data is used intact as the 0th to 15th extended messages. As for 16th and subsequent extended messages, a predetermined arithmetic process is applied to the (n−16)-th to (n−1)-th messages to generate an n-th extended message.

The step processes sequentially update an internal state value by applying predetermined arithmetic operations using 80 extended messages for respective 80 steps with respect to an initial value (hash initial value) of a predetermined internal state value including five 32-bit data. In the first 0th step (to be referred to as step 0 hereinafter), a predetermined arithmetic process is applied to the hash initial value using the 0th extended message to update the internal state value. In each of the remaining 79 steps (to be referred to as step n hereinafter), the predetermined arithmetic process is applied to the internal state value of step (n−1) using the n-th extended message, thereby updating the internal state value.

The addition process adds the internal state value as the step process result of the 80th step of a block of interest to a hash intermediate value from the first block to the immediately preceding block.

The hash value calculation result from the first block until a certain block of the message is a hash intermediate value, and the hash intermediate value from the first block until the last block is a hash value for the entire message.

(Arrangement of Hash Value Calculation Circuit)

FIG. 1 is a block diagram showing the arrangement of a hash value calculation circuit according to the first embodiment of the present invention.

Reference numeral 100 denotes a hash value calculation circuit. Reference numeral 101 denotes a message storage unit which temporarily stores a message to be DMA-transferred by an external DMA controller (to be referred to as DMAC hereinafter) to be described later from an external memory to the hash value calculation circuit 100.

Reference numeral 102 denotes an extended message storage unit which temporarily stores extended messages. Reference numeral 103 denotes a message extension processor which inputs extended messages temporarily stored in the extended message storage unit 102 and executes a message extension process.

Reference numeral 104 denotes a step processor which sequentially executes step processes of step 0 to step 79 for each step with respect to each block of an input message. Reference numeral 105 denotes a selector which selects an internal state value to be processed by the step processor 104.

Reference numeral 106 denotes an internal state value storage unit which temporarily stores an internal state value as the output from the step processor 104. Reference numeral 107 denotes an addition processor which executes an addition process of the internal state value after completion of processes for all the steps and a hash intermediate value until the immediately preceding block.

Reference numeral 108 denotes a selector which selects a hash intermediate value to be input to the addition processor 107. Reference numerals 109 and 110 denote hash intermediate value storage units (first and second intermediate value storage units) which store a hash intermediate value as the output from the addition processor 107. Reference numeral 111 denotes a selector which selects one of hash intermediate values stored in the hash intermediate value storage units 109 and 110.

Reference numeral 112 denotes a selector which selects one of a hash intermediate value as the hash value calculation result until the immediately preceding block, and a hash initial value. Reference numeral 113 denotes a hash value calculation controller which generates various signals required to control data exchange between the external DMAC and a CPU, and the hash value calculation.

Reference numeral 114 denotes a hash value output unit which appends 32-bit dummy data to a 160-bit hash value for respective divisions of a message to obtain three 64-bit data, and transmits these data outside the hash value calculation circuit 100 by DMA transfer. Reference numeral 116 denotes a register which stores operation parameters of the hash value calculation circuit 100, which are set by a CPU outside the hash value calculation circuit 100.

Reference numeral 117 denotes a bus signal which includes an address signal, data signal, and control signal used to input/output data to/from the register 116. Reference numeral 118 denotes a DMA data/control signal to be exchanged with the DMAC, which includes DMA input data, DMA output data, a DMA request signal, and a DMA acknowledge signal (to be described later).

Reference numeral 119 denotes a hash intermediate value selected by the selector 111. Reference numeral 120 denotes DMA input data to be output from the DMAC to the hash value calculation circuit 100. The message storage unit 101 stores this DMA input data.

Reference numeral 121 denotes DMA output data to be output from the hash value calculation circuit 100 to the DMAC. As this DMA output data, the hash value output unit 114 outputs a hash value or hash intermediate value. Reference numeral 122 denotes a DMA request signal to be output from the hash value calculation circuit 100 to the DMAC. The hash value calculation controller 113 asserts a DMA read request signal and DMA write request signal respectively when it issues a read request of input data and a write request of output data.

Reference numeral 123 denotes a DMA acknowledge signal to be output from the DMAC to the hash value calculation circuit 100. That is, the DMAC asserts a DMA read acknowledge signal and outputs input data in response to a read request of input data, and asserts a DMA write acknowledge signal and fetches output data in response to a write request of output data. Note that the DMA request signal 122 and DMA acknowledge signal 123 include read/write signals together.

Reference numeral 124 denotes a block load signal, which is output from the hash value calculation controller 113 so as to load extended messages stored in the message storage unit 101 onto the extended message storage unit 102 at the beginning of a hash value calculation for each block. Reference numeral 125 denotes a hash intermediate value selection signal which is output from the hash value calculation controller 113 as a control signal of the selector 105.

Reference numeral 126 denotes a signal, which indicates an initial value of the hash value calculation, which is set in the register 116, that is, a hash initial value to be output from the hash value calculation controller 113 to the selector 112. Reference numeral 127 denotes a hash initial value selection signal X which is output from the hash value calculation controller 113 as a control signal of the selector 112.

Reference numeral 128 denotes a hash initial value selection signal Y which is output from the hash value calculation controller 113 as a control signal of the selector 108. Reference numeral 129 denotes a hash intermediate value A load signal, which is output from the hash value calculation controller 113 as a load signal of a hash intermediate value A 135 in the hash intermediate value storage unit A 109.

Reference numeral 130 denotes a hash intermediate value B load signal, which is output from the hash value calculation controller 113 as a load signal of a hash intermediate value B 136 in the hash intermediate value storage unit B 110. Reference numeral 131 denotes a message A selection signal, which is output from the hash value calculation controller 113 as a control signal of the selector 111.

Reference numeral 132 denotes a message which is output from the message storage unit 101 to the extended message storage unit 102. Reference numeral 133 denotes an extended message which is output from the extended message storage unit 102 to the message extension processor 103.

Reference numeral 134 denotes an internal state value as the output from the internal state value storage unit 106. Reference numeral 135 denotes a hash intermediate value A as the output from the hash intermediate value storage unit A 109. Reference numeral 136 denotes a hash intermediate value B as the output from the hash intermediate value storage unit B 110.

Reference numeral 137 denotes a block counter which counts the number of blocks to be processed for each message, and is cleared upon completion of the hash value calculation for the predetermined number of blocks that form a message. Reference numeral 138 denotes a step counter which counts the number of steps to be processed for each block of a message, and is cleared after the predetermined number of steps is counted.

Note that in this embodiment, the counter value of the block counter 137 indicates a value (n+1) with respect to the n-th (n=0, . . . ) block process. The counter value of the step counter 138 indicates a value (n+1) with respect to the n-th (n=0, . . . , 79) step process.

In this embodiment, the hash value calculation circuit 100 executes the message extension process, step process, and addition process of the hash value calculation except for the padding process. The padding process is executed by components other than the hash value calculation circuit 100 in a hash value calculation system 200 to be described later, that is, a CPU 201 and memory 202 to be described later.

(Arrangement of Hash Value Calculation System)

Figure 2:
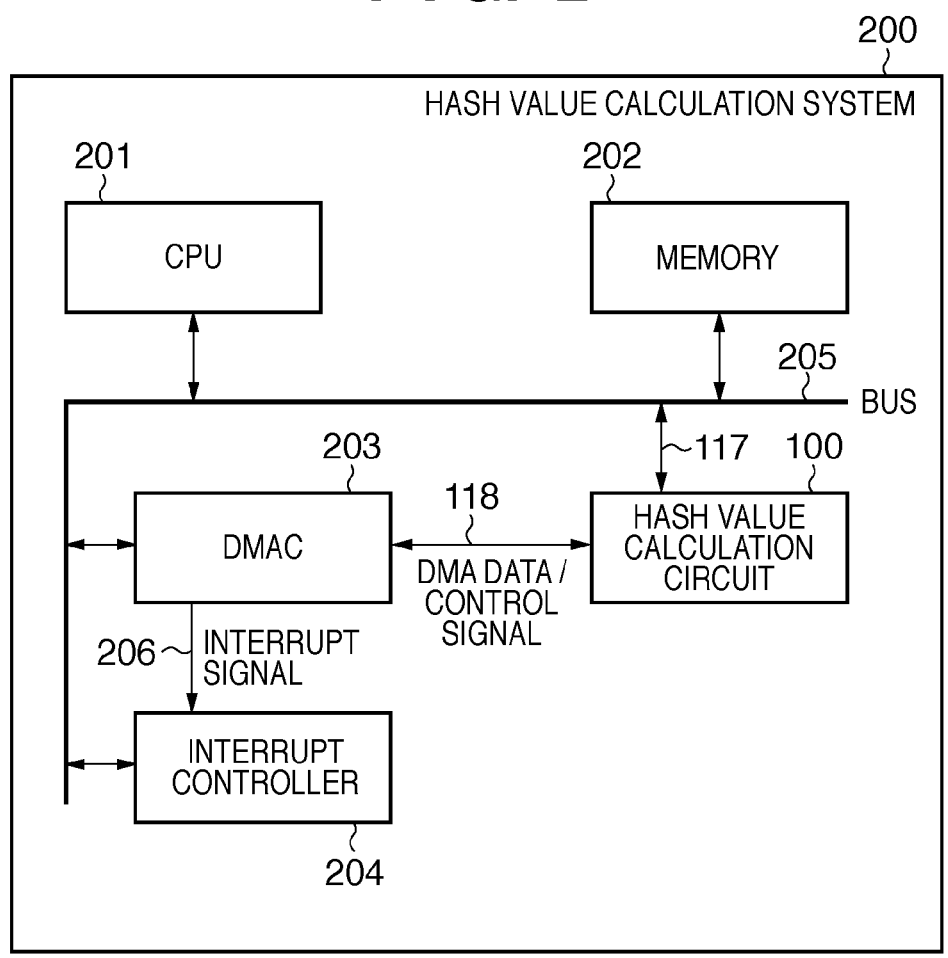
FIG. 2 is a block diagram showing the principal part of the system arrangement required to operate the hash value calculation circuit.

FIG. 2 is a block diagram showing an example of the arrangement of a system required to operate the hash value calculation circuit 100. Reference numeral 200 denotes a hash value calculation system. Reference numeral 201 denotes a CPU which controls the operation of the hash value calculation system 200. Reference numeral 202 denotes a memory used to store messages which are to undergo hash value calculations, hash values, and the like.

Reference numeral 203 denotes a direct memory access controller (DMAC) which transfers a message from the memory 202 to the hash value calculation circuit 100, and transfers a hash value from the hash value calculation circuit 100 to the memory 202. Reference numeral 204 denotes an interrupt controller which controls interrupt signals of the hash value calculation system 200. Reference numeral 205 denotes a bus which connects the hash value calculation circuit 100, CPU 201, memory 202, DMAC 203, and interrupt controller 204, and includes an address signal, data signal, and control signal.

Reference numeral 206 denotes an interrupt signal from the DMAC 203 to the interrupt controller 204. In this embodiment, after the DMAC 203 transfers a hash value from the hash value calculation circuit 100 to the memory 202, it notifies the interrupt controller 204 of an interrupt from the DMAC 203 using the interrupt signal 206. The interrupt controller 204 notifies the CPU 201 of hash value storage using an interrupt signal (not shown).

(Overview of Hash Value Calculation)

Figure 3:
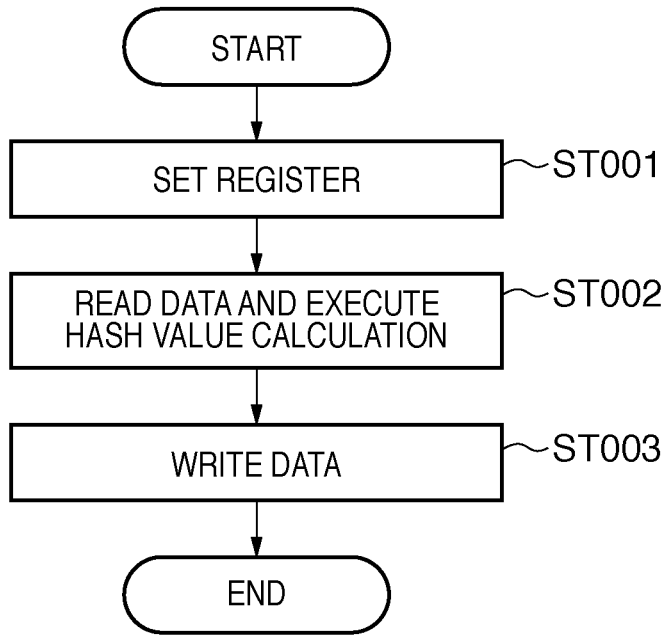
FIG. 3 is a flowchart showing the operation sequence of a hash value calculation for each message in the hash value calculation system.

FIG. 3 is a flowchart showing the operation sequence of a hash value calculation for each message in the hash value calculation system of this embodiment.

In ST001, the CPU 201 sets operation parameters of a hash value calculation for a message of interest in the register 116 of the hash value calculation circuit 100 via the bus signal 117.

In ST002, the hash value calculation circuit 100 reads data of the message by DMA read transfer, executes a hash value calculation for each block, and generates a hash value up to the last block.

In ST003, the hash value calculation circuit 100 outputs the hash value of the message of interest by DMA write transfer.

(Storage Contents of Register)

Figure 4:
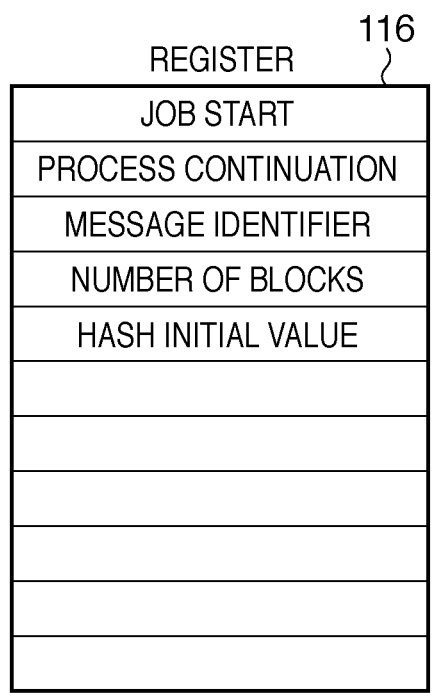
FIG. 4 is a view showing the internal configuration of a register in the hash value calculation circuit.
Figure 8C:
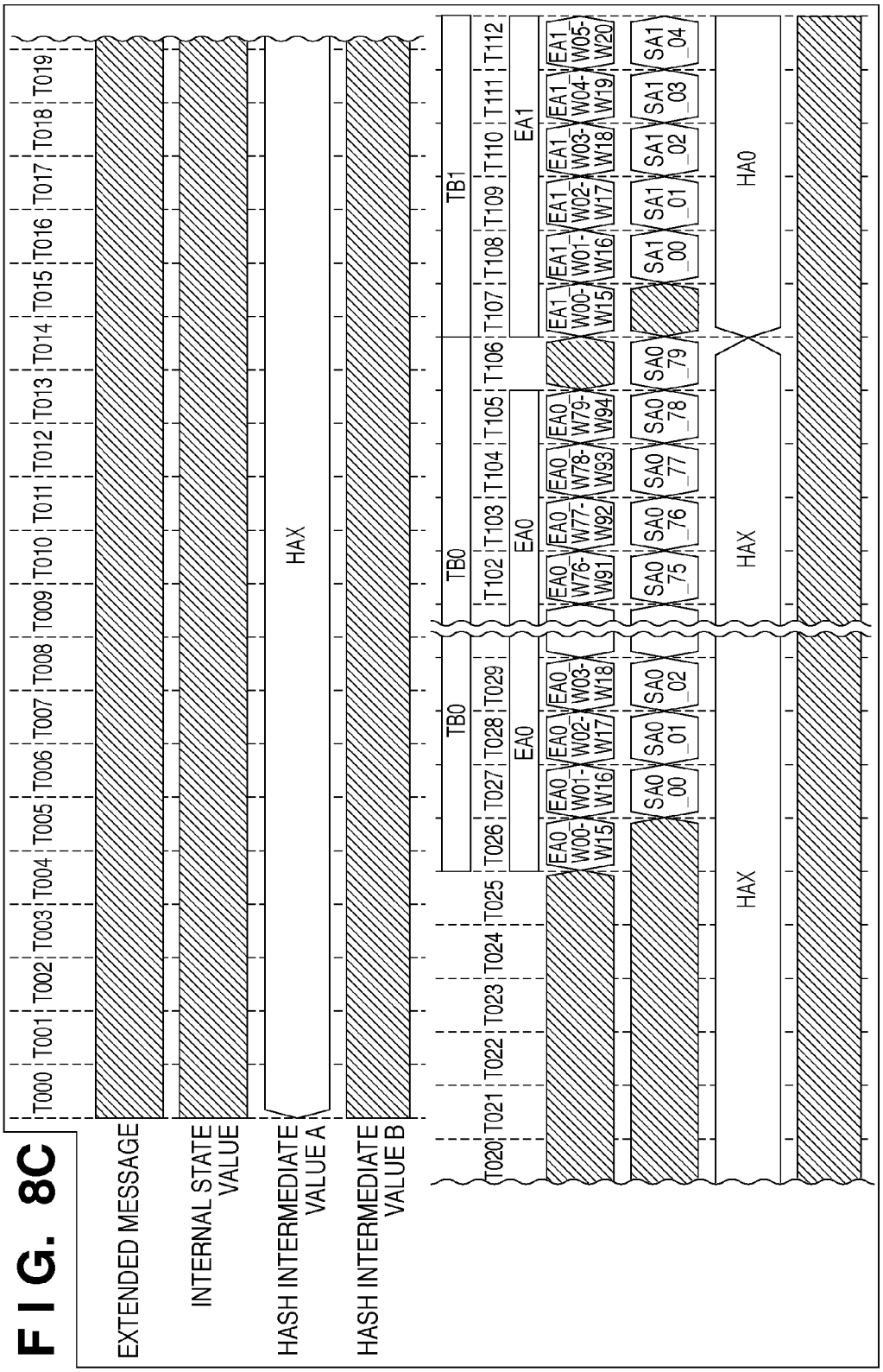
Figure 9B:
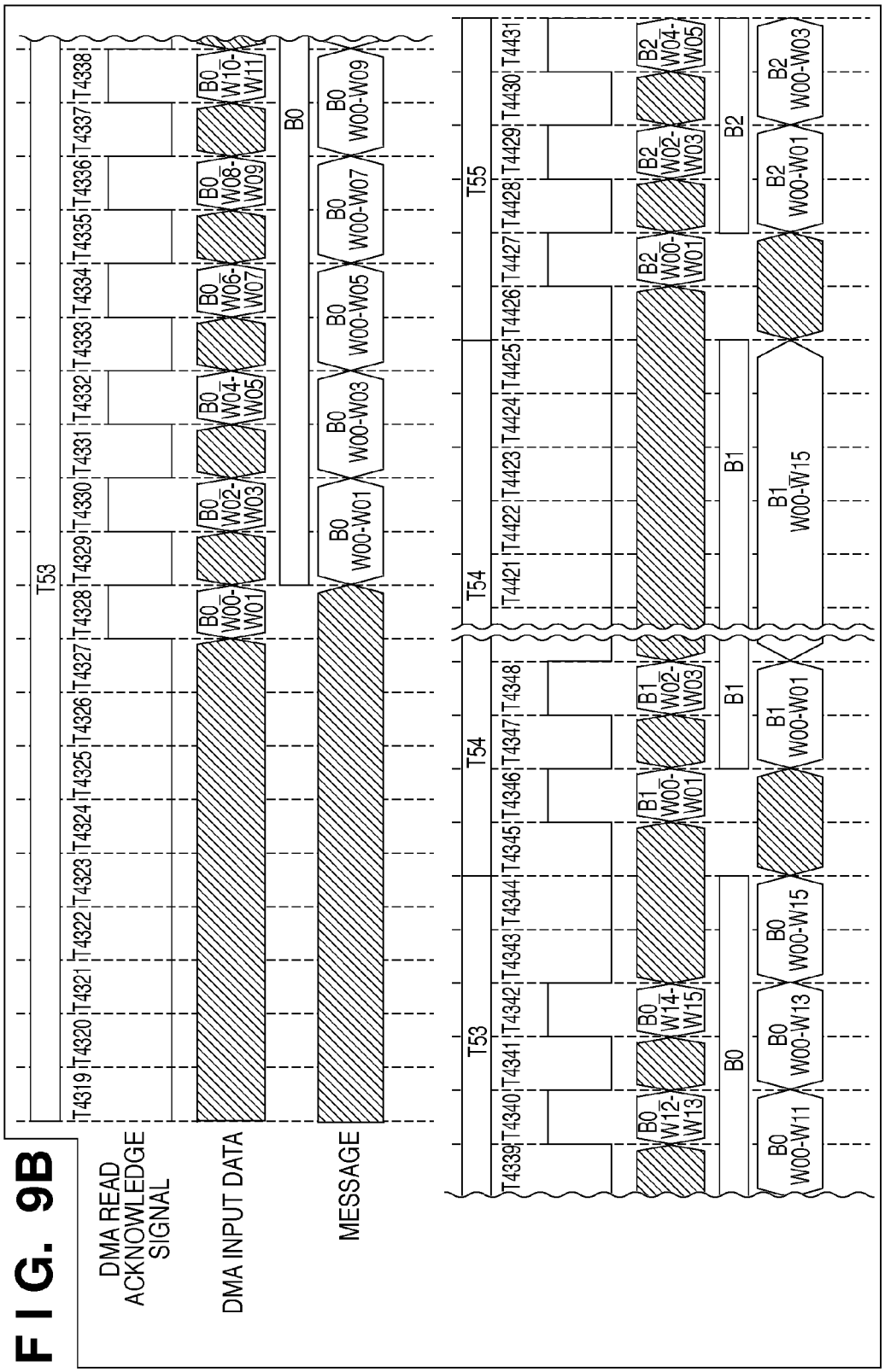
Figure 10A:
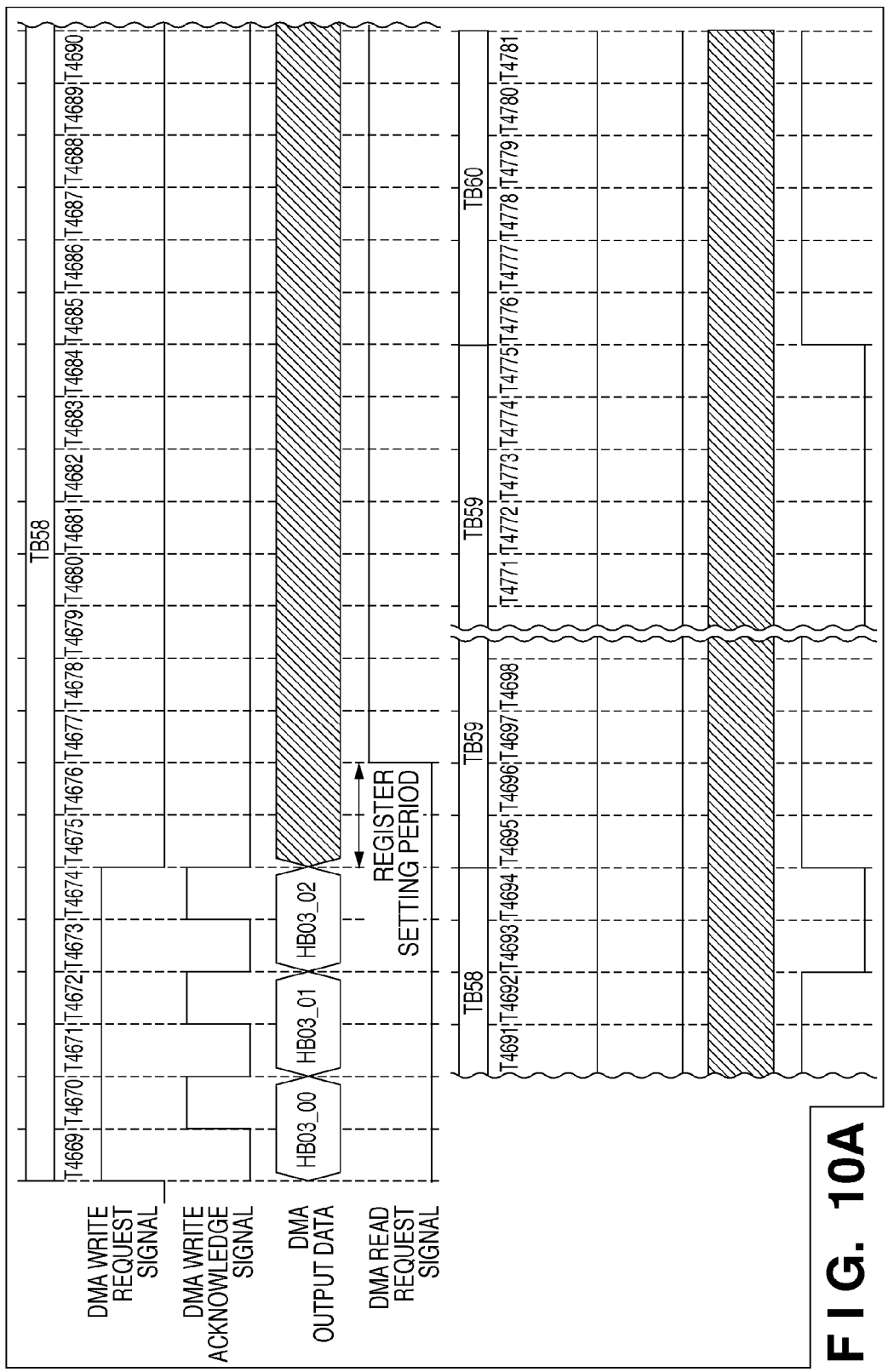
Figure 10B:
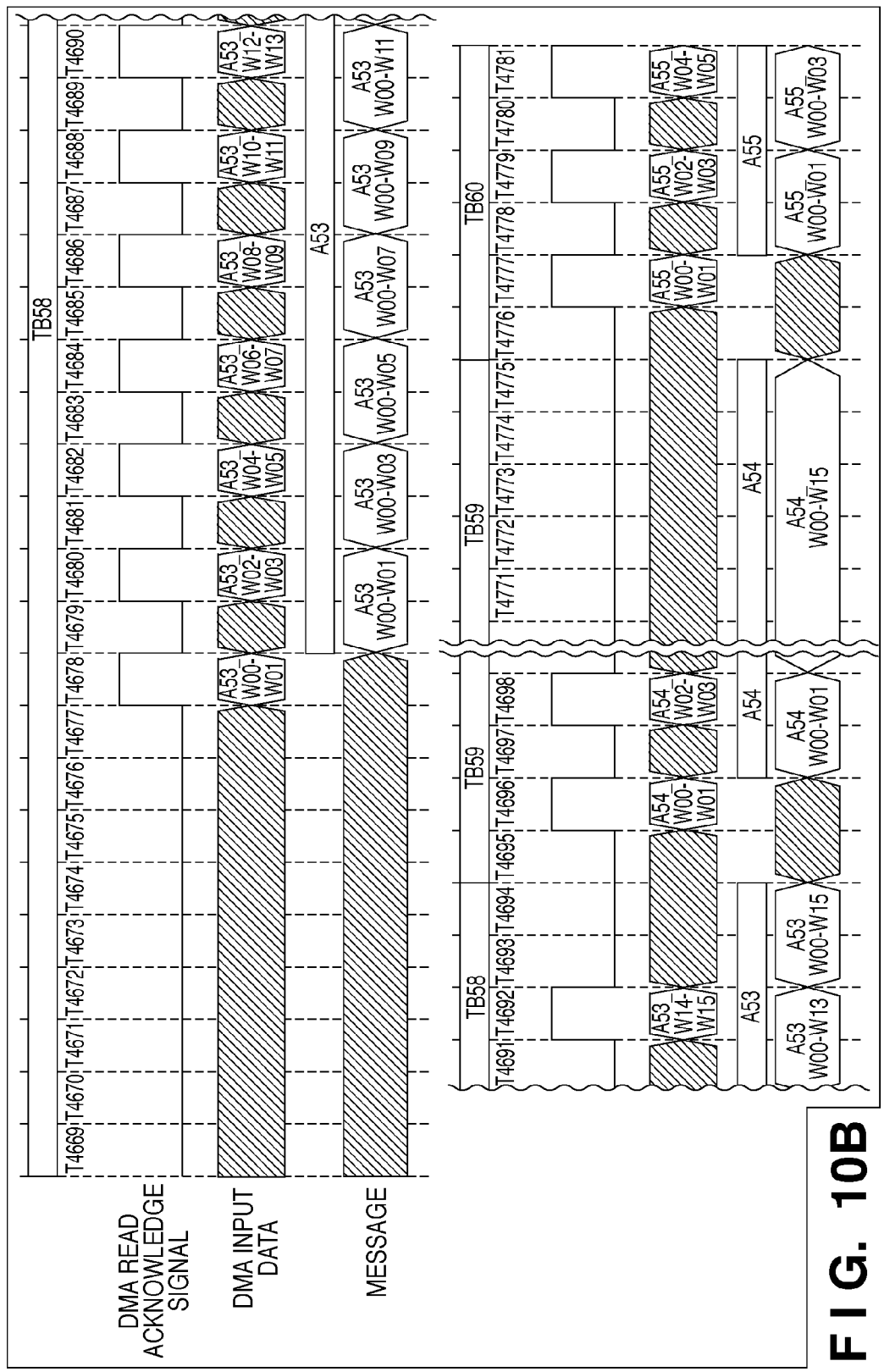
Figure 10C:
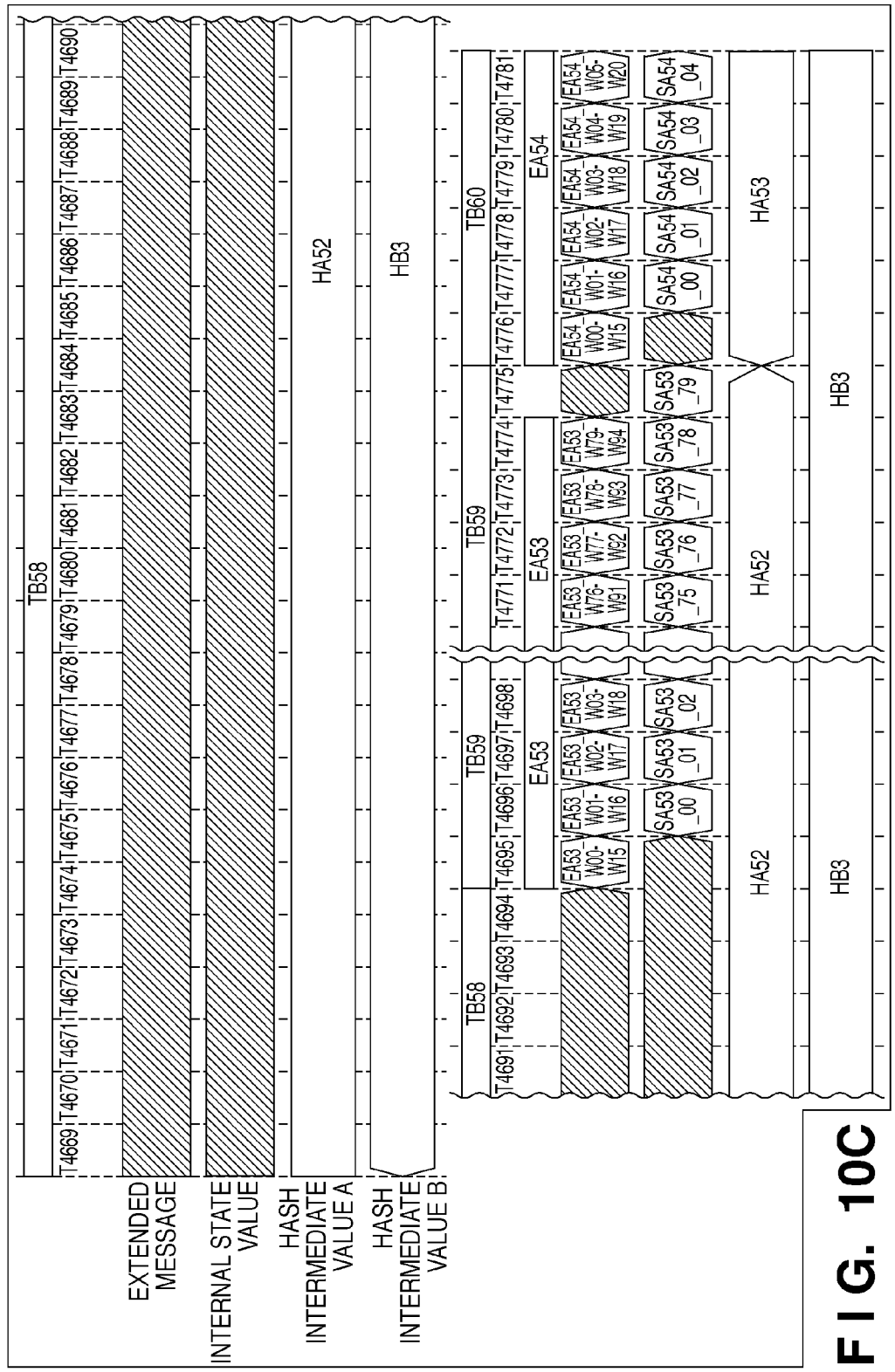
Figure 10E:
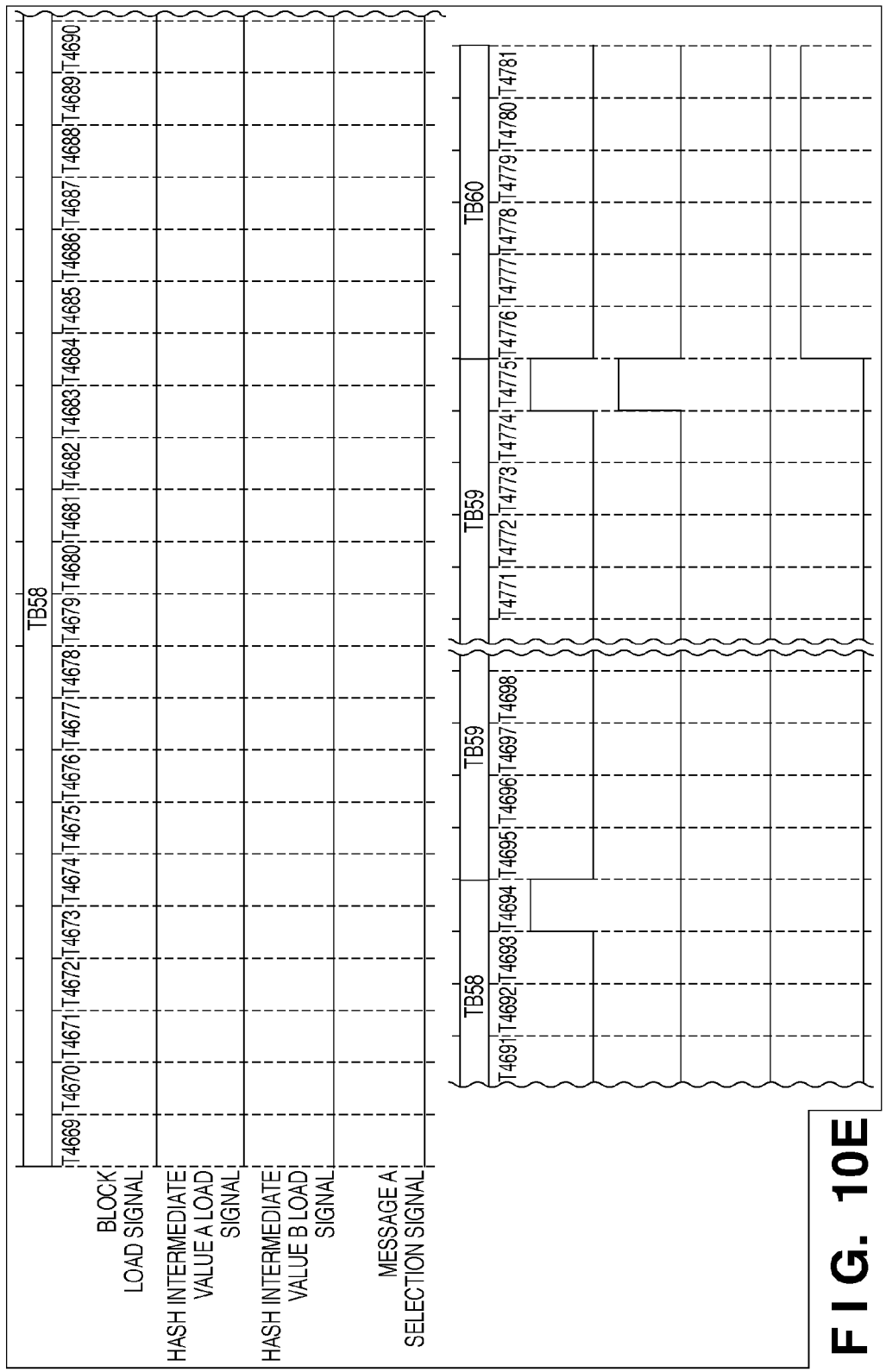

FIG. 4 is a view showing information stored by the register 116 in the hash value calculation circuit 100 of this embodiment.

The register 116 has storage areas of job start information, message identifier information, number of blocks information, hash initial value information, and process continuation information. Information in the "job start" area indicates whether "to start hash value calculation" or "not to start hash value calculation" based on information set in the "message identifier", "number of blocks", "hash initial value", and "process continuation" areas. Whether or not to start a hash value calculation can be expressed by "1" or "0" of a predetermined bit in the corresponding area. To set "1" or "0" in the predetermined bit will be referred to as "to set a flag" or "to clear a flag" hereinafter.

The CPU 201 sets a predetermined flag in the "job start" area in the register 116 of the hash value calculation circuit 100 so as to indicate "to start hash value calculation" for each hash processing request corresponding to one message. When the predetermined flag is set in the corresponding area, and the hash value calculation for the immediately preceding message is complete, the hash value calculation circuit 100 starts a hash value calculation. Then, upon completion of the hash value calculation for the message to be processed, the hash value calculation circuit 100 clears the flag to indicate "not to start hash value calculation".

Information in the "message identifier" area is an identifier used to identify a target message in a processing request by a plurality of predetermined bits in the area. For example, when the number of types of messages is two, if a predetermined bit is "1", it indicates "to process message A"; if it is "0", it indicates "to process message B".

Information in the "number of blocks" area indicates the number of blocks in a processing request by predetermined bits. For example, when a value indicated by the predetermined bits indicates the number of blocks to be processed, if the value of the predetermined bits is "0x0004", the number of blocks to be processed is four.

Information in the "hash initial value" area indicates an initial value (hash initial value) of an internal state value in a processing request. In case of SHA-1, since the internal state value includes five 32-bit data, predetermined 160 bits in that area indicate a hash initial value. Note that the CPU 201 may write an initial value of an internal state value of the SHA-1 algorithm in the "hash initial value" area or it may write a value corresponding to a hash intermediate value so as to resume and process the interrupted hash value calculation.

Information in the "process continuation" area indicates, by "1" or "0" of a predetermined bit in that area, which of values is to be used as an initial value of an internal state value used in a hash value calculation in a processing request:

"to use initial value of internal state value" stored in the "hash initial value" area; or "to use hash intermediate value" stored in the hash intermediate value storage unit in the hash value calculation circuit 100.

Note that the CPU 201 writes predetermined values in the "message identifier", "number of blocks", "hash initial value", and "process continuation" areas for each hash processing request corresponding to one message.

(Message Example)

FIG. 5 shows two messages which are to undergo hash value calculations in this embodiment, that is, message A (first message) and message B (second message). In SHA-1, a hash value calculation is made for respective 512-bit blocks. In this case, message A is divided into 512-bit blocks A0, A1, A2, . . . , A51, A52, A53, A54, . . . , A93, A94, and A95 from its head position. As for the last block A95, a part less than 512 bits is appended with padding data. Likewise, message B is divided into 512-bit blocks B0, B1, B2, and B3 from its head position, and padding data is appended to the block B3. These messages are stored in the memory 202.

(Overview of Message Transfer)

FIG. 6 shows the transfer order when messages A and B, which are to undergo hash value calculations in this embodiment, are transferred from the memory 202 to the hash value calculation circuit 100. This embodiment will exemplify a case in which the CPU 201 controls the hash value calculation circuit 100 to preferentially process message B in the middle of message A. That is, the DMAC 203 sequentially transfers blocks A0, A1, A2, ..., A51, and A52, which form message A, to the hash value calculation circuit 100, and then sequentially transfers blocks B0, B1, B2, and B3, which form message B, to the hash value calculation circuit 100. After that, the DMAC 203 transfers blocks A53, A54, ..., A93, A94, and A95, which form message A, to the hash value calculation circuit 100.

In this embodiment, it is decided in advance that the CPU 201 issues a processing request to interrupt the hash value calculation of message A and to start that of message B. Also, the CPU 201 issues, to the hash value calculation circuit 100, processing requests of message A as two messages, that is, a message including blocks A0 to A52 and that including blocks A53 to A95.

(Hash Value Calculation)

In this embodiment, the hash value calculation circuit 100 executes hash value calculations as many as the number of blocks in ST002, without interrupting them, for a message having the number of blocks set in the register 116 by the CPU 201 in ST001 according to the sequence shown in FIG. 3. In ST003, the hash value calculation circuit 100 outputs a hash value of the hash value calculation result. Upon completion of the hash value calculations for the message, when the CPU 201 sets a processing request for the next message in the register 116 of the hash value calculation circuit 100, the hash value calculation circuit 100 executes hash value calculations as many as the number of blocks set in the register 116 for the next message.

FIG. 7 is a flowchart showing the operation sequence of hash value calculations of this embodiment when three messages (A0 to A52, B0 to B3, and A53 to A95) are input in the order shown in FIG. 6. Hash value calculations are sequentially executed for each message according to the operation sequence in ST001 and ST002 in FIG. 3.

In ST101, the CPU 201 sets a processing request for the first message (A0 to A52) in the register 116 of the hash value calculation circuit 100.

In ST102, the hash value calculation circuit 100 reads data of the first message (A0 to A52) by issuing a read request to the DMAC 203, and executes hash value calculations for this message.

In ST103, the hash value calculation circuit 100 outputs a hash value for the first message (A0 to A52) by issuing a write request to the DMAC 203.

In ST104, the CPU 201 sets a processing request for the second message (B0 to B3) in the register 116 of the hash value calculation circuit 100.

In ST105, the hash value calculation circuit 100 reads data of the second message (B0 to B3) by issuing a read request to the DMAC 203, and executes hash value calculations for this message.

In ST106, the hash value calculation circuit 100 outputs a hash value for the second message (B0 to B3) by issuing a write request to the DMAC 203.

In ST107, the CPU 201 sets a processing request for the third message (A53 to A95) in the register 116 of the hash value calculation circuit 100.

In ST108, the hash value calculation circuit 100 reads data of the third message (A53 to A95) by issuing a read request to the DMAC 203, and executes hash value calculations for this message.

In ST109, the hash value calculation circuit 100 outputs a hash value for the third message (A53 to A95) by issuing a write request to the DMAC 203.

(Details of Hash Value Calculation)

FIGS. 8A to 10E are timing charts showing the operations of the hash value calculations for respective steps. Note that TXXX represents a period based on an operation clock cycle T as a basic unit of the step process and DMA transfer process. In this embodiment, the hash value calculation circuit 100 is synchronously designed based on operation clocks having the cycle T. For example, each 512-bit block data of message A corresponds to 16, that is, 0th to 15th 32-bit extended messages W0 to W15. For example, the 0th block of message A is described as A0, the 0th and 1st 32-bit data of a block A0 are described as A0_W00-W01, and the first 16 extended messages of the block A0 are described as EA0_W00-W15. Likewise, an internal state value of the 0th step of the block A0 is described as SA0_00, and a hash intermediate value of the block A0 is described as HA0. The operations of respective units for respective unit periods will be described below.

At T000, the hash value calculation controller 113 asserts the DMA write request signal 122 to the DMAC 203 so as to write data. At T001, the DMAC 203 returns the DMA write acknowledge signal 123, and transfers, to the memory 202, first 64 bits of a hash value (HAX in this case), which is output as the DMA output data 116 from the hash value output unit 114. After that, from T002 to T005, the DMAC 203 transfers the hash value HAX to the memory 202. During this interval, the hash value calculation controller 113 counts the number of times of assertion of the DMA write acknowledge signal 123 by the DMAC 203. In this case, the hash value calculation controller 113 confirms that the DMA write acknowledge signal 123 was asserted three times until T005, and deasserts the DMA write request signal 122 at T006.

At T006 and T007, the CPU 201 sets the register 116 via the bus 205 and bus signal 117. In this case, the CPU 201 sets a "to start hash value calculation" flag in the "job start" area of the register 116 in FIG. 4, and sets a "to use initial value of internal state value" flag in the "process continuation" area. Also, the CPU 201 sets a "to process message A" flag in the "message identifier" area, a "to process for 53 blocks" flag in the "number of blocks" area, and an "initial value of SHA-1 algorithm" in the "hash initial value" area.

In response to the "to start hash value calculation" flag set in the "job start" area of the register 116, the hash value calculation controller 113 asserts the DMA read request signal 122 to the DMAC 203 so as to read data at T008. At T009, the DMAC 203 returns the DMA read acknowledge signal 123. At the same time, the DMAC 203 transfers first 64 bits (A0_W00-W01) of the first block A0 of message A stored in the memory 202 to the hash value calculation circuit 100.

At T010, the message storage unit 101 stores the 64-bit data A0_W00-W01. After that, from T011 to T023, the DMAC 203 transfers the block A0 from the memory 202 to the hash value calculation circuit 100. During this interval, the hash value calculation controller 113 counts the number of times of assertion of the DMA acknowledge signal 123 by the DMAC 203. The hash value calculation controller 113 confirms that the DMAC 203 asserted the DMA acknowledge signal 123 eight times until T023, and deasserts the DMA read request signal 122 at T024. In a state in which the "to start hash value calculation" flag is set in the "job start" area of the register 116, the block counter 137 counts the number of blocks to be processed based on the number of times of deassertion of the DMA read request signal 122. Letting BC be the counter value of the block counter 137, BC=1 in this case. Also at T024, the message storage unit 101 stores the block A0.

At T025, the hash value calculation controller 113 asserts the block load signal 124.

At T026, the extended message storage unit 102 detects assertion of the block load signal 124, and loads the block A0 stored in the message storage unit 101. At this time, the extended message storage unit 102 stores the block A0 by dividing it into 16 32-bit data EA0_W00 to EA0_W15. After assertion of the block load signal 124, the step counter 138 counts the number of steps using clocks (not shown) for respective basic processing periods T. Letting SC be the counter value of the step counter 138, SC=1 in this case. After that, the step counter 138 counts up for each clock of the basic processing period T as a unit of one step process until the counter value SC reaches 80. The hash value calculation controller 113 asserts the DMA read request signal 122 to read data of the next block in response to that the data stored in the message storage unit 101 is loaded onto the extended message storage unit 102.

At T026, the message extension processor 103 inputs the extended messages 133 (EA0_W00 to EA0_W15) stored in the extended message storage unit 102, and calculates 32-bit data EA0_W16.

At T026, the hash value calculation controller 113 asserts the hash initial value selection signal X 127 in response to the "to use initial value of internal state value" flag set in the "process continuation" area of the register 116 and the counter value=1 of the step counter 138. At T026, the hash value calculation controller 113 asserts the hash intermediate value selection signal 125 in response to the counter value=1 of the step counter 138.

At T026, since the hash initial value selection signal X 127 is asserted, the selector 112 outputs the hash initial value 126 of the hash intermediate value 119 and hash initial value 126 as the inputs to itself. The selector 105 outputs the output from the selector 112 of the output from the selector 112 and the internal state value 134 as the inputs to itself in response to assertion of the hash intermediate value selection signal 125. As a result, the selector 105 outputs the hash initial value 126.

At T026, the step processor 104 inputs the data EA0_W00 stored in the extended message storage unit 102 and the hash initial value 126, and calculates an internal state value SA0_00 by applying the process of step 0 of SHA-1 to them.

At T027, the step counter 138 counts up its counter value SC to 2.

At T027, the extended message storage unit 102 stores the data EA0_W01 to EA0_W15, and the data EA0_W16 calculated by the message extension processor 103 at T026.

At T027, the internal state value storage unit 106 stores the internal state value SA0_00 calculated at T026.

At T027, the message extension processor 103 inputs the extended messages 133 (EA0_W01 to EA0_W16) stored in the extended message storage unit 102, and calculates 32-bit data EA0_W17.

At T027, the hash value calculation controller 113 deasserts the hash initial value selection signal X 127 and the hash intermediate value selection signal 125 in response to the counter value≠1 of the step counter 138.

At T027, the selector 105 outputs the internal state value 134 of the output from the selector 112 and the internal state value 134 as the inputs to itself in response to deassertion of the hash intermediate value selection signal 125. As a result, the selector 105 outputs the internal state value SA0_00.

At T027, the step processor 104 inputs the extended message EA0_W01 and the internal state value SA0_00, and calculates an internal state value SA0_01 by applying the process of step 1 of SHA-1 to them.

At T027, the DMAC 203 returns the DMA read acknowledge signal 123, and transfers 64-bit data A1_W00-W01 from the memory 202 to the hash value calculation circuit 100.

At T028, the step counter 138 counts up its counter value SC to 3.

At T028, the extended message storage unit 102 stores the data EA0_W02 to EA0_W16 and the data EA0_W17 calculated by the message extension processor 103 at T027.

At T028, the internal state value storage unit 106 stores the internal state value SA0_01 calculated at T027.

At T028, the message extension processor 103 inputs the extended messages 133 (EA0_W02 to EA0_W17) stored in the extended message storage unit 102, and calculates 32-bit data EA0_W18.

At T028, the selector 105 outputs the internal state value 134 of the output from the selector 112 and the internal state value 134 as the inputs to itself in response to deassertion of the hash intermediate value selection signal 125. As a result, the selector 105 outputs the internal state value SA0_01.

At T028, the step processor 104 inputs the data EA0_W02 stored in the extended message storage unit 102 and the internal state value SA0_01, and calculates an internal state value SA0_02 by applying the process of step 2 of SHA-1 to them.

At T028, the message storage unit 101 stores the 64-bit data A1_W00-W01.

After that, from T029 to T041, the DMAC 203 DMA-transfers a block A1 from the memory 202 to the hash value calculation circuit 100. During this interval, the hash value calculation controller 113 counts the number of times of assertion of the DMA read acknowledge signal 123 by the DMAC 203. The hash value calculation controller 113 confirms that the DMAC 203 asserted the DMA acknowledge signal 123 eight times until T041, and deasserts the DMA read request signal 122 at T042. At T042, the message storage unit 101 stores the block A1. In response to deassertion of the DMA read request signal 122, the block counter 137 counts up its counter value BC to 2.

During an interval from T029 to T105, the hash value calculation circuit 100 executes the processes of steps 2 to 79 of SHA-1. During this interval, the step counter 138 counts up the counter value SC from 3 to 80. As a result, the internal state value storage unit 106 stores an internal state value SA0_79 as the processing result of step 79 of SHA-1 at T106.

Since the predetermined 80 steps are counted until T105, the step counter 138 clears the counter value SC to zero at T106.

At T106, the hash value calculation controller 113 asserts the hash initial value selection signal Y 128 in response to:
 the "to use initial value of internal state value" flag set in the "process continuation" area of the register 116; and
 the counter value SC=80 of the step counter 138 at T105.

At T106, the selector 108 outputs the hash initial value 126 of the hash initial value 126 and hash intermediate value 119 as the inputs to itself in response to assertion of the hash initial value selection signal Y 128.

At T106, the addition processor 107 inputs the internal state value 134 (SA0_79) and the hash initial value 126, and calculates a hash intermediate value HA0.

At T106, the hash value calculation controller 113 asserts the hash intermediate value A load signal 129 since the "message identifier" area of the register 116 indicates "to process message A". Also, the hash value calculation controller 113 asserts the block load signal 124.

The hash intermediate value storage unit A 109 detects assertion of the hash intermediate value A load signal 129, and stores the hash intermediate value HA0 at T107. At T107, the hash value calculation controller 113 asserts the message A selection signal 131 since the "message identifier" area of the register 116 indicates "to process message A". Then, the selector 111 outputs, to the hash value output unit 114, the output (HA0) from the hash intermediate value storage unit A 109 of the output from the hash intermediate value storage unit A 109 and that from the hash intermediate value storage unit B 110.

The extended message storage unit 102 detects assertion of the block load signal 124, and loads the block A1 stored in the message storage unit 101 at T107. At this time, the extended message storage unit 102 stores the block A1 by dividing it into 16 32-bit data EA1_W00 to EA1_W15. The hash value calculation controller 113 asserts the DMA read request signal 122 to read data of the next block in response to that the extended message storage unit 102 stores the data stored in the message storage unit 101.

At T107, the hash value calculation controller 113 deasserts the hash initial value selection signal Y 128 in response to completion of the hash value calculation of the block A0.

At T107, the step counter 138 begins to count up its counter value SC to 1 in response to assertion of the block load signal 124.

At T107, the message extension processor 103 inputs the extended messages 133 (EA1_W00 to EA1_W15) stored in the extended message storage unit 102, and calculates 32-bit data EA1_W16.

Since the process of the block A1 is in progress, the hash value calculation controller 113 does not assert the hash initial value selection signal X 127 at T107.

At T107, the selector 112 outputs the hash intermediate value 119 (HA0) of the hash intermediate value 119 and the hash initial value 126 as the inputs to itself in response to deassertion of the hash initial value selection signal X 127. Also, the selector 105 outputs the output from the selector 112 of the output from the selector 112 and the internal state value 134 as the inputs to itself in response to assertion of the hash intermediate value selection signal 125. As a result, the selector 105 outputs the hash intermediate value 119 (HA0).

At T107, the step processor 104 inputs the data EA1_W00 stored in the extended message storage unit 102 and the hash intermediate value 119 (HA0), and calculates an internal state value SA1_00 by applying the process of step 0 of SHA-1 to them.

After that, as in the DMA transfer of the block A1 from T027 to T041, a block A2 is DMA-transferred from T108 to T122. At T123, the hash value calculation controller 113 deasserts the DMA read request signal 122 for the block A1. In response to deassertion of the DMA read request signal 122, the block counter 137 counts up its counter value BC to 3. As in the processes of steps 1 to 79 of SHA-1 for the block A0 from T027 to T105, the processes of steps 1 to 79 of SHA-1 are applied to the block A1 from T108 to T186. During this interval, the step counter 138 counts up the counter value SC from 2 to 80. As a result, at T187, the internal state value storage unit 106 stores an internal state value SA1_79 as the processing result of step 79 of SHA-1.

At T187, since the process of the block A1 is in progress, the hash value calculation controller 113 does not assert the hash initial value selection signal Y 128.

At T187, the selector 108 outputs the hash intermediate value 119 (HA0) of the hash initial value 126 and the hash intermediate value 119 (HA0) as the inputs to itself in response to deassertion of the hash initial value selection signal Y 128.

At T187, the addition processor 107 inputs the internal state value 134 (SA1_79) and the hash intermediate value 119 (HA0), and calculates a hash intermediate value HA1.

At T187, the hash value calculation controller 113 asserts the hash intermediate value A load signal 129 since the "message identifier" area of the register 116 indicates "to process message A". The hash intermediate value storage unit A 109 detects assertion of the hash intermediate value A load signal 129, and stores the hash intermediate value HA1 at T188. In this case, the hash value calculation controller 113 asserts the message A selection signal 131 since the "message identifier" area of the register 116 indicates "to process message A". Then, the selector 111 outputs, to the hash value output unit 114, the output (HA1) from the hash intermediate value storage unit A 109 of the output from the hash intermediate value storage unit A 109 and that from the hash intermediate value storage unit B 110.

After that, in response to that the "message identifier" area of the register 116 indicates "to process message A" and the "number of blocks" area indicates "to process for 53 blocks", blocks A3 to A52 are DMA-transferred. Also, hash value calculations are executed for the blocks A2 to A52.

(Operation in Block Unit)

FIGS. 11A and 11B (to be collectively referred to as FIG. 11 hereinafter) are timing charts showing the operations of the hash value calculations for respective blocks according to this embodiment. Note that TBXXX represents a period for 81 periods T each of which is basically used as a unit of the block process. T026 to T106 described above correspond to TB0, and T107 to T187 correspond to TB1. However, each of TB53 and TB58, which correspond to periods in which DMA write transfer upon completion of the hash value calculation for each message and DMA read transfer of the first block of the next message are executed, corresponds to a period for 26 periods T. The input messages A0_W00 to A0_W15 are expressed by A0(t), the extended messages EA0_W00 to EA0_W79 are expressed by EA0(t), and the internal state values SA0_00 to SA0_79 are expressed by SA0(t). Note that t represents the number of steps, and the value of XX(t) changes depending on the number of steps t.

The operations of the respective units for each block process period will be described below. Note that detailed operations for some step process periods will also be described.

As described above, the DMAC 203 DMA-transfers the block A1 from the memory 202 to the hash value calculation circuit 100 in TB0. Upon completion of the DMA transfer of the block A1, the block counter 137 counts up its counter value BC to 2. In TB1, the DMAC 203 DMA-transfers the block A2 from the memory 202 to the hash value calculation circuit 100. Upon completion of the DMA transfer of the block A2, the block counter 137 counts up its counter value BC to 3.

As described above, the hash value calculation circuit 100 inputs the block A0 as the first block of message A, and calculates extended messages EA0(t) and internal state values SA0(t) in TB0. In the step process for updating SA(t), an internal state value is updated using the t-th extended message and (t−1)-th internal state value for each step t, and the internal state value SA0_79 is calculated in step 79. Finally, the internal state value SA0_79 is added to the hash initial value to calculate the hash intermediate value HA0. In TB1, the hash intermediate value storage unit A 109 stores the hash intermediate value HA0. The hash value calculation circuit 100 inputs the block A1, calculates extended messages EA1(t) and internal state values SA1(t), and calculates the internal state value SA1_79 in step 79. Finally, the internal state value SA1_79 is added to the hash intermediate value HA0 to calculate the hash intermediate value HA1.

After that, in TB2 to TB51, the DMAC 203 DMA-transfers the blocks A3 to A52 from the memory 202 to the hash value calculation circuit 100. At this time, the value of the block counter 137 is counted up from 4 to 53. In TB2 to TB52, the hash value calculation circuit 100 executes the hash value calculations of the blocks A2 to A52. As a result, the hash intermediate value storage unit A 109 holds a hash intermediate value HA52 and the hash value output unit 114 outputs the hash intermediate value HA52 in TB53.

In this case, the "to process message A" and "to process for 53 blocks" requirements stored in the "message identifier" area and "number of blocks" area of the register 116 are satisfied. Thus, the hash value calculation controller 113 clears the "to start hash value calculation" flag stored in the "job start" area and the "to use initial value of internal state value" flag stored in the "process continuation" area of the register 116 in TB53. Also, the hash value calculation controller 113 asserts the DMA write request signal 122 to the DMAC 203 in TB53. The DMAC 203 returns the DMA write acknowledge signal 123, and transfers the hash intermediate value HA52 output from the hash value output unit 114 to the memory 202. The hash value calculation controller 113 counts the number of times of assertion of the DMA write acknowledge signal 123 by the DMAC 203. The hash value calculation controller 113 confirms that the DMAC 203 asserted the DMA write acknowledge signal 123 three times, and deasserts the DMA write request signal 122.

In TB53, the DMAC 203 detects deassertion of the DMA write request signal 122 from the hash value calculation circuit 100, and asserts the interrupt signal 206 to notify the interrupt controller 204 of an interrupt. The interrupt controller 204 notifies the CPU 201 of storage of the hash intermediate value HA52 in the memory 202 using an interrupt signal (not shown).

In TB53, the CPU 201 detects based on the interrupt from the DMAC 203 that processing of "message A" "for 53 blocks" "from the head of the message" is complete. Then, the CPU 201 sets the register 116 via the bus 205 and bus signal 117. In this case, the CPU 201 sets a "to start hash value calculation" flag in the "job start" area of the register 116 shown in FIG. 4, and also sets a "to use initial value of internal state value" flag in the "process continuation" area. Also, the CPU 201 sets a "to process message B" flag in the "message identifier" area, a "to process for 4 blocks" flag in the "number of blocks" area, and an "initial value of SHA-1 algorithm" in the "hash initial value" area.

In response to the "to start hash value calculation" flag set in the "job start" area of the register 116, the hash value calculation controller 113 asserts the DMA read request signal 122 to the DMAC 203 so as to read data in TB53. The DMAC 203 returns the DMA read acknowledge signal 123, and DMA-transfers a first block B0 of message B to the hash value calculation circuit 100. The message storage unit 101 then stores the block B0. The block counter 137 counts up its counter value BC to 1.

In TB54, a block B1 is DMA-transferred, and the hash value calculation is executed for the block B0. Details will be described below.

At T4344, the hash value calculation controller 113 asserts the block load signal 124. At T4345, the extended message storage unit 102 detects assertion of the block load signal 124, and loads the block B0 stored in the message storage unit 101. At this time, the extended message storage unit 102 stores the block B0 by dividing it into 16 32-bit data EB0_W00 to EB0_W15. The step counter 138 begins to count up its counter value SC to 1. The hash value calculation controller 113 asserts the DMA read request signal 122 to read data of the next block in response to that the extended message storage unit 102 stores the data stored in the message storage unit 101.

At T4345, the message extension processor 103 inputs the extended messages 133 (EB0_W00 to EB0_W15) stored in the extended message storage unit 102, and calculates 32-bit data EB0_W16.

At T4345, the hash value calculation controller 113 asserts the hash initial value selection signal X 127 and hash intermediate value selection signal 125 in response to:
  the "to use initial value of internal state value" flag set in the "process continuation" area of the register 116; and
  the counter value SC=1 of the step counter 138.

At T4345, the selector 112 outputs the hash initial value 126 of the hash intermediate value 119 and the hash initial value 126 as the inputs to itself in response to assertion of the hash initial value selection signal X 127. Also, the selector 105 outputs the output from the selector 112 of the output from the selector 112 and the internal state value 134 as the inputs to itself in response to assertion of the hash intermediate value selection signal 125. As a result, the selector 105 outputs the hash initial value 126.

At T4345, the step processor 104 inputs the data EB0_W00 stored in the extended message storage unit 102 and the hash initial value 126, and calculates an internal state value SB0_00 by applying the process of step 0 of SHA-1 to them.

At T4346, the step counter 138 counts up its counter value SC to 2.

At T4346, the extended message storage unit 102 stores the data EB0_W01 to EB0_W15 and the data EB0_W16 calculated by the message extension processor 103.

At T4346, the internal state value storage unit 106 stores the internal state value SB0_00.

At T4346, the message extension processor 103 inputs the extended messages 133 (EB0_W01 to EB0_W16) stored in the extended message storage unit 102, and calculates 32-bit data EB0_W17.

At T4346, the hash value calculation controller 113 deasserts the hash initial value selection signal X 127 and the hash intermediate value selection signal 125 in response to the counter value SC≠1 of the step counter 138.

At T4346, the selector 105 outputs the internal state value 134 of the output from the selector 112 and the internal state value 134 as the inputs to itself in response to deassertion of the hash intermediate value selection signal 125. As a result, the selector 105 outputs the internal state value SB0_00.

At T4346, the step processor 104 inputs the extended message EB0_W01 and the internal state value SB0_00, and calculates an internal state value SB0_01 by applying the process of step 1 of SHA-1 to them. The hash value calculation controller 113 then counts up the step counter 138. The value of the step counter 138 at that time is 2.

At T4346, the DMAC 203 returns the DMA read acknowledge signal 123, and transfers 64-bit data B1_W00-W01 from the memory 202 to the hash value calculation circuit 100.

At T4347, the step counter 138 counts up its counter value SC to 3.

At T4347, the extended message storage unit 102 stores the data EB0_W02 to EB0_W16 and the data EB0_W17 calculated by the message extension processor 103.

At T4347, the internal state value storage unit 106 stores the internal state value SB0_01.

At T4347, the message extension processor 103 inputs the extended messages 133 (EB0_W02 to EB0_W17) stored in the extended message storage unit 102, and calculates 32-bit data EB0_W18.

At T4347, the selector 105 outputs the internal state value 134 of the output from the selector 112 and the internal state value 134 as the inputs to itself in response to deassertion of the hash intermediate value selection signal 125. As a result, the selector 105 outputs the internal state value SB0_01.

At T4347, the step processor 104 inputs the extended message EB0_W02 and the internal state value SB0_01, and calculates an internal state value SB0_02 by applying the process of step 2 of SHA-1 to them.

At T4347, the message storage unit 101 stores the 64-bit data B1_W00-W01 DMA-transferred by the DMAC 203.

After that, from T4348 to T4360, the DMAC 203 successively executes DMA transfer of the block B1 from the memory 202 to the hash value calculation circuit 100. During this interval, the hash value calculation controller 113 counts the number of times of assertion of the DMA read acknowledge signal 123 by the DMAC 203. After the hash value calculation controller 113 confirms that the DMAC 203 asserted the DMA acknowledge signal 123 eight times, it deasserts the DMA read request signal 122. Then, the message storage unit 101 stores the block B1. The block counter 137 counts up its counter value BC to 2.

From T4348 to T4424, the hash value calculation circuit 100 executes the processes of steps 3 to 79 of SHA-1. During this interval, the step counter 138 counts up from 4 to 80 at the beginning of the respective step processes. As a result, at T4425, the internal state value storage unit 106 stores an internal state value SB0_79 as the processing result of step 79 of SHA-1.

At T4425, the hash value calculation controller 113 asserts the hash initial value selection signal Y 128 in response to:
  the "to use initial value of internal state value" flag set in the "process continuation" area of the register 116; and
  the counter value SC=80 of the step counter 138 at T4424.

At T4425, the selector 108 outputs the hash initial value 126 of the hash initial value 126 and the hash intermediate value 119 as the inputs to itself in response to assertion of the hash initial value selection signal Y 128.

At T4425, the addition processor 107 inputs the internal state value 134 (SB0_79) and the hash initial value 126, and calculates a hash intermediate value HB0.

At T4425, the hash value calculation controller 113 asserts the hash intermediate value B load signal 130 since the "message identifier" area of the register 116 indicates "to process message B". The hash value calculation controller 113 also asserts the block load signal 124. At T4426 during a TB55 period, the hash intermediate value storage unit B 110 stores the hash intermediate value HB0. Also, since the "message identifier" area of the register 116 indicates "to process message B", the hash value calculation controller 113 does not assert the message A selection signal 131. Then, the selector 111 outputs, to the hash value output unit 114, the output (HB0) from the hash intermediate value storage unit B 110 of the output from the hash intermediate value storage unit A 109 and that from the hash intermediate value storage unit B 110.

At T4426, the extended message storage unit 102 detects assertion of the block load signal 124, and loads the block B1 stored in the message storage unit 101. At this time, the extended message storage unit 102 stores the block B1 by dividing it into 16 32-bit data EB1_W00 to EB1_W15. The hash value calculation controller 113 asserts the DMA read request signal 122 so as to read data of the next block in response to that the extended message storage unit 102 stores the data stored in the message storage unit 101.

At T4426, the hash value calculation controller 113 deasserts the hash initial value selection signal Y 128 in response to completion of the hash value calculation of the block B0.

As described above, in TB55, the hash intermediate value storage unit A 109 stores the hash intermediate value HA52, and the hash intermediate value storage unit B 110 stores the hash intermediate value HB0.

The hash value calculation for the block B1 is made using the hash intermediate value HB0 stored in the hash intermediate value storage unit B 110 in TB55.

After that, the DMAC 203 DMA-transfers blocks B2 and B3 from the memory 202 to the hash value calculation circuit 100 in TB55 and TB56. At this time, the block counter 137 counts up the counter value BC from 3 to 4. The hash value calculation circuit 100 executes hash value calculations for the blocks B1 to B3 in TB55 to TB57. During this interval, since the "message identifier" area of the register 116 indicates "to process message B", the hash value calculation controller 113 does not assert the hash intermediate value A load signal 129, and asserts the hash intermediate value B load signal 130 as needed. For this reason, the hash intermediate value storage unit A 109 does not store any hash intermediate value of message B, and the hash intermediate value storage unit B 110 stores the hash intermediate value of message B. Since the "message identifier" area of the register 116 indicates "to process message B", the hash value calculation controller 113 does not assert the message A selection signal 131. For this reason, the selector 111 outputs the output from the hash intermediate value storage unit B 110 of the output from the hash intermediate value storage unit A 109 and that from the hash intermediate value storage unit B 110. Other processes are the same as those for blocks A1 to A3.

As a result, hash intermediate values HB1 to HB3 are calculated in TB55 to TB57. In TB58, the hash intermediate value storage unit A 109 stores the hash intermediate value HA52 for the blocks A0 to A52 of message A, and the hash intermediate value storage unit B 110 stores the hash intermediate value HB3 for the blocks B0 to B3 of message B. Since message B includes the blocks B0 to B3, as shown in FIG. 5, the hash intermediate value HB3 is output as a hash value HB of message B. In TB58, the hash value calculation controller 113 does not assert the message A selection signal 131 since the "message identifier" area of the register 116 indicates "to process message B". For this reason, the selector 111 outputs, to the hash value output unit 114, the output (HB) from the hash intermediate value storage unit B 110 of the output (HA52) from the hash intermediate value storage unit A 109 and that (HB) from the hash intermediate value storage unit B 110 as the inputs to itself.

In this state, the "to process message B" and "to process for 4 blocks" requirements stored in the "message identifier" and "number of blocks" areas of the register 116 are satisfied. Then, the hash value calculation controller 113 clears the "to start hash value calculation" flag stored in the "job start" area and "to use initial value of internal state value" flag stored in the "process continuation" area of the register 116 in TB58. Also, the hash value calculation controller 113 asserts the DMA write request signal 122 to the DMAC 203 in TB58. The DMAC 203 returns the DMA write acknowledge signal 123, and transfers the hash value HB from the hash value output unit 114 to the memory 202. The hash value calculation controller 113 counts the number of times of assertion of the DMA write acknowledge signal 123 by the DMAC 203. The hash value calculation controller 113 confirms that the DMAC 203 asserted the DMA write acknowledge signal 123 three times, and deasserts the DMA write request signal 122.

In TB58, the DMAC 203 detects deassertion of the DMA write request signal 122 by the hash value calculation circuit 100, asserts the interrupt signal 206, and notifies the interrupt controller 204 of an interrupt. Then, the interrupt controller 204 notifies the CPU 201 of storage of the hash value HB in the memory 202 using an interrupt signal (not shown).

In TB58, the CPU 201 detects, based on the interrupt from the DMAC 203, that the processing of "message B" "for 4 blocks" "using the initial value of the internal state value" is complete. Then, the CPU 201 sets the register 116 via the bus 205 and bus signal 117. In this case, the CPU 201 sets a "to start hash value calculation" flag in the "job start" area of the register 116 shown in FIG. 4, and sets a "to use hash intermediate value" flag in the "process continuation" area. Also, the CPU 201 sets a "to process message A" flag in the "message identifier" area, and a "to process for 43 blocks" flag in the "number of blocks" area. At this time, the hash value calculation controller 113 clears the block counter 137.

In response to the "to start hash value calculation" flag set in the "job start" area of the register 116, the hash value calculation controller 113 asserts the DMA read request signal 122 to the DMAC 203 so as to read data in TB58. The DMAC 203 returns the DMA read acknowledge signal 123, and DMA-transfers a block A53 of message A to the hash value calculation circuit 100. The message storage unit 101 stores the block A53. Then, the block counter 137 counts up its counter value BC to 1.

In TB59, a block A54 is DMA-transferred, and the hash value calculation is executed for the block A53. Details will be described below.

At T4694, the hash value calculation controller 113 asserts the block load signal 124. At T4695, the extended message storage unit 102 detects assertion of the block load signal 124, and loads the block A53 stored in the message storage unit 101. At this time, the extended message storage unit 102 stores the block A53 by dividing it into 16 32-bit data EA53_W00 to EA53_W15. The hash value calculation controller 113 asserts the DMA read request signal 122 to read data of the next block in response to that the extended message storage unit 102 stores the data stored in the message storage unit 101.

At T4695, the step counter 138 counts up its counter value SC to 1.

At T4695, the message extension processor 103 inputs the extended messages 133 (EA53_W00 to EA53_W15) stored in the extended message storage unit 102, and calculates 32-bit data EA53_W16.

The hash value calculation controller 113 deasserts the hash initial value selection signal X 127 in response to the "to use hash intermediate value" flag set in the "process continuation" area of the register 116.

At T4695, the hash value calculation controller 113 asserts the message A selection signal 131 since the "message identifier" area of the register 116 indicates "to process message A". Hence, the selector 111 outputs the output (HA52) from the hash intermediate value storage unit A 109 of the output (HA52) from the hash intermediate value storage unit A 109 and that (HB) from the hash intermediate value storage unit B 110 as the inputs to itself. The selector 112 outputs the hash intermediate value 119 (HA52) of the hash intermediate value 119 (HA52) and the hash initial value 126 as the inputs to itself in response to deassertion of the hash initial value selection signal X 127. The selector 105 outputs the output from the selector 112 of the output from the selector 112 and the internal state value 134 as the inputs to itself in response to assertion of the hash intermediate value selection signal 125. As a result, the selector 105 outputs the hash intermediate value 119 (HA52).

At T4695, the step processor 104 inputs the data EA53_W00 stored in the extended message storage unit 102 and the hash intermediate value HA52, and calculates an internal state value SA53_00 by applying the process of step 0 of SHA-1 to them.

At T4696, the step counter 138 counts up its counter value SC to 2.

At T4696, the extended message storage unit 102 stores the data EA53_W01 to EA53_W15, and the data EA53_W16 calculated by the message extension processor 103.

At T4696, the internal state value storage unit 106 stores the internal state value SA53_00.

At T4696, the message extension processor 103 inputs the extended messages 133 (EA53_W01 to EA53_W16) stored in the extended message storage unit 102, and calculates 32-bit data EA53_W17.

At T4696, the hash value calculation controller 113 deasserts the hash initial value selection signal X 127 since the process of step 1 of SHA-1 is in progress.

At T4696, the selector 105 outputs the internal state value 134 of the output from the selector 112 and the internal state value 134 as the inputs to itself in response to deassertion of the hash intermediate value selection signal 125. As a result, the selector 105 outputs the internal state value SA53_00.

At T4696, the step processor 104 inputs the extended message EA53_W01 and the internal state value SA53_00, and calculates an internal state value SA53_01 by applying the process of step 1 of SHA-1 to them.

At T4696, the DMAC 203 returns the DMA read acknowledge signal 123, and transfers 64-bit data A54_W00-W01 from the memory 202 to the hash value calculation circuit 100. At T4697, the step counter 138 counts up its counter value SC to 3.

At T4697, the extended message storage unit 102 stores the data EA53_W02 to EA53_W16 and the data EA53_W17 calculated by the message extension processor 103.

At T4697, the internal state value storage unit 106 stores the internal state value SA53_01.

At T4697, the message extension processor 103 inputs the extended messages 133 (EA53_W02 to EA53_W17) stored in the extended message storage unit 102, and calculates 32-bit data EA53_W18.

At T4697, the selector 105 outputs the internal state value 134 of the output from the selector 112 and the internal state value 134 as the inputs to itself in response to deassertion of the hash intermediate value selection signal 125. As a result, the selector 105 outputs the internal state value SA53_01.

At T4697, the step processor 104 inputs the extended message EA53_W02 and the internal state value SA53_01, and calculates an internal state value SA53_02 by applying the process of step 2 of SHA-1 to them.

At T4697, the message storage unit 101 stores the 64-bit data A54_W00-W01.

After that, from T4698 to T4710, the DMAC 203 successively executes DMA transfer of the block A54 from the memory 202 to the hash value calculation circuit 100. During this interval, the hash value calculation controller 113 counts the number of times of assertion of the DMA read acknowledge signal 123 by the DMAC 203. After the hash value calculation controller 113 confirms that the DMAC 203 asserted the DMA acknowledge signal 123 eight times, it deasserts the DMA read request signal 122 at T4711. Then, the message storage unit 101 stores the block A54. The block counter 137 counts up its counter value BC to 2.

From T4697 to T4774, the hash value calculation circuit 100 executes the processes of steps 2 to 79 of SHA-1. During this interval, the step counter 138 counts up the counter value SC from 3 to 80 at the beginning of the respective step processes. As a result, at T4775, the internal state value storage unit 106 stores an internal state value SA53_79 as the processing result of step 79 of SHA-1.

At T4775, the hash value calculation controller 113 deasserts the hash initial value selection signal Y 128 in response to the "to use hash intermediate value" flag set in the "process continuation" area of the register 116.

At T4775, the selector 108 outputs the hash intermediate value 119 of the hash initial value 126 and the hash intermediate value 119 as the inputs to itself in response to deassertion of the hash initial value selection signal Y 128.

At T4775, the addition processor 107 inputs the internal state value 134 (SA53_79) and the hash intermediate value 119 (HA52), and calculates a hash intermediate value HA53.

At T4775, the hash value calculation controller 113 asserts the block load signal 124.

At T4775, the hash value calculation controller 113 asserts the hash intermediate value A load signal 129 since the "message identifier" area of the register 116 indicates "to process message A". At T4776 during a TB60 period, the hash intermediate value storage unit A 109 stores the hash intermediate value HA53. Also, since the "message identifier" area of the register 116 indicates "to process message A", the hash value calculation controller 113 asserts the message A selection signal 131. Then, the selector 111 outputs, to the hash value output unit 114, the output (HA53) from the hash intermediate value storage unit A 109 of the output from the hash intermediate value storage unit A 109 and that from the hash intermediate value storage unit B 110.

At T4776, the extended message storage unit 102 detects assertion of the block load signal 124, and loads the block A54 stored in the message storage unit 101. At this time, the extended message storage unit 102 stores the block A54 by dividing it into 16 32-bit data EA54_W00 to EA54_W15. The hash value calculation controller 113 asserts the DMA read request signal 122 so as to read data of the next block in response to that the extended message storage unit 102 stores the data stored in the message storage unit 101.

At T4776, the hash value calculation controller 113 deasserts the hash initial value selection signal Y 128 in response to completion of the hash value calculation of the block A53.

As described above, in TB60, the hash intermediate value storage unit A 109 stores the hash intermediate value HA53, and the hash intermediate value storage unit B 110 stores the hash value HB.

After that, the DMAC 203 DMA-transfers blocks A55 to A95 from the memory 202 to the hash value calculation circuit 100 from TB60 to TB100. At this time, the block counter 137 counts up the counter value BC from 3 to 43. The hash value calculation circuit 100 executes hash value calculations for the blocks A54 to A95 from TB60 to TB101. During this interval, since the "message identifier" area of the register 116 indicates "to process message A", the hash value calculation controller 113 does not assert the hash intermediate value B load signal 130, and asserts the hash intermediate value A load signal 129 as needed. For this reason, the hash intermediate value storage unit B 110 does not store any hash intermediate value of message A, and the hash intermediate value storage unit A 109 stores the hash intermediate value of message A. Since the "message identifier" area of the register 116 indicates "to process message A", the hash value calculation controller 113 asserts the message A selection signal 131. For this reason, the selector 111 outputs the output from the hash intermediate value storage unit A 109 of the output from the hash intermediate value storage unit A 109 and that from the hash intermediate value storage unit B 110. Other processes are the same as those for other blocks.

As a result, in TB102, the hash intermediate value storage unit A 109 stores a hash intermediate value HA95 for the blocks A0 to A95 of message A. Since message A includes the blocks A0 to A95, as shown in FIG. 5, the hash intermediate value HA95 is output as a hash value HA of message A. In TB102, the hash value calculation controller 113 asserts the message A selection signal 131. Hence, the selector 111 outputs, to the hash value output unit 114, the output (HA) from the hash intermediate value storage unit A 109 of the output (HA) from the hash intermediate value storage unit A 109 and that (HB) from the hash intermediate value storage unit B 110 as the inputs to itself.

In this state, the "to process message A" and "to process for 43 blocks" requirements stored in the "message identifier" and "number of blocks" areas of the register 116 are satisfied. Thus, the hash value calculation controller 113 clears the "to start hash value calculation" flag stored in the "job start" area and "to use hash intermediate value" flag stored in the "process continuation" area of the register 116 in TB102. Also, the hash value calculation controller 113 asserts the DMA write request signal 122 to the DMAC 203 in TB102. The DMAC 203 returns the DMA write acknowledge signal 123, and transfers the hash value HA from the hash value output unit 114 to the memory 202. The hash value calculation controller 113 counts the number of times of assertion of the DMA write acknowledge signal 123 by the DMAC 203. The hash value calculation controller 113 confirms that the DMAC 203 asserted the DMA write acknowledge signal 123 three times, and deasserts the DMA write request signal 122.

In TB102, the DMAC 203 detects deassertion of the DMA write request signal 122 by the hash value calculation circuit 100, asserts the interrupt signal 206, and notifies the interrupt controller 204 of an interrupt. Then, the interrupt controller 204 notifies the CPU 201 of storage of the hash value HA in the memory 202 using an interrupt signal (not shown).

As described above, according to this embodiment, the CPU sequentially requests the hash value calculation circuit to execute the hash value calculations for the first, second, and third messages, so that message B is processed first in the middle of message A. Note that the first message includes the blocks A0 to A52, the second message includes the blocks B0 to B3, and the third message includes the blocks A53 to A95. Then, the hash intermediate value as the hash value calculation result for the first message is stored in the hash value calculation circuit. After completion of the hash value calculation of the second message, the hash value calculation for the third message is executed using the stored hash intermediate value of the first message. As a result, compared to the conventional arrangement in which a hash intermediate value is temporarily written out to an external memory and is loaded again, a time for an overhead required to exchange the hash intermediate value with the external memory can be reduced, and efficient hash value calculations with a high response speed can be implemented.

In this embodiment, since data for one block of a message is stored in the hash value calculation circuit, the need for an overhead time required to transfer each block data of a message from the external memory can be obviated. For this reason, more efficient hash value calculations can be implemented.

In this embodiment, at the time of completion of the hash value calculation for the immediately preceding block, data for one block stored in the circuit is loaded onto the extension processor, and a data transfer request for the next block from the external memory is then issued. However, the present invention is not limited to this. For example, the loaded data for the block is stored in the storage unit until the hash value calculation for that block is completed, and a data transfer request for the next block may then be issued. Even when the hash value calculation for a block of interest is aborted in the middle of the processing, since the data of the block of interest is stored in the circuit, an effect of reducing an overhead required to load that data again from the external memory can be obtained.

This embodiment has exemplified SHA-1 used as the hash function. However, the hash function may use other algorithms such as MD5 and SHA-256.

In this embodiment, an extended message is sequentially generated for each step. However, extended messages may be simultaneously generated first.

In the arrangement of this embodiment, hash intermediate values for two different messages can be stored. By arranging three or more hash intermediate value storage units, the hash value calculations for three or more different messages can be interrupted and resumed.

In the arrangement of this embodiment, a plurality of hash intermediate value storage units each having a hash intermediate value storage area that can store one hash intermediate value are arranged. However, the present invention is not limited to such a specific arrangement. For example, one or a plurality of hash intermediate value storage units each having a hash intermediate value storage area that can store a plurality of hash intermediate values may be arranged.

In this embodiment, the correspondence between the hash intermediate values of respective messages and the hash intermediate value storage units is fixed like that the hash intermediate value of message A is stored in the hash intermediate value storage unit A, and that of message B is stored in the hash intermediate value storage unit B. However, for example, a correspondence information storage unit which stores correspondence information indicating correspondence between hash intermediate value storage areas and hash intermediate values of messages may be arranged, and the hash intermediate value storage areas may be decided based on the correspondence information stored in the correspondence information storage unit.

In this embodiment, the CPU processes the padding process of the hash value calculation outside the hash circuit. However, the padding process may also be processed inside the hash circuit.

In this embodiment, the DMAC is used as a device used to exchange a message and hash value between the hash value calculation circuit and the external memory. However, other transfer devices may be used.

In the example of this embodiment, the bit width of the DMA input/output data is 64 bits. However, other numbers of bits may be used.

In this embodiment, the basic processing period T of the process for each step of the hash value calculation is equal to that of the DMA transfer process. However, the basic processing periods of the step process and DMA transfer process may be different.

In the example of this embodiment, the CPU sets the number of blocks of a message in the register of the hash value calculation circuit, and the hash value calculation circuit detects supply of the message having the number of blocks set by the CPU by counting the DMA acknowledge signals. However, other methods may be used. For example, the CPU may notify completion of message transfer by setting it in the register.

Note that the embodiment of the present invention is not limited to the above arrangement, and various modifications may be made.

Second Embodiment

In the first embodiment, the CPU 201 sets the process continuation information, message identifier information, and the like in the register of the hash value calculation circuit 100 for each message. The second embodiment will explain a case in which an input data attribute signal as a sideband signal which is synchronized with data of a message includes process continuation information, message identifier information, and the like.

(Arrangement of Hash Value Calculation Circuit)

FIG. 12 is a block diagram showing the arrangement of a hash value calculation circuit according to the second embodiment. Only differences from the first embodiment will be described below with reference to FIG. 12.

Reference numeral 137 denotes a block counter which counts the number of blocks of a first message (to be referred to as message A hereinafter) received by the hash value calculation circuit 100. Reference numeral 140 denotes a block counter X which counts the number of blocks of a second message (to be referred to as message B hereinafter) received by the hash value calculation circuit 100. Upon completion of the hash value calculations for a given number of blocks which form a message, the hash value calculation controller 113 clears the counter value of the block counter 137 or block counter X 140. Reference numeral 139 denotes an input data attribute signal which is output from the DMAC 203 to the hash value calculation circuit 100 in synchronism with DMA input data 120. The contents of the input data attribute signal include message identifier information and process continuation information.

(Storage Contents of Register)

Figure 13:
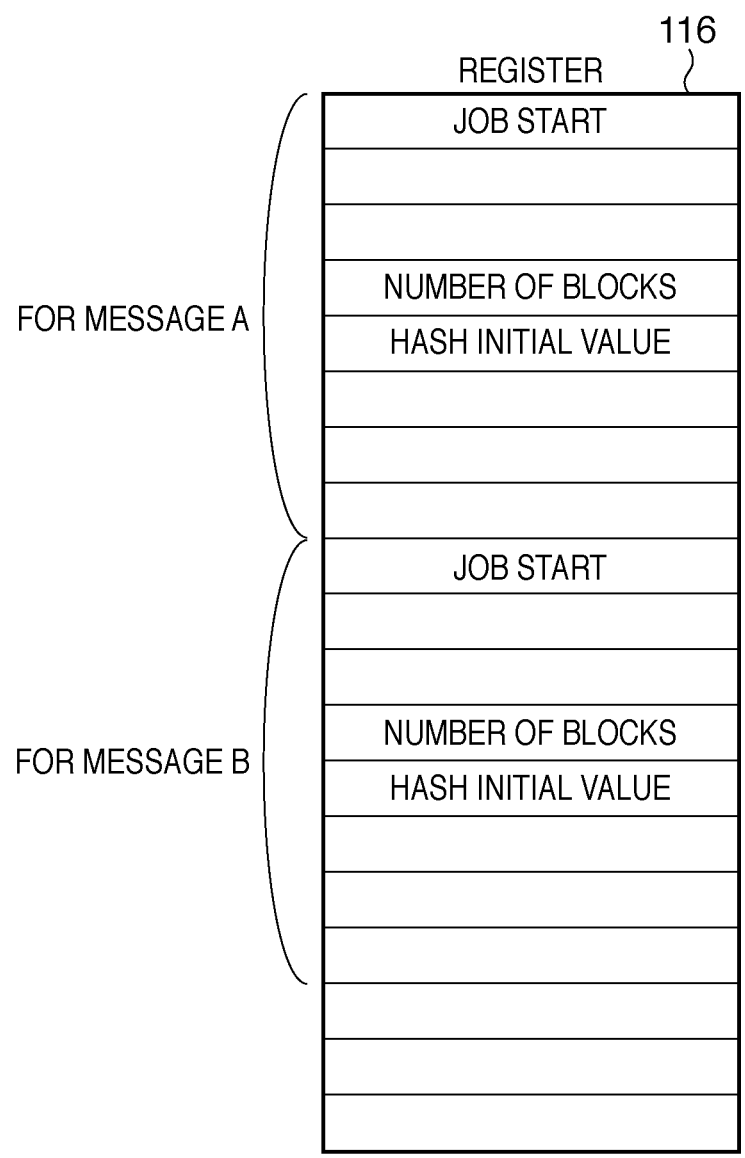
FIG. 13 is a view showing the internal configuration of a register in the hash value calculation circuit.

FIG. 13 is a view showing information stored in the register 116 in the hash value calculation circuit 100 of this embodiment. Only differences from the first embodiment will be described below.

The register 116 has storage areas of job start information, number of blocks information, and hash initial value information for respective message types.

In this embodiment, the CPU 201 writes, in the register 116, settings of job start information, number of block information, and hash initial value information for a plurality of messages to be processed before the hash value calculation circuit 100 starts a job.

In the first embodiment, the CPU 201 decides in advance to issue processing requests so as to interrupt the hash value calculation for message A, and to execute the hash value calculation for message B. That is, the CPU 201 decides to issue processing requests for message A as two messages, that is, a message including blocks A0 to A52, and that including blocks A53 to A95 to the hash value calculation circuit 100. In this embodiment, the CPU 201 sets information for a plurality of messages which are to undergo hash value calculations in the register of the hash value calculation circuit 100 first. That is, the CPU 201 sets information of message A including 96 blocks and that of message B including four blocks in predetermined areas of the register 116. After the CPU 201 sets the register and the hash value calculation circuit 100 starts the hash value calculation for a corresponding processing request, the CPU 201 decides to interrupt the hash value calculation of message A. Furthermore, the CPU 201 controls the DMAC 203 to transfer data of message B in turn from a block B0 to the hash value calculation circuit from a block A52 of message A.

The hash value calculation circuit 100 determines each message type and the presence/absence of process continuation according to message identifier information and process continuation information included in the input data attribute signal 139 for the plurality of messages set in the register. Furthermore, the hash value calculation circuit 100 executes hash value calculations as needed for each message.

The hash value calculation circuit 100 detects reception of block data of message B before reception of 96 block data set in the register for message A based on:

a counter value BC of the block counter 137 which counts the number of transferred blocks of each message; and
a message identifier included in attribute information.

The hash value calculation circuit 100 then determines to interrupt the hash value calculation of message A.

(Hash Value Calculation)

Figure 14A:
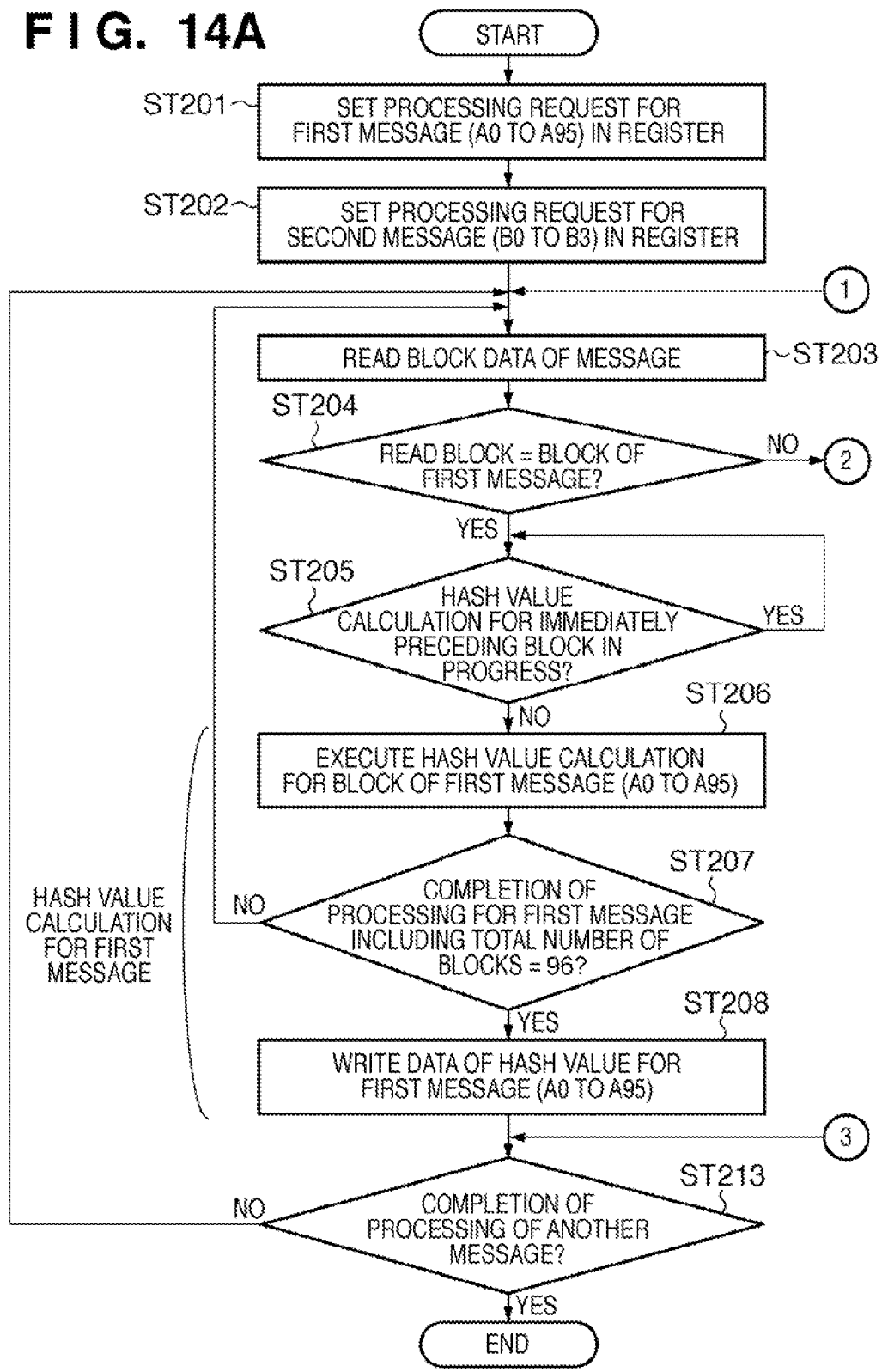
Figure 15B:
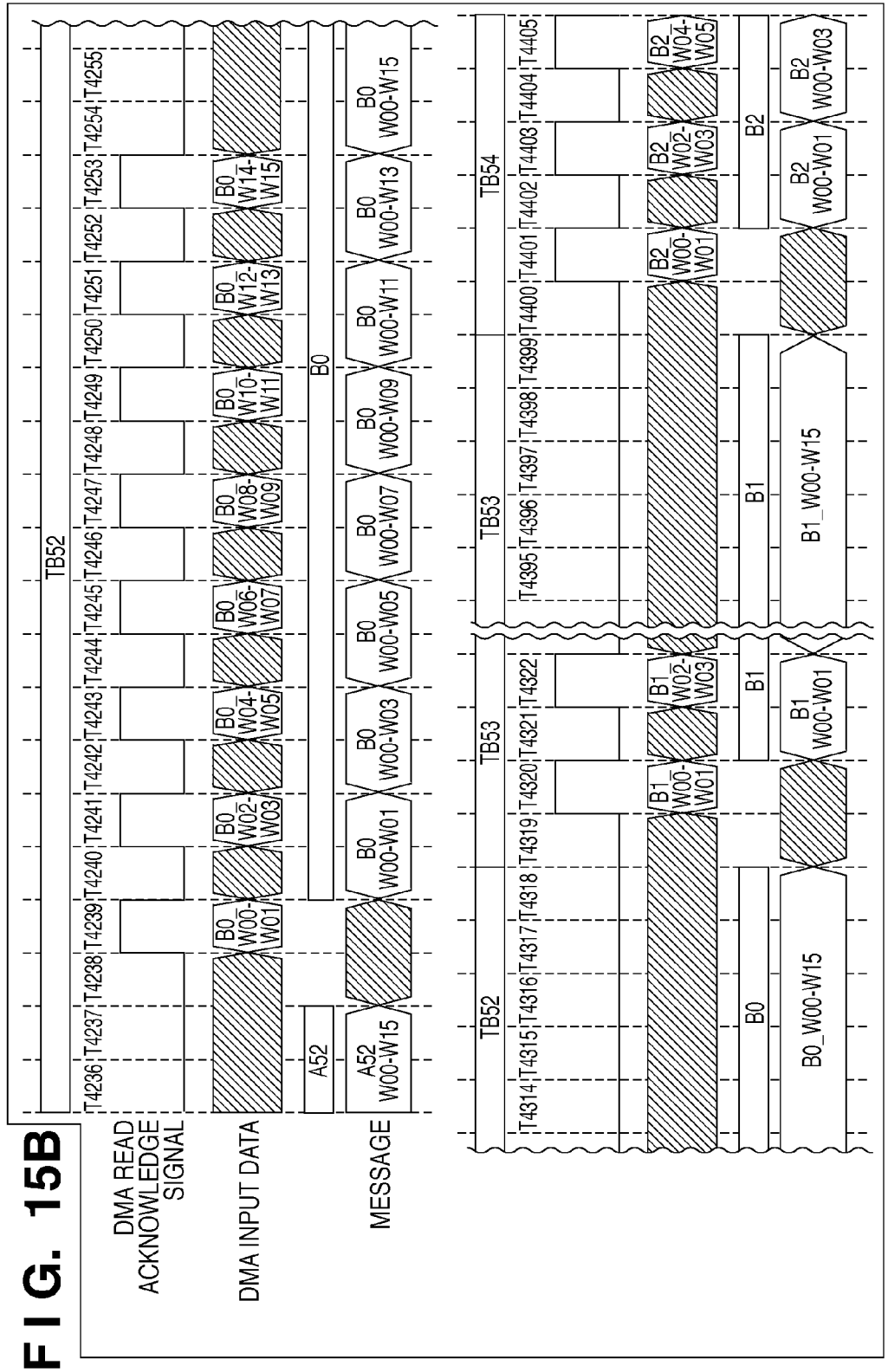
Figure 15C:
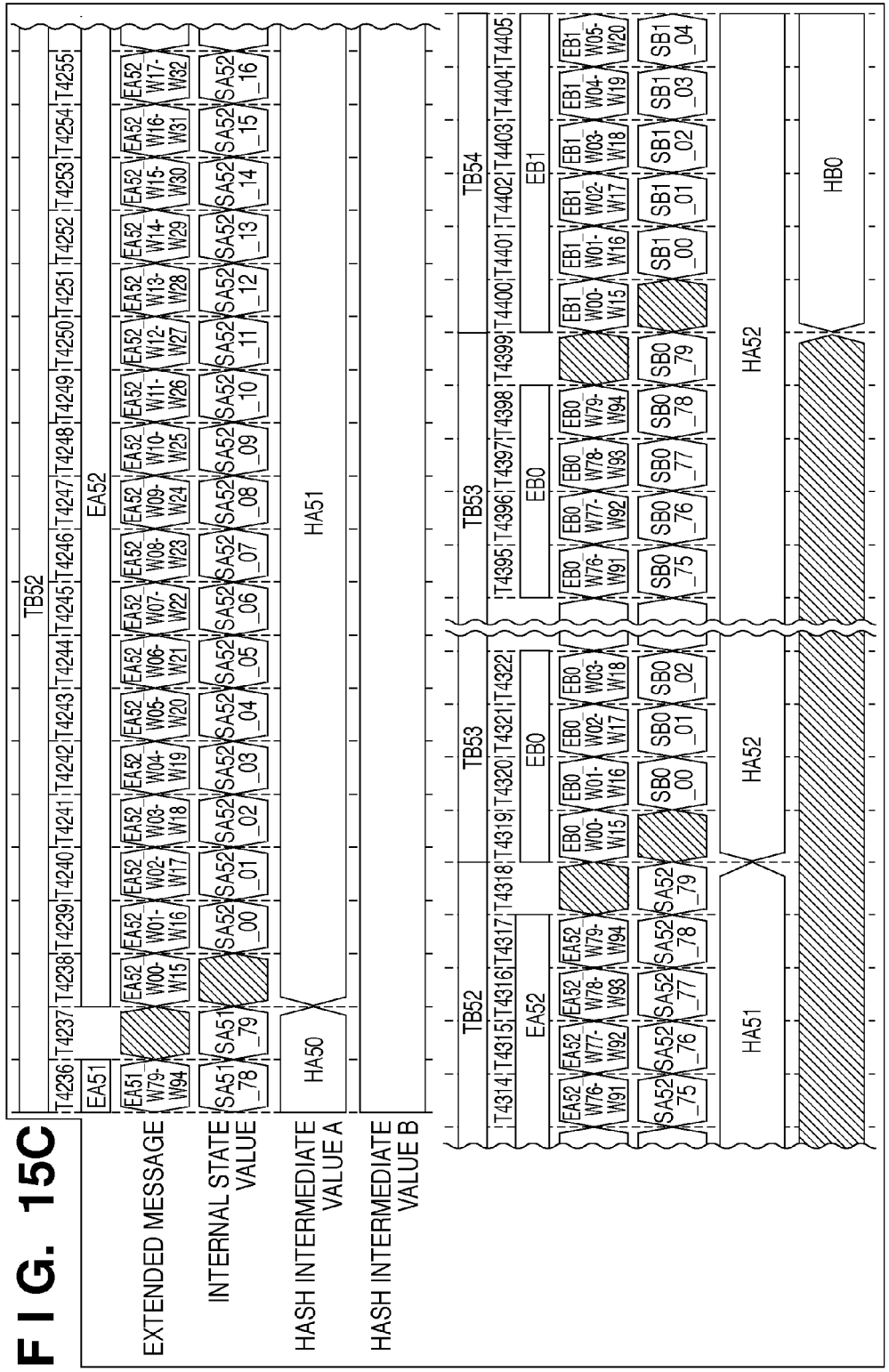
Figure 15D:
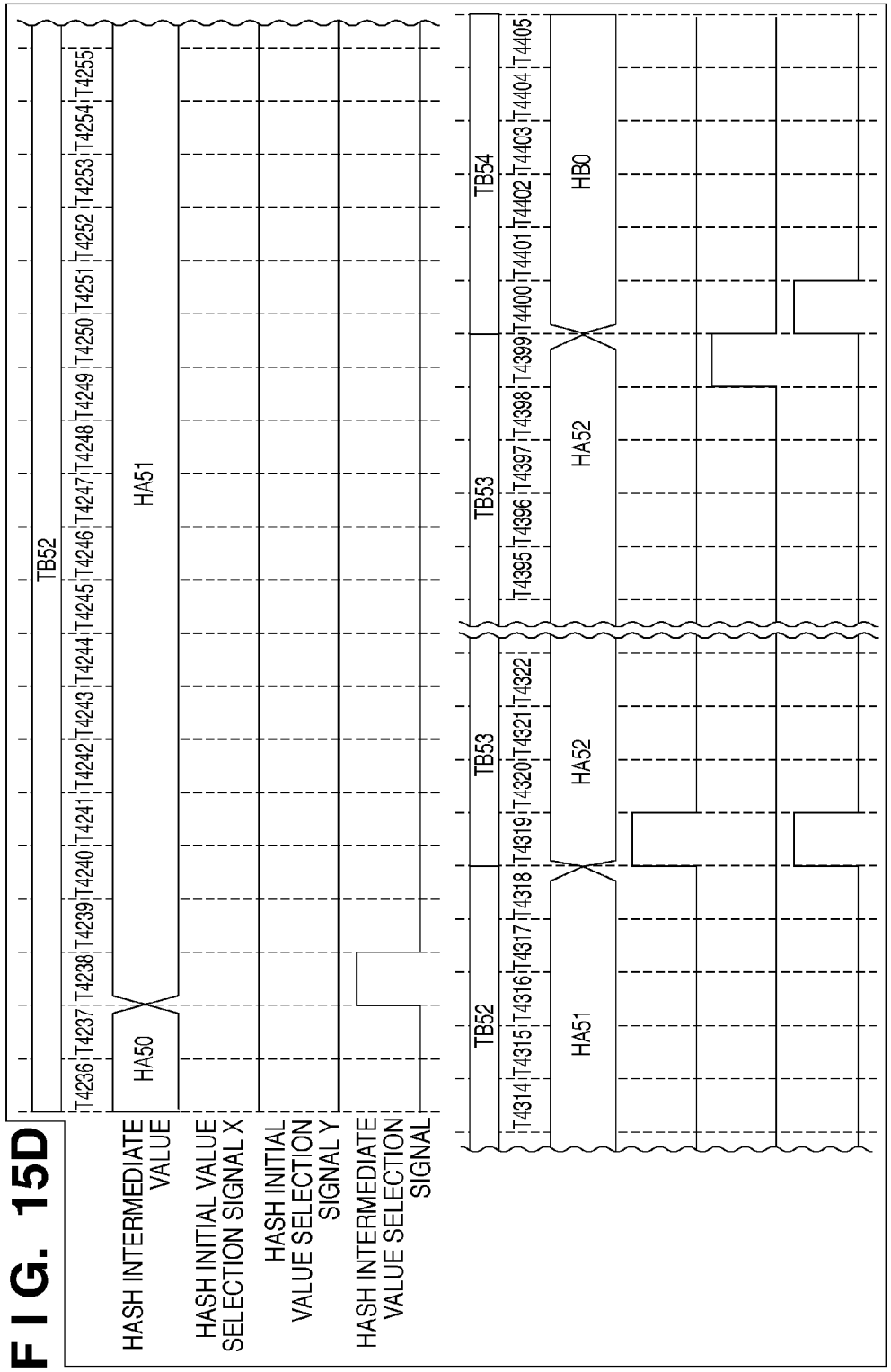
Figure 16B:
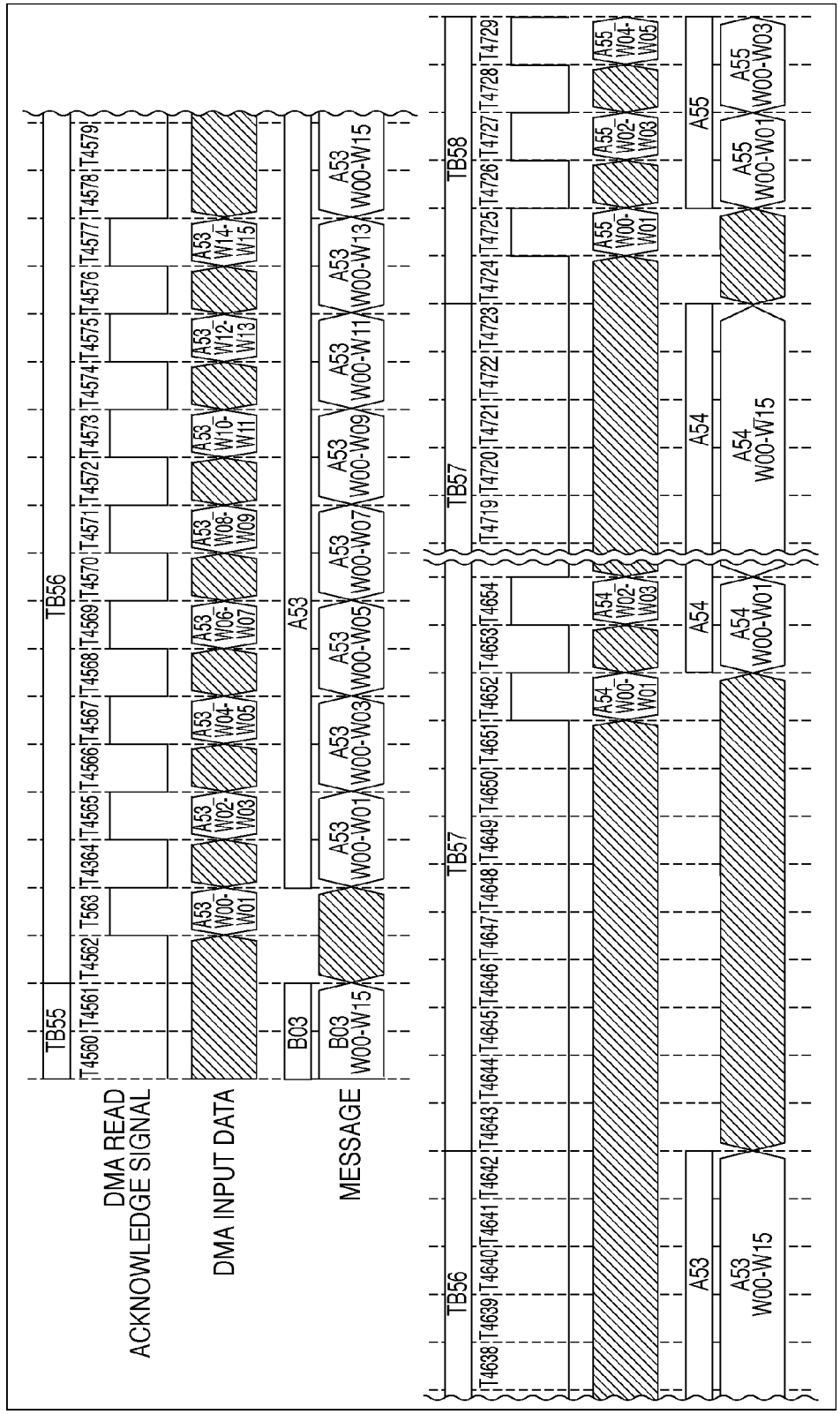
Figure 16C:
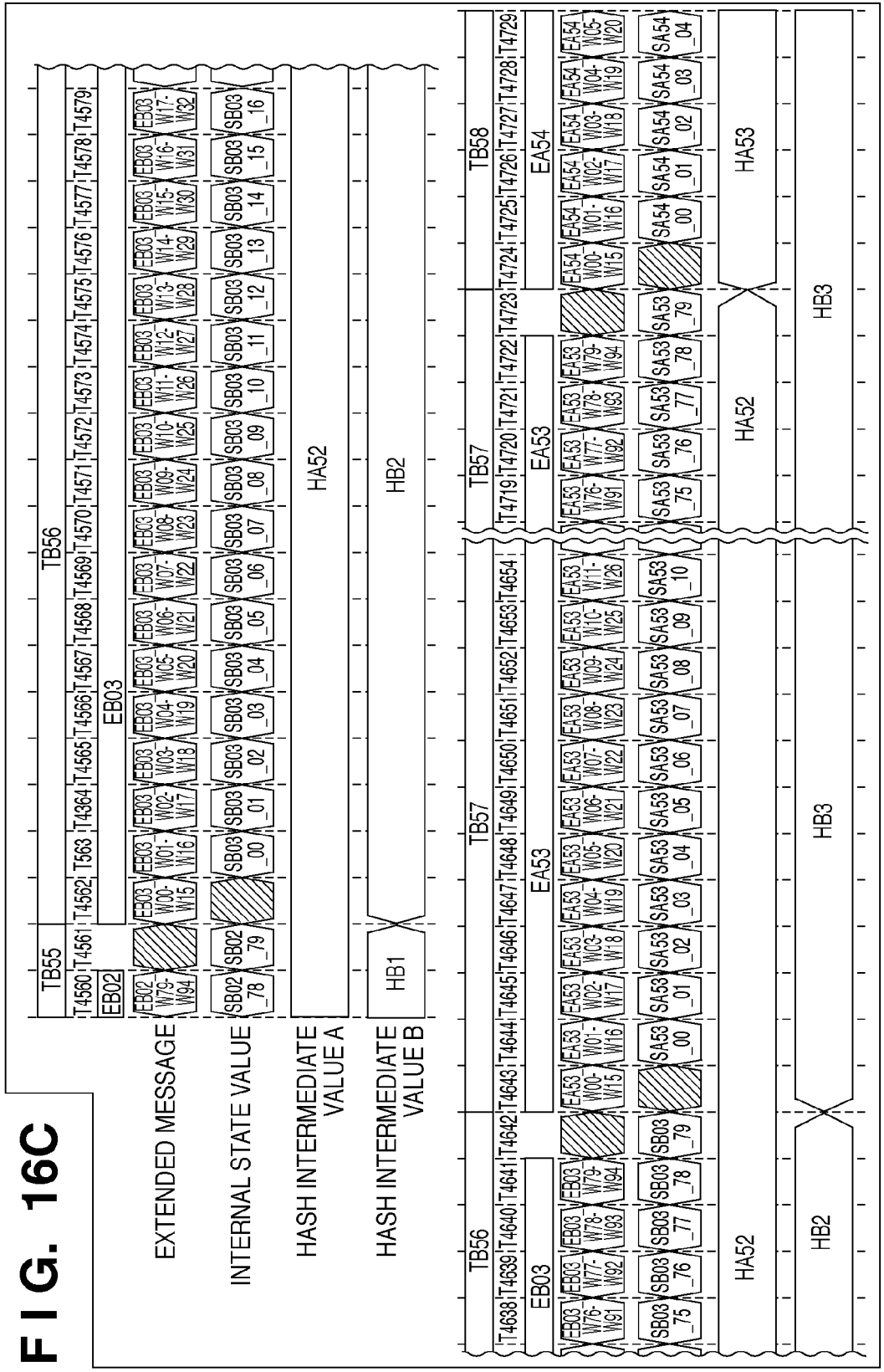
Figure 16D:
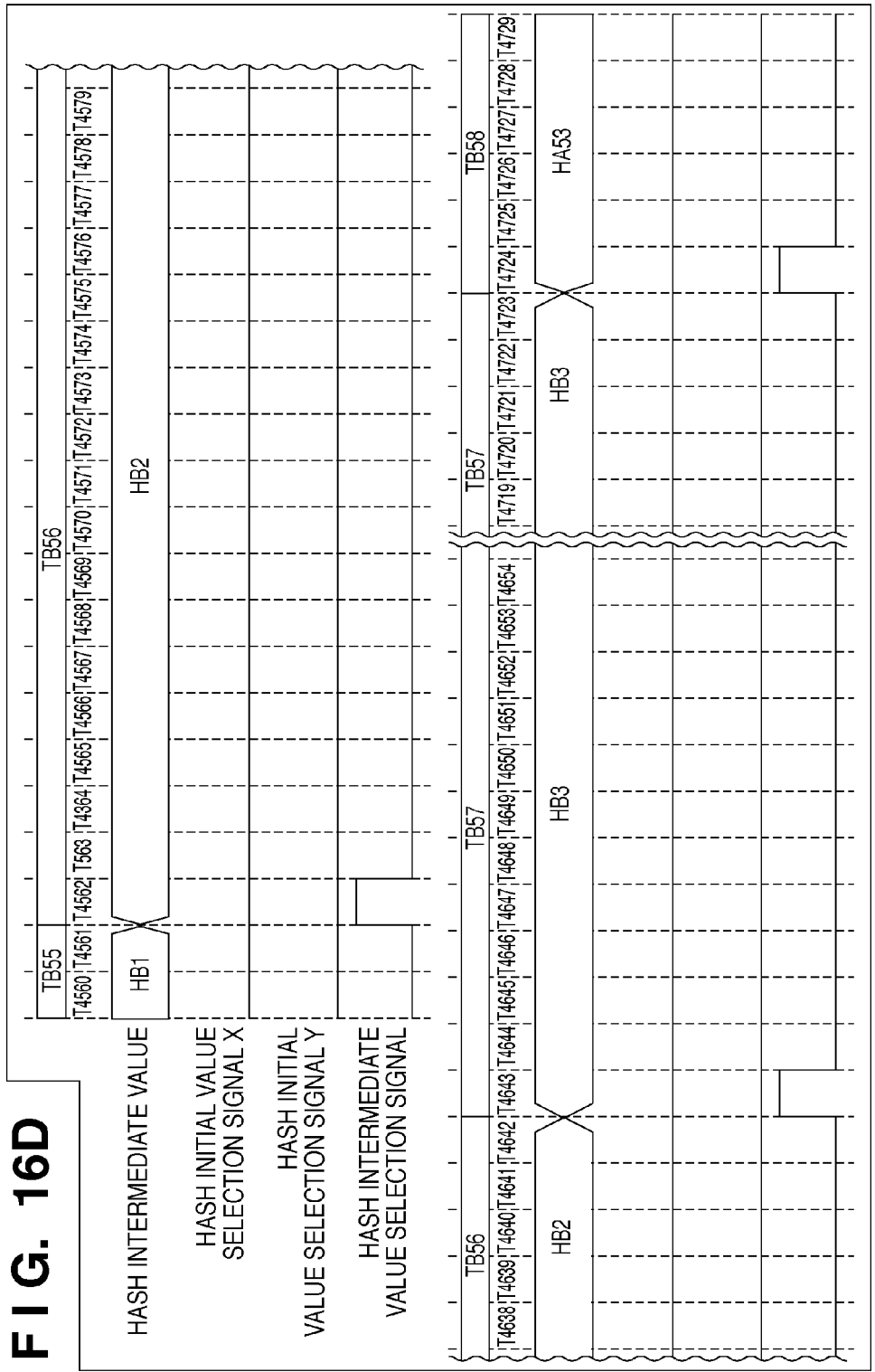

FIGS. 14A and 14B are flowcharts showing the operation sequence of the hash value calculations of this embodiment when two messages (blocks A0 to A95 and blocks B0 to B3) are input in the order shown in FIG. 6.

In ST201, the CPU 201 sets a processing request for the first message (A0 to A95) in the register 116 of the hash value calculation circuit 100.

In ST202, the CPU 201 sets a processing request for the second message (B0 to B3) in the register 116 of the hash value calculation circuit 100.

In ST203, the hash value calculation circuit 100 issues a read request to the DMAC 203 to read data for one block of the message.

In ST204, the hash value calculation circuit 100 determines the message of the read block data based on a message identifier of the attribute signal. If the message identifier indicates message A, the process advances to ST205; if it indicates message B, the process advances to ST209.

The hash value calculation circuit 100 determines in ST205 whether or not the hash value calculation for the immediately preceding block is in progress. If the hash value calculation is in progress, the process waits until the hash value calculation of that block is completed; if the hash value calculation is complete, the process advances to ST206.

In ST206, the hash value calculation circuit 100 executes the hash value calculation for one block of the first message (A0 to A95).

The hash value calculation circuit 100 determines in ST207 whether or not the hash value calculations for the first message (A0 to A95) including the total number of blocks=96 are complete. If the hash value calculations are complete, the process advances to ST208; otherwise, the process returns to ST203.

In ST208, the hash value calculation circuit 100 issues a write request to the DMAC 203 to output a hash value for the first message (A0 to A95).

The hash value calculation circuit 100 determines in ST209 whether or not the hash value calculation for the immediately preceding block is in progress. If the hash value calculation is in progress, the process waits until the hash value calculation of that block is complete; if the hash value calculation is complete, the process advances to ST210.

In ST210, the hash value calculation circuit 100 executes the hash value calculation for one block of the second message (B0 to B3).

The hash value calculation circuit 100 determines in ST211 whether or not the hash value calculations for the second message (B0 to B3) including the total number of blocks=4 are complete. If the hash value calculations are complete, the process advances to ST212; otherwise, the process returns to ST203.

In ST212, the hash value calculation circuit 100 issues a write request to the DMAC 203 to output a hash value for the second message (B0 to B3).

The hash value calculation circuit 100 determines in ST213 if the processing of another message is complete. If the processing is complete; the processing ends; otherwise, the process returns to ST203.

In this embodiment, at T006 and T007 (not shown), the CPU 201 sets the register 116 via the bus 205 and bus signal 117 as in the first embodiment. In this case, the CPU 201 sets a "to start hash value calculation" flag in the "job start" area for message A in the register 116 shown in FIG. 12. Also, the CPU 201 sets a "to process for 96 blocks" flag in the "number of blocks" area, and an "initial value of SHA-1 algorithm" in the "hash initial value" area. Likewise, the CPU 201 sets a "to start hash value calculation" flag in the "job start" area for message B, a "to process for 4 blocks" flag in the "number of blocks area", and an "initial value of SHA-1 algorithm" in the "hash initial value" area.

After that, the hash value calculation circuit 100 receives the DMA input data 120 and the input data attribute signal 139 of a message which is transferred by the DMAC 203 from the memory. The hash value calculation circuit 100 executes the hash value calculations for each message according to the message identifier and process continuation information included in the input data attribute signal 139, and the total number of blocks and the number of DMA-transferred blocks stored in the register for each message.

(Details of Hash Value Calculation)

FIGS. 15A to 16E are timing charts showing the operations of the hash value calculations for respective steps. FIGS. 15A to 16E respectively show the operations upon switching message A to message B, and those upon switching message B to message A. Only differences from the first embodiment will be described below.

The processes from T000 to T4237 are the same as those in the first embodiment. At T4237, the addition processor 107 inputs an internal state value SA51_79 and a hash intermediate value HA50 to execute the addition process, and outputs a hash intermediate value HA51. At T4238, the hash intermediate value storage unit A 109 stores the hash intermediate value HA51.

At T4237, the hash value calculation controller 113 asserts the block load signal 124. The extended message storage unit 102 detects assertion of the block load signal 124, and loads a block A52 stored in the message storage unit 101 at T4238.

Assume that the CPU 201 controls the DMAC 203 to start transfer of message B from the memory 202 to the hash value calculation circuit 100 after completion of transfer of the block A52. At T4238, the hash value calculation controller 113 asserts the DMA read request signal 122 to read data of the next block in response to that the extended message storage unit 102 stores the data of the block A52 stored in the message storage unit 101.

From T4238 to T4318, the hash value calculation for the block A52 is executed.

On the other hand, from T4239 to T4253, the DMAC 203 returns the DMA data read acknowledge signal 123, and transfers a block B0 from the memory 202 to the hash value calculation circuit 100 at the same time. At T4254, the message storage unit 101 stores the block B0. Simultaneously with loading of the block B0, the hash value calculation controller 113 loads the input data attribute signal 139 to identify information indicating "message B" and that indicating "to use initial value of internal state value". Letting BCX be the counter value of the block counter X 140, the block counter X 140 counts up a counter value BCX corresponding to the block B0 of message B to 1. The block counter 137 stores "53" as the counter value BC corresponding to the block A52 of message A.

At T4319, the hash intermediate value storage unit A 109 stores the hash intermediate value HA52. Since the hash value calculations for message A including the total number of blocks=96 are complete only for 53 blocks from the first block, the hash value calculation controller 113 does not assert the DMA write request signal 122 at T4319. Also, the DMAC 203 does not DMA-transfer the hash intermediate value HA52 from the hash value calculation circuit 100 to the memory 202.

(Operation in Block Unit)

FIGS. 17A and 17B (to be collectively referred to as FIG. 17 hereinafter) are timing charts showing the operations of the hash value calculations for respective blocks according to this embodiment. Note that detailed operations for some step process periods will also be described.

In TB52, the hash value calculation controller 113 asserts the DMA read request signal 122 to the DMAC 203 so as to read data. The DMAC 203 returns the DMA read acknowledge signal 123, and DMA-transfers the first block B0 of message B to the hash value calculation circuit 100. The message storage unit 101 stores the block B0.

In TB53, a block B1 is DMA-transferred, and the hash value calculation for the block B0 is executed. In TB54, since the hash value calculation controller 113 asserts the hash intermediate value B load signal 130, the hash intermediate value storage unit B 110 stores a hash intermediate value HB0 calculated in TB53. The hash value calculation controller 113 deasserts the message A selection signal 131. Then, the selector 111 outputs, to the hash value output unit 114, the output (HB0) from the hash intermediate value storage unit B 110 of the output from the hash intermediate value storage unit A 109 and that from the hash intermediate value storage unit B 110.

In this way, in TB54, the hash intermediate value storage unit A 109 stores the hash intermediate value HA52, and the hash intermediate value storage unit B 110 stores the hash intermediate value HB0.

The hash value calculation for the block B1 is executed using the hash intermediate value HB0 stored in the hash intermediate value storage unit B 110 in TB54.

After that, the DMAC 203 DMA-transfers blocks B2 and B3 from the memory 202 to the hash value calculation circuit 100 in TB54 and TB55.

Assume that the CPU 201 controls the DMAC 203 to resume transfer of the remaining data of message A from the memory 202 to the hash value calculation circuit 100 after completion of transfer of the block B3. Then, the DMAC 203 DMA-transfers a block A53 which forms message A from the memory 202 to the hash value calculation circuit 100 in TB56. At this time, the DMAC 203 transmits a value indicating "to use hash intermediate value" as the process continuation information in the input data attribute signal 139 for message A. After the DMAC 203 completes transfer of the block A53 and the hash value calculation circuit 100 stores data of the block A53, the hash value calculation controller 113 loads the input data attribute signal 139. Then, the hash value calculation controller 113 identifies information indicating "message A" and that indicating "to use hash intermediate value". The block counter X 140 stores "4" as the counter value BCX. The block counter 139 counts up the counter value BC to 54 in correspondence with the block A53 of message A. Note that in the first embodiment, the block A53 is transferred after the register settings for the blocks A53 to A95 of message A are made upon completion of the hash value calculations of message B. By contrast, in this embodiment, the block A53 can be transferred before completion of the hash value calculations of message B.

The hash value calculation circuit 100 executes the hash value calculations for the blocks B1 to B3 in TB54 to TB56. During this interval, the hash value calculation controller 113 does not assert the hash intermediate value A load signal 129, and asserts the hash intermediate value B load signal 130 as needed. For this reason, the hash intermediate value storage unit A 109 does not store any hash intermediate value of message B, and the hash intermediate value storage unit B 110 stores the hash intermediate value of message B. Also, the hash value calculation controller 113 deasserts the message A selection signal 131. Thus, the selector 111 outputs the output from the hash intermediate value storage unit B 110 of the output from the hash intermediate value storage unit A 109 and that from the hash intermediate value storage unit B 110. Other processes are the same as those for the blocks A1 to A3.

As a result, the hash value calculation circuit 100 calculates hash intermediate values HB1 to HB3 in TB54 to TB56.

In TB57, the hash intermediate value storage unit A 109 stores the hash intermediate value HA52 for the blocks A0 to A52 of message A, and the hash intermediate value storage unit B 110 stores the hash intermediate value HB3 for the blocks B0 to B3 of message B. Since message B includes the blocks B0 to B3, as shown in FIG. 5, the hash intermediate value HB3 is output as a hash value HB of message B. In TB57, the hash value calculation controller 113 deasserts the message A selection signal 131. For this reason, the selector 111 outputs, to the hash value output unit 114, the output (HB) from the hash intermediate value storage unit B 110 of the output (HA52) from the hash intermediate value storage unit A 109 and that (HB) from the hash intermediate value storage unit B 110 as the inputs to itself.

At this time, the "to process for 4 blocks" requirement stored in the "number of blocks" area for message B in the register 116 is satisfied. Hence, the hash value calculation controller 113 clears the "to start hash value calculation" flag stored in the "job start" area of the register 116 in TB57. Also, the hash value calculation controller 113 clears the counter value BCX of the block counter X 140. The hash value calculation controller 113 asserts the DMA write request signal 122 to the DMAC 203 in TB57. The DMAC 203 returns the DMA write acknowledge signal 123, and transfers the hash value HB from the hash value output unit 114 to the memory 202. The hash value calculation controller 113 counts the number of times of assertion of the DMA write acknowledge signal 123 by the DMAC 203. The hash value calculation controller 113 confirms that the DMAC 203 asserted the DMA write acknowledge signal 123 three times, and then deasserts the DMA write request signal 122.

In TB57, the DMAC 203 detects deassertion of the DMA write request signal 122 by the hash value calculation circuit 100, asserts the interrupt signal 206, and notifies the interrupt controller 204 of an interrupt. Then, the interrupt controller 204 notifies the CPU 201 of storage of the hash value HB in the memory 202 using an interrupt signal (not shown).

In TB57, the CPU 201 detects based on the interrupt from the DMAC 203 that the processing of "message B" "for 4 blocks" "using the initial value of the internal state value" is complete.

In TB57, a block A54 is DMA-transferred, and the hash value calculation for the block A53 is executed. After that, the DMAC 203 DMA-transfers blocks A55 to A95 from the memory 202 to the hash value calculation circuit 100 in TB58 to TB98. The hash value calculation circuit 100 executes the hash value calculations for the blocks A54 to A95 in TB58 to TB99. During this interval, the hash value calculation controller 113 does not assert the hash intermediate value B load signal 130, and asserts the hash intermediate value A load signal 129 as needed. For this reason, the hash intermediate value storage unit B 110 does not store any hash intermediate value of message A, and the hash intermediate value storage unit A 109 stores the hash intermediate value of message A. The hash value calculation controller 113 asserts the message A selection signal 131. For this reason, the selector 111 outputs the output from the hash intermediate value storage unit A 109 of the output from the hash intermediate value storage unit A 109 and that from the hash intermediate value storage unit B 110. Other processes are the same as those for other blocks.

As a result, in TB100, the hash intermediate value storage unit A 109 stores a hash intermediate value HA95 for the blocks A0 to A95. Since message A includes the blocks A0 to A95, as shown in FIG. 5, the hash intermediate value HA95 is output as a hash value HA of message A. In TB100, the hash value calculation controller 113 asserts the message A selection signal 131. For this reason, the selector 111 outputs, to the hash value output unit 114, the output (HA) from the hash intermediate value storage unit A 109 of the output (HA) from the hash intermediate value storage unit A 109 and that (HB) from the hash intermediate value storage unit B 110 as the inputs to itself.

At this time, the "to process for 96 blocks" requirement stored in the "number of blocks" area for message A in the register 116 is satisfied. Then, the hash value calculation controller 113 clears the "to start hash value calculation" flag stored in the "job start" area of the register 116 in TB100. Also, the hash value calculation controller 113 clears the counter value BC of the block counter 137.

The hash value calculation controller 113 asserts the DMA write request signal 122 to DMAC 203 in TB100. The DMAC 203 returns the DMA write acknowledge signal 123, and transfers the hash value HA from the hash value output unit 114 to the memory 202. The hash value calculation controller 113 counts the number of times of assertion of the DMA write acknowledge signal 123 by the DMAC 203. The hash value calculation controller 113 confirms that the DMAC 203 asserted the DMA write acknowledge signal 123 three times, and then deasserts the DMA write request signal 122.

In TB100, the DMAC 203 detects deassertion of the DMA write request signal 122 by the hash value calculation circuit 100, asserts the interrupt signal 206, and notifies the interrupt controller 204 of an interrupt. Then, the interrupt controller 204 notifies the CPU 201 of storage of the hash value HA in the memory 202 using an interrupt signal (not shown).

In TB100, the CPU 201 detects based on the interrupt from the DMAC 203 that the processing of "message A" "for 96 blocks" "using the initial value of the internal state value" is complete.

As described above, according to this embodiment, the message identifier and process continuation information are extracted from the input data attribute signal appended to data of a message, and are identified. Then, when the hash value calculations for the first message are interrupted in the middle of the processing, and those for another second message are executed first, the hash value calculation period can be further shortened compared to the first embodiment. That is, a time required to DMA-transfer the hash value calculation result (hash intermediate value) to the memory after the hash value calculations up to the middle block of the first message, and a time required to make the register settings for a message at the beginning of the hash value calculations for each message can be reduced. Also, the hash value calculations for the second message can be completed earlier.

More specifically, in FIGS. 9A to 9E which show the timing charts of the hash value calculations for respective steps in the first embodiment, the hash value of message B is output at the timing of T4669 in TB58. In contrast, in FIGS. 16A to 16E which show the timing charts of the hash value calculations for respective steps in the second embodiment, the hash value HB of message B is output at the timing of T4643 in TB57.

In the second embodiment, the hash value calculation period is shortened by 26 basic processing periods corresponding to the period of TB53 in the first embodiment, compared to the first embodiment. The DMA transfer period of the first block of the unprocessed part of the first message can be hidden in the hash value calculation period of the second message, and the hash value calculation of the first message can be resumed earlier than the first embodiment. More specifically, in FIGS. 11A and 11B, the hash intermediate value HA53 for the first block to the block A53 of message A in the first embodiment is output at the timing of T4776 in TB60. By contrast, in FIGS. 16A to 16E, the hash intermediate value HA53 for the first block to the block A53 of message A in the second embodiment is output at the timing of T4724 in TB58. In the second embodiment, the hash value calculation period is shortened by 52 basic processing periods corresponding to the sum of the periods of TB53 and TB58 of the first embodiment, compared to the first embodiment.

In this embodiment, at the time of completion of the hash value calculation for the immediately preceding block, data for one block stored in the circuit is loaded to the extension processor, and a transfer request of data for the next block from the external memory is issued after loading. Although the processing period is prolonged, data of one loaded block may be stored in the storage unit until the hash value calculation for that block is completed and, after that, a transfer request of data for the next block may be issued. At this time, even when the hash value calculation for a block of interest is aborted in the middle of the processing, since the data of the block of interest is stored in the circuit, an effect of reducing an overhead required to load that data again from the external memory can be obtained.

This embodiment has exemplified SHA-1 used as the hash function. However, the hash function may use other algorithms such as MD5 and SHA-256.

In this embodiment, an extended message is sequentially generated for each step. However, extended messages may be simultaneously generated first.

In the arrangement of this embodiment, hash intermediate values for two different messages can be stored. However, the present invention is not limited to such specific arrangement. For example, by arranging three or more hash intermediate value storage units, block counters, register setting areas, and the like, the hash value calculations for three or more different messages can be interrupted and resumed.

In the arrangement of this embodiment, a plurality of hash intermediate value storage units each having a hash intermediate value storage area that can store one hash intermediate value are arranged. However, the present invention is not limited to such specific arrangement. For example, one or a plurality of hash intermediate value storage units each having a hash intermediate value storage area that can store a plurality of hash intermediate values may be arranged.

In this embodiment, the correspondence between the hash intermediate values of respective messages and the hash intermediate value storage units is fixed like that the hash intermediate value of message A is stored in the hash intermediate value storage unit A, and that of message B is stored in the hash intermediate value storage unit B. However, for example, a hash intermediate value storage information storage unit which stores correspondence information indicating correspondence between hash intermediate value storage areas and hash intermediate values of messages may be arranged, and the hash intermediate value storage areas may be decided based on the correspondence information stored in the hash intermediate value storage information storage unit.

In this embodiment, the CPU processes the padding process of the hash value calculation outside the hash circuit. However, the padding process may also be processed inside the hash circuit.

In this embodiment, the DMAC is used as a device used to exchange a message and hash value between the hash value calculation circuit and the external memory. However, other transfer devices may be used.

In this embodiment, the bit width of the DMA input/output data is 64 bits. However, other numbers of bits may be used.

In this embodiment, the basic processing period T of the process for each step of the hash value calculation is equal to that of the DMA transfer process. However, the basic processing periods of the step process and DMA transfer process may be different.

In this embodiment, the input data attribute signal includes the message identifier and process continuation information, and its data width is defined by 8 bits. However, the input data attribute signal may also include another information such as message priority information, and the data width of the signal may be changed depending on information.

In this embodiment, the hash value calculation circuit identifies a block number of an input message by counting the number of input blocks for each message. Alternatively, the input data attribute signal may also include a block number.

In this embodiment, the CPU sets the number of blocks of a message in the register of the hash value calculation circuit, and the hash value calculation circuit detects supply of the message having the number of blocks set by the CPU by counting the DMA acknowledge signals. However, other methods may be used. For example, the CPU may notify completion of message transfer by setting it in the register.

In this embodiment, the settings about messages A and B as those which are to undergo hash value calculations are initially set in the register, and the hash value calculations are executed for message A or B in accordance with an input message. However, when the hash value calculations for message C are required to be started in the middle of the hash value calculations for message A or B, register settings of a hash processing request for message C may be added in the middle of the processing. In this case, the hash value calculations for messages A, B, and C can be executed in accordance with an input message.

Note that the embodiment of the present invention is not limited to the above arrangement, and various modifications may be made.

Third Embodiment

In the second embodiment, the CPU sets job start information, number of blocks information, and hash initial value information in advance the register of the hash value calculation circuit as information of a processing request associated with each message. In the third embodiment, the CPU also sets message priority information in advance in the register in the hash value calculation circuit in addition to the above information.

(Arrangement of Hash Value Calculation Circuit)

Figure 18:
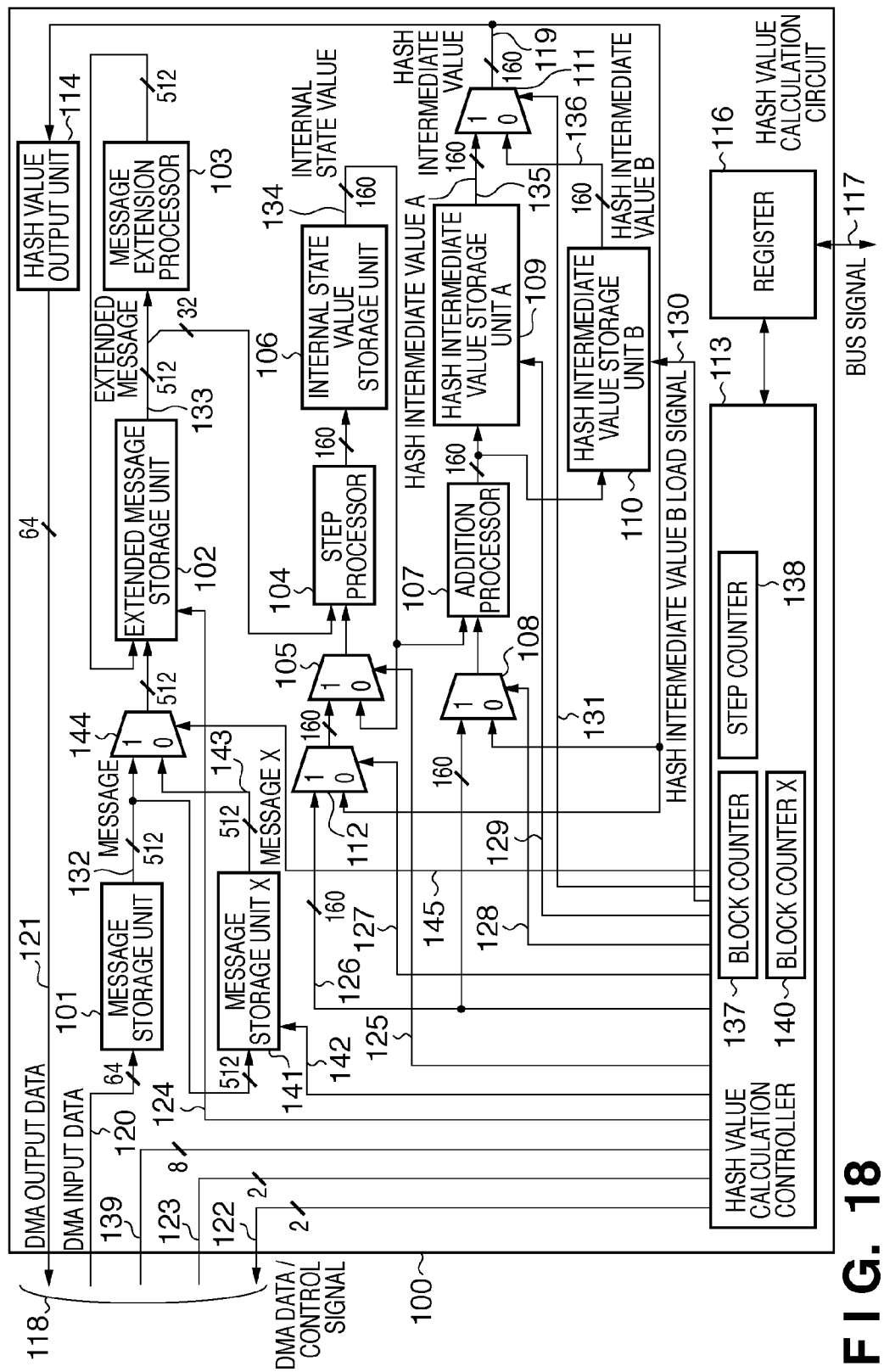
FIG. 18 is a block diagram showing the internal arrangement of a hash value calculation circuit.

FIG. 18 is a block diagram showing the arrangement of a hash value calculation circuit according to this embodiment. Only differences from the second embodiment will be described below with reference to FIG. 18.

Reference numeral 141 denotes a message storage unit X which stores block data. The message storage unit X 141 stores data stored in the message storage unit 101 upon completion of the hash value calculation when all of the following conditions are satisfied.

The priority of a message of block data stored in the message storage unit 101 is low.

The priority of a message of a block whose hash value calculation is in progress is low.

The block whose hash value calculation is in progress is stored in itself.

Reference numeral 142 denotes a block load signal X, which is output from the hash value calculation controller 113 so as to load data of a message stored in the message storage unit 101 to the message storage unit X. Reference numeral 143 denotes a message X which is output from the message storage unit X 141 to a selector 144 (to be described below). Reference numeral 144 denotes a selector which selects one of the message 132 and the message X 143, and outputs the selected message to the extended message storage unit 102. Reference numeral 145 denotes a message X selection signal which is output from the hash value calculation controller 113 as a control signal of the selector 144.

(Storage Contents of Register)

Figure 19:
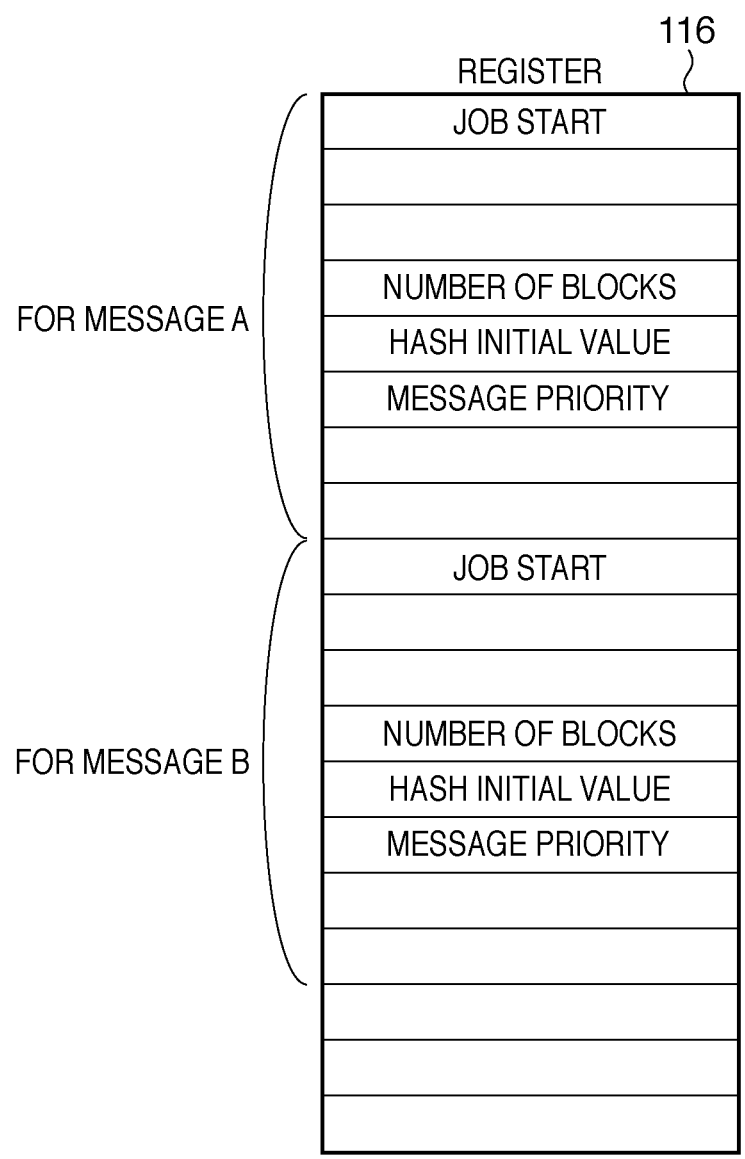
FIG. 19 is a view showing the internal configuration of a register in the hash value calculation circuit.

FIG. 19 is a view showing information stored in the register 116 in the hash value calculation circuit 100. Only differences from the second embodiment will be described below.

The register 116 has storage areas of job start information, number of blocks information, hash initial value information, and message priority information for each message type.

In this embodiment, at T006 and T007, the CPU 201 sets the register 116 via the bus 205 and bus signal 117 as in the second embodiment. In this case, the CPU 201 sets a "to start hash value calculation" flag in the "job start" area for message A of the register 116 shown in FIG. 19. Furthermore, the CPU 201 sets a "to process for 96 blocks" flag in the "number of blocks" area, an "initial value of SHA-1 algorithm" in the "hash initial value" area, and a "low priority" flag in the "message priority" area. Likewise, the CPU 201 sets a "to start hash value calculation" flag in the "job start" area for message B. Furthermore, the CPU 201 sets a "to process for 4 blocks" flag in the "number of blocks" area, an "initial value of SHA-1 algorithm" in the "hash initial value" area, and a "high priority" flag in the "message priority" area.

After that, the hash value calculation circuit 100 receives the DMA input data 120 and input data attribute signal 139 of a message which is transferred by the DMAC 203 from the memory. The hash value calculation circuit 100 executes the hash value calculations for each message according to the message identifier and process continuation information included in the input data attribute signal 139, and the total number of blocks and the number of DMA-transferred blocks stored in predetermined areas of the register for each message.

(Hash Value Calculation)

Figure 20A:
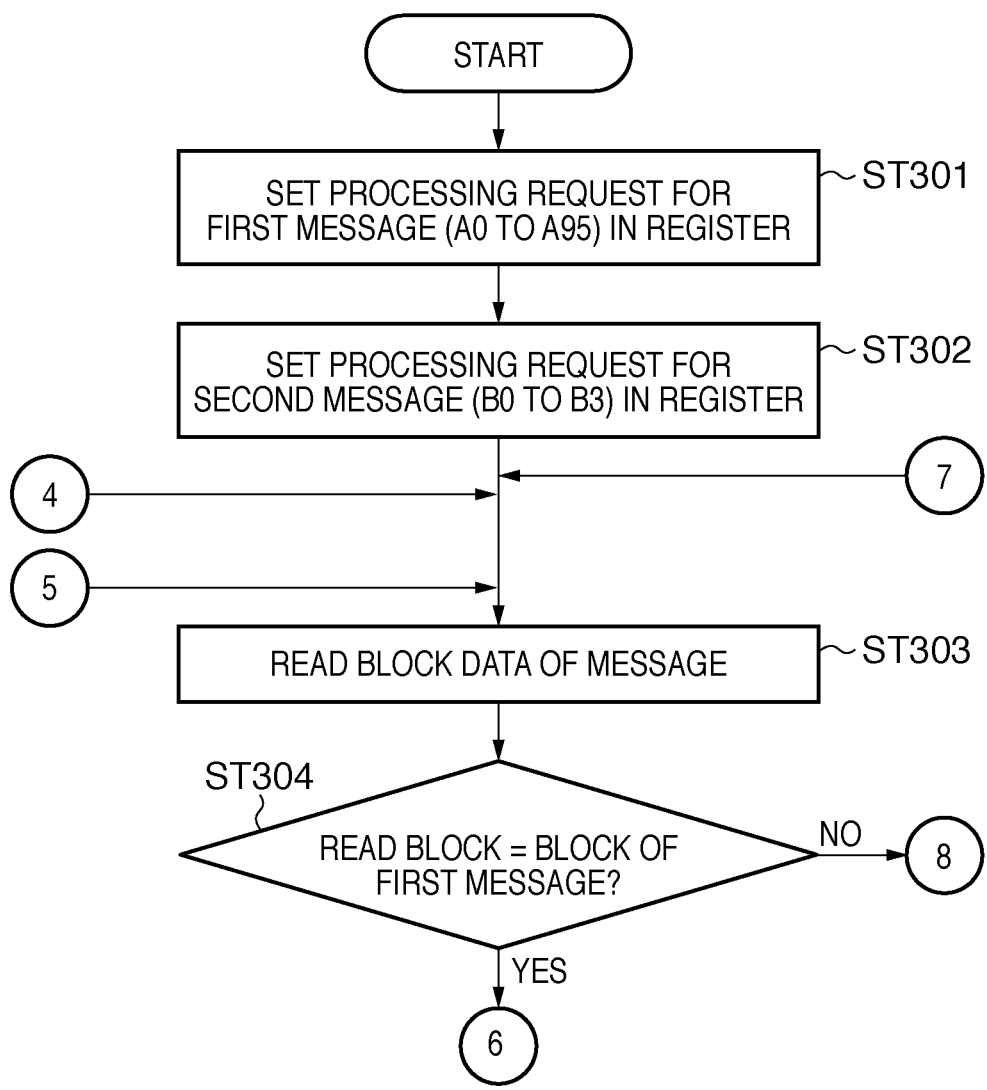
FIGS. 20A, 20B and 20C are flowcharts showing the operation sequence of the hash value calculations for a plurality of messages in the hash value calculation system.
Figure 20B:
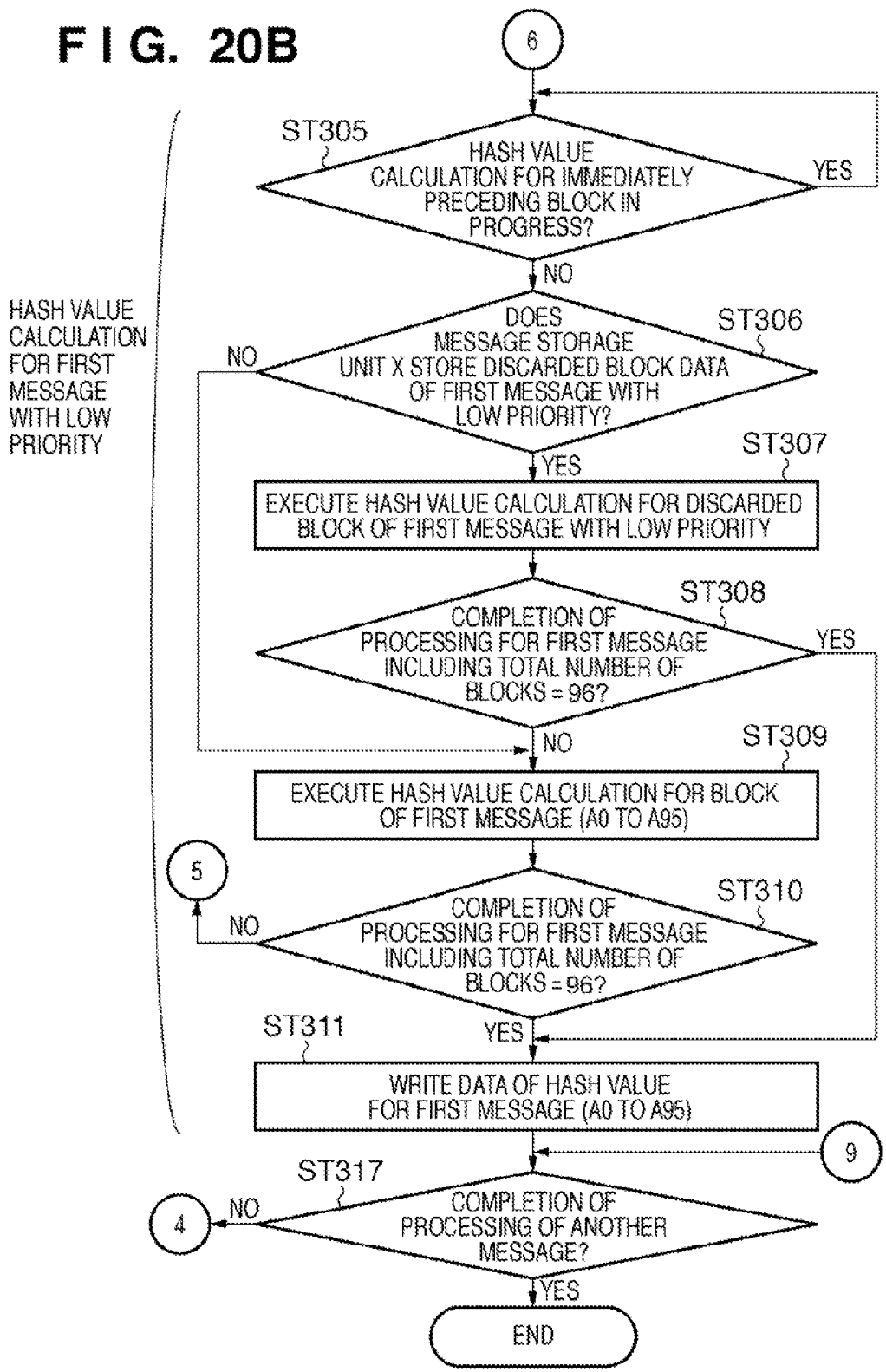
Figure 20C:
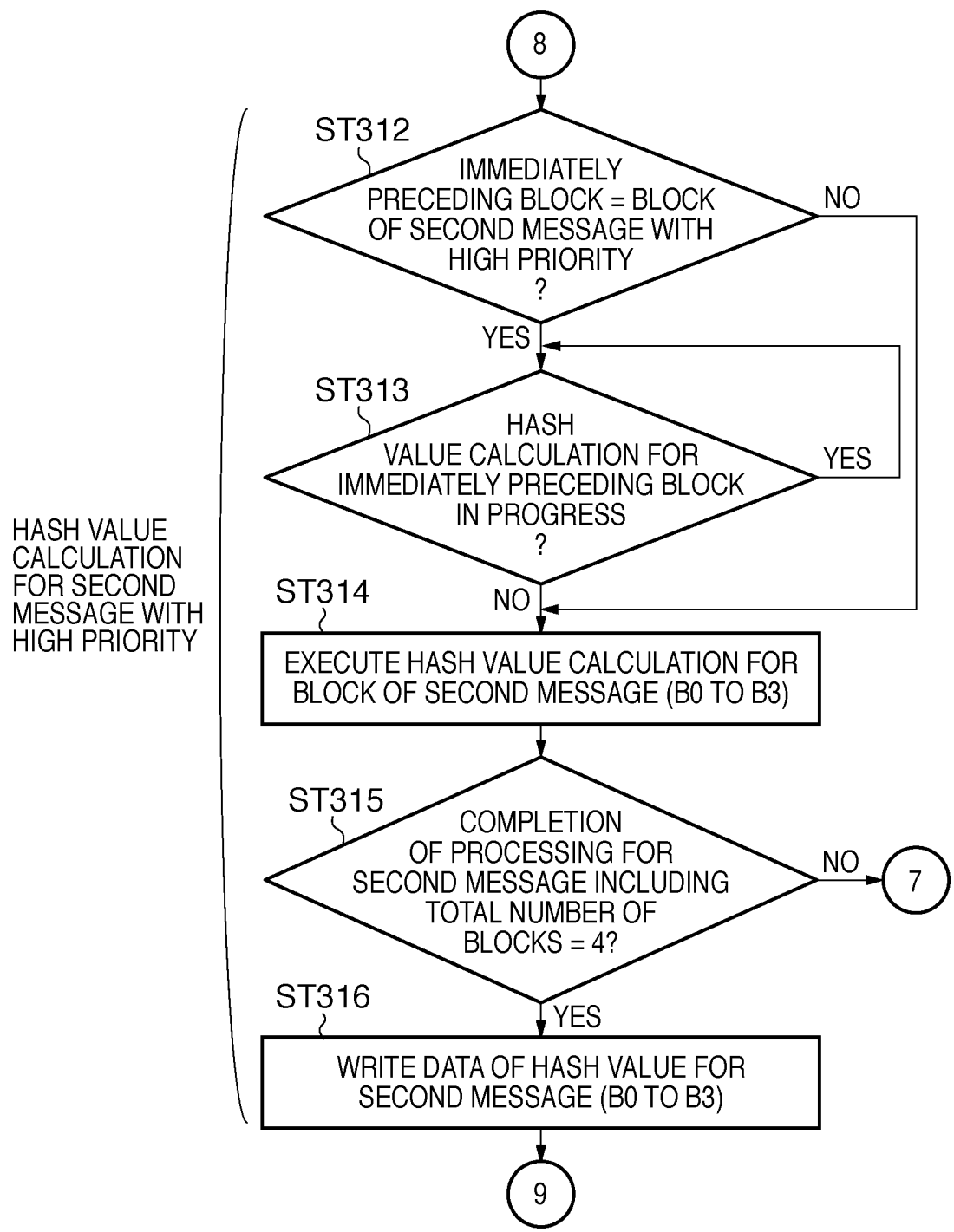
Figure 21B:
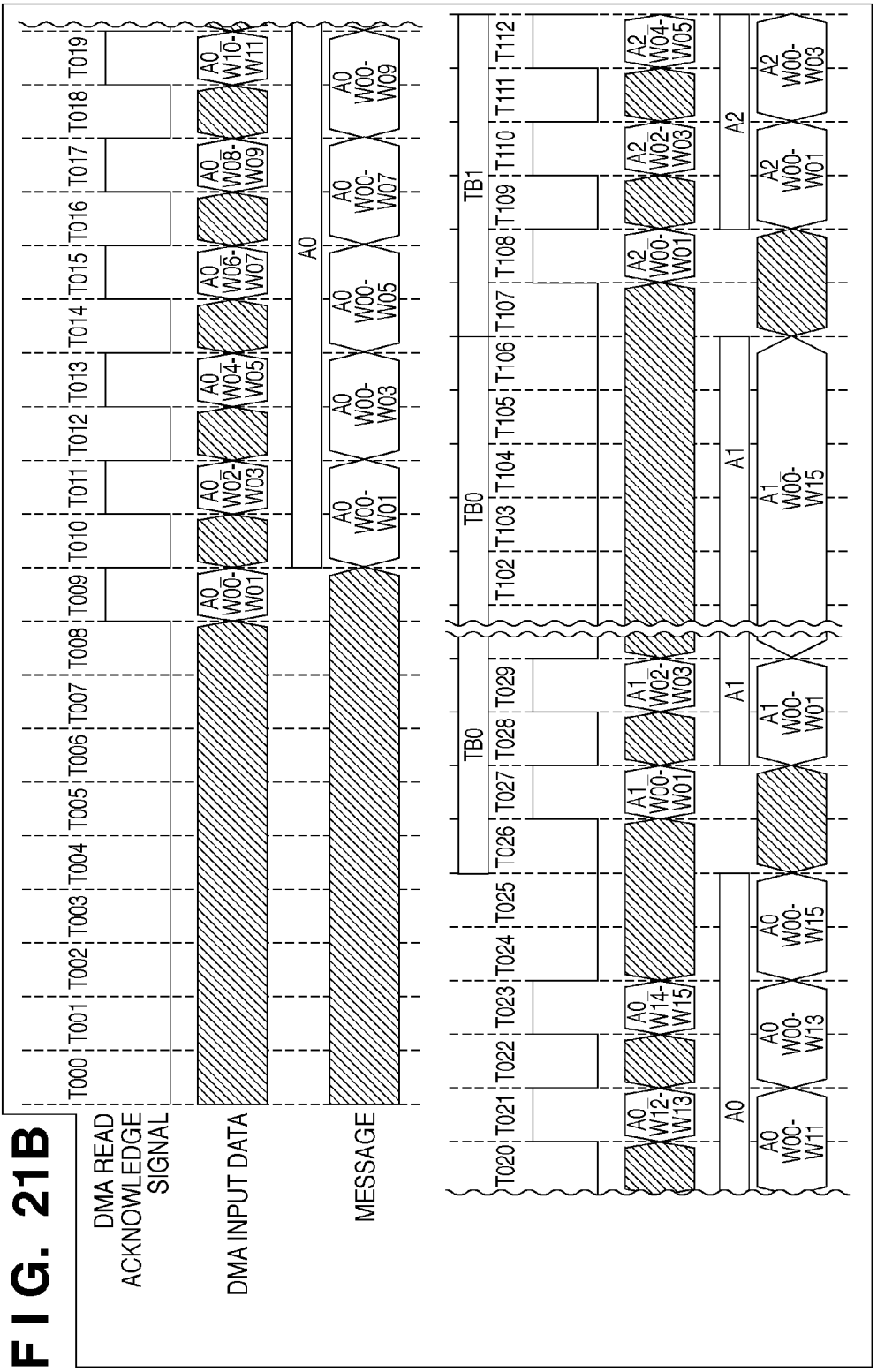
Figure 21C:
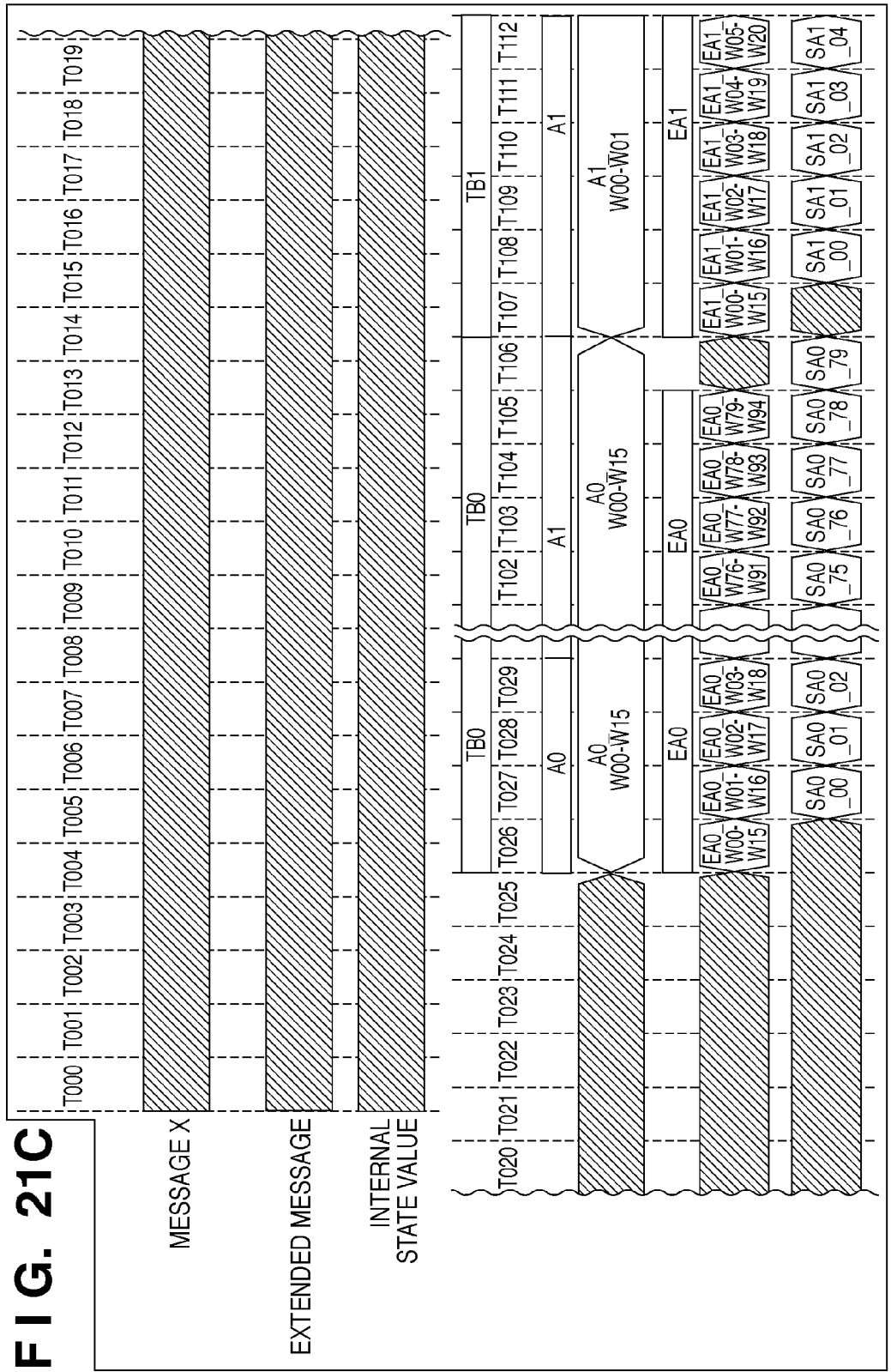
Figure 21D:
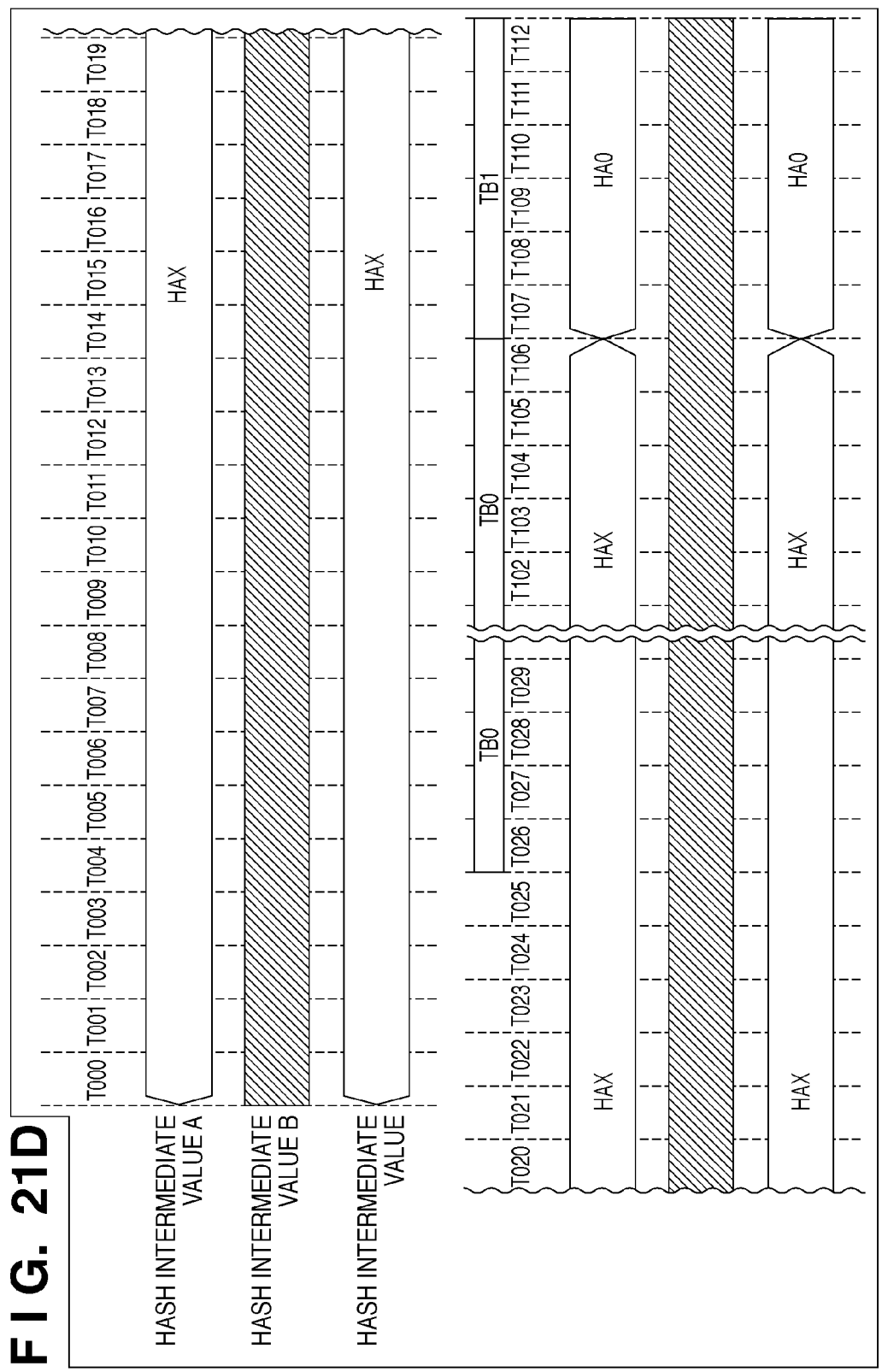
Figure 21G:
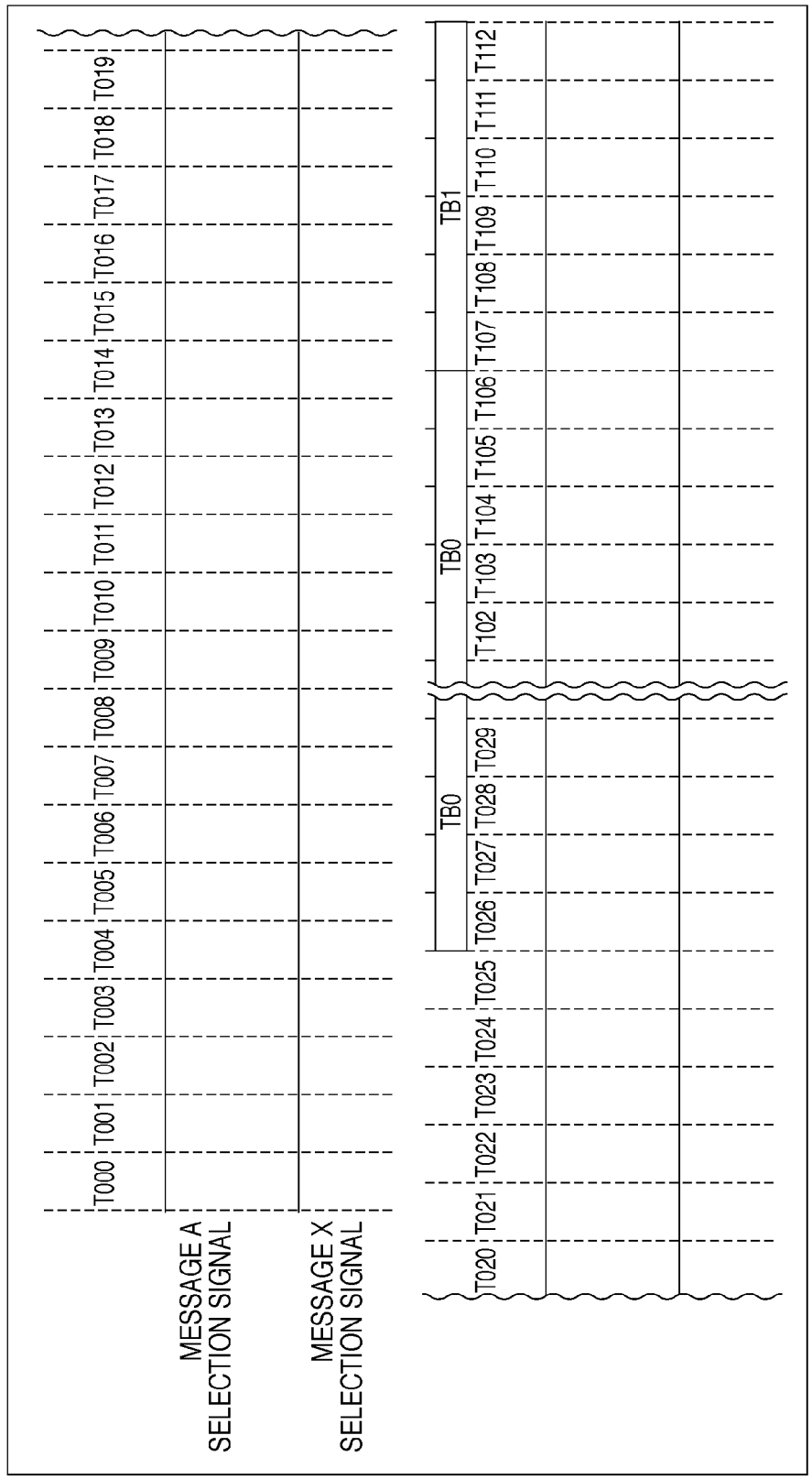
Figure 22A:
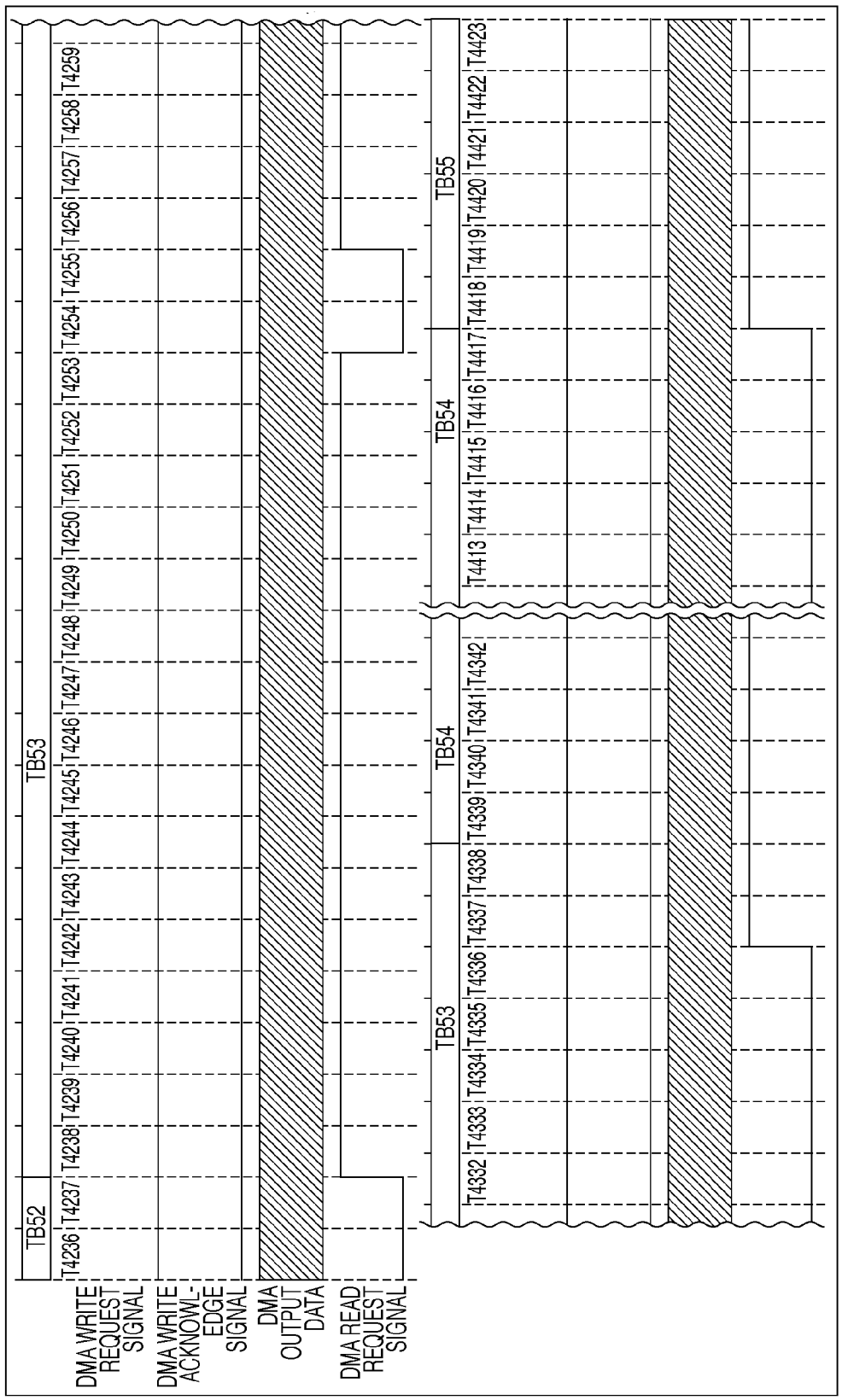
FIGS. 22A to 22F are timing charts showing the hash value calculations for respective steps.
Figure 22B:
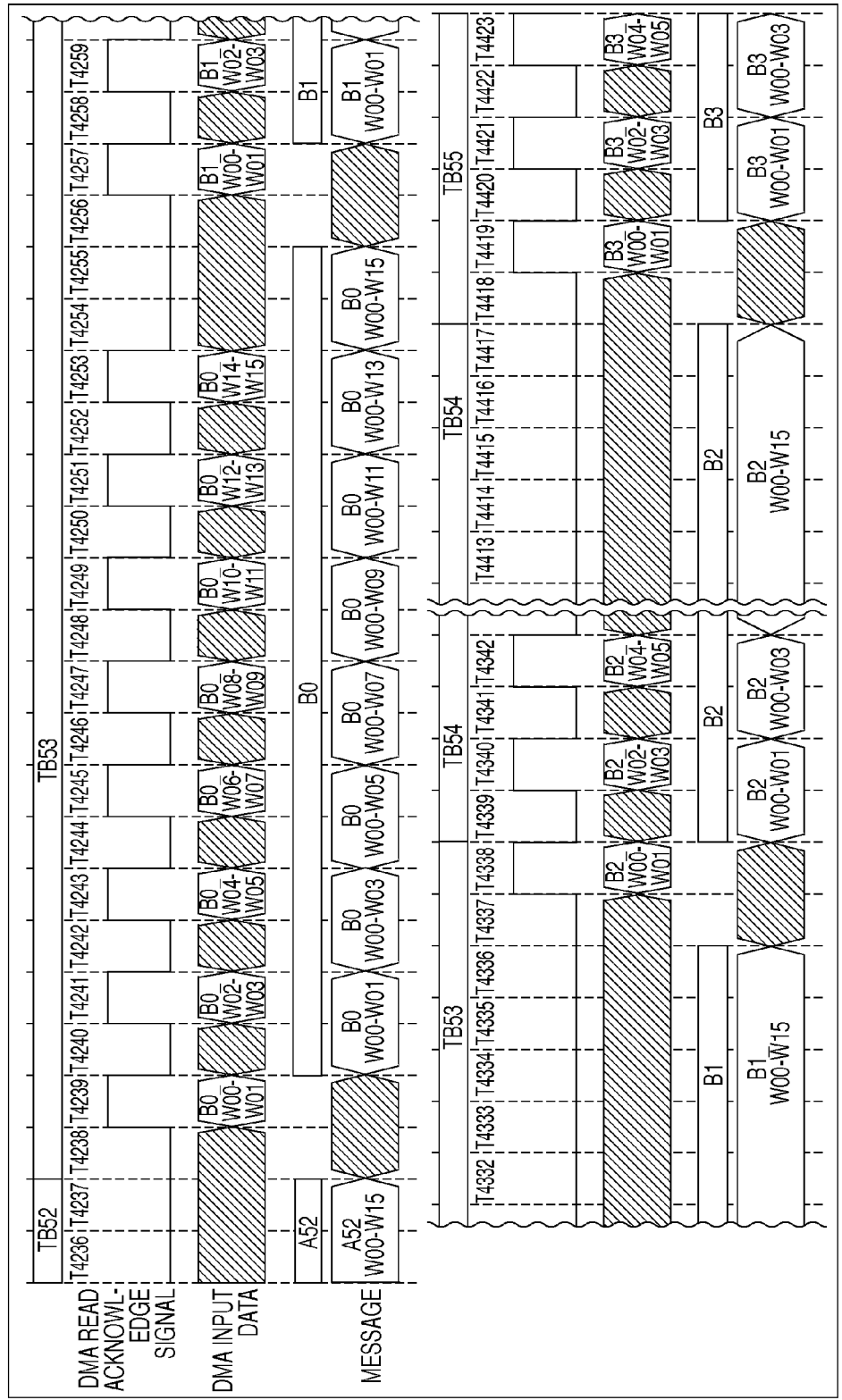
Figure 22C:
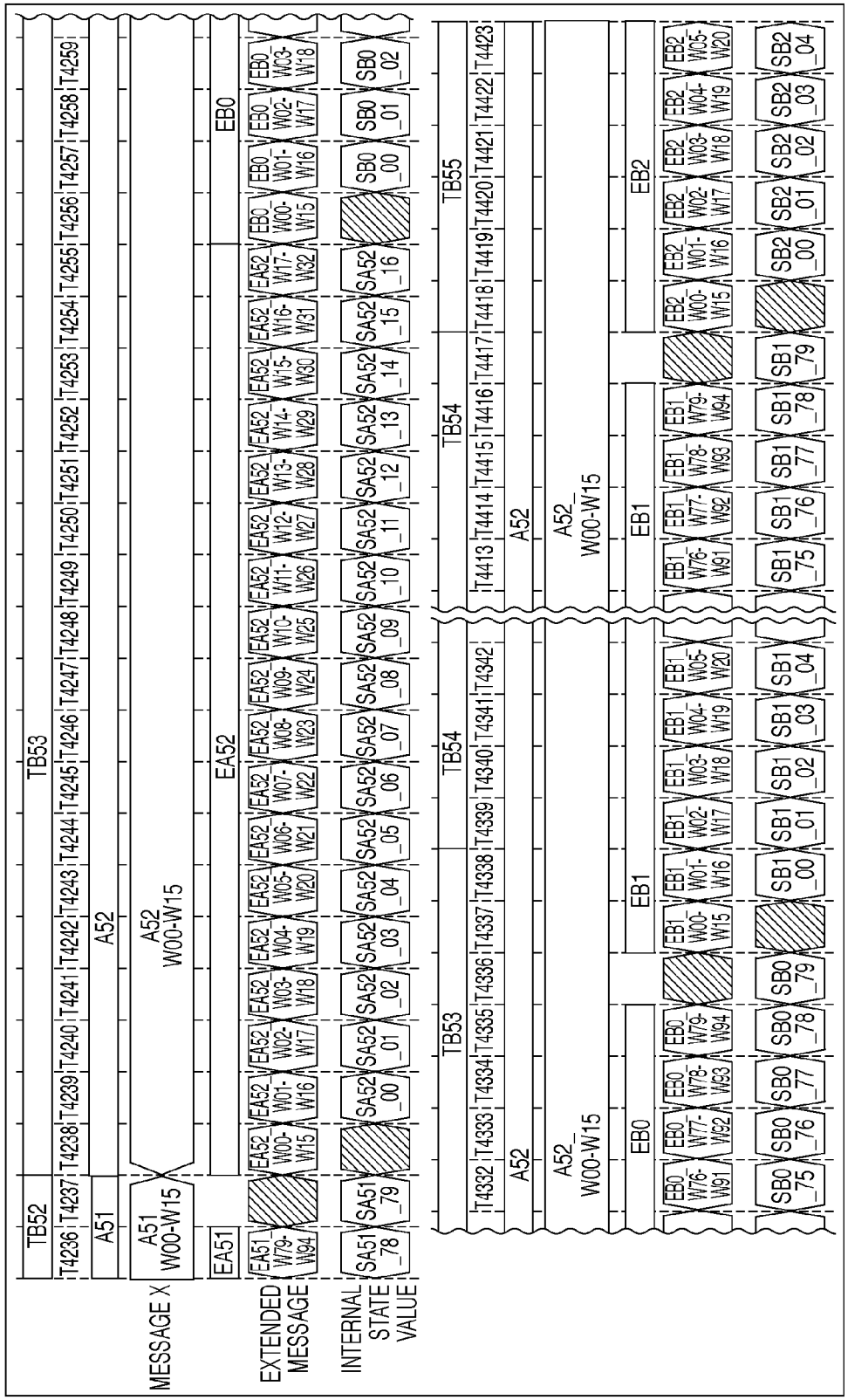
Figure 22D:
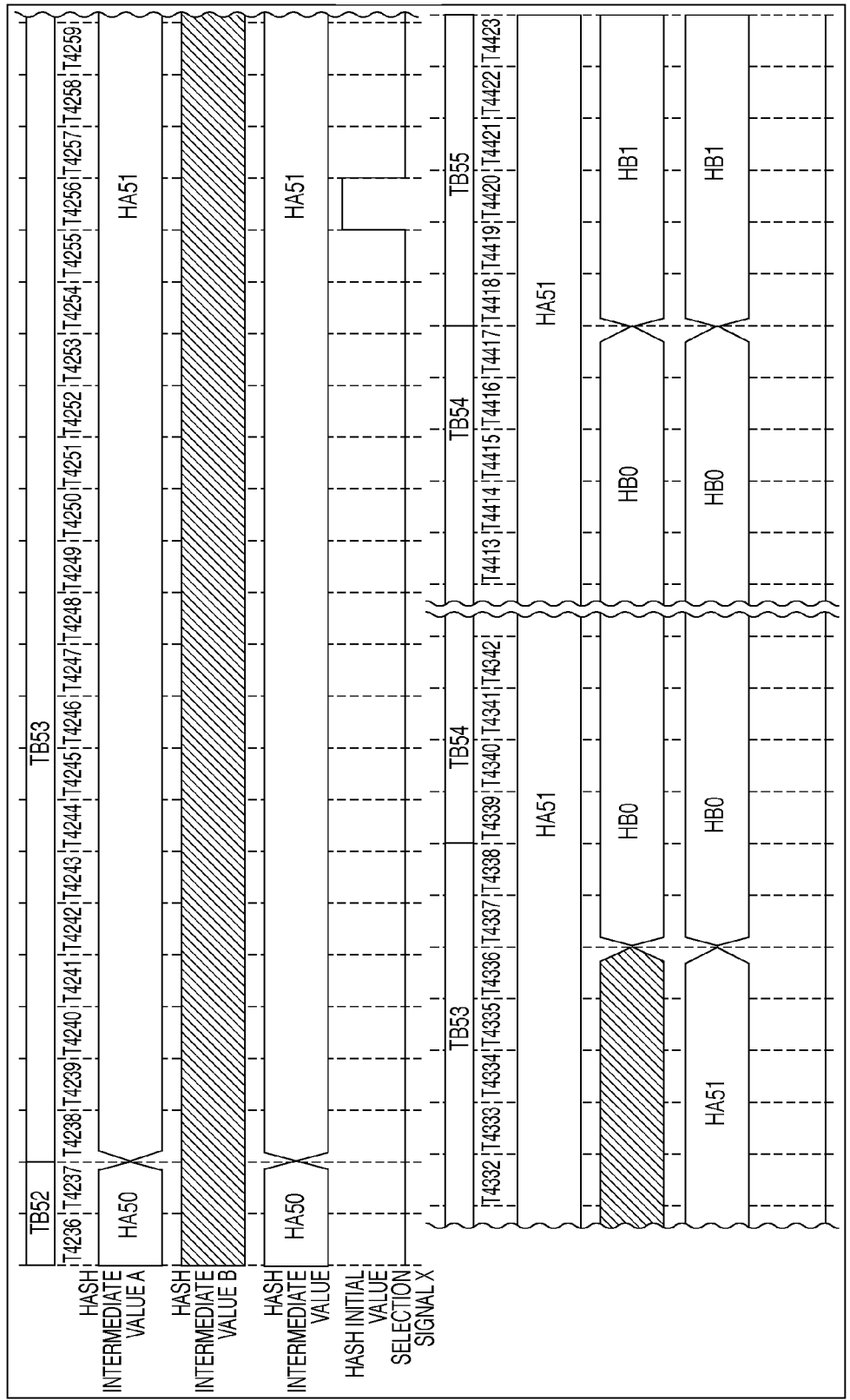
Figure 22E:
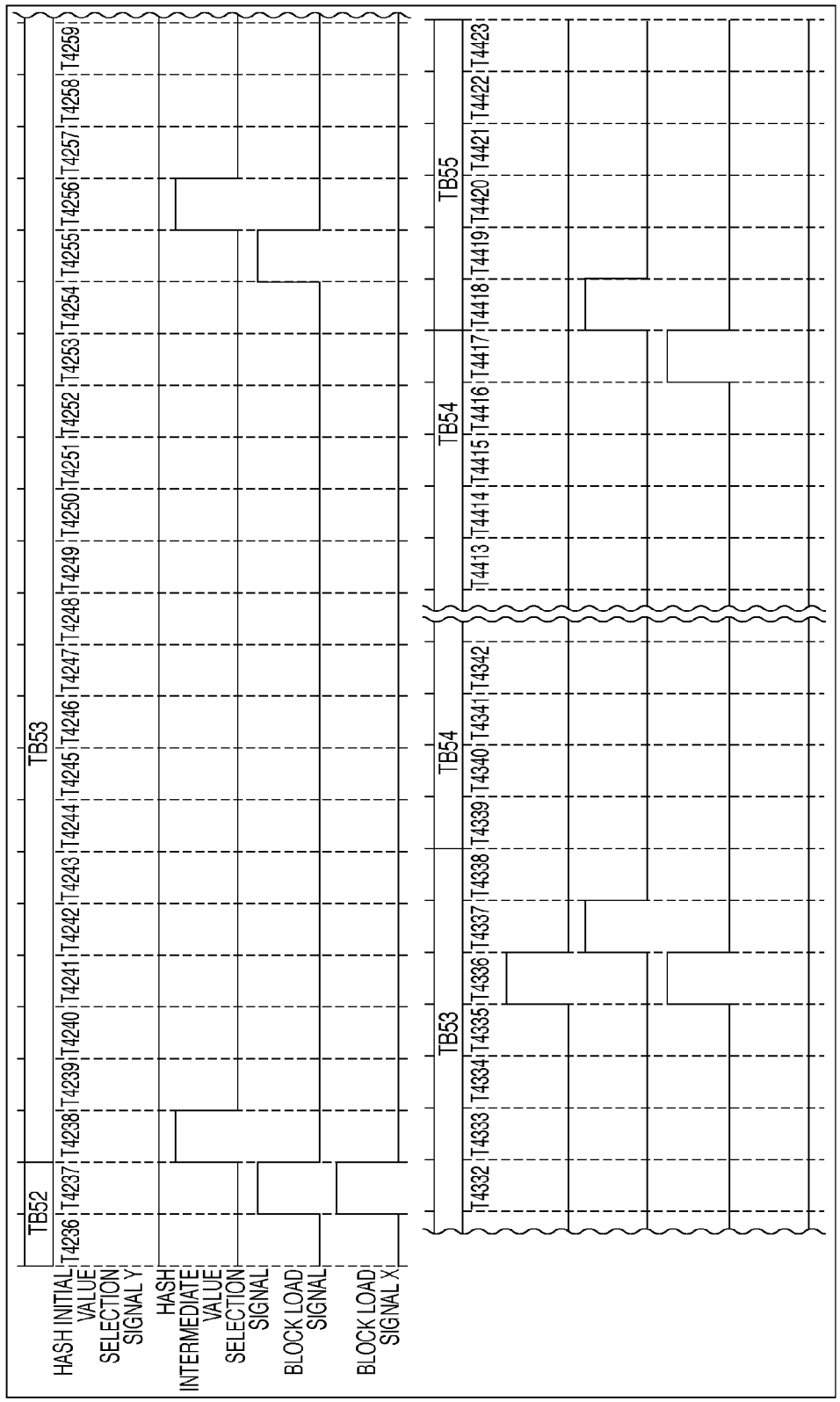
Figure 22F:
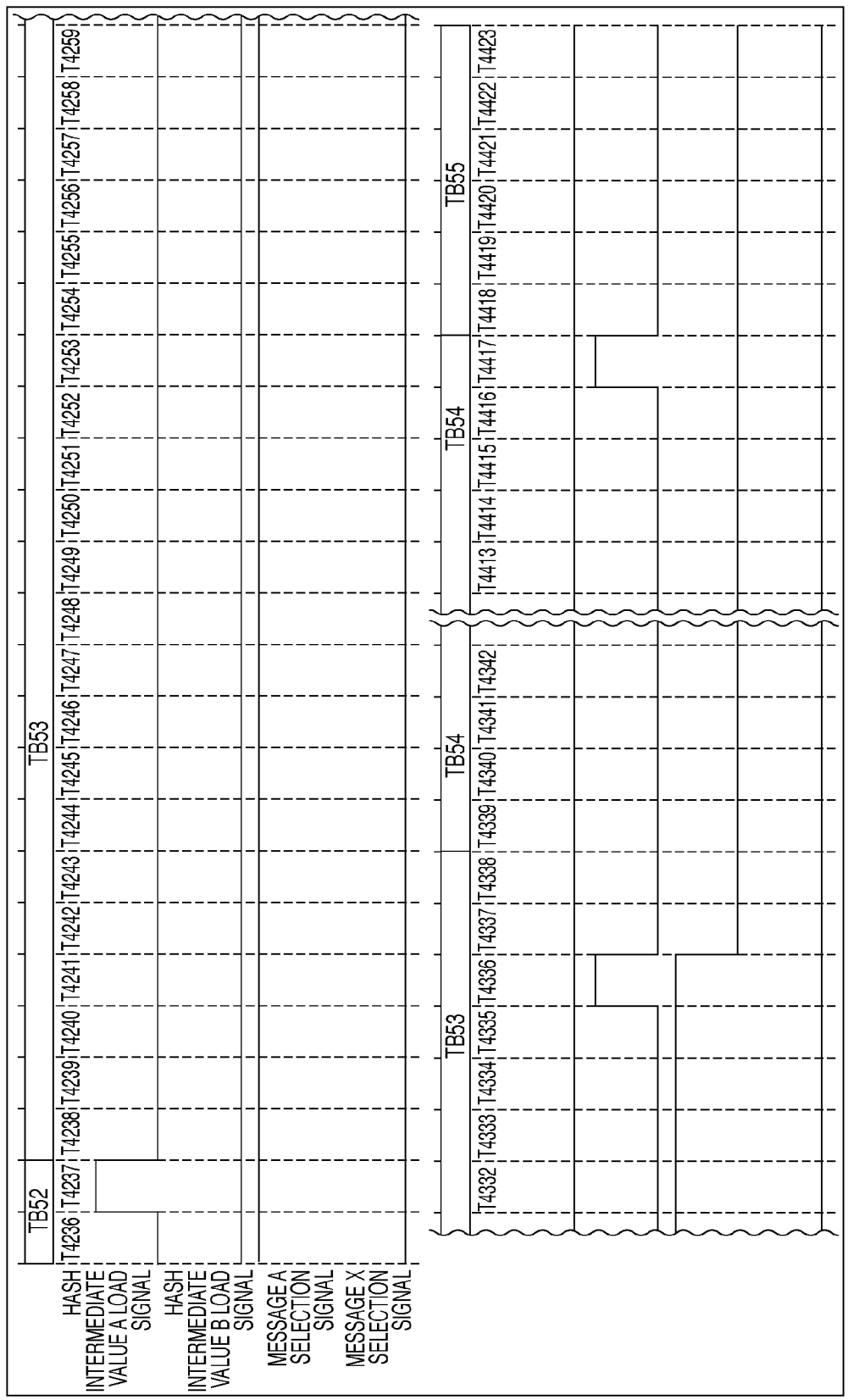
Figure 23A:
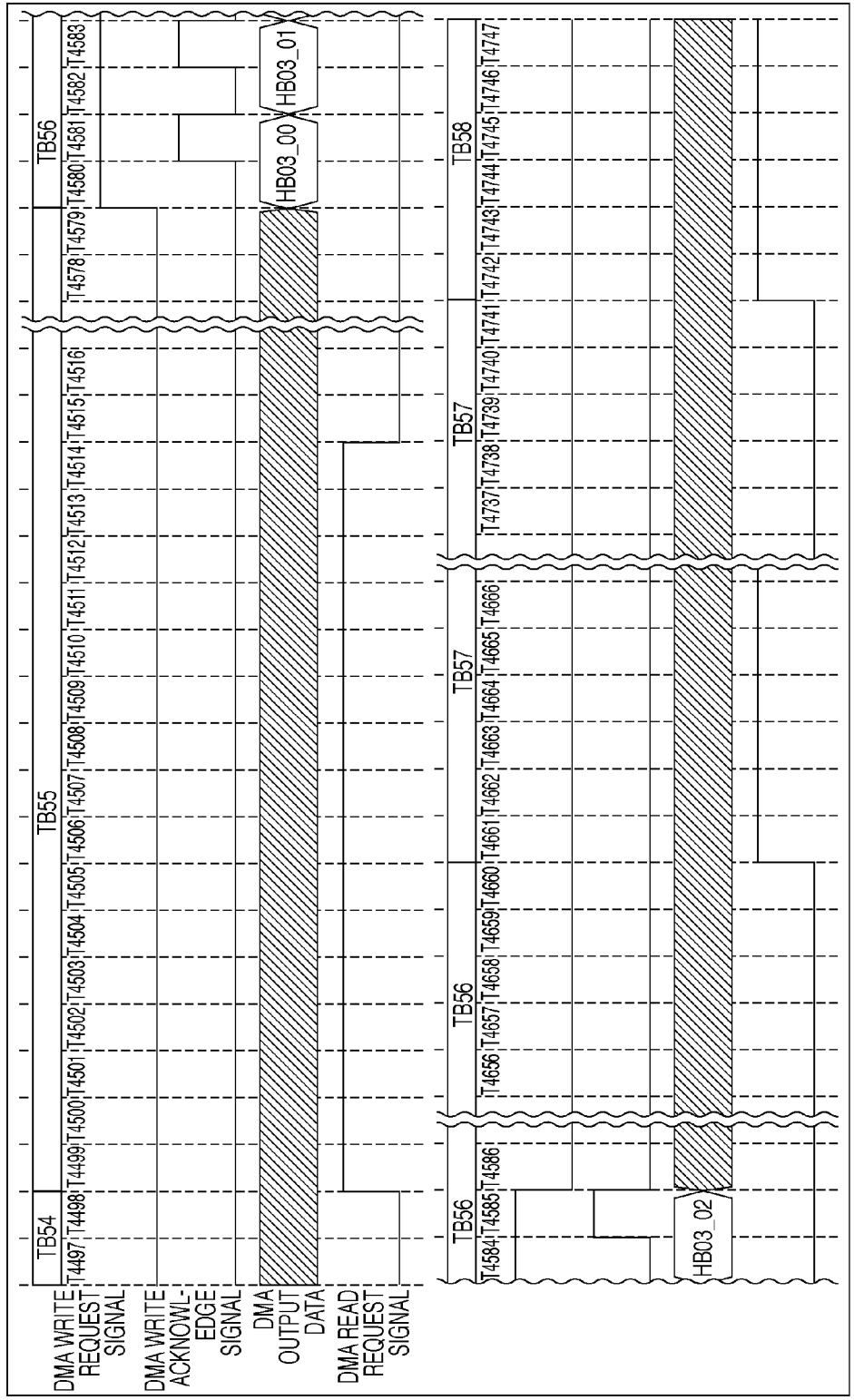
Figure 23B:
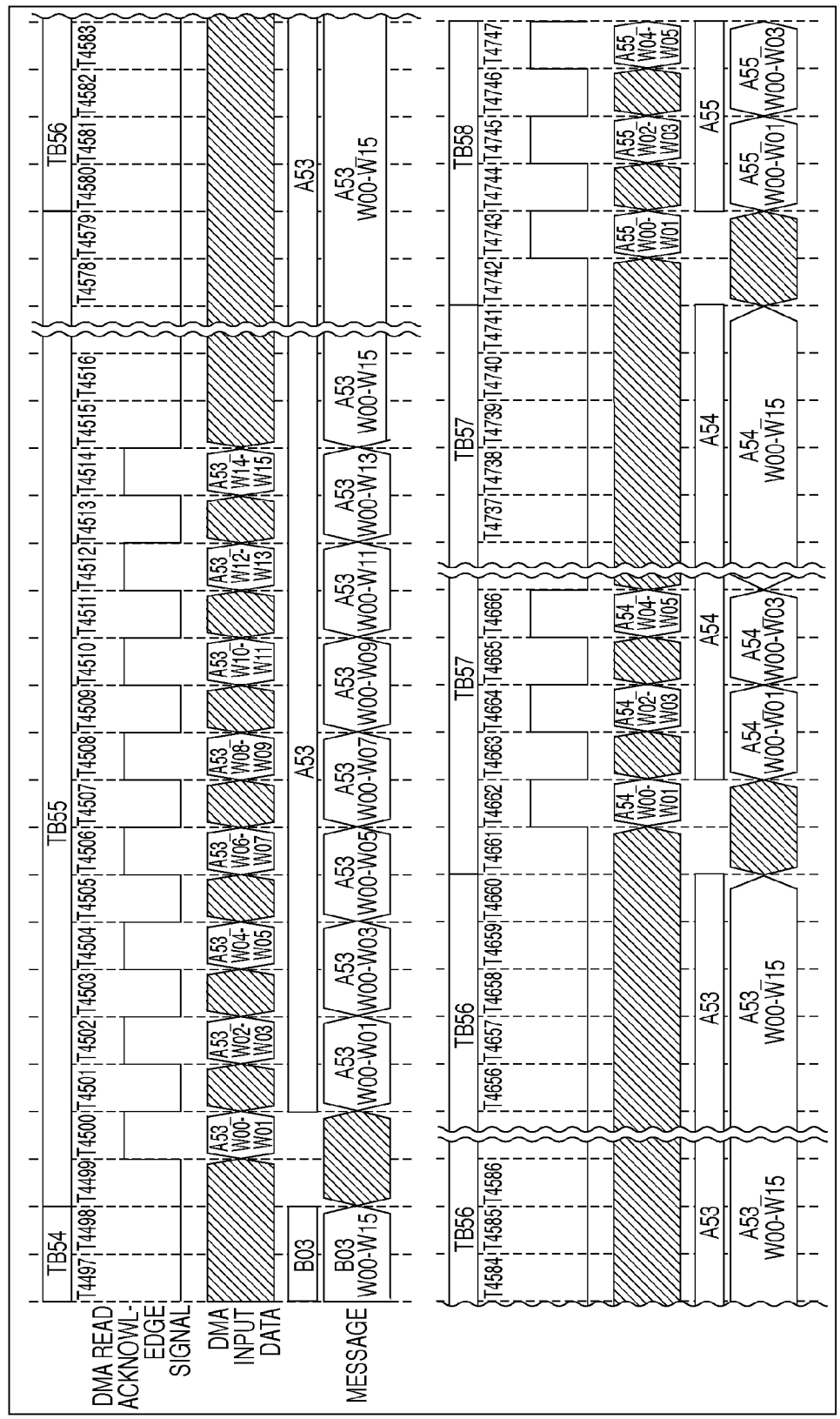
Figure 23C:
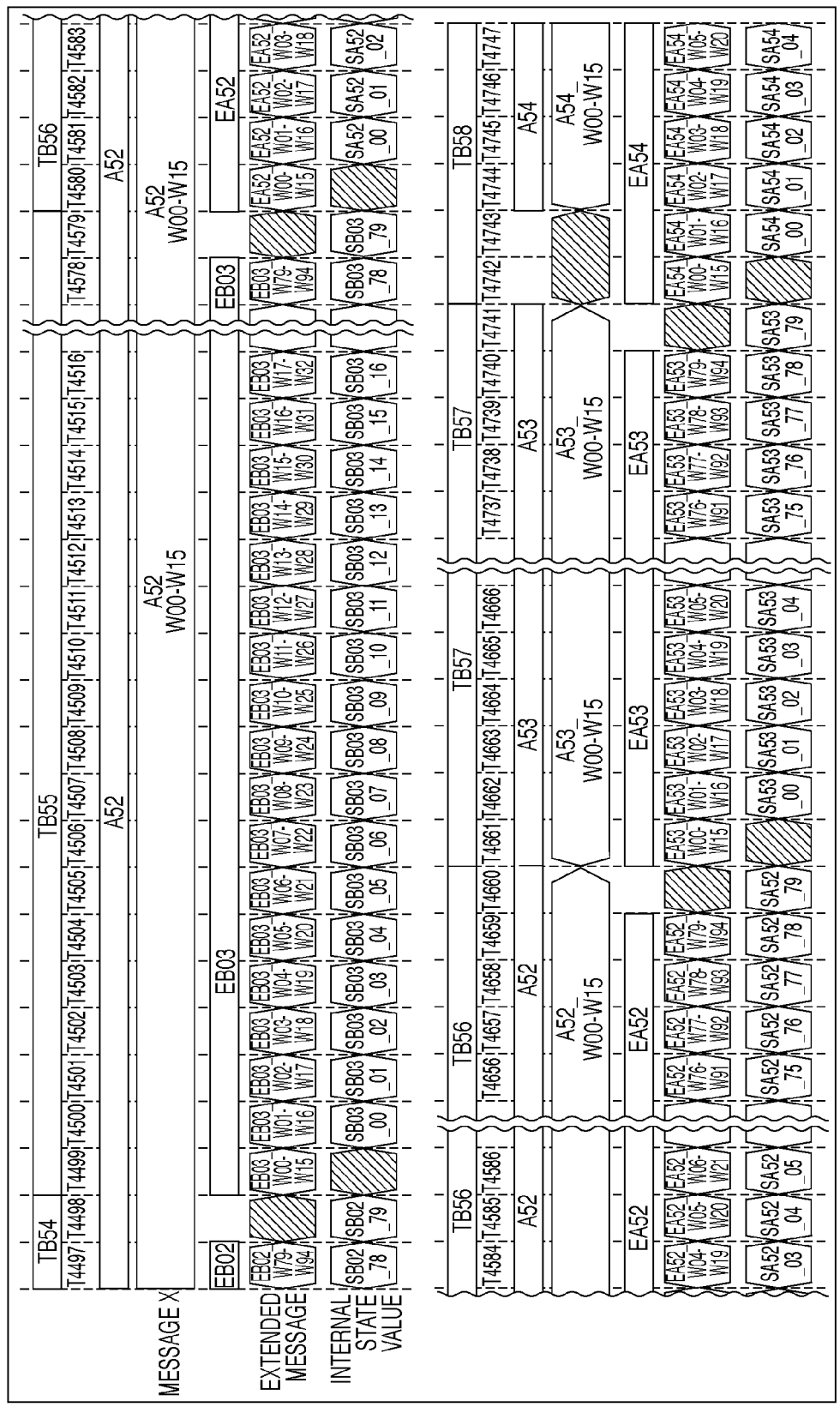
Figure 23E:
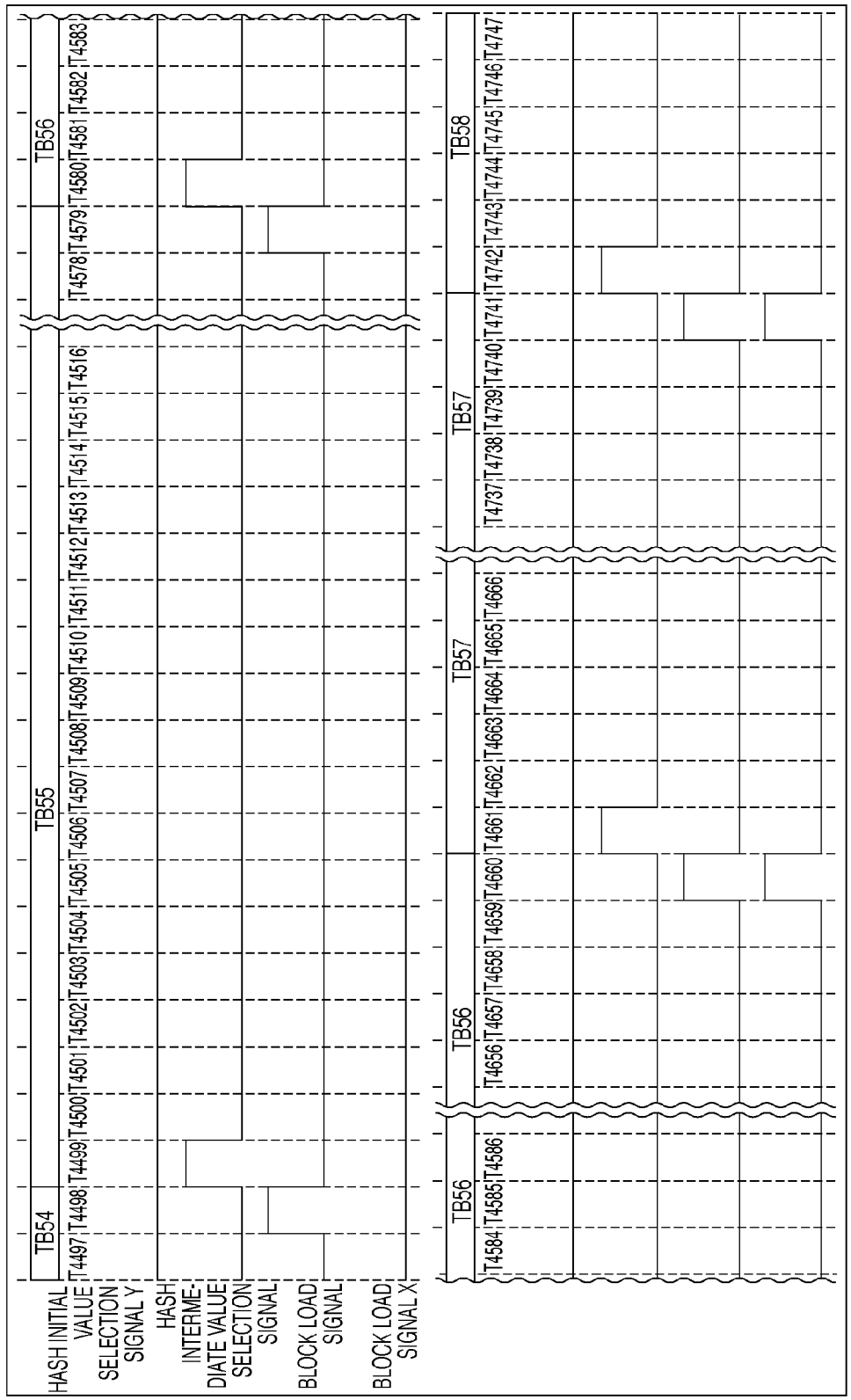
Figure 23F:
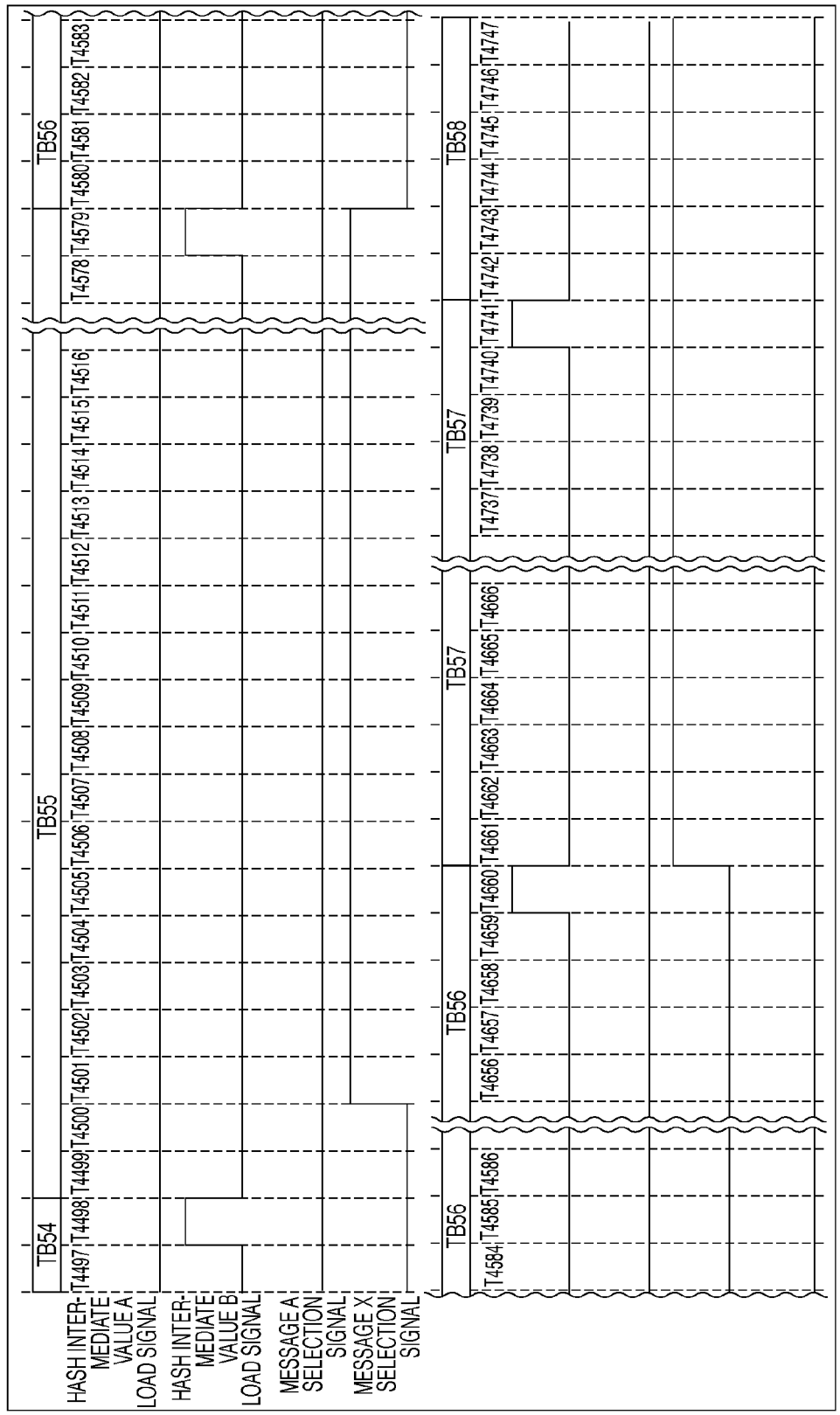

FIGS. 20A, 20B and 20C are flowcharts showing the operation sequence of the hash value calculations according to this embodiment when two messages (blocks A0 to A95 and blocks B0 to B3) are input in the order shown in FIG. 6.

In ST301, the CPU 201 sets a processing request for the first message (A0 to A95) in the register 116 of the hash value calculation circuit 100.

In ST302, the CPU 201 sets a processing request for the second message (B0 to B3) in the register 116 of the hash value calculation circuit 100.

In ST303, the hash value calculation circuit 100 issues a read request to the DMAC 203 to read data for one block of the message.

In ST304, the hash value calculation circuit 100 determines the message of the read block data based on a message identifier of the attribute signal. If the message identifier indicates message A, the process advances to ST305; if it indicates message B, the process advances to ST312.

The hash value calculation circuit 100 determines in ST305 whether or not the hash value calculation for the immediately preceding block is in progress. If the hash value calculation is in progress, the process waits until the hash value calculation of that block is complete; if the hash value calculation is complete, the process advances to ST306.

The hash value calculation circuit 100 determines in ST306 if the message storage unit X 141 stores a discarded block of the first message with low priority. If the message storage unit X stores data of the discarded block of the first message, the process advances to ST307; otherwise, the process jumps to ST309.

In ST307, the hash value calculation circuit 100 executes the hash value calculation for the discarded block of the first message with low priority.

The hash value calculation circuit 100 determines in ST308 whether or not the hash value calculations for the first message (A0 to A95) including the total number of blocks=96 are complete. If the hash value calculations are complete, the process jumps to ST311; otherwise, the process advances to ST309.

In ST309, the hash value calculation circuit 100 executes the hash value calculation for one block of the first message (A0 to A95).

The hash value calculation circuit 100 determines in ST310 whether or not the hash value calculations for the first message (A0 to A95) including the total number of blocks=96 are complete. If the hash value calculations are complete, the process advances to ST311; otherwise, the process returns to ST303.

In ST311, the hash value calculation circuit 100 issues a write request to the DMAC 203 to output a hash value for the first message (A0 to A95).

The hash value calculation circuit 100 determines in ST312 if the immediately preceding block is that of the second message with high priority. If the immediately preceding block is that of the second message with high priority, the process advances to ST313; if the immediately preceding block is that of the first message with low priority, the process jumps to ST314.

The hash value calculation circuit 100 determines in ST313 whether or not the hash value calculation for the immediately preceding block is in progress. If the hash value calculation is in progress, the process waits until the hash value calculation of that block is complete; if the hash value calculation is complete, the process advances to ST314.

In ST314, the hash value calculation circuit 100 executes the hash value calculation for one block of the second message (B0 to B3).

The hash value calculation circuit 100 determines in ST315 whether or not the hash value calculations for the second message (B0 to B3) including the total number of blocks=4 are complete. If the hash value calculations are complete, the process advances to ST316; otherwise, the process returns to ST303.

In ST316, the hash value calculation circuit 100 issues a write request to the DMAC 203 to output a hash value for the second message (B0 to B3).

The hash value calculation circuit 100 determines in ST317 if the processing of another message is complete. If the processing is complete, the processing ends; otherwise, the process returns to ST303.

(Details of Hash Value Calculation)

FIGS. 21A to 23F are timing charts showing the operations of the hash value calculations for respective steps according to this embodiment. FIGS. 21A to 23F respectively show the operations for the leading steps of message A, those upon switching message A to message B, and those upon switching message B to message A. Only differences from the second embodiment will be described below.

The processes from T000 to T024 are the same as those in the second embodiment. At T025, the hash value calculation controller 113 asserts the block load signal 124. Since message A stored in the message storage unit has low priority, the hash value calculation controller 113 asserts the block load signal 124 and the block load signal X 142. The message storage unit X 141 detects assertion of the block load signal X 142, and loads a block A0 stored in the message storage unit 142 at T026. Also, the extended message storage unit 102 detects assertion of the block load signal 124, and loads the output from the selector 144 at T026. At this time, since the hash value calculation controller 113 does not assert the message X selection signal 145, the selector 144 outputs the message 132 of the message 132 and the message X 143.

From T000 to T4237, basically the same processes as in the second embodiment are executed. However, in this embodiment, the message storage unit X 141 stores the message 132 based on the priority of that message, and the selector 144 selects one of the output from the message storage unit 101 and that from the message storage unit X 141 and outputs the selected message to the extended message storage unit 102.

At T4237, the hash value calculation controller 113 asserts the block load signal 124. The extended message storage unit 102 detects assertion of the block load signal 124, and loads a block A52 stored in the message storage unit 102 as the output from the selector 144 at T4238. At this time, the extended message storage unit 101 stores the block A52 by dividing it into 16 32-bit data EA52_W00 to EA52_W15. The hash value calculation circuit 100 executes the processes of steps 0 to 17 for the block A52 of message A from T4238 to T4255.

At T4238, the hash value calculation controller 113 asserts the DMA read request signal 122 to read data of the next block in response to that the extended message storage unit 102 stores the data stored in the message storage unit 101. The hash value calculation circuit 100 loads a block B0 via DMA transfer from T4238 to T4253, and the message storage unit 101 stores the block B0 at T4254.

At T4255, the hash value calculation controller 113 detects message B based on message identifier information in the input data attribute signal 139. Furthermore, the hash value calculation controller 113 detects based on information in the "message priority" area of the register 116 that message B has "high priority". Then, the hash value calculation controller 113 asserts the block load signal 124 to discard the step process for the block A52 of message A, which has been processed until T4255, and to execute the hash value calculations of message B with high priority first. The extended message storage unit 102 detects assertion of the block load signal 124, and loads the block B0 stored in the message storage unit 101 as the output from the selector 144 at T4256. At this time, since the hash value calculation controller 113 does not assert the block load signal X 142 at T4255, the message storage unit X 141 does not load the message 132 (block B0) as the output from the message storage unit 101.

After that, the hash value calculation circuit 100 executes the hash value calculations for message B from T4256 to T4579, and the DMAC 203 outputs a hash value HB of message B from T4580 to T4585.

At T4499, the hash value calculation controller 113 asserts the DMA read request signal 122 in response to that the last block B3 of message B stored in the message storage unit 101 is loaded to the extended message storage unit 102. Then, data of the next message is read. From T4500 to T4514, the DMAC 203 DMA-transfers a block A53 of message A. At T4515, the message storage unit 101 stores the block A53. At this time, although message A stored in the message storage unit 101 has low priority, since the hash value calculation of data stored in the message storage unit X 141 is not complete yet, the hash value calculation controller 113 does not assert the block load signal X 142. Therefore, the message storage unit X 141 does not load the message 132 (block A53) as the output from the message storage unit 101.

At T4500, the hash value calculation controller 113 loads the input data attribute signal 139 and detects that loading of message A is resumed. Thus, the hash value calculation controller 113 asserts the message X selection signal 145 at T4501. Then, the selector 144 outputs the message X 143 of the message 132 and the message X 143. At T4579, the hash value calculation controller 113 asserts the block load signal 124. At T4580, the extended message storage unit 102 detects assertion of the block load signal 124, and loads the message X 143 (A52) as the output of the selector 144. The hash value calculation controller 113 deasserts the message X selection signal 145 at T4580. From T4580, the processing of the block A52, which was discarded previously in the middle of the processing, is resumed.

(Operation in Block Unit)

FIGS. 24A and 24B (to be collectively referred to as FIG. 24 hereinafter) are timing charts showing the operations of the hash value calculations for respective blocks according to this embodiment.

In TB52, the DMAC 203 DMA-transfers the block B0 to the hash value calculation circuit 100 as in the second embodiment. However, the DMAC 203 transfers the hash value HB of message B from the hash value calculation circuit 100 at the timing of T4580 in TB56. In the second embodiment, the hash value calculation circuit 100 outputs the hash value HB at the timing of T4643 in TB57. Therefore, in the third embodiment, the output start timing of the hash value of message B is shortened by 63 basic processing periods compared to the second embodiment. Note that the 63 basic processing periods are calculated by subtracting 18 basic processing periods required to store data of the block B0 of message B from the 81 basic processing periods for one block. These 18 processing periods are also those in which the hash value calculation of the hash intermediate value HA52, which was discarded in the middle of the processing, was executed.

On the other hand, in this embodiment, the hash value calculation circuit 100 outputs the hash intermediate value HA53 at the timing of T4742 in TB58. In the second embodiment, the hash value calculation circuit 100 output the hash intermediate value HA53 at the timing of T4724 in TB58. Therefore, in the third embodiment, the output start timing of the hash value of message A is delayed by 18 basic processing periods compared to the second embodiment.

In this embodiment, the message priority of message B is high, but the present invention is not limited to this. When the message priority of message B is low which is the same as message A, the hash value calculation circuit 100 does not discard the hash value calculation of the block A52 in the middle of the processing as in the second embodiment. Instead, the hash value calculation circuit 100 executes the hash value calculation for the block B0 after generation of the hash intermediate value of the block A52.

As described above, according to this embodiment, a target message is identified by extracting it from the input data attribute signal attached to data of that message, and the second message storage unit which further stores the message stored in the message storage unit is added. For example, a case will be examined below wherein the hash value calculation for the first message is interrupted in the middle of the processing, and that for another second message is executed first. According to the arrangement of this embodiment, the hash value calculation for a certain block of the first message, which is being processed, is discarded until data of the second message is stored, and the first block of the second message can be preferentially processed. Therefore, the hash value calculations for the second message are complete earlier.

This embodiment has exemplified SHA-1 used as the hash function. However, the hash function may use other algorithms such as MD5 and SHA-256.

In this embodiment, an extended message is sequentially generated for each step. However, extended messages may be simultaneously generated first.

In the arrangement of this embodiment, hash intermediate values for two different messages can be stored. However, the present invention is not limited to such specific arrangement. For example, by arranging three or more hash intermediate value storage units, block counters, register setting areas, and the like, the hash value calculations for three or more different messages can be interrupted and resumed. In the arrangement of this embodiment, a plurality of hash intermediate value storage units each having a hash intermediate value storage area that can store one hash intermediate value are arranged. However, the present invention is not limited to such specific arrangement. For example, one or a plurality of hash intermediate value storage units each having a hash intermediate value storage area that can store a plurality of hash intermediate values may be arranged.

In the above description, the correspondence between the hash intermediate values of respective messages and the hash intermediate value storage units is fixed like that the hash intermediate values of messages A and B are respectively stored in the hash intermediate value storage units A and B. However, the present invention is not limited to this. For example, a hash intermediate value storage information storage unit which stores correspondence information indicating correspondence between hash intermediate value storage areas and hash intermediate values of messages may be arranged, and the hash intermediate value storage areas may be decided based on the correspondence information stored in the hash intermediate value storage information storage unit.

In this embodiment, the message priority includes two levels, that is, high priority and low priority. Alternatively, the message priority may include three or more levels, and the hash value calculations for a message with higher priority may be preferentially executed.

In this embodiment, another message storage unit which further stores a message stored in the first message storage unit is arranged. However, the present invention is not limited to this. For example, two or more message storage units may be arranged in addition to the first message storage unit according to the number of priority levels and the number of hash intermediate value storage units.

In this embodiment, the CPU processes the padding process of the hash value calculation outside the hash circuit. However, the padding process may also be processed inside the hash circuit.

In this embodiment, the DMAC is used as a device used to exchange a message and hash value between the hash value calculation circuit and the external memory. However, other transfer devices may be used.

In this embodiment, the bit width of the DMA input/output data is 64 bits. However, other numbers of bits may be used.

In this embodiment, the basic processing period T of the process for each step of the hash value calculation is equal to that of the DMA transfer process. However, the basic processing periods of the step process and DMA transfer process may be different.

In this embodiment, the CPU sets the message priority as information of a processing request in a predetermined area of the register in advance. Alternatively, the input data attribute signal may include message priority.

In this embodiment, the input data attribute signal includes the message identifier and process continuation information, and the data width is 8 bits. However, the present invention is not limited to this. For example, the input data attribute signal may include another information such as message priority, a block identifier, and the like, and the data width of the signal may be changed depending on included information.

In this embodiment, the hash value calculation circuit identifies the block number of an input message by counting the number of input blocks for each message. Alternatively, the input data attribute signal may also include the block number.

In this embodiment, the CPU sets the number of blocks of a message in the register of the hash value calculation circuit, and the hash value calculation circuit recognizes supply of the message having the number of blocks set by the CPU by counting the DMA acknowledge signals. However, other methods may be used. For example, the CPU may notify completion of message transfer by setting it in the register.

In this embodiment, the hash value calculation for a block of a message with low priority is discarded in the middle of the processing based on information of message priority stored in the predetermined area of the register. However, the present invention is not limited to this. For example, the message identifier in the attribute signal may also mean the message priority, or another processing interrupt instruction signal may be input, so that the hash value calculation for a message whose calculation is in progress may be determined to be discarded by preferentially executing that for a message with high priority.

In the description of this embodiment, the settings about messages A and B are made in the register first as messages which are to undergo hash value calculations, and the hash value calculations for message A or B are then executed according to the input message. However, the present invention is not limited to this. For example, a case will be examined below wherein the hash value calculations for message C are required to be started in the middle of the hash value calculations for message A or B. In this case, when register settings of a hash processing request for message C may be added in the middle of the processing, the hash value calculations for messages A, B, and C can be executed in accordance with an input message.

Note that the embodiment of the present invention is not limited to the above arrangement, and various modifications may be made.

As described above, according to the arrangements of the first to third embodiments, an overhead upon execution of the hash value calculations by selecting a message to be processed for respective blocks can be reduced, and the security of the hash value calculations can be maintained.

Fourth Embodiment

This embodiment will explain a hash value calculation apparatus which supports MD5, SHA1, and SHA512 as hash algorithms, and processes a maximum of two messages in parallel. Two processes to be executed in parallel will be referred to as processes A and B hereinafter.

The hash value calculation processes a message for each block including 16 words, and outputs a hash value of N words as its final result. The hash value calculation includes a series of processes as follows.

A message is divided into blocks each including 16 words, and predetermined data is added to the rearmost position of a message so that the last block also includes 16 words (to be referred to as a padding process hereinafter).

A message extension process, step processes, and addition process (to be described later) are executed for each block including 16 words, thereby generating a hash intermediate value.

The message extension process is an arithmetic process for generating an extended message of one word using data for 16 words. A message which is input first is used intact as first to 16th extended messages. As for the 17th and subsequent extended messages, an n-th extended message of one word is generated using (n−16)-th to (n−1)-th extended messages of 16 words. This generation is repeated to generate up to an N-th extended message. Assume that N is the predetermined number of steps prescribed in the algorithm.

Each step process is an arithmetic process for generating the next internal state value using a predetermined internal state value including W words (W is an integer prescribed by the hash algorithm) and an extended message of one word. The first internal state value is generated using a hash initial value and the first extended message. The n-th internal state value is generated using the (n−1)-th internal state value and the n-th extended message. This generation is repeated to generate up to the N-th internal state value.

The addition process is an arithmetic process for adding the hash intermediate value from the first block to the immediately preceding block and the N-th internal state value of the block of interest. The hash intermediate value of the first block is generated by adding the hash initial value and the N-th internal state value of the first block. A hash intermediate value obtained for the last block is output as a hash value for the whole message.

The number of bits which define one word is prescribed for respective hash algorithms: 32 bits for MD5, 32 bits for SHA1, and 64 bits for SHA512.

The number of words of the internal state value and hash value is prescribed for respective hash algorithms: 4 words (128 bits) for MD5, 5 words (160 bits) for SHA1, and 8 words (256 bits) for SHA512.

The predetermined number N of steps is prescribed for respective hash algorithms: N=64 for MD5, N=80 for SHA1, and N=80 for SHA512.

(Hash Value Calculation Circuit)

Figure 25:
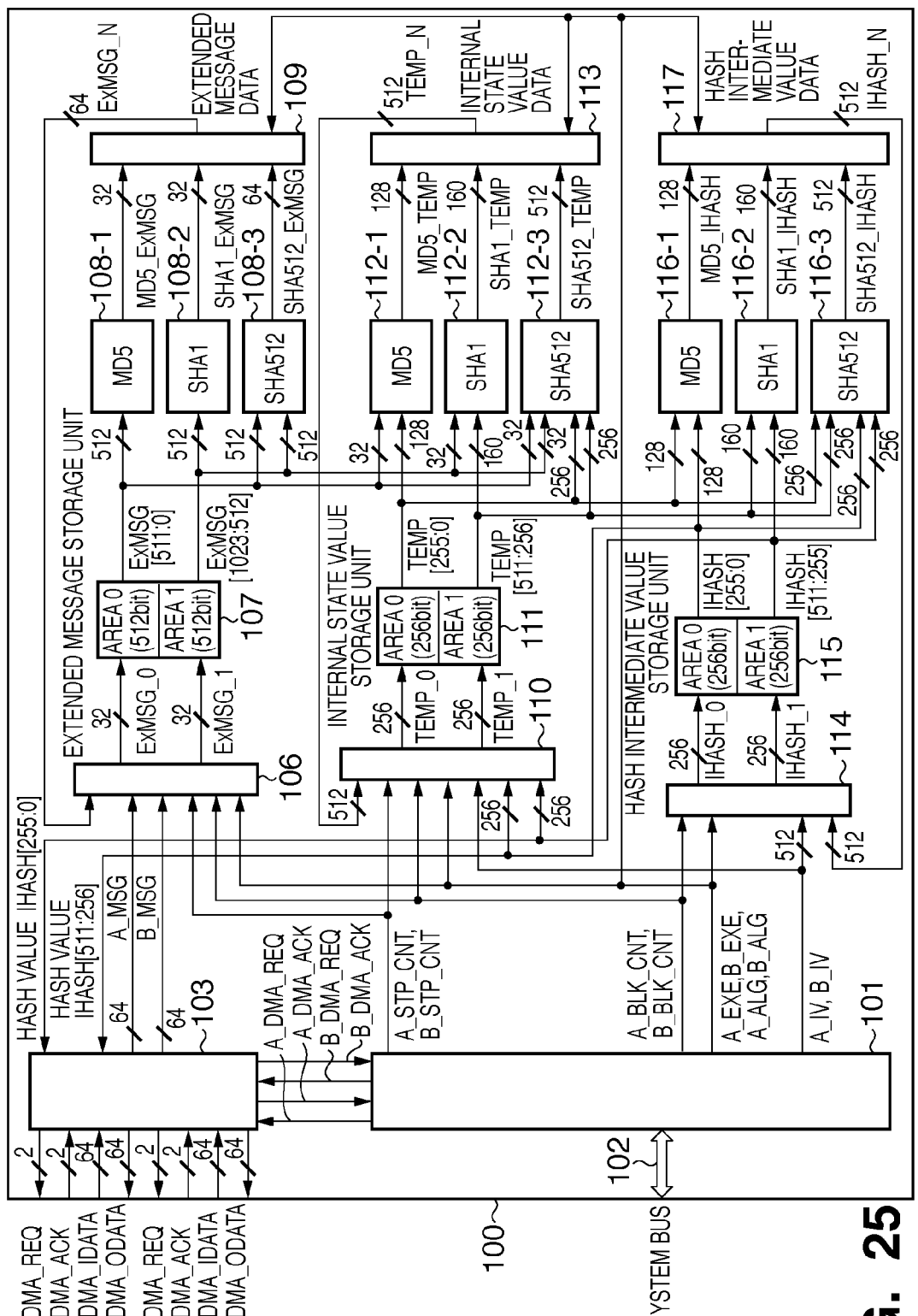
FIG. 25 is a block diagram showing the arrangement of a hash value calculation circuit.

FIG. 25 is a block diagram showing the arrangement of a hash value calculation circuit according to this embodiment. Reference numeral 100 denotes a hash value calculation circuit.

Reference numeral 101 denotes a hash value calculation controller which controls processes A and B, and includes a register for controlling hash value calculations. A CPU which is arranged outside the hash value calculation circuit 100 can access the register via a system bus 102.

The hash value calculation controller 101 generates the following signals:
- a signal A_EXE which indicates that process A is in progress;
- a signal A_ALG which indicates a hash algorithm which is being executed by process A;
- a signal A_STP_CNT which indicates the number of steps which are being executed by process A;
- a signal A_BLK_CNT which indicates the number of blocks which are being executed by process A; and
- a signal A_IV which indicates a hash initial value used in process A.

The signal A_EXE indicates that process A is in progress when it is "1", and the signal A_ALG indicates one of MD5, SHA1, and SHA512. The signal A_STP_CNT is reset to 0 when A_EXE="1", and begins to count upon reception of the first acknowledge in response to an input transfer request of an input message. The signal A_STP_CNT counts up from 0 to N+1 for each clock cycle, and then returns to 0. The message extension process executes the first to N-th processes when the signal A_STP_CNT is 0 to N−1, and the step process executes the first to N-th processes when the signal A_STP_CNT is 0 to N. The addition process executes the first to N-th processes when the signal A_STP_CNT is 2 to N+1. The signal A_BLK_CNT is reset to 0 when A_EXE="1", and counts up by +1 when the signal A_STP_CNT reaches N+1. The signal A_BLK_CNT counts up until the number of blocks−1 of an input message, and then returns to 0.

The hash value calculation controller 101 generates a signal A_DMA_REQ as a data transfer request to a DMA controller (to be referred to as DMAC hereinafter) A, which is arranged outside the hash value calculation circuit 100, and transfers input/output data used by process A. Then, the hash value calculation controller 101 receives an acknowledge signal A_DMA_ACK from the DMAC A. The signals A_DMA_REQ and A_DMA_ACK are respectively 2-bit signals. Assume that signals A_DMA_REQ[0]/A_DMA_ACK[0] are input transfer signals used to input an input message as data to be processed, and signals A_DMA_REQ[1]/A_DMA_ACK[1] are output transfer signals used to output a hash value obtained as the hash value calculation result.

Furthermore, the hash value calculation controller 101 generates the following signals:
- a signal B_EXE which indicates that process B is in progress;
- a signal B_ALG which indicates a hash algorithm which is being executed by process B;
- a signal B_STP_CNT which indicates the number of steps which are being executed by process B;
- a signal B_BLK_CNT which indicates the number of blocks which are being executed by process B; and
- a signal B_IV which indicates a hash initial value used in process B.

The signal B_EXE indicates that process B is in progress when it is "1", and the signal B_ALG indicates one of MD5, SHA1, and SHA512. The signal B_STP_CNT is reset to 0 when B_EXE="1", and begins to count upon reception of the first acknowledge in response to an input transfer request of an input message. The signal B_STP_CNT counts up from 0 to N+1 for each clock cycle, and then returns to 0. The message extension process executes the first to N-th processes when the signal B_STP_CNT is 0 to N−1, and the step process executes the first to N-th processes when the signal B_STP_CNT is 0 to N. The addition process executes the first to N-th processes when the signal B_STP_CNT is 2 to N+1. The signal B_BLK_CNT is reset to 0 when B_EXE="1", and counts up by +1 when the signal B_STP_CNT reaches N+1. The signal B_BLK_CNT counts up until the number of blocks−1 of an input message, and then returns to 0.

The hash value calculation controller 101 generates a signal B_DMA_REQ as a data transfer request to a DMAC B, which is arranged outside the hash value calculation circuit 100, and transfers input/output data used by process B. Then, the hash value calculation controller 101 receives an acknowledge signal B_DMA_ACK from the DMAC B. The signals B_DMA_REQ and B_DMA_ACK are respectively 2-bit signals. Assume that signals B_DMA_REQ[0]/B_DMA_ACK[0] are input transfer signals used to input an input message as data to be processed, and signals B_DMA_REQ[1]/B_DMA_ACK[1] are output transfer signals used to output a hash value obtained as the hash value calculation result.

Reference numeral 103 denotes a DMA IF unit which is an interface with the DMACs arranged outside the hash value calculation circuit 100. Reference numeral 104 denotes interface signals with the DMAC A which transfers input/output data of process A. An input data bus A_DMA_IDATA has a 64-bit width, transfers an input message as data to be processed in 64-bit units, and outputs a 64-bit input message A_MSG. An output data bus A_DMA_ODATA has a 64-bit width, and transfers a hash value obtained as the hash value calculation result in 64-bit units. Reference numeral 105 denotes interface signals with the DMAC B which transfers input/output data of process B. An input data bus B_DMA_IDATA has a 64-bit width, transfers an input message as data to be processed in 64-bit units, and outputs a 64-bit input message B_MSG. An output data bus B_DMA_ODATA has a 64-bit width, and transfers a hash value obtained as the hash value calculation result in 64-bit units.

(Interface Signals)

Figure 34A:
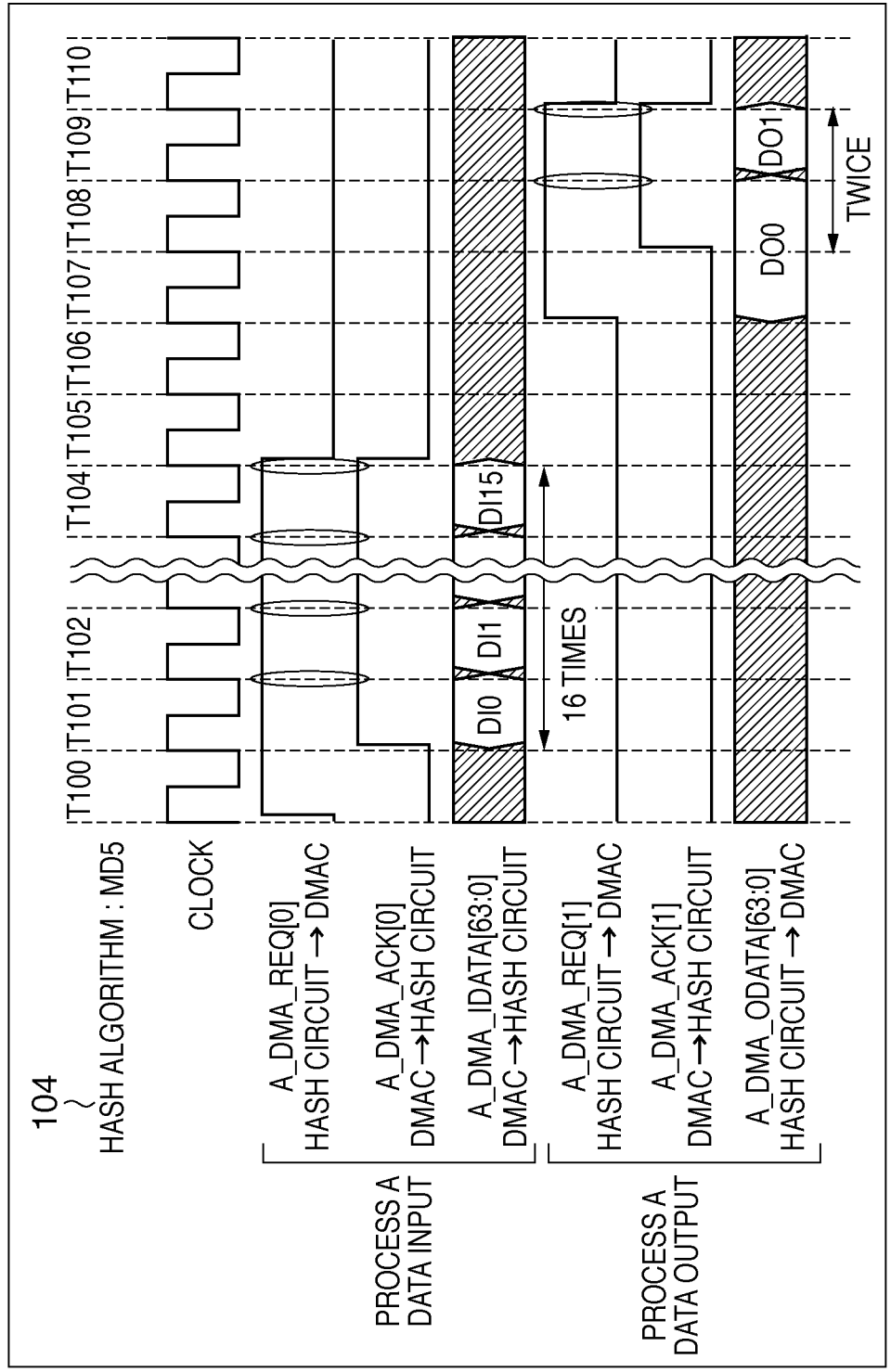
FIGS. 34A and 34B are timing charts showing an example of the operation based on interface signals.
Figure 34B:
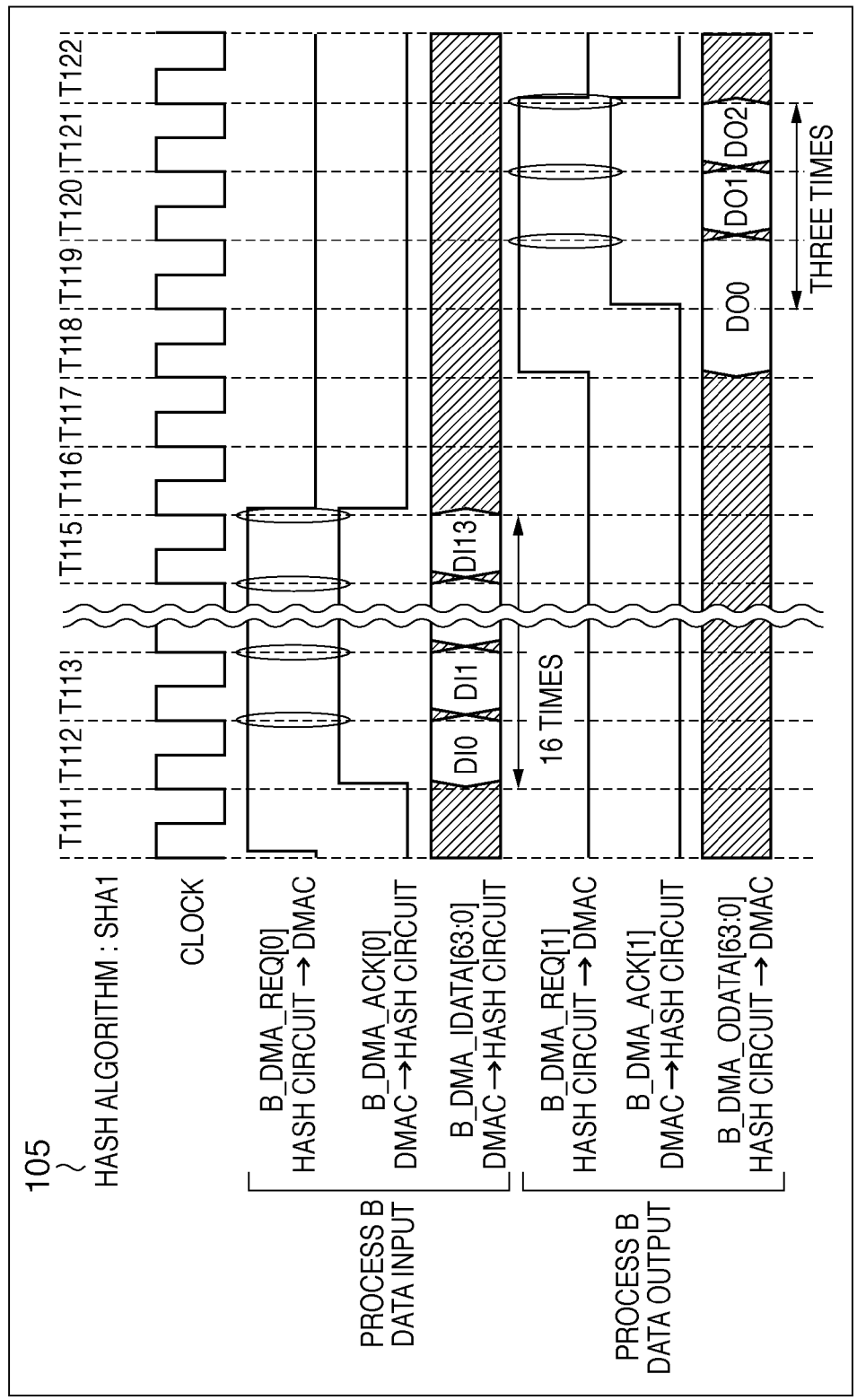

FIGS. 34A and 34B are timing charts showing an example of the operations based on the interface signals 104 and 105. T100 to T105 indicate the input transfer of the signals 104, and T107 to T110 indicate the output transfer of the signals 104. In the input transfer, the DMA IF unit 103 asserts the input transfer request signal A_DMA_REQ[0] to the DMAC A at T100.

At T101, the DMAC A transfers first input data DI0 to the DMA IF unit 103, and asserts the acknowledge signal A_DMA_ACK[0]. In response to the leading edge of a clock at T102, the signals A_DMA_REQ[0] and A_DMA_ACK[0] are asserted at the same time to complete the input transfer of the data DI0, and the DMAC A transfers second input data DI1. In the output transfer, at T107, the DMA IF unit 103 outputs first output data DO0 to the DMAC A, and asserts the output transfer request signal A_DMA_REQ[1] at the same time. At T108, the DMAC A asserts the acknowledge signal A_DMA_ACK[1] to the DMA IF unit 103, and receives the output data.

In response to the leading edge of a clock at T109, the signals A_DMA_REQ[1] and A_DMA_ACK[1] are asserted to complete the output transfer of the data DO0, and the DMA IF unit 103 transfers second output data DO1. In this embodiment, the data amount corresponding to one transfer request of process A is determined, and the DMAC A continuously transfers the determined data amount once it asserts the acknowledge signal. Assume that the input transfer continuously transfers data for one word for one block. When one word is less than the input data bus width of 64 bits, it is transferred by padding data to lower bits. Assume that the output transfer continuously transfers data for one word in correspondence with the number of words of a hash value. When one word is less than the input data bus width of 64 bits, it is transferred by padding data to lower bits. Since MD5, SHA1, and SHA512 require 16 words per block, data are continuously transferred 16 times. The output transfer divides a hash value into data each having a 64-bit width, and continuously transfers the divided data. Since a hash value of MD5 requires 128 bits, data is continuously transferred twice. Since a hash value of SHA1 requires 160 bits, data is continuously transferred three times. Since a hash value of SHA512 requires 512 bits, data is continuously transferred eight times.

T111 to T116 indicate the input transfer of the signals 105, and T118 to T122 indicate the output transfer of the signals 105. In the input transfer, the DMA IF unit 103 asserts the input transfer request signal B_DMA_REQ[0] to the DMAC B at T111.

At T112, the DMAC B transfers first input data DI0 to the DMA IF unit 103, and asserts the acknowledge signal B_DMA_ACK[0]. In response to the leading edge of a clock at T113, the signals B_DMA_REQ[0] and B_DMA_ACK[0] are asserted at the same time to complete the input transfer of the data DI0, and the DMAC B transfers second input data DI1. In the output transfer, at T118, the DMA IF unit 103 outputs first output data DO0 to the DMAC B, and asserts the output transfer request signal B_DMA_REQ[1] at the same time. At T119, the DMAC B asserts the acknowledge signal B_DMA_ACK[1] to the DMA IF unit 103, and receives the output data.

In response to the leading edge of a clock at T120, the signals B_DMA_REQ[1] and B_DMA_ACK[1] are asserted to complete the output transfer of the data DO0, and the DMA IF unit 103 transfers second output data DO1. In this embodiment, the data amount corresponding to one transfer request of process B is determined in advance, and the DMAC B continuously transfers the determined data amount once it asserts the acknowledge signal. Assume that the input transfer continuously transfers data for one word for one block. When one word is less than the input data bus width of 64 bits, it is transferred by padding data to lower bits. Since MD5, SHA1, and SHA512 require 16 words per block, data are continuously transferred 16 times. Assume that the output transfer divides a hash value into data each having a 64-bit width, and continuously transfers the divided data. Since a hash value of MD5 requires 128 bits, data is continuously transferred twice. Since a hash value of SHA1 requires 160 bits, data is continuously transferred three times. Since a hash value of SHA512 requires 512 bits, data is continuously transferred eight times.

Reference numeral 106 denotes an extended message selector. The extended message selector 106 selects externally input messages A_MSG and B_MSG, and an extended message ExMSG_N in accordance with the signals A_EXE, A_ALG, A_STP_CNT, B_EXE, B_ALG, and B_STP_CNT. Then, the extended message selector 106 outputs 32-bit data ExMSG_0 and ExMSG_1. The data ExMSG_0 is stored in area 0 of an extended message storage unit 107 (to be described later), and the data ExMSG_1 is stored in area 1 of the extended message storage unit 107.

(Selection of Data Exmsg_0 and Exmsg_1)

FIG. 35 is a view showing an example of the selection policies of the data ExMSG_0 and ExMSG_1. Reference numeral 1001 denotes data selection policies of the data ExMSG_0.

Reference numeral 1001-a denotes a case in which the MD5 hash value calculation of process A is in progress, and the first to 16th message extension processes are to be executed (A_EXE=1 and A_ALG=MD5 and A_STP_CNT=0 to 15). In this case, lower 32 bits A_MSG[31:0] of transfer data from the DMAC A are selected.

Reference numeral 1001-b denotes a case in which the SHA512 hash value calculation of process A is in progress, and the first to 16th message extension processes are to be executed (A_EXE=1 and A_ALG=SHA512 and A_STP_CNT=0 to 15). In this case, lower 32 bits A_MSG[31:0] of transfer data from the DMAC A are selected.

Reference numeral 1001-c denotes a case in which the MD5 hash value calculation of process B is in progress, and the first to 16th message extension processes are to be executed (B_EXE=1 and B_ALG=MD5 and B_STP_CNT=0 to 15). In this case, lower 32 bits B_MSG[31:0] of transfer data from the DMAC B are selected.

Reference numeral 1001-d denotes a case in which the SHA512 hash value calculation of process B is in progress, and the first to 16th message extension processes are to be executed (B_EXE=1 and B_ALG=SHA512 and B_STP_CNT=0 to 15). In this case, lower 32 bits B_MSG[31:0] of transfer data from the DMAC B are selected.

Reference numeral 1001-e denotes a case other than the above cases. In this case, lower 32 bits ExMSG_N[31:0] of an extended message (to be described later) are selected.

Reference numeral 1002 denotes data selection policies of the data ExMSG_1.

Reference numeral 1002-a denotes a case in which the MD5 hash value calculation of process A is in progress, and the first to 16th message extension processes are to be executed (A_EXE=1 and A_ALG=MD5 and A_STP_CNT=0 to 15). In this case, lower 32 bits A_MSG[31:0] of transfer data from the DMAC A are selected.

Reference numeral 1002-b denotes a case in which the SHA512 hash value calculation of process A is in progress, and the first to 16th message extension processes are to be executed (A_EXE=1 and A_ALG=SHA512 and A_STP_CNT=0 to 15). In this case, upper 32 bits A_MSG[63:32] of transfer data from the DMAC A are selected.

Reference numeral 1002-c denotes a case in which the MD5 hash value calculation of process B is in progress, and the first to 16th message extension processes are to be executed (B_EXE=1 and B_ALG=MD5 and B_STP_CNT=0 to 15). In this case, lower 32 bits B_MSG[31:0] of transfer data from the DMAC B are selected.

Reference numeral 1002-d denotes a case in which the SHA512 hash value calculation of process B is in progress, and the first to 16th message extension processes are to be executed (B_EXE=1 and B_ALG=SHA512 and B_STP_CNT=0 to 15). In this case, upper 32 bits B_MSG[63:32] of transfer data from the DMAC B are selected.

Reference numeral 1002-e denotes a case other than the above cases. In this case, upper 32 bits ExMSG_N[63:32] of an extended message (to be described later) are selected.

According to the selection policies shown in FIG. 35, when the hash value calculation of process A or B is in progress, data used in the process is selected; when the hash value calculation is not in progress, the extended message ExMSG_N is output and stored in the extended message storage unit 107.

Reference numeral 107 denotes an extended message storage unit 107 which stores output data from the extended message selector 106. The extended message storage unit 107 includes a 1024-bit flip-flop, in which the 0th to 511th bits form area 0, and the 512th to 1023rd bits form area 1. Let ExMSG[1023:0] be the output signal from the 1024-bit flip-flop.

(Extended Message Storage Unit)

Figure 36:
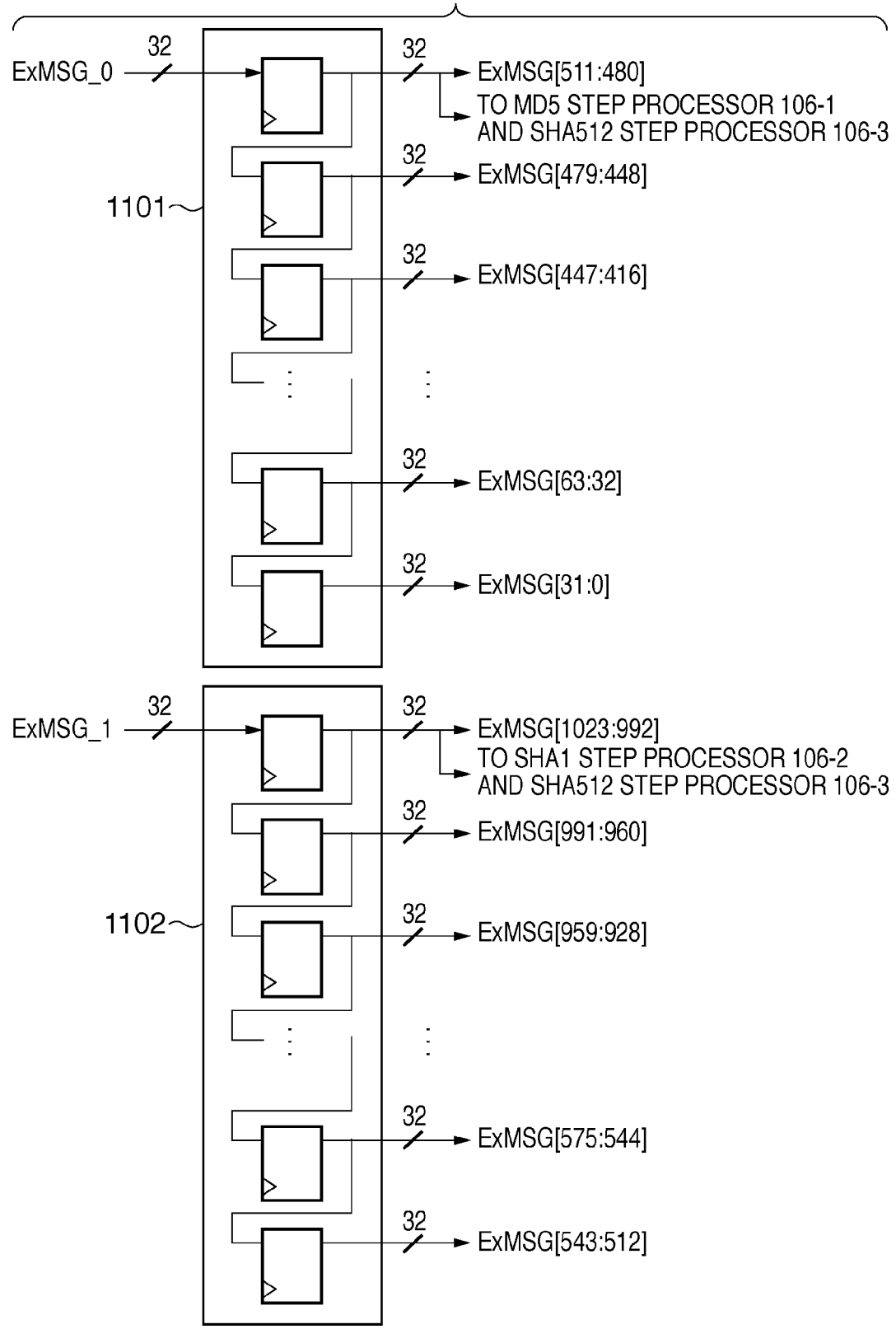
FIG. 36 is a diagram showing an example of the internal arrangement of an extended message storage unit.

FIG. 36 is a diagram showing an example of the internal arrangement of the extended message storage unit 107. Reference numeral 1101 denotes a flip-flop of area 0. The flip-flop 1101 shifts stored data toward the LSB by 32 bits for each clock, and stores 32-bit data ExMSG_0 in most significant 32 bits ExMSG[511:480]. Reference numeral 1102 denotes a flip-flop of area 1. The flip-flop 1102 shifts stored data toward the LSB by 32 bits for each clock, and stores 32-bit data ExMSG_1 in most significant 32 bits ExMSG[1023:992].

Reference numerals 108-1, 108-2, and 108-3 denote message extension processors which execute message extension processes of the corresponding hash functions. Since the message extension processes are different in correspondence with the hash algorithms, the message extension processors corresponding to the respective hash algorithms are arranged. The message extension processor 108-1 corresponds to MD5. The message extension processor 108-2 corresponds to SHA1. The message extension processor 108-3 corresponds to SHA512. The areas of the extended message storage unit 107 where data to be processed by the message extension processors 108-1, 108-2, and 108-3 are stored are determined in advance.

The MD5 message extension processor 108-1 uses area 0 as a storage area of data to be processed. The message extension processor 108-1 inputs data ExMSG[511:0] of area 0, and outputs an extended message MD5 ExMSG[31:0] of one word (32 bits).

The SHA1 message extension processor 108-2 uses area 1 as a storage area of data to be processed. The message extension processor 108-2 inputs data ExMSG[1023:512] of area 1, and outputs an extended message SHA1_ExMSG[31:0] of one word (32 bits).

The SHA512 message extension processor 108-3 uses areas 0 and 1 as storage areas of data to be processed. One word of SHA512 is defined by 64 bits, lower 32-bit data of one word is stored in area 0, and upper 32-bit data of one word is stored in area 1. The message extension processor 108-3 inputs data ExMSG[1023:0] of areas 0 and 1, and outputs an extended message SHA512_ExMSG[63:0] of one word (64 bits).

The areas of the extended message storage unit 107 where data to be processed by the message extension processors 108-1, 108-2, and 108-3 are stored are determined in advance, and the extended message storage unit 107 is connected as inputs to the message extension processors 108-1, 108-2, and 108-3. For this reason, the message extension processors 108-1, 108-2, and 108-3 always execute message extension processes to have data in the determined areas of the extended message storage unit 107 as inputs.

Reference numeral 109 denotes a message extension process result selector. The message extension process result selector 109 selects:

output data MD5_ExMSG from the MD5 message extension processor 108-1;

output data SHA1_ExMSG from the SHA1 message extension processor 108-2; or output data SHA512_ExMSG from the SHA512 message extension processor 108-3 in accordance with the signals A_EXE, A_ALG, B_EXE, and B_ALG, and outputs the selected data as an extended message ExMSG_N of 64-bit data. Note that ExMSG_N[31:0] is an extended message stored in area 0 of the extended message storage unit 107, and ExMSG_N[63:32] is an extended message stored in area 1 of the extended message storage unit 107.

(Selection of Data ExMSG_N[31:0] and ExMSG_N[63:32])

FIG. 37 is a view showing an example of the selection policies of the data ExMSG_N[31:0] and ExMSG_N[63:32]. Reference numeral 1201 denotes data selection policies of the data ExMSG_N[31:0].

Reference numeral 1201-a denotes a case in which the MD5 hash value calculation of process A is in progress (A_EXE=1 and A_ALG=MD5). In this case, the output data MD5_ExMSG[31:0] of the message extension processor 108-1 is selected.

Reference numeral 1201-b denotes a case in which the MD5 hash value calculation of process B is in progress (B_EXE=1 and B_ALG=MD5). In this case, the output data MD5_ExMSG[31:0] of the message extension processor 108-1 is selected.

Reference numeral 1201-c denotes a case other than the above cases. In this case, lower 32 bits SHA512_ExMSG[31:0] of the output data SHA512_ExMSG of the SHA512 message extension processor 108-3 are selected.

Reference numeral 1202 denotes data selection policies of the data ExMSG_N[63:32].

Reference numeral 1202-a denotes a case in which the SHA1 hash value calculation of process A is in progress (A_EXE=1 and A_ALG=SHA1). In this case, the output data SHA1_ExMSG[31:0] of the message extension processor 108-2 is selected.

Reference numeral 1202-b denotes a case in which the SHA1 hash value calculation of process B is in progress (B_EXE=1 and B_ALG=SHA1). In this case, the output data SHA1_ExMSG[31:0] of the message extension processor 108-2 is selected.

Reference numeral 1202-c denotes a case other than the above cases. In this case, upper 32 bits SHA512_ExMSG[63:32] of the output data SHA512_ExMSG of the SHA512 message extension processor 108-3 are selected.

According to the selection policies of FIG. 37, when the hash value calculation of process A or B is in progress, the output from the message extension processor 108-1 or 108-2, which is used in the process, is selected. When the hash value calculation is not in progress, the output data SHA512_ExMSG of the SHA512 message extension processor 108-3 is output, and is stored in the extended message storage unit 107.

Reference numeral 110 denotes an internal state value storage data selector. The internal state value storage data selector 110 selects:

hash initial values A_IV and B_IV;

a step process result TEMP_N; or hash intermediate value storage data IHASH in accordance with the signals A_EXE, A_ALG, A_STP_CNT, A_BLK_CNT, B_EXE, B_ALG, B_STP_CNT, and B_BLK_CNT, and outputs 256-bit data TEMP_0 and TEMP_1.

The data TEMP_0 is stored in area 0 of an internal state value storage unit 111 (to be described later), and the data TEMP_1 is stored in area 1 of the internal state value storage unit 111.

(Selection of Data TEMP_0 and TEMP_1)

FIG. 38 is a view showing an example of the data selection policies of the data TEMP_0 and TEMP_1. Reference numeral 1301 denotes data selection policies of the data TEMP_0.

- Reference numeral 1301-*a* denotes a case in which the MD5 hash value calculation of process A is in progress until the first step process in the first block (A_EXE=1 and A_ALG=MD5 and A_BLK_CNT=0 and A_STP_CNT=0). In this case, lower 256 bits A_IV[255:0] of a process A hash initial value are selected.
- Reference numeral 1301-*b* denotes a case in which the SHA512 hash value calculation of process A is in progress until the first step process in the first block (A_EXE=1 and A_ALG=SHA512 and A_BLK_CNT=0 and A_STP_CNT=0). In this case, lower 256 bits A_IV[255:0] of the process A hash initial value are selected.
- Reference numeral 1301-*c* denotes a case in which the MD5 hash value calculation of process A is in progress until the first step process in a block from the first block (A_EXE=1 and A_ALG=MD5 and A_BLK_CNT≠0 and A_STP_CNT=0). In this case, lower 256 bits IHASH[255:0] of hash intermediate value storage data obtained by the process of the immediately preceding block are selected.
- Reference numeral 1301-*d* denotes a case in which the SHA512 hash value calculation of process A is in progress until the first step process in a block from the first block (A_EXE=1 and A_ALG=SHA512 and A_BLK_CNT≠0 and A_STP_CNT=0). In this case, lower 256 bits IHASH[255:0] of hash intermediate value data obtained by the process of the immediately preceding block are selected.
- Reference numeral 1301-*e* denotes a case in which the MD5 hash value calculation of process B is in progress until the first step process in the first block (B_EXE=1 and B_ALG=MD5 and B_BLK_CNT=0 and B_STP_CNT=0). In this case, lower 256 bits B_IV[255:0] of a process B hash initial value are selected.
- Reference numeral 1301-*f* denotes a case in which the SHA512 hash value calculation of process B is in progress until the first step process in the first block (B_EXE=1 and B_ALG=SHA512 and B_BLK_CNT=0 and B_STP_CNT=0). In this case, lower 256 bits B_IV[255:0] of the process B hash initial value are selected.
- Reference numeral 1301-*g* denotes a case in which the MD5 hash value calculation of process B is in progress until the first step process in a block from the first block (B_EXE=1 and B_ALG=MD5 and B_BLK_CNT≠0 and B_STP_CNT=0). In this case, lower 256 bits IHASH[255:0] of hash intermediate value data obtained by the process of the immediately preceding block are selected.
- Reference numeral 1301-*h* denotes a case in which the SHA512 hash value calculation of process B is in progress until the first step process in a block from the first block (B_EXE=1 and B_ALG=SHA512 and B_BLK_CNT≠0 and B_STP_CNT=0). In this case, lower 256 bits IHASH[255:0] of hash intermediate value data obtained by the process of the immediately preceding block are selected.
- Reference numeral 1301-*i* denotes a case other than the above cases. In this case, lower 256 bits TEMP_N[255:0] of internal state value data (to be described later) are selected.

Reference numeral 1302 denotes data selection policies of the data TEMP_1.

- Reference numeral 1302-*a* denotes a case in which the MD5 hash value calculation of process A is in progress until the first step process in the first block (A_EXE=1 and A_ALG=MD5 and A_BLK_CNT=0 and A_STP_CNT=0). In this case, lower 256 bits A_IV[255:0] of the process A hash initial value are selected.
- Reference numeral 1302-*b* denotes a case in which the SHA512 hash value calculation of process A is in progress until the first step process in the first block (A_EXE=1 and A_ALG=SHA512 and A_BLK_CNT=0 and A_STP_CNT=0). In this case, upper 256 bits A_IV[511:256] of the process A hash initial value are selected.
- Reference numeral 1302-*c* denotes a case in which the MD5 hash value calculation of process A is in progress until the first step process in a block from the first block (A_EXE=1 and A_ALG=MD5 and A_BLK_CNT≠0 and A_STP_CNT=0). In this case, upper 256 bits IHASH[511:256] of hash intermediate value data obtained by the process of the immediately preceding block are selected.
- Reference numeral 1302-*d* denotes a case in which the SHA512 hash value calculation of process A is in progress until the first step process in a block from the first block (A_EXE=1 and A_ALG=SHA512 and A_BLK_CNT≠0 and A_STP_CNT=0). In this case, upper 256 bits IHASH[511:256] of hash intermediate value data obtained by the process of the immediately preceding block are selected.
- Reference numeral 1302-*e* denotes a case in which the MD5 hash value calculation of process B is in progress until the first step process in the first block (B_EXE=1 and B_ALG=MD5 and B_BLK_CNT=0 and B_STP_CNT=0). In this case, lower 256 bits B_IV[255:0] of the process B hash initial value are selected.
- Reference numeral 1302-*f* denotes a case in which the SHA512 hash value calculation of process B is in progress until the first step process in the first block (B_EXE=1 and B_ALG=SHA512 and B_BLK_CNT=0 and B_STP_CNT=0). In this case, upper 256 bits B_IV[511:256] of the process B hash initial value are selected.
- Reference numeral 1302-*g* denotes a case in which the MD5 hash value calculation of process B is in progress until the first step process in a block from the first block (B_EXE=1 and B_ALG=MD5 and B_BLK_CNT≠0 and B_STP_CNT=0). In this case, upper 256 bits IHASH[511:256] of hash intermediate value data obtained by the process of the immediately preceding block are selected.
- Reference numeral 1302-*h* denotes a case in which the SHA512 hash value calculation of process B is in progress until the first step process in a block from the first block (B_EXE=1 and B_ALG=SHA512 and B_BLK_CNT≠0 and B_STP_CNT=0). In this case, upper 256 bits IHASH[511:256] of hash intermediate value data obtained by the process of the immediately preceding block are selected.

Reference numeral 1302-*i* denotes a case other than the above cases. In this case, upper 256 bits TEMP_N[511:256] of internal state value data (to be described later) are selected.

According to the selection policies of FIG. 38, when the hash value calculation of process A or B is in progress, data to be used in the process is selected; when the hash value calculation is not in progress, the internal state value TEMP_N is output, and is stored in the internal state value storage unit 111.

Reference numeral 111 denotes an internal state value storage unit which stores output data from the internal state value storage data selector 109. The internal state value storage unit 111 includes a 512-bit flip-flop, the 0th to 255th bits form area 0, and the 256th to 511th bits form area 1. Let TEMP[511:0] be an output signal from the 512-bit flip-flop. Area 0 stores the data TEMP_0, and area 1 stores the data TEMP_1.

Reference numerals 112-1, 112-2, and 112-3 denote step processors which execute step processes. Since the step processes are different in correspondence with the hash algorithms, the step processors corresponding to the respective hash algorithms are arranged. The step processor 112-1 corresponds to MD5. The step processor 112-2 corresponds to SHA1. The step processor 112-3 corresponds to SHA512. The areas of the internal state value storage unit 111 where data to be processed by the step processors 112-1, 112-2, and 112-3 are stored are determined in advance.

The MD5 step processor 112-1 uses area 0 as a storage area of data to be processed. The step processor 112-1 inputs data TEMP[127:0] of area 0 and output data ExMSG[511:480] from the extended message storage unit 107, and outputs a 128-bit internal state value MD5_TEMP[127:0].

The SHA1 step processor 112-2 uses area 1 as a storage area of data to be processed. The step processor 112-2 inputs data TEMP[255:128] of area 1 and output data ExMSG[1023:992] from the extended message storage unit 107, and outputs a 160-bit internal state value SHA1 TEMP[159:0].

The SHA512 step processor 112-3 uses areas 0 and 1 as storage areas of data to be processed. The step processor 112-3 inputs data TEMP[511:0] of areas 0 and 1, and output data ExMSG[511:480] and ExMSG[1023:992] from the extended message storage unit 107, and outputs a 512-bit internal state value SHA512_TEMP[511:0].

The areas of the internal state value storage unit 111 where data to be processed by the step processors 112-1, 112-2, and 112-3 are respectively stored are determined in advance, and the internal state value storage unit 111 are connected as inputs of the step processors. For this reason, the step processors 112-1, 112-2, and 112-3 always execute the step processes to have data of the determined areas of the internal state value storage unit 111 as inputs.

Reference numeral 113 denotes a step process result selector.

The step process result selector 113 selects:
output data MD5_TEMP from the MD5 step processor 112-1;
output data SHA1_TEMP from the SHA1 step processor 112-2; or
output data SHA512_TEMP from the SHA512 step processor 112-3
in accordance with the signals A_EXE, A_ALG, B_EXE, and B_ALG, and outputs the selected data as data TEMP_N. Data TEMP_N[255:0] is internal state value data stored in area 0 of the internal state value storage unit 111, and data TEMP_N [511:256] is internal state value data stored in area 1 of the internal state value storage unit 111.

(Selection of Data TEMP_N[255:0] and TEMP_N[511:256])

FIG. 39 is a view showing an example of the selection policies of the data TEMP_N[255:0] and TEMP_N[511:256].

Reference numeral 1401 denotes data selection policies of the data TEMP_N[255:0].

Reference numeral 1401-*a* denotes a case in which the MD5 hash value calculation of process A is in progress (A_EXE=1 and A_ALG=MD5). In this case, as lower 128 bits, the output data MD5_TEMP[127:0] of the MD5 step processor 112-1 is selected.

Reference numeral 1401-*b* denotes a case in which the MD5 hash value calculation of process B is in progress (B_EXE=1 and B_ALG=MD5). In this case, as lower 128 bits, the output data MD5_TEMP[127:0] of the MD5 step processor 112-1 is selected.

Reference numeral 1401-*c* denotes a case other than the above cases. In this case, the output data SHA512_TEMP[127:0] of the SHA512 step processor 112-3 is selected. As the data TEMP_N[255:128], the data SHA512_TEMP[255:128] is always output.

Reference numeral 1402 denotes data selection policies of the data TEMP_N[511:256].

Reference numeral 1402-*a* denotes a case in which the SHA1 hash value calculation of process A is in progress (A_EXE=1 and A_ALG=SHA1). In this case, as lower 160 bits, the output data SHA1_TEMP[159:0] of the SHA1 step processor 112-2 is selected.

Reference numeral 1402-*b* denotes a case in which the SHA1 hash value calculation of process B is in progress (B_EXE=1 and B_ALG=SHA1). In this case, as lower 160 bits, the output data SHA1_TEMP[159:0] of the SHA1 step processor 112-2 is selected.

Reference numeral 1402-*c* denotes a case other than the above cases. In this case, the output data SHA512_TEMP[511:256] of the SHA512 step processor 112-3 is selected.

As the data TEMP_N[511:256], the data SHA512_TEMP [511:256] is always output.

According to the selection policies of FIG. 39, when the hash value calculation of process A or B is in progress, the output from the step processor used in the corresponding process is selected. When the hash value calculation is not in progress, the output data SHA512_TEMP of the SHA512 step processor 112-3 is output, and is stored in the internal state value storage unit 111.

Reference numeral 114 denotes a hash intermediate value storage data selector. The hash intermediate value storage data selector 114 selects hash initial values A_IV and B_IV and a hash intermediate value result IHASH_N according to the signals A_EXE, A_ALG, A_BLK_CNT, B_EXE, A_STP_ CNT, B_STP_CNT, B_ALG, and B_BLK_CNT. Then, the hash intermediate value storage data selector 114 outputs 256-bit data IHASH_0 and IHASH_1.

The data IHASH_0 is stored in area 0 of a hash intermediate value storage unit 115 (to be described later), and the data IHASH_1 is stored in area 1 of the hash intermediate value storage unit 115.

(Selection of Data IHASH_0 and IHASH_1)

FIG. 40 is a view showing an example of the data selection policies of the data IHASH_0 and IHASH_1.

Reference numeral 1501 denotes data selection policies of the data IHASH_0.

Reference numeral 1501-*a* denotes a case in which the MD5 hash value calculation of process A is in process, and the addition process other than the N-th addition process in the first block is to be executed (A_EXE=1 and A_ALG=MD5 and A_BLK_CNT=0 and A_STP_CNT≠65). In this case, lower 256 bits A_IV[255:0] of the process A hash initial value are selected.

Reference numeral 1501-*b* denotes a case in which the SHA512 hash value calculation of process A is in process, and the addition process other than the N-th addition process in the first block is to be executed (A_EXE=1 and A_ALG=SHA512 and A_BLK_CNT=0 and A_STP_CNT≠81). In this case, lower 256 bits A_IV[255:0] of the process A hash initial value are selected.

Reference numeral 1501-*c* denotes a case in which the MD5 hash value calculation of process B is in process, and the addition process other than the N-th addition process in the first block is to be executed (B_EXE=1 and B_ALG=MD5 and B_BLK_CNT=0 and B_STP_CNT≠65). In this case, lower 256 bits B_IV[255:0] of the process B hash initial value are selected.

Reference numeral 1501-*d* denotes a case in which the SHA512 hash value calculation of process B is in process, and the addition process other than the N-th addition process in the first block is to be executed (B_EXE=1 and B_ALG=SHA512 and B_BLK_CNT=0 and B_STP_CNT≠81). In this case, lower 256 bits B_IV[255:0] of the process B hash initial value are selected.

Reference numeral 1501-*e* denotes a case other than the above cases. In this case, lower 256 bits IHASH_N[255:0] of hash intermediate value data (to be described later) are selected.

Reference numeral 1502 denotes data selection policies of the data IHASH_1.

Reference numeral 1502-*a* denotes a case in which the MD5 hash value calculation of process A is in process, and the addition process other than the N-th addition process in the first block is to be executed (A_EXE=1 and A_ALG=MD5 and A_BLK_CNT=0 and A_STP_CNT≠65). In this case, lower 256 bits A_IV[255:0] of the process A hash initial value are selected.

Reference numeral 1502-*b* denotes a case in which the SHA512 hash value calculation of process A is in process, and the addition process other than the N-th addition process in the first block is to be executed (A_EXE=1 and A_ALG=SHA512 and A_BLK_CNT=0 and A_STP_CNT≠81). In this case, upper 256 bits A_IV[511:256] of the process A hash initial value are selected.

Reference numeral 1502-*c* denotes a case in which the MD5 hash value calculation of process B is in process, and the addition process other than the N-th addition process in the first block is to be executed (B_EXE=1 and B_ALG=MD5 and B_BLK_CNT=0 and B_STP_CNT≠65). In this case, lower 256 bits B_IV[255:0] of the process B hash initial value are selected.

Reference numeral 1502-*d* denotes a case in which the SHA512 hash value calculation of process B is in process, and the addition process other than the N-th addition process in the first block is to be executed (B_EXE=1 and B_ALG=SHA512 and B_BLK_CNT=0 and B_STP_CNT≠81). In this case, upper 256 bits B_IV[511:256] of the process B hash initial value are selected.

Reference numeral 1502-*e* denotes a case other than the above cases. In this case, upper 256 bits IHASH_N[511:256] of hash intermediate value data (to be described later) are selected.

According to the selection policies of FIG. 40, when the hash value calculation of process A or B is in progress, data to be used in the process is selected; otherwise, the hash intermediate value IHASH_N is output.

Reference numeral 115 denotes a hash intermediate value storage unit which stores output data from the hash intermediate value storage data selector 114. The hash intermediate value storage unit includes a 512-bit flip-flop, the 0th to 255th bits form area 0, and the 256th to 511th bits form area 1. Let IHASH[511:0] be an output signal from the 512-bit flip-flop. Area 0 stores data IHASH_0, and area 1 stores data IHASH_1.

As described above, the addition process adds an internal state value after the predetermined number of times of step processes to obtain a result as a new hash intermediate value. In this embodiment, a value is added to an internal state value after each of the first to N-th step processes for each cycle. However, the hash intermediate value storage unit stores only a value added to the internal state value after the N-th step process.

The storage conditions of the data IHASH_0 are:
when the MD5 or SHA512 hash value calculation of process A is in progress and the addition process at the beginning of the processing or the N-th addition process is to be executed; and
when the MD5 or SHA512 hash value calculation of process B is in progress and the addition process at the beginning of the processing or the N-th addition process is to be executed.

The storage conditions of the data IHASH_1 are:
when the SHA1 or SHA512 hash value calculation of process A is in progress and the addition process at the beginning of the processing or the N-th addition process is to be executed; and
when the SHA1 or SHA512 hash value calculation of process B is in progress and the addition process at the beginning of the processing or the N-th addition process is to be executed.

Reference numerals 116-1, 116-2, and 116-3 denote addition processors, each of which adds data which is generated by the step processor 112-1, 112-2, or 112-3 and is stored in the internal state value storage unit 111, and the output from the hash intermediate value storage unit 115 to generate the next hash intermediate value. Since the addition processors require different bit widths depending on the hash algorithms, the addition processors corresponding to the respective hash algorithms are arranged. The addition processor 116-1 corresponds to MD5. The addition processor 116-2 corresponds to SHA1. The addition processor 116-3 corresponds to SHA512. The areas of the hash intermediate value storage unit 115, and those of the internal state value storage unit 111, where data to be processed by the addition processors 116-1, 116-2, and 116-3 are stored, are determined in advance.

Assume that the MD5 addition processor 116-1 includes four 32-bit adders, and stores data to be processed in area 0 of the hash intermediate value storage unit 115. The addition processor 116-1 adds data IHASH[127:0] in area 0 of the hash intermediate value storage unit 115 and output data TEMP[127:0] of the internal state value storage unit 111, and outputs a 128-bit hash intermediate value MD5 IHASH[127:0].

Assume that the SHA1 addition processor 116-2 includes five 32-bit adders, and stores data to be processed in area 1 of the hash intermediate value storage unit 115. The addition processor 116-2 adds data IHASH[511:256] in area 1 of the hash intermediate value storage unit 115 and output data TEMP[511:256] of the internal state value storage unit 111, and outputs a 160-bit hash intermediate value SHA1_IHASH [159:0].

Assume that the SHA512 addition processor 116-3 includes eight 64-bit adders, and stores data to be processed in areas 0 and 1 of the hash intermediate value storage unit 115. The addition processor 116-3 adds data IHASH[511:0] in areas 0 and 1 of the hash intermediate value storage unit 115 and output data TEMP[511:0] of the internal state value storage unit 111, and outputs a 512-bit hash intermediate value SHA512_IHASH[255:0].

The addition processors 116-1, 116-2, and 116-3 determine the areas of the internal state value storage unit 111, where their data to be processed are stored, and connect the internal state value storage unit 111 as their inputs. For this reason, the addition processors 116-1, 116-2, and 116-3 always execute the addition processes to have, as inputs, the data in the determined areas of the internal state value storage unit 111.

Reference numeral 117 denotes a hash intermediate value result selector. The hash intermediate value result selector 117 selects:

output data MD5_IHASH of the MD5 addition processor 116-1;

output data SHA1_IHASH of the SHA1 addition processor 116-2; or output data SHA512_IHASH of the SHA512 addition processor 116-3 according to the signals A_EXE, A_ALG, B_EXE, and B_ALG, and outputs the selected data as data IHASH_N. Data IHASH_N[255:0] is hash intermediate value data stored in area 0 of the hash intermediate value storage unit 115, and data IHASH_N[511:256] is hash intermediate value data stored in area 1 of the hash intermediate value storage unit 115.

(Selection of Data IHASH_N[255:0] and IHASH_N[511:256])

FIG. 41 is a view showing an example of the data selection policies of the data IHASH_N[255:0] and IHASH_N[511:256].

Reference numeral 1601 denotes data selection policies of the data IHASH_N[255:0].

Reference numeral 1601-*a* denotes a case in which the MD5 hash value calculation of process A is in progress (A_EXE=1 and A_ALG=MD5). In this case, as lower 128 bits, output data MD5_IHASH[127:0] of the MD5 addition processor 116-1 is selected.

Reference numeral 1601-*b* denotes a case in which the MD5 hash value calculation of process B is in progress (B_EXE=1 and B_ALG=MD5). In this case, as lower 128 bits, output data MD5_IHASH[127:0] of the MD5 addition processor 116-1 is selected.

Reference numeral 1601-*c* denotes a case other than the above cases. In this case, output data SHA512_IHASH [255:0] of the SHA512 addition processor 116-3 is selected.

As data IHASH_N[255:128], data SHA512_IHASH[255:128] is always output.

Reference numeral 1602 denotes data selection policies of the data IHASH_N[511:256].

Reference numeral 1602-*a* denotes a case in which the SHA1 hash value calculation of process A is in progress (A_EXE=1 and A_ALG=SHA1). In this case, as lower 160 bits, output data SHA1_IHASH[159:0] of the SHA1 addition processor 116-2 is selected.

Reference numeral 1602-*b* denotes a case in which the SHA1 hash value calculation of process B is in progress (B_EXE=1 and B_ALG=SHA1). In this case, as lower 160 bits, output data SHA1_IHASH[159:0] of the SHA1 addition processor 116-2 is selected.

Reference numeral 1602-*c* denotes a case other than the above cases. In this case, output data SHA512_IHASH [511:256] of the SHA512 addition processor 116-3 is selected. As data IHASH_N[511:416], data SHA512_IHASH[511:416] is always output.

According to the selection policies of FIG. 41, when the hash value calculation of process A or B is in progress, the output from the step processor used in the process is selected. When the hash value calculation is not in progress, the output data SHA512_IHASH of the SHA512 addition processor 116-3 is output, and is stored in the hash intermediate value storage unit 115.

(Internal Arrangement of Controller)

Figure 26:
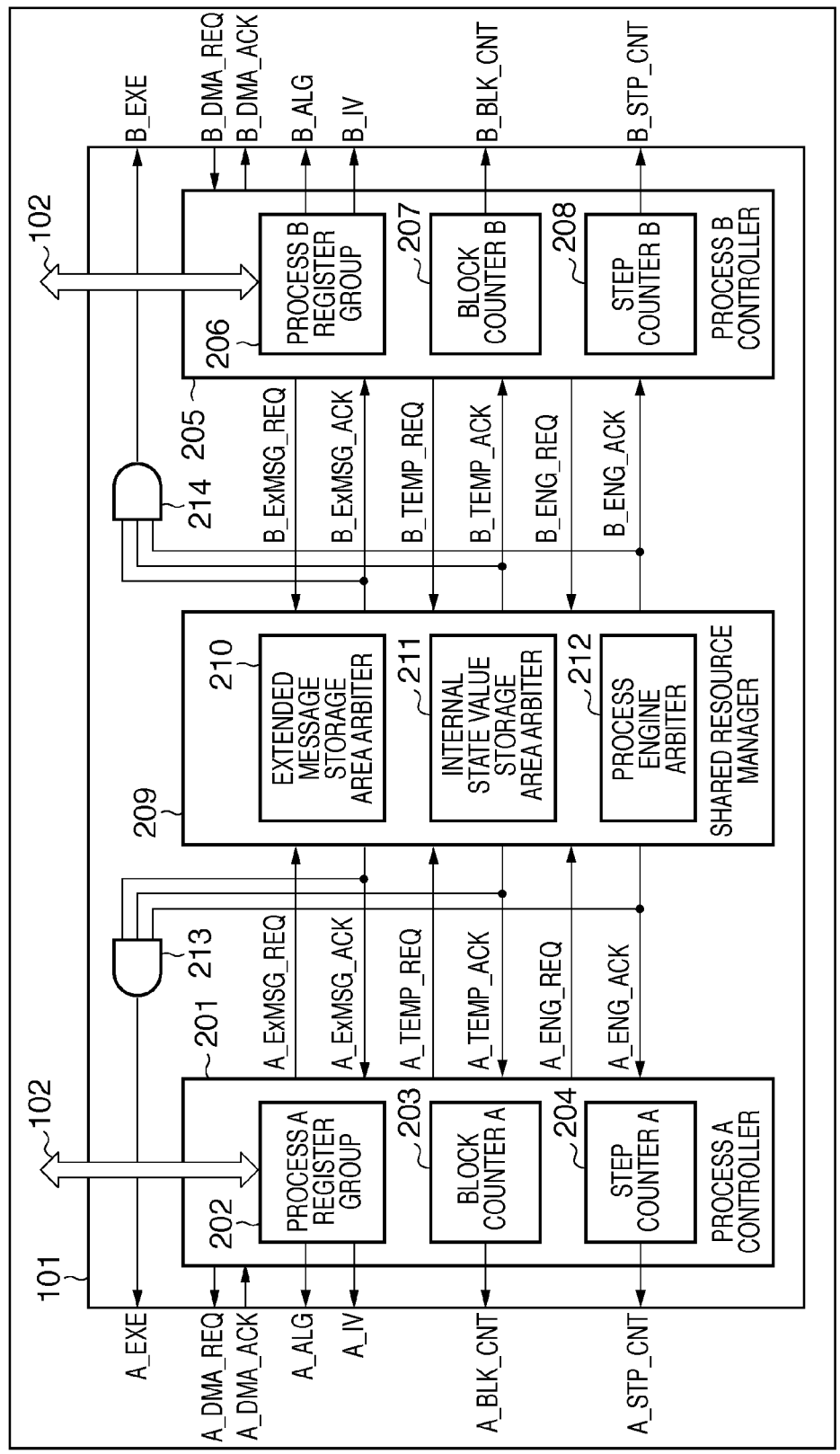
FIG. 26 is a block diagram showing an example of the internal arrangement of a controller.

FIG. 26 is a block diagram showing an example of the internal arrangement of the controller 101. Referring to FIG. 26, reference numeral 201 denotes a process A controller which controls process A. The process A controller 201 includes a process A register group 202 which is used to set parameters required for the hash value calculation, a block counter A 203 which counts the number of blocks in execution, and a step counter A 204 which counts the number of steps in execution.

FIG. 27 is a view showing the specifications of registers. Reference numerals 301 to 304 in FIG. 27 denote the specifications of registers included in the process A register group 202.

Reference numeral 301 denotes a register A_ENB which is used to set a start request of the hash value calculation of process A. When "1" is set in this register, the register gives the instruction to start the hash value calculation. This register is automatically cleared at the time of completion of the hash value calculation. Reference numeral 302 denotes a register A_ALG which is used to set a hash algorithm. In this register, MD5 is selected by setting "00", SHA1 is selected by setting "01", and SHA512 is selected by setting "10". Reference numeral 303 denotes a register A_BLK which is used to set the number of blocks of a message which is to undergo the hash value calculation. A value of the number of blocks−1 of the message which is to undergo the hash value calculation is set in this register. Reference numeral 304 denotes a register which is used to set an initial value used in the hash value calculation. The initial value is prescribed by each hash algorithm.

When "1" is set in the register A_ENB 301 to request to start the hash value calculation, the process A controller 201 issues, to a shared resource manager 209 (to be described later), use requests of:

an area of the extended message storage unit;
an area of the internal state value storage unit;
the message extension processor;
the step processor; and
the addition processor (these processors will be collectively referred to as process engines hereinafter), which are required to execute the hash value calculation set in the register A_ALG. More specifically, the process A controller 201 issues a use request signal A_ExMSG_REQ of the specific area of the extended message storage unit, and receives a use permission signal A_ExMSG_ACK from the shared resource manager 209. The process A controller 201 issues a use request signal A_TEMP_REQ of the specific area of the internal state value storage unit, and receives a use permission signal A_TEM- P_ACK from the shared resource manager 209. The process A controller 201 issues a use request signal A_ENG_REQ of the process engines of the specific hash algorithm, and receives a use permission signal A_ENG_ACK from the shared resource manager 209.

Reference numeral 205 denotes a process B controller which controls process B. The process B controller 205 includes a process B register group 206, block counter B 207, and step counter B 208 as in the process A controller 201. Reference numerals 305 to 308 in FIG. 27 denote the specifications of registers included in the process B register group 206.

Reference numeral 305 denotes a register which is used to set a start request of the hash value calculation of process B. Reference numeral 306 denotes a register which is used to set a hash algorithm. Reference numeral 307 denotes a register which is used to set the number of blocks of a message which is to undergo the hash value calculation. The register 307 sets a value of the number of blocks–1 of the message which is to undergo the hash value calculation. Reference numeral 308 denotes a register which is used to set an initial value used in the hash value calculation. The specifications of the registers are the same as those of the registers 301 to 304 included in the process A register group 202.

When "1" is set in the register B_ENB 305 to request to start the hash value calculation, the process B controller 205 issues, to the shared resource manager 209, use requests of:
- an area of the extended message storage unit;
- an area of the internal state value storage unit; and
- the process engines which are required to execute the hash value calculation set in the register B_ALG. More specifically, the process B controller 205 issues a use request signal B_ExMSG_REQ of the specific area of the extended message storage unit, and receives a use permission signal B_ExMSG_ACK from the shared resource manager 209. The process B controller 205 issues a use request signal B_TEMP_REQ of the specific area of the internal state value storage unit, and receives a use permission signal B_TEMP_ACK from the shared resource manager 209. The process B controller 205 issues a use request signal B_ENG_REQ of the process engines of the specific hash algorithm, and receives a use permission signal B_ENG_ACK from the shared resource manager 209.

Reference numeral 209 denotes a shared resource manager which manages resources shared by processes A and B. The resources shared by processes A and B include:
- the extended message storage unit 107;
- the internal state value storage unit 111;
- the hash intermediate value storage unit 115;
- the message extension processors 108-1, 108-2, and 108-3;
- the step processors 112-1, 112-2, and 112-3; and
- the addition processors 116-1, 116-2, and 116-3.

Reference numeral 210 denotes an extended message storage area arbiter which manages the use areas of the extended message storage unit 107. When processes A and B issue use requests of an identical area, the extended message storage area arbiter 210 arbitrates these requests, and grants a permission of use.

Reference numeral 211 denotes an internal state value storage area arbiter. When processes A and B issue use requests of an identical area, the internal state value storage area arbiter 211 arbitrates these requests, and grants a use permission. The hash intermediate value storage unit 115 is divided to have the same areas as those of the internal state value storage unit 111, and when a use permission of a given area of the internal state value storage unit 111 is granted, a use permission of the same area of the hash intermediate value storage unit 115 is granted at the same time.

Reference numeral 212 denotes a process engine arbiter which manages use of the message extension processors 108-1, 108-2, and 108-3. When processes A and B issue use requests of the message extension processor of the identical hash algorithm, the process engine arbiter 212 arbitrates these requests and grants a use permission. When the use permission of the message extension processor is granted, those of the step processor and addition processor of the identical hash algorithm are also granted.

Reference numeral 213 denotes a gate A_EXE which indicates an execution state of process A. When A_EXE=1, it indicates an "in-execution" state. A_EXE=1 (in execution) is set when a use permission A_ExMSG_ACK of the extended message storage area, a use permission A_TEMP_ACK of the internal state value storage area, and a use permission A_ENG_ACK of the process engines are granted.

Reference numeral 214 denotes a gate B_EXE which indicates an execution state of process B. When B_EXE=1, it indicates an "in-execution" state. B_EXE=1 (in execution) is set when a use permission B_ExMSG_ACK of the extended message storage area, a use permission B_TEMP_ACK of the internal state value storage area, and a use permission B_ENG_ACK of the process engines are granted.

(System Arrangement Example)

Figure 28:
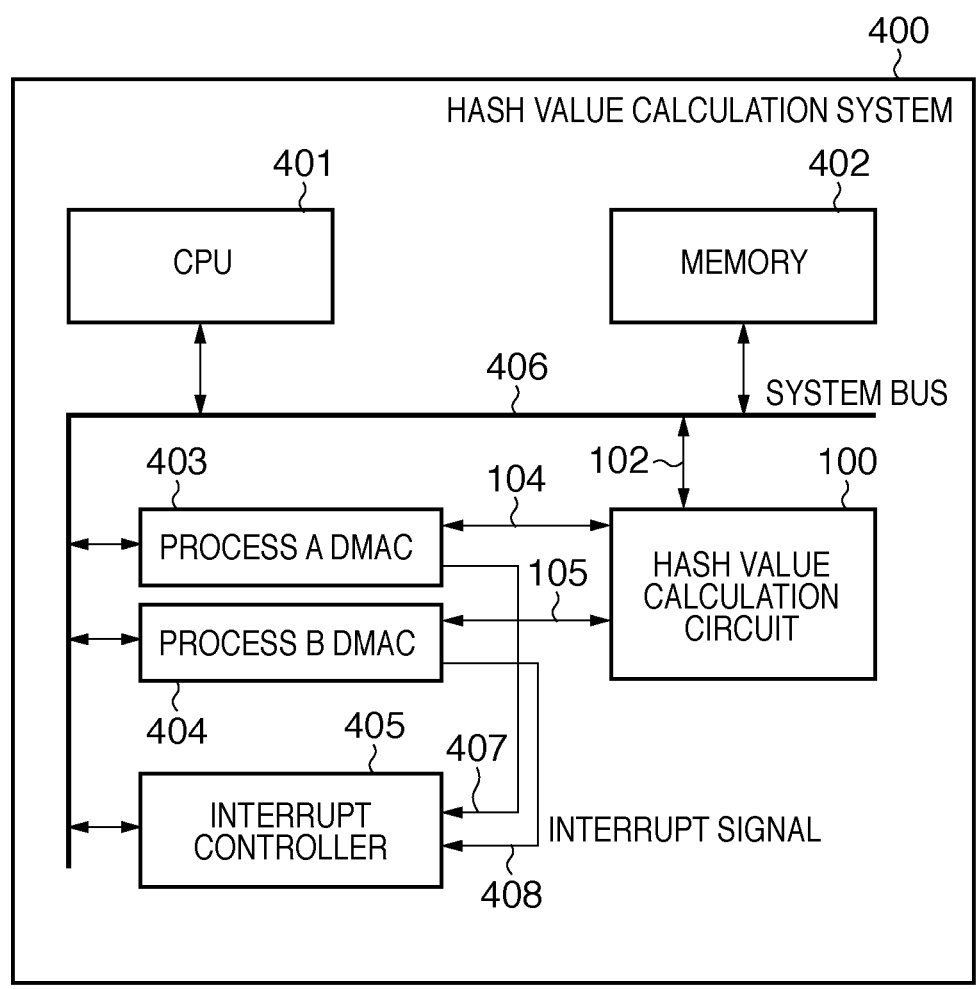
FIG. 28 is a block diagram showing an example of the arrangement of a system required to operate the hash value calculation circuit.

FIG. 28 is a block diagram showing an example of the arrangement of a system which operates the hash value calculation circuit 100.

Reference numeral 400 denotes a hash value calculation system. Reference numeral 401 denotes a CPU which controls the operation of the hash value calculation system 400. Reference numeral 402 denotes a memory which stores messages which are to undergo hash value calculations, hash values, and the like. Reference numeral 403 denotes a DMAC A which transfers an input message of process A from the memory 402 to the hash value calculation circuit 100, and transfers the hash value calculation result of process A from the hash value calculation circuit 100 to the memory 402. Reference numeral 404 denotes a DMAC B which transfers an input message of process B from the memory 402 to the hash value calculation circuit 100, and transfers the hash value calculation result of process B from the hash value calculation circuit 100 to the memory 402. Reference numeral 405 denotes an interrupt controller which controls interrupt signals of the hash value calculation system 400.

Reference numeral 406 denotes a system bus which connects the hash value calculation circuit 100, CPU 401, memory 402, DMAC A 403, DMAC B 404, and interrupt controller 405, and includes an address signal, data signal, control signal, and the like. Reference numeral 407 denotes an interrupt signal from the DMAC A 403 to the interrupt controller 405. After the hash value calculation result of process A is transferred from the hash value calculation circuit 100 to the memory 402, the DMAC A 403 generates the interrupt signal to notify the interrupt controller 405 of completion of the transfer. Reference numeral 408 denotes an interrupt signal from the DMAC B 404 to the interrupt controller 405. After the hash value calculation result of process B is transferred from the hash value calculation circuit 100 to the memory 402, the DMAC B 404 generates the interrupt signal to notify the interrupt controller 405 of completion of the transfer. The interrupt controller 405 notifies the CPU 401 of storage of the hash value calculation result using an interrupt signal (not shown).

(Operation of Cpu)

Figure 29B:
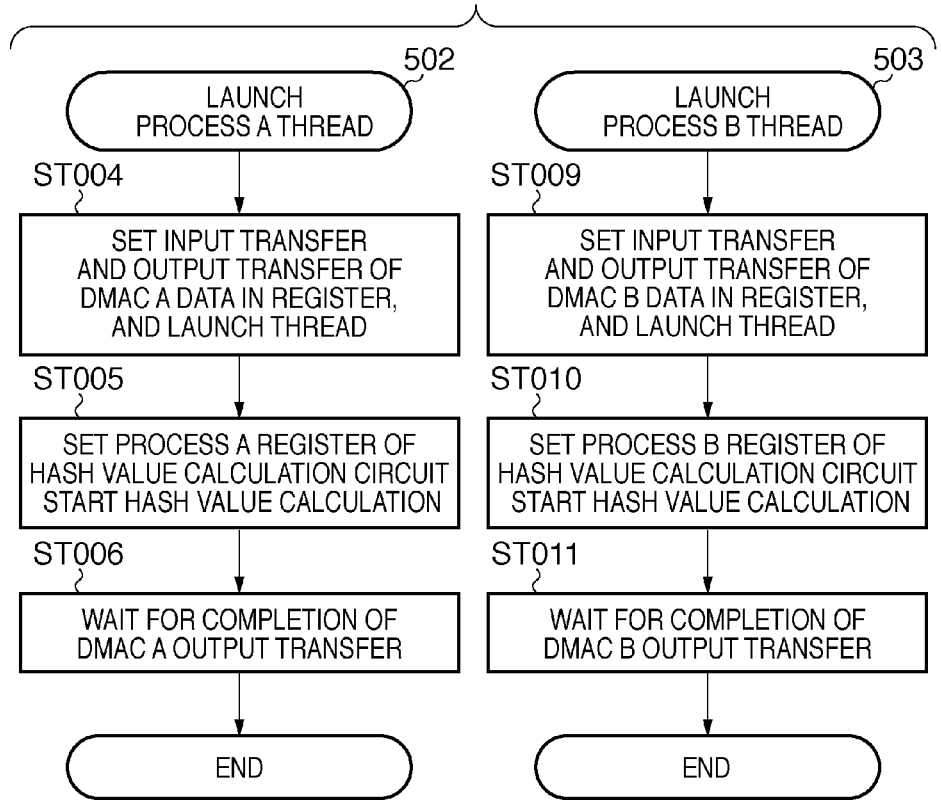
Figure 29C:
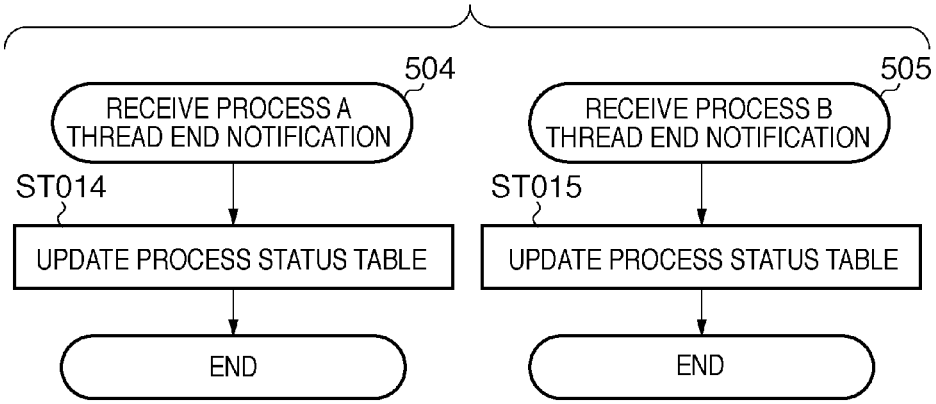

FIGS. 29A, 29B, and 29C are flowcharts showing the operation sequence of the CPU for each message reception in the hash value calculation system of this embodiment. Reference numeral 501 denotes a sequence at the time of reception of a message. When the CPU receives a message, it decides in ST001 whether process A or B processes the received message. The CPU 401 includes a process status table which indicates the process statuses of processes A and B. The process status table indicates "busy" or "idle". The CPU decides process A or B which is "idle" as that used to process the message. Assume that when both processes A and B are "idle", process A has higher priority. If both processes A and B are "busy", the CPU waits until one of them becomes "idle". If the CPU decides process A in ST002, it updates the status of process A in the process status table to "busy", and launches a process A thread. If the CPU decides process B, it updates the status of process B in the process status table to "busy", and launches a process B thread in ST003.

Reference numeral 502 denotes a sequence executed when the process A thread is to be launched. When the process A thread is to be launched, the CPU makes an input transfer setting for transferring a message from the memory 402 to the hash value calculation circuit 100 and an output transfer setting for transferring a hash value from the hash value calculation circuit 100 to the memory 402 in a register of the DMAC A and launches the process A thread in ST004. In ST005, the CPU makes settings for hash value calculations in the process A register group of the hash value calculation circuit 100, and issues a process start request. The CPU waits for completion of the data output transfer of the DMAC A (ST006), and ends the process A thread.

Reference numeral 503 denotes a sequence executed when the process B thread is to be launched. When the process B thread is to be launched, the CPU makes an input transfer setting for transferring a message from the memory 402 to the hash value calculation circuit 100 and an output transfer setting for transferring a hash value from the hash value calculation circuit 100 to the memory 402 in a register of the DMAC B and launches the process B thread in ST009. In ST010, the CPU makes settings for hash value calculations in the process B register group of the hash value calculation circuit 100, and issues a process start request. The CPU waits for completion of the data output transfer of the DMAC B (ST011), and ends the process B thread.

Reference numeral 504 denotes a sequence at the time of reception of a process A thread end notification. In ST014, the CPU updates the status of process A in the process status table to "idle". Reference numeral 505 denotes a sequence at the time of reception of a process B thread end notification. In ST015, the CPU updates the status of process B in the process status table to "idle".

(Operation of Hash Value Calculation Circuit)

Figure 30A:
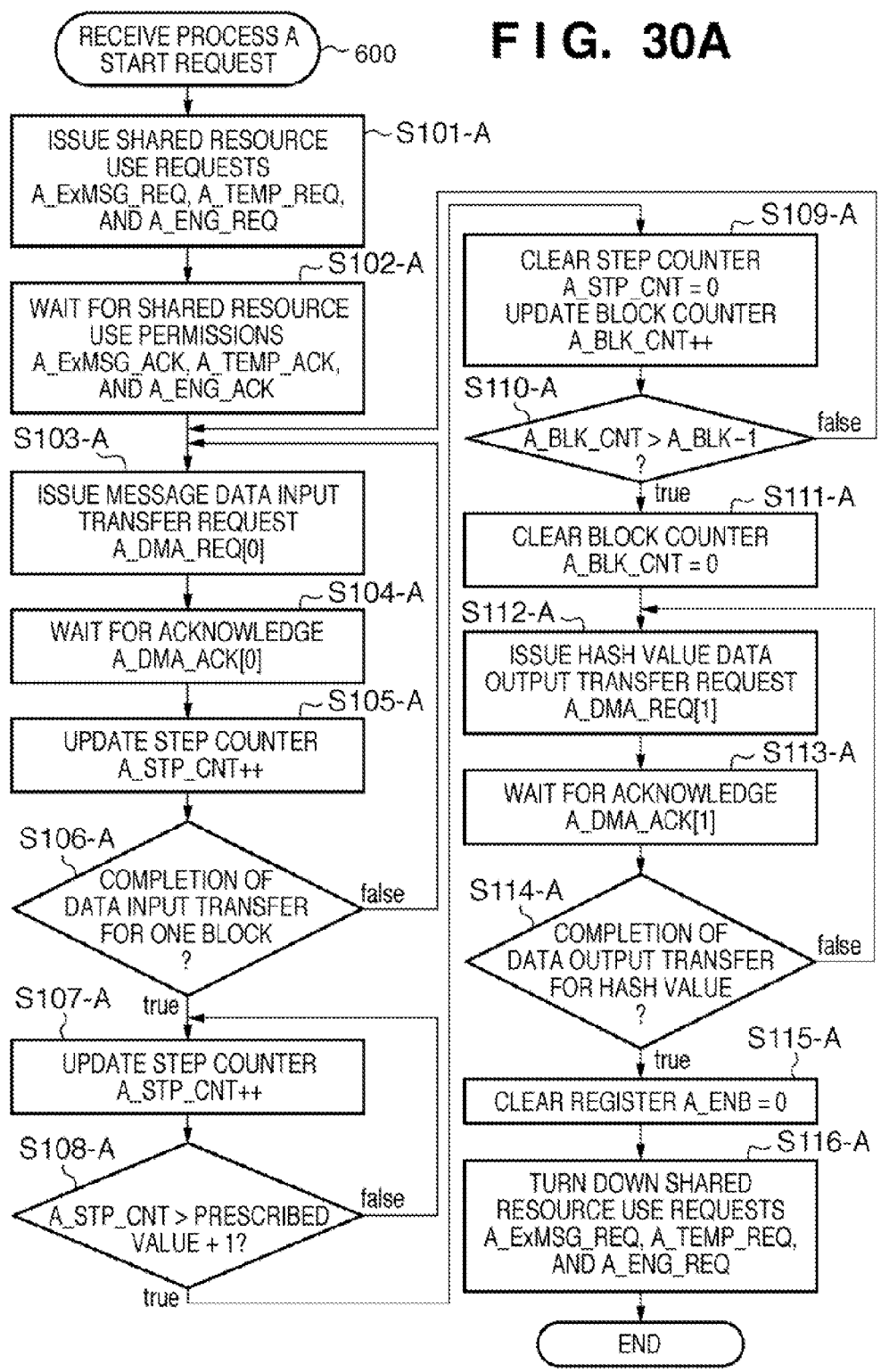
FIGS. 30A and 30B are flowcharts showing the operation sequence of a hash circuit in the hash value calculation system.
Figure 30B:
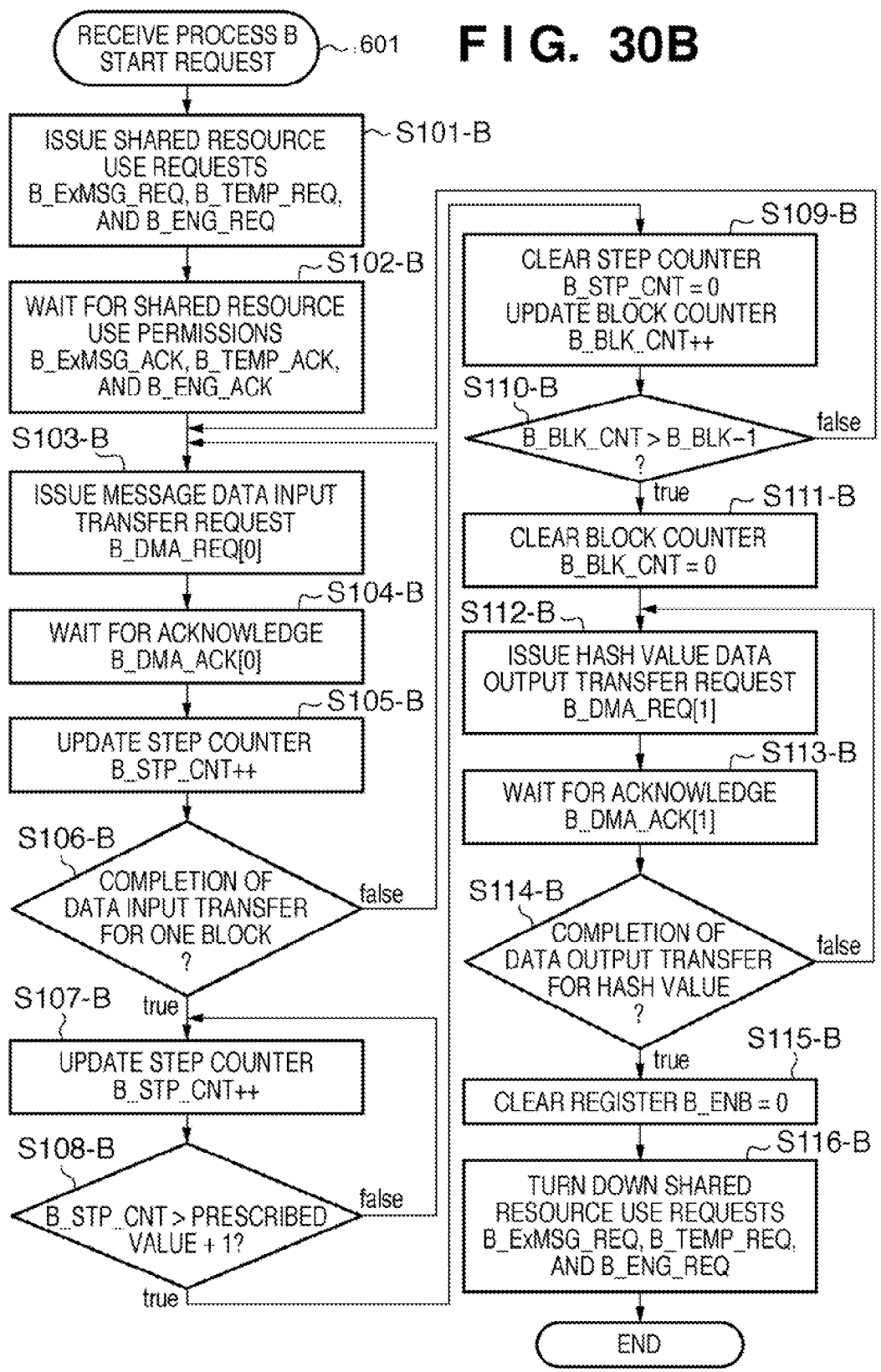

FIGS. 30A and 30B are flowcharts showing the operation sequences of the hash value calculation circuit 100 in the hash value calculation system of this embodiment.

Reference numeral 600 denotes a sequence at the time of reception of a process A start request. When the CPU sets '1' in the process A job start setting register 301, a process A start request is received. Upon reception of the process A start request, the process A controller 201 issues shared resource use requests A_ExMSG_REQ, A_TEMP_REQ, and A_ENG_ REQ according to the value A_ALG in the process A hash algorithm setting register 302 (ST101-A).

The process A controller 201 waits until the shared resource manager 209 grants permissions (acknowledges) A_ExMSG_ACK, A_TEMP_ACK, and A_ENG_ACK (ST102-A). After the permissions A_ExMSG_ACK, A_TEMP_ACK, and A_ENG_ACK are granted, the process A controller 201 issues a data input transfer request to the DMAC A (ST103-A). Upon reception of the acknowledgement in ST102-A, the process A controller 201 starts processing, and updates the step counter A_STP_CNT by +1 (ST105-A). The process A controller 201 determines in ST106-A if data transfer for one block, which is prescribed in the hash algorithm, is complete. If the data transfer is not complete yet, the process returns to ST103-A to issue a data input transfer request again. If the data transfer is complete, the data input transfer is complete, and the process advances to ST107-A. In ST107-A, the process A controller 201 updates the step counter by +1.

The process A controller 201 determines in ST108-A if A_STP_CNT exceeds a value +1, which value is prescribed in the hash algorithm. The process A controller 201 repeats ST107-A until the prescribed value +1 is exceeded. If the prescribed value +1 is exceeded, the process A controller 201 clears the step counter, and updates the block counter A_BLK_CNT by +1 (ST109-A). The process A controller 201 determines in ST110-A if A_BLK_CNT exceeds a value A_BLK−1, which value is set in the process A block count setting register 303. The process A controller 201 inputs data and executes hash value calculations until A_BLK−1 is exceeded. If A_BLK_CNT exceeds A_BLK−1, the process A controller 201 clears the block counter (ST111-A). In order to output a hash value, the process A controller 201 issues a data output transfer request to the DMAC A in ST112-A, and waits for an acknowledge in ST113-A. The process A controller 201 repeats ST112-A and ST113-A until data transfer for the hash value is completed.

If the data transfer for the hash value is complete, the process A controller 201 clears the process A job start setting register 301 (ST115-A), and turns down the shared resource use requests A_ExMSG_REQ, A_TEMP_REQ, and A_ENG_ REQ (ST116-A), thus ending the processing.

Reference numeral 601 denotes a sequence at the time of reception of a process B start request. When the CPU sets '1' in the process B job start setting register 305, a process B start request is received. Upon reception of the process B start request, the process B controller 205 issues shared resource use requests B_ExMSG_REQ, B_TEMP_REQ, and B_ENG_ REQ according to the value B_ALG in the process B hash algorithm setting register 306 (ST101-B). The process B controller 205 waits until the shared resource manager 209 grants permissions (acknowledges) B_ExMSG_ACK, B_TEMP_ ACK, and B_ENG_ACK (ST102-B). After the permissions B_ExMSG_ACK, B_TEMP_ACK, and B_ENG_ ACK are granted, the process B controller 205 issues a data input transfer request to the DMAC B (ST103-B). Upon reception of the acknowledges in ST102-B, the process B controller 205 starts processing, and updates the step counter B_STP_ CNT by +1 (ST105-B).

The process B controller 205 determines in ST106-B if data transfer for one block, which is prescribed in the hash algorithm, is complete. If the data transfer is not complete yet, the process returns to ST103-B to issue a data input transfer request again. If the data transfer is complete, the data input transfer is complete, and the process advances to ST107-B. In ST107-B, the process B controller 205 updates the step counter by +1. The process B controller 205 determines in ST108-B if B_STP_CNT exceeds a value +1, which value is prescribed in the hash algorithm. The process B controller 205 repeats ST107-B until the prescribed value +1 is exceeded. If the prescribed value +1 is exceeded, the process B controller 205 clears the step counter, and updates the block counter B_BLK_CNT by +1 (ST109-B). The process B controller 205 determines in ST110-B if B_BLK_CNT exceeds a value B_BLK−1, which value is set in the process B block count setting register 307. The process B controller 205 inputs data and executes hash value calculations until B_BLK−1 is exceeded. If B_BLK_CNT exceeds B_BLK−1, the process B controller 205 clears the block counter (ST111-B). In order to output a hash value, the process B controller 205 issues a data output transfer request to the DMAC B in ST112-B, and waits for an acknowledge in ST113-B. The process B controller 205 repeats ST112-B and ST113-B until data transfer for the hash value is completed. If the data transfer for the hash value is complete, the process B controller 205 clears the process B job start setting register 305 (ST115-B), and turns down the shared resource use requests B_ExMSG_REQ, B_TEMP_REQ, and B_ENG_REQ (ST116-B), thus ending the processing.

(Message Example)

Figure 31:
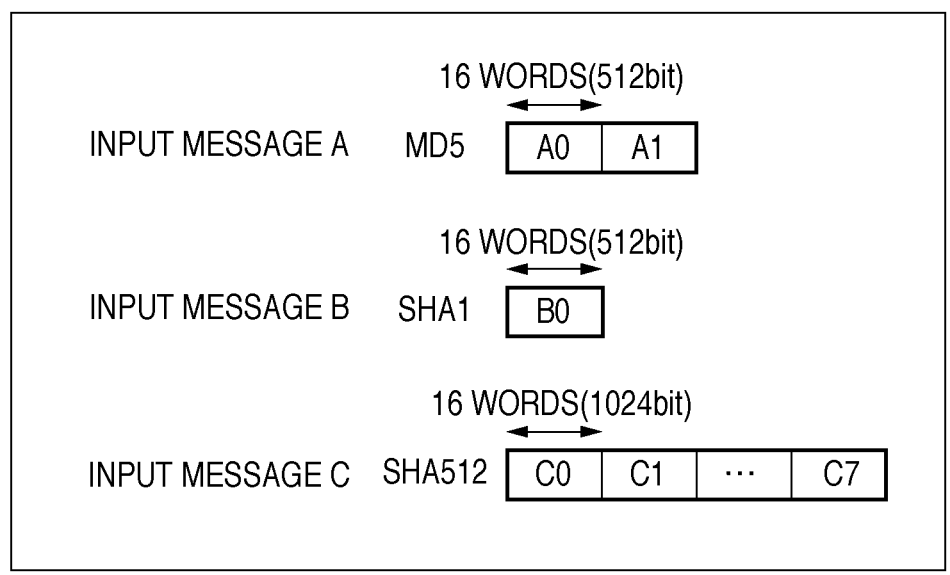
FIG. 31 is a view showing an example of messages which are to undergo hash value calculations.
Figure 32A:
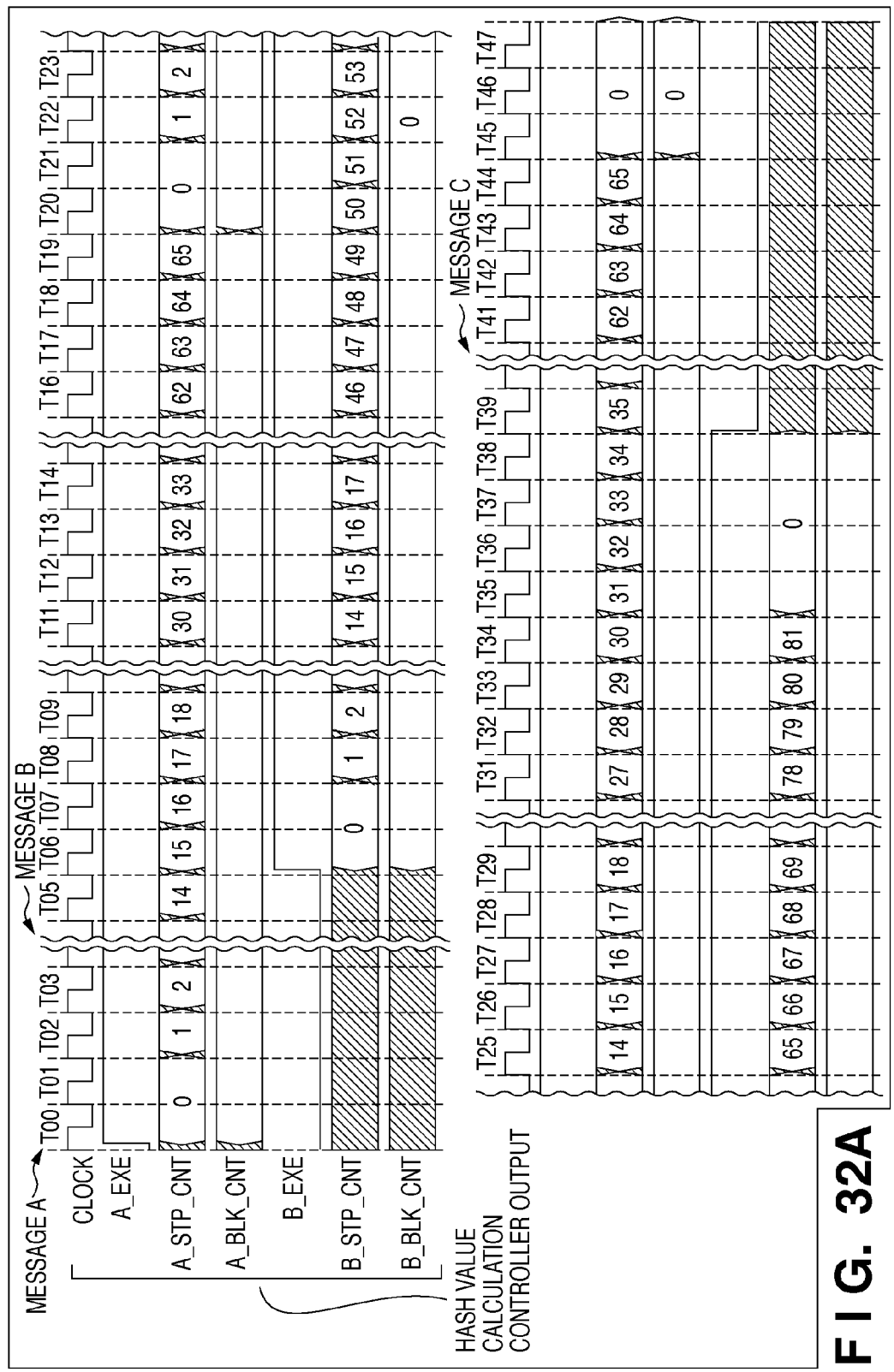
FIGS. 32A to 32H are timing charts showing an example of details of the hash value calculations.
Figure 32B:
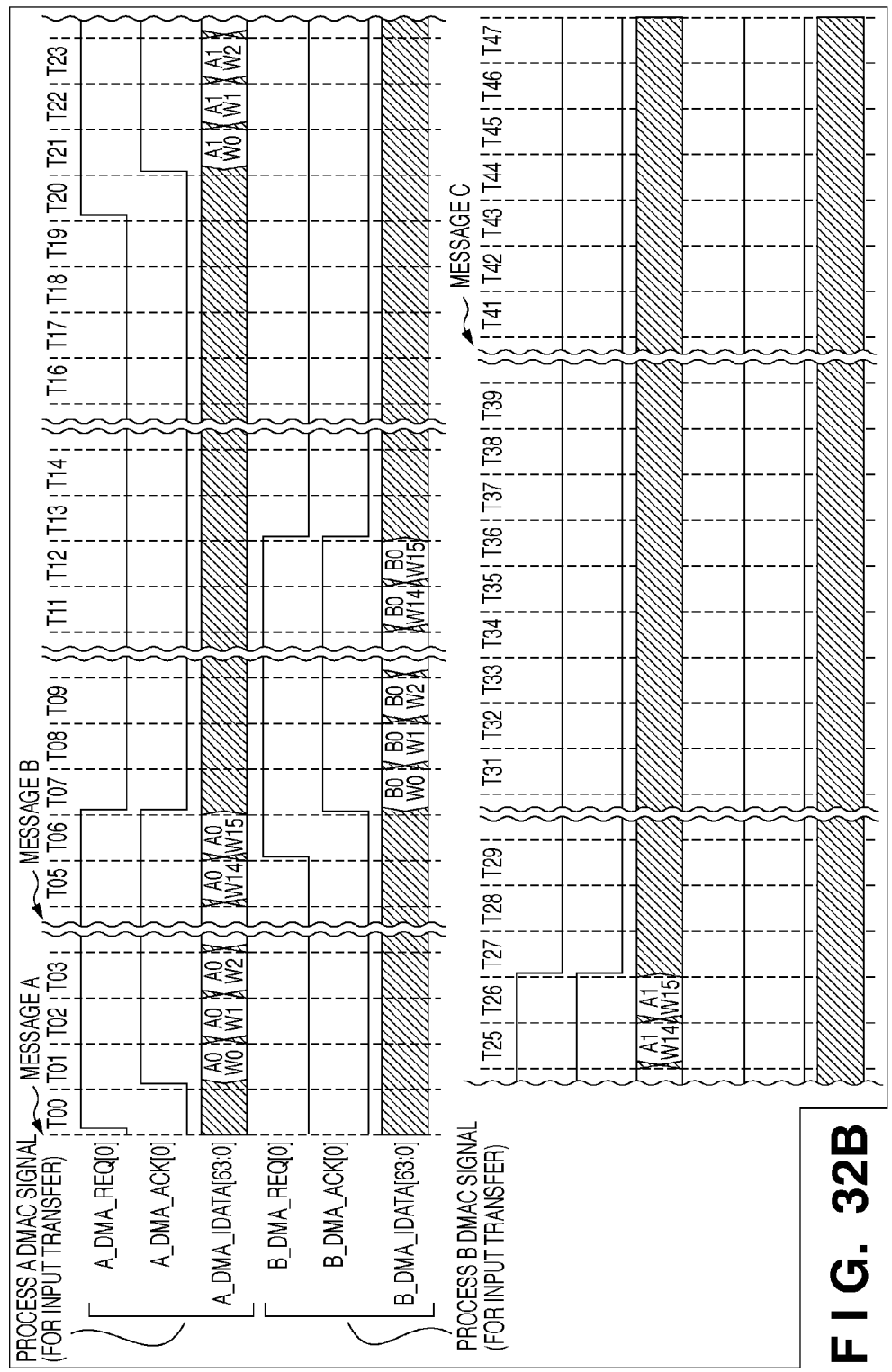
Figure 32C:
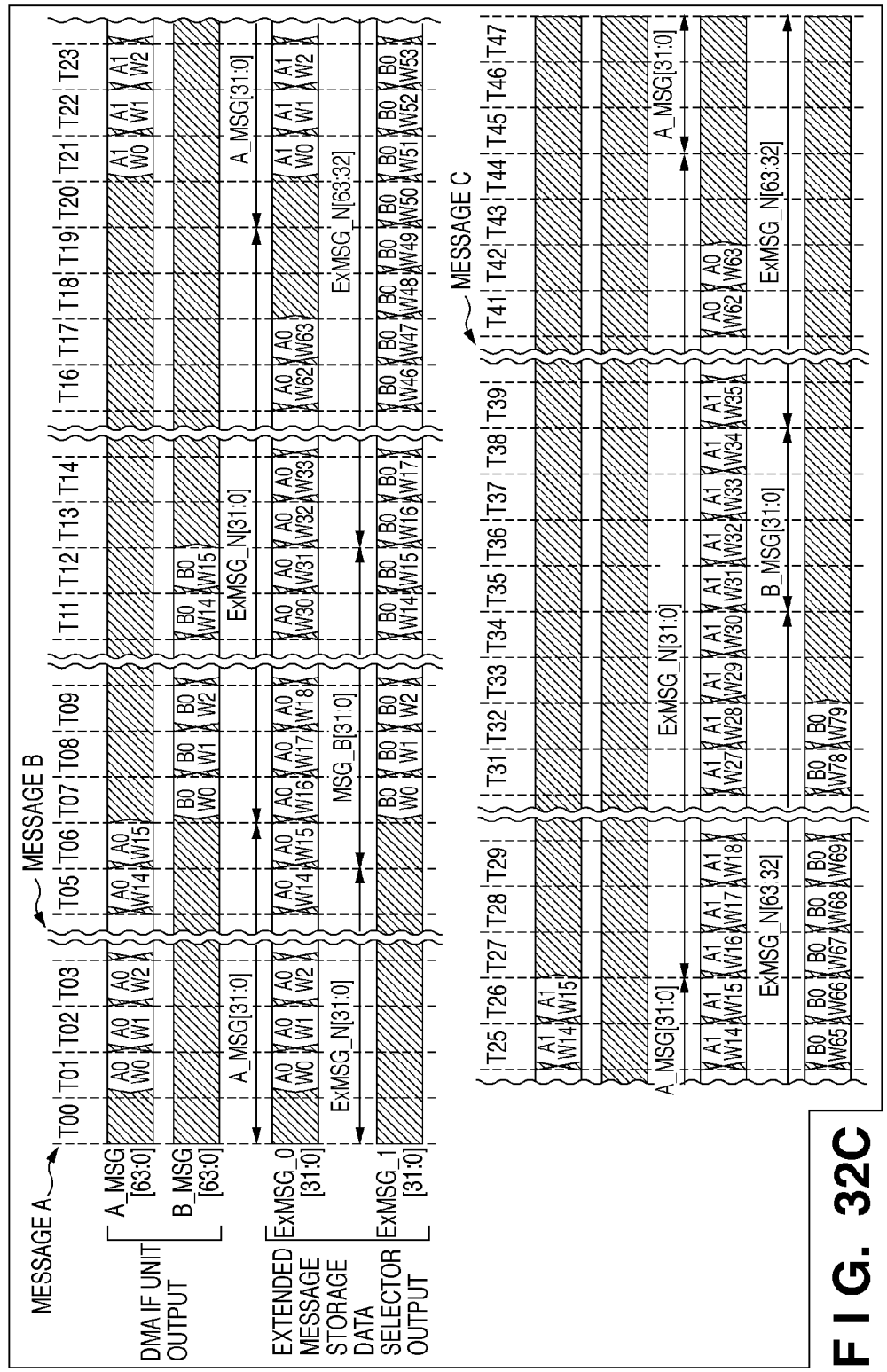
Figure 32D:
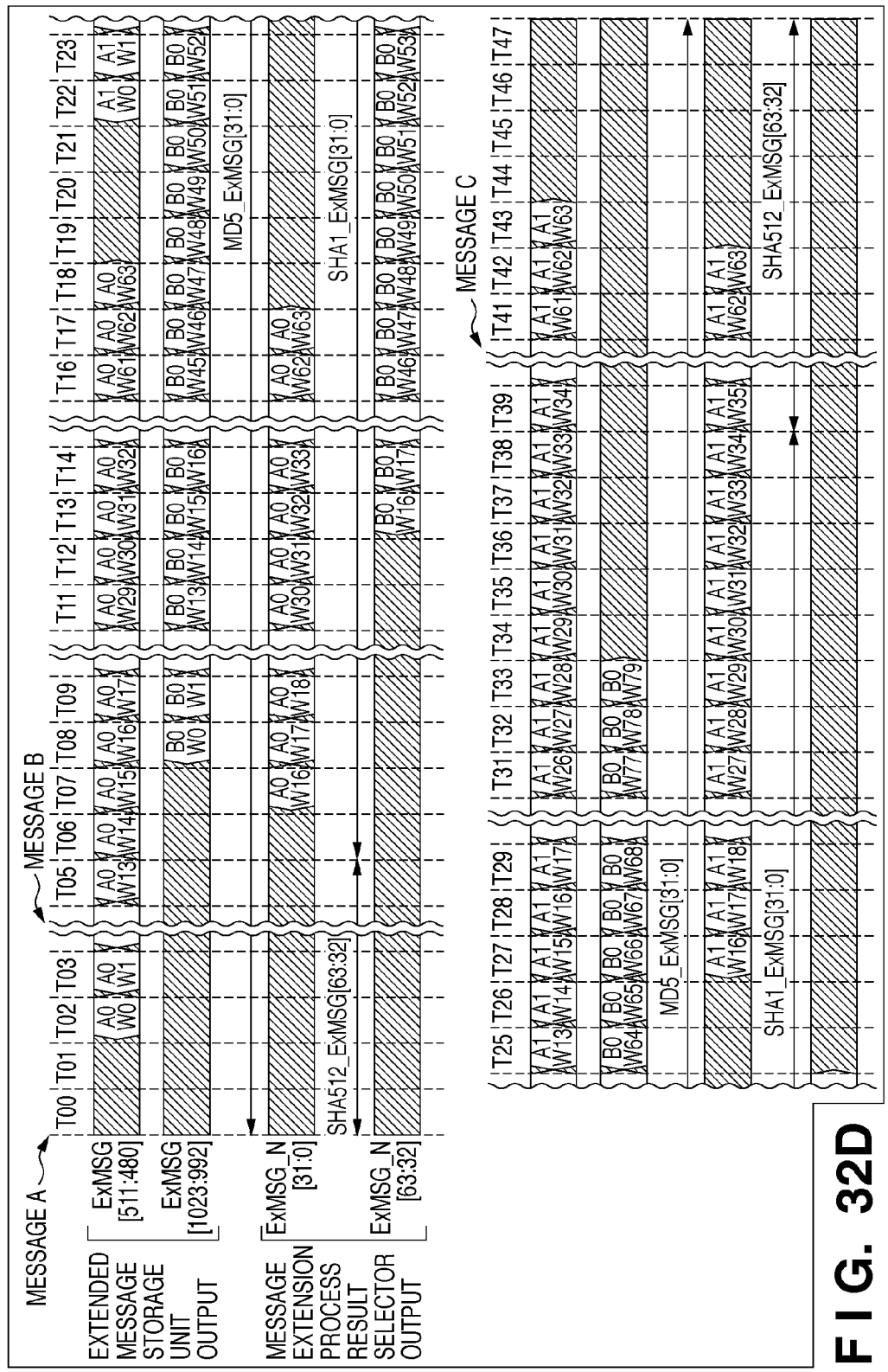
Figure 32E:
Figure 32F:
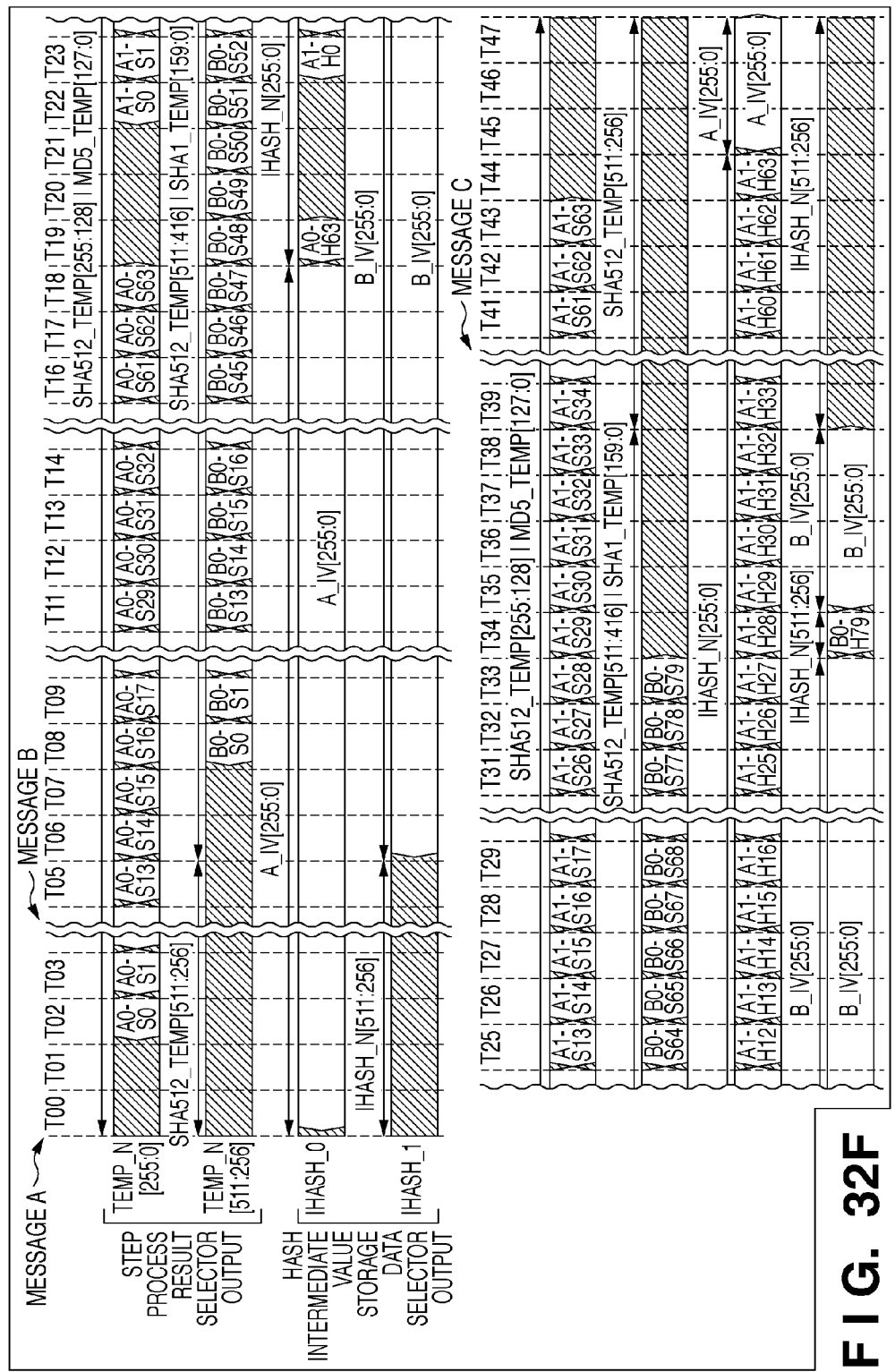
Figure 32G:
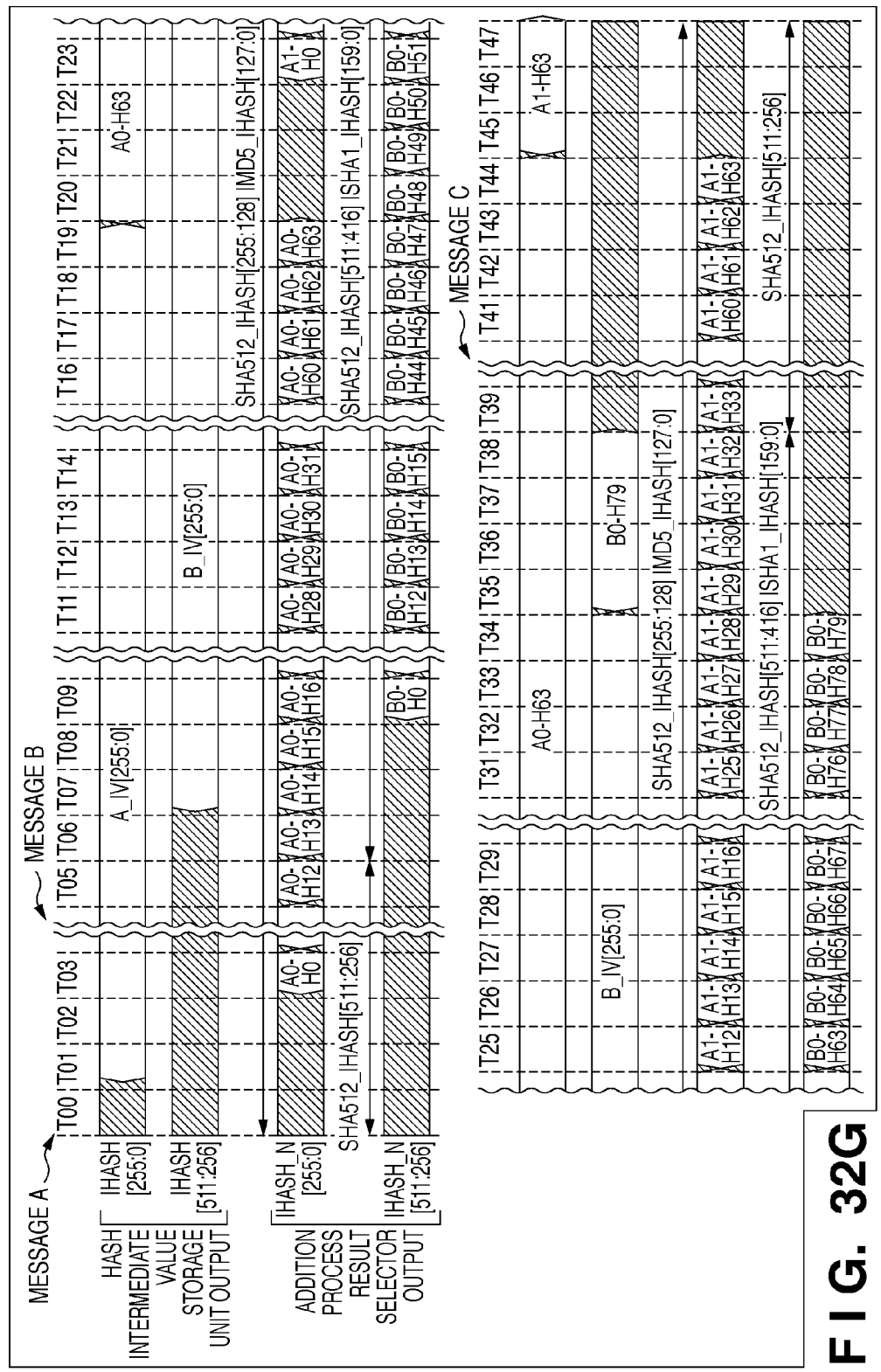
Figure 32H:
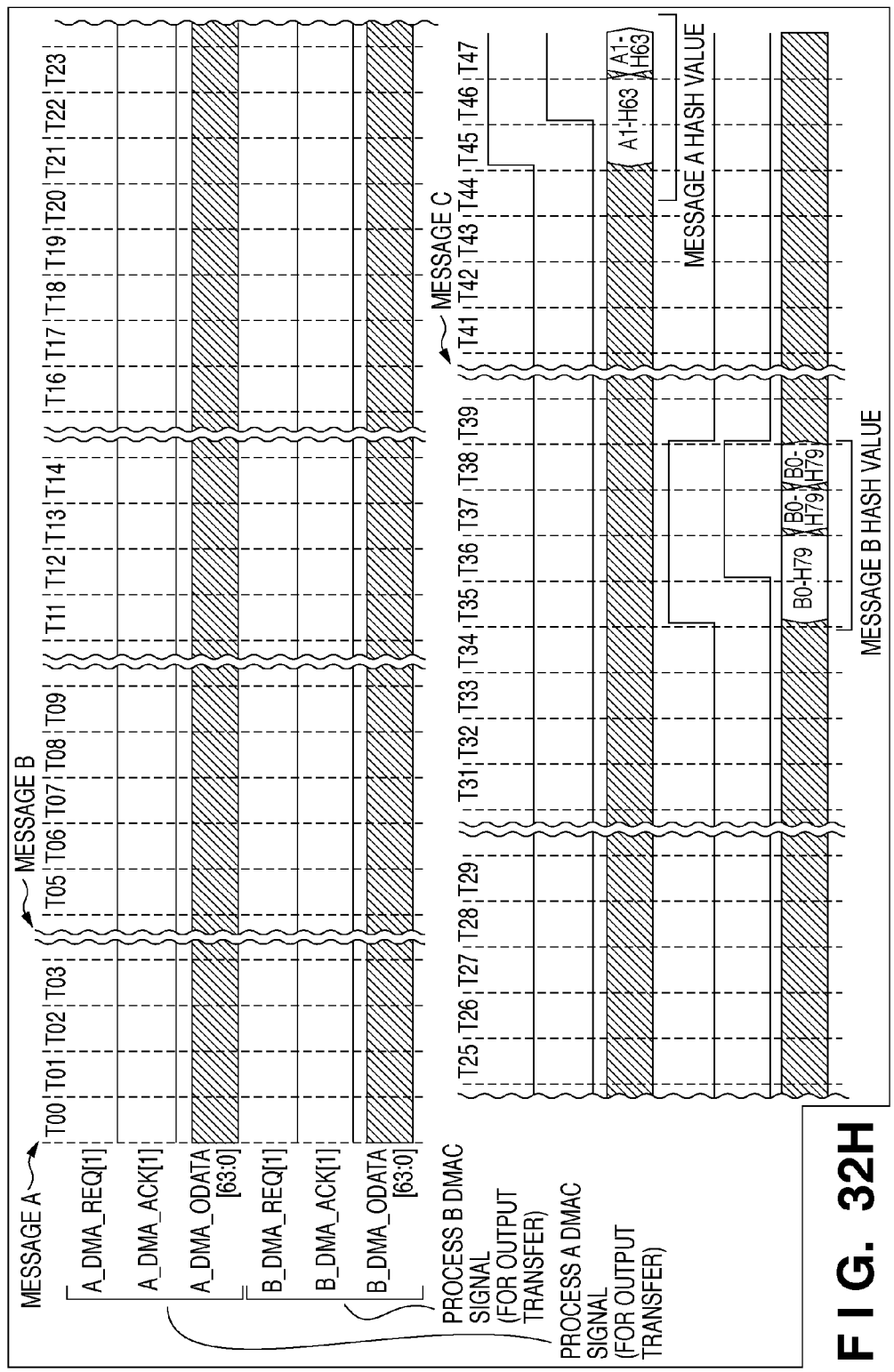
Figure 33A:
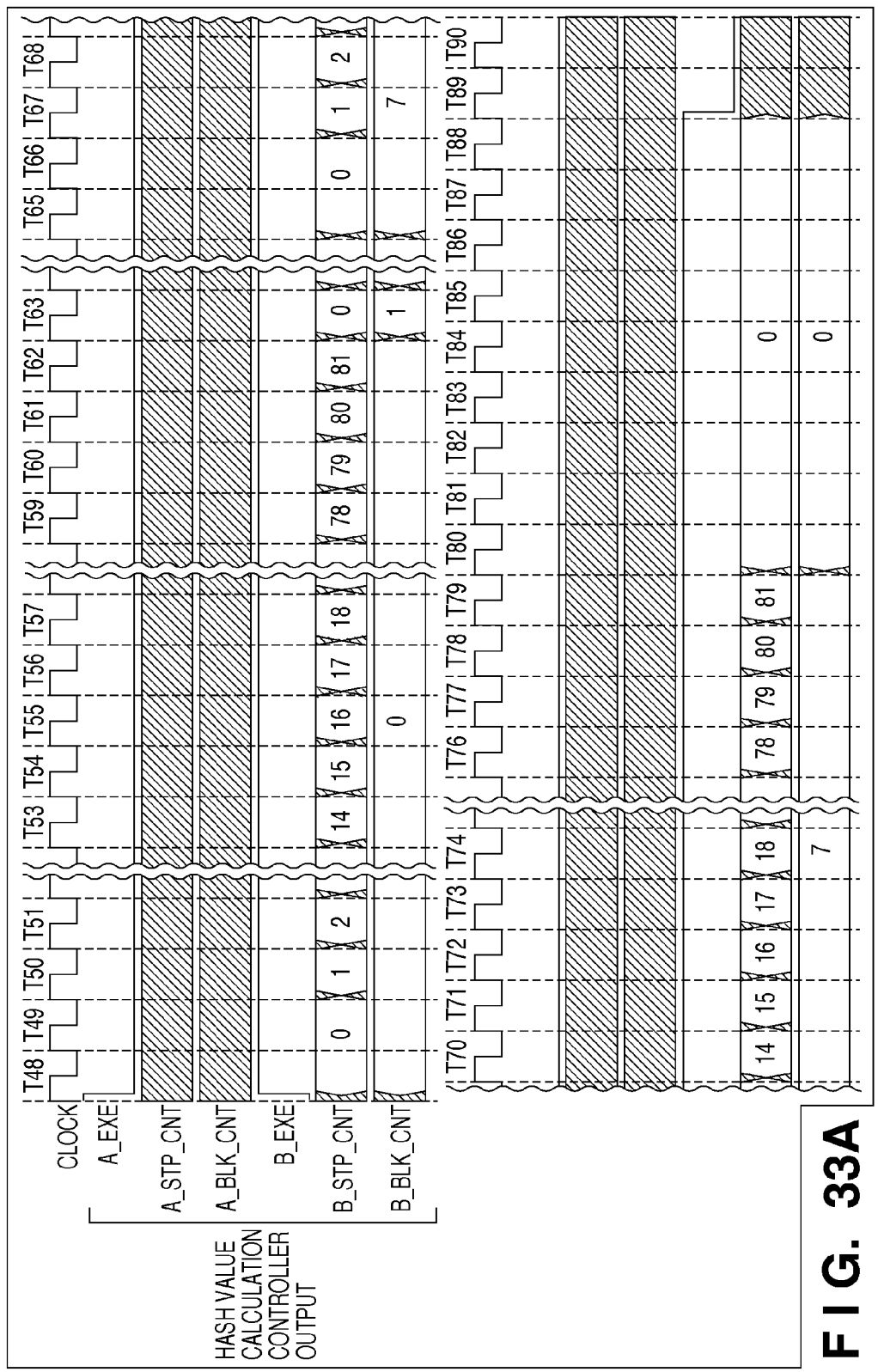
Figure 33B:
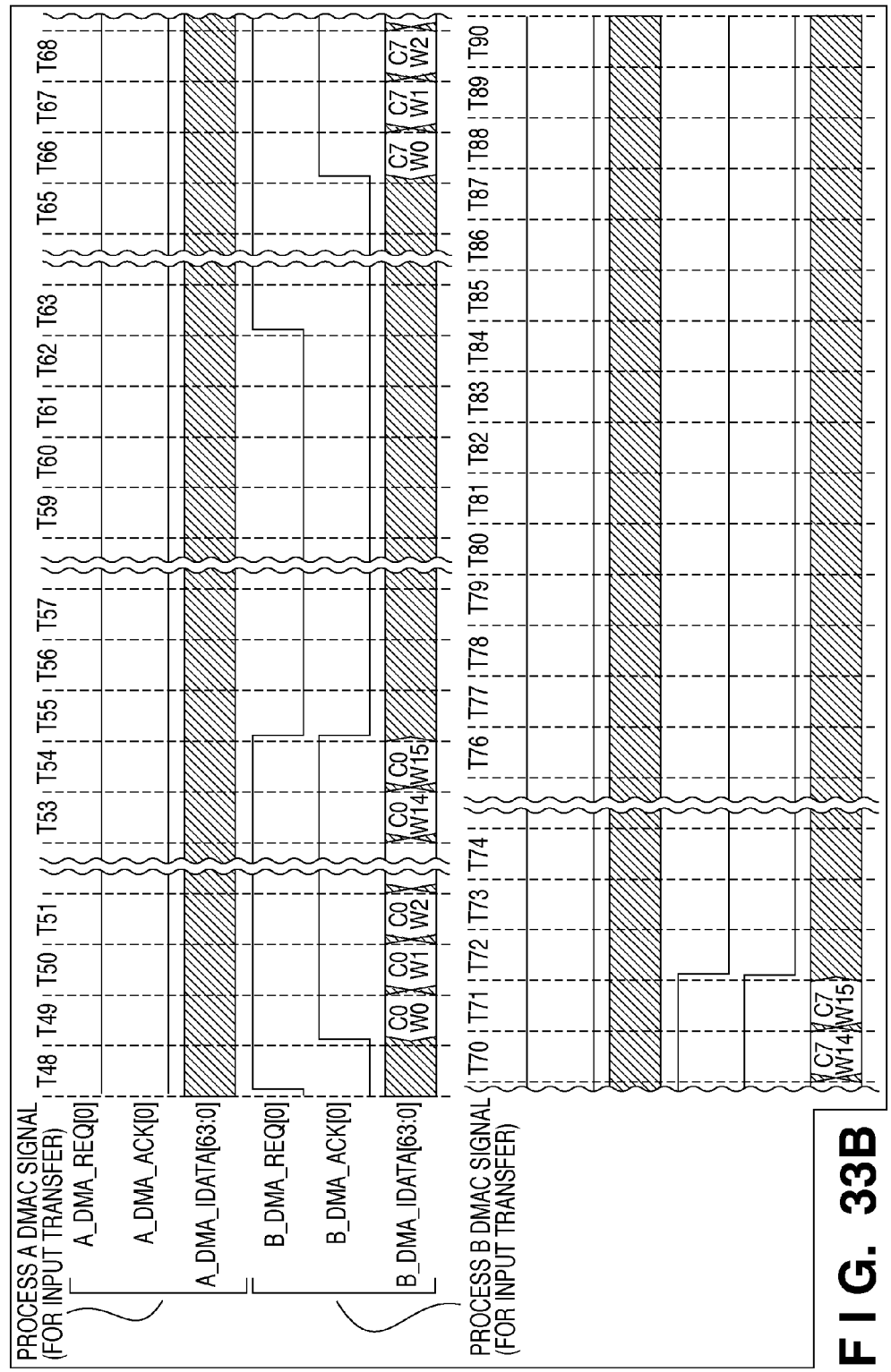
Figure 33C:
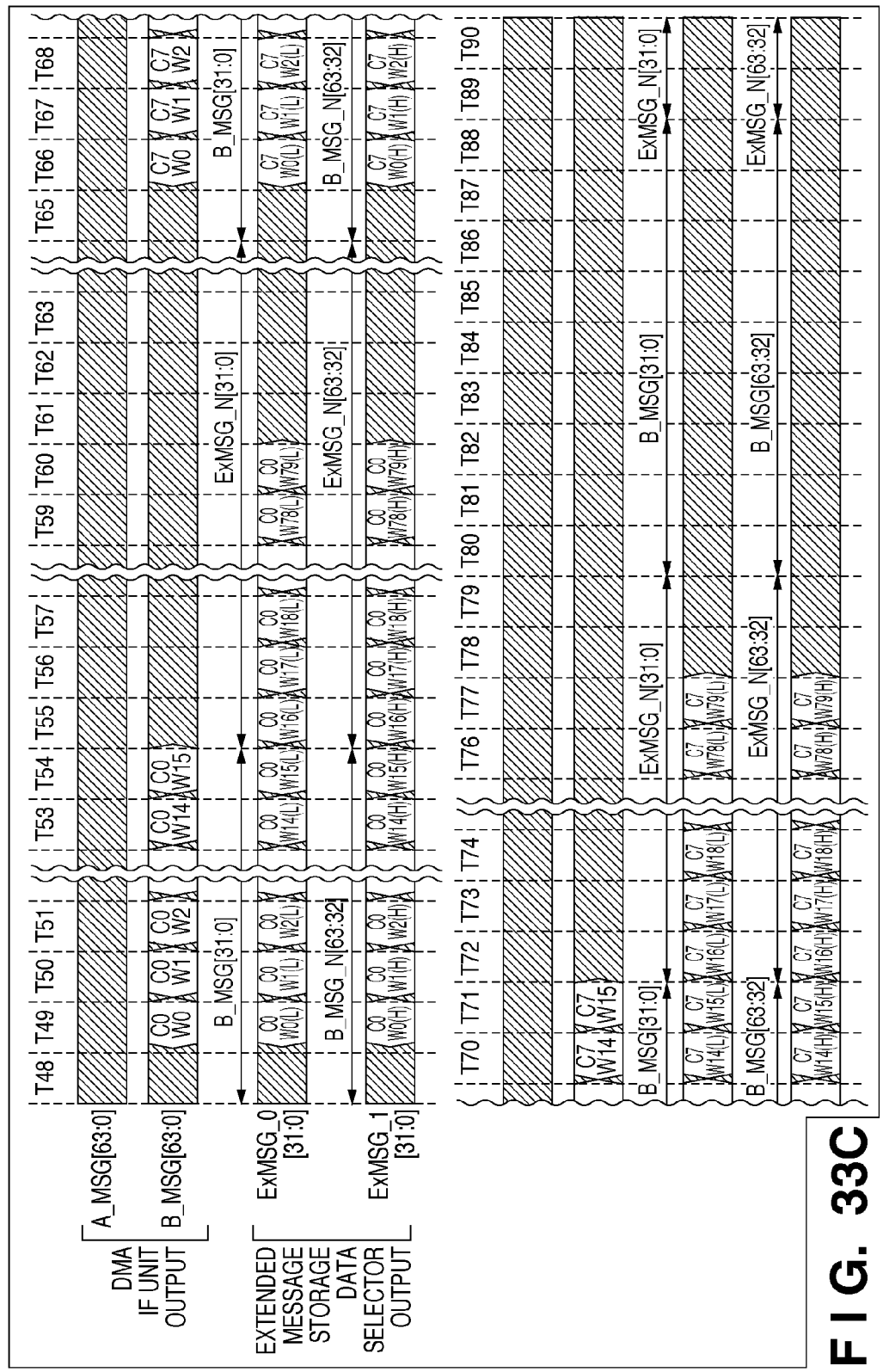
Figure 33D:
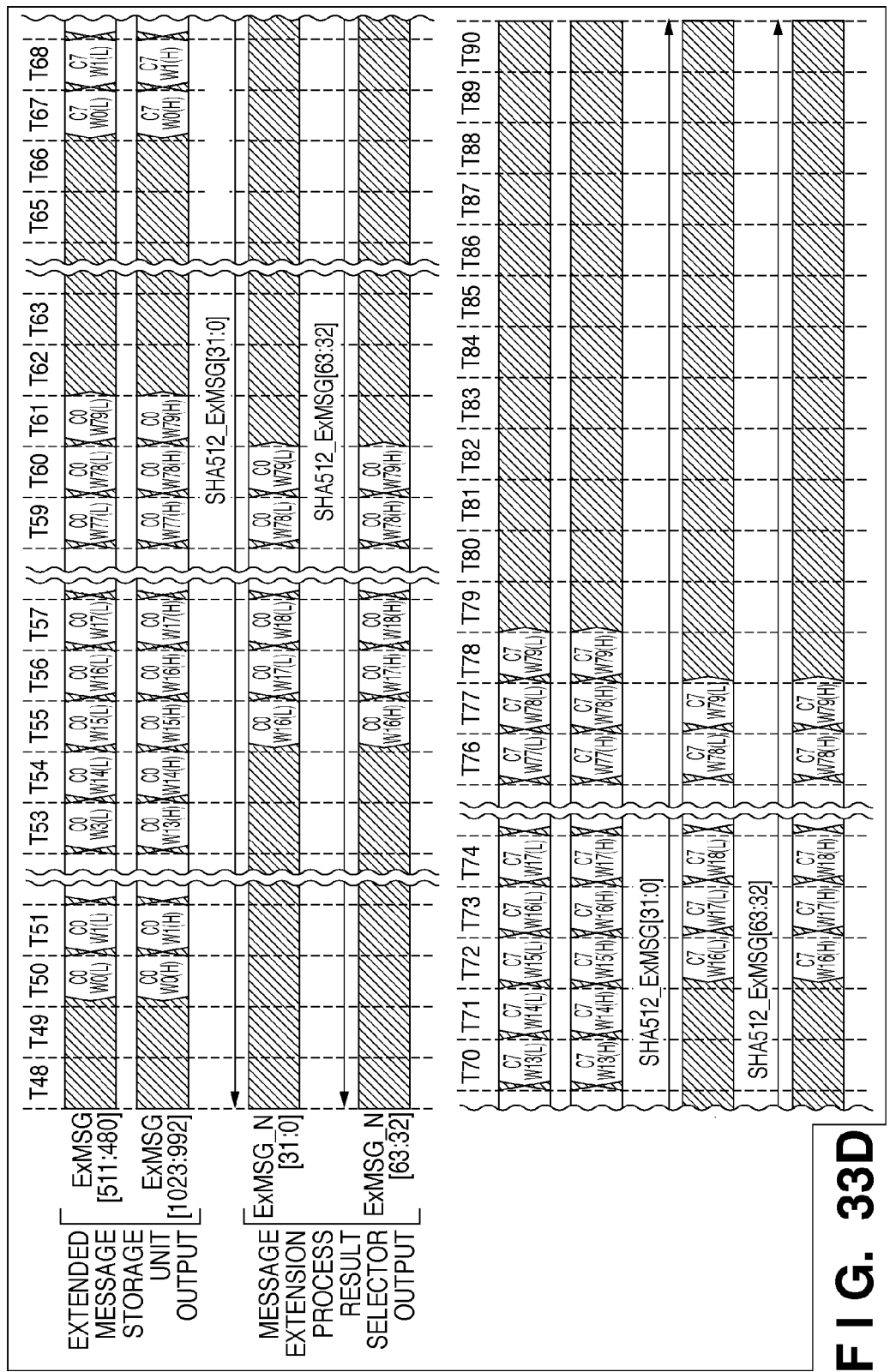
Figure 33E:
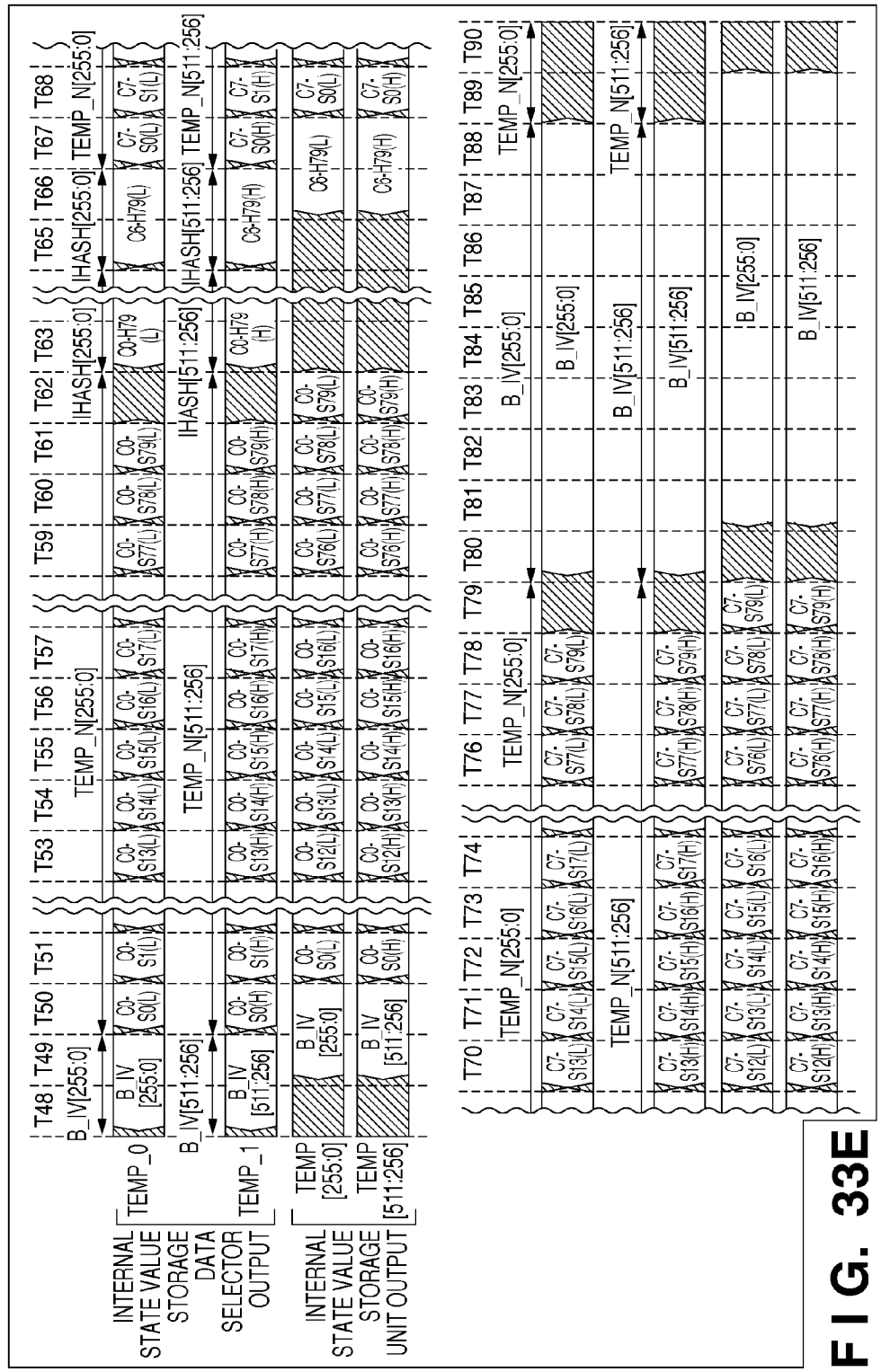
Figure 33F:
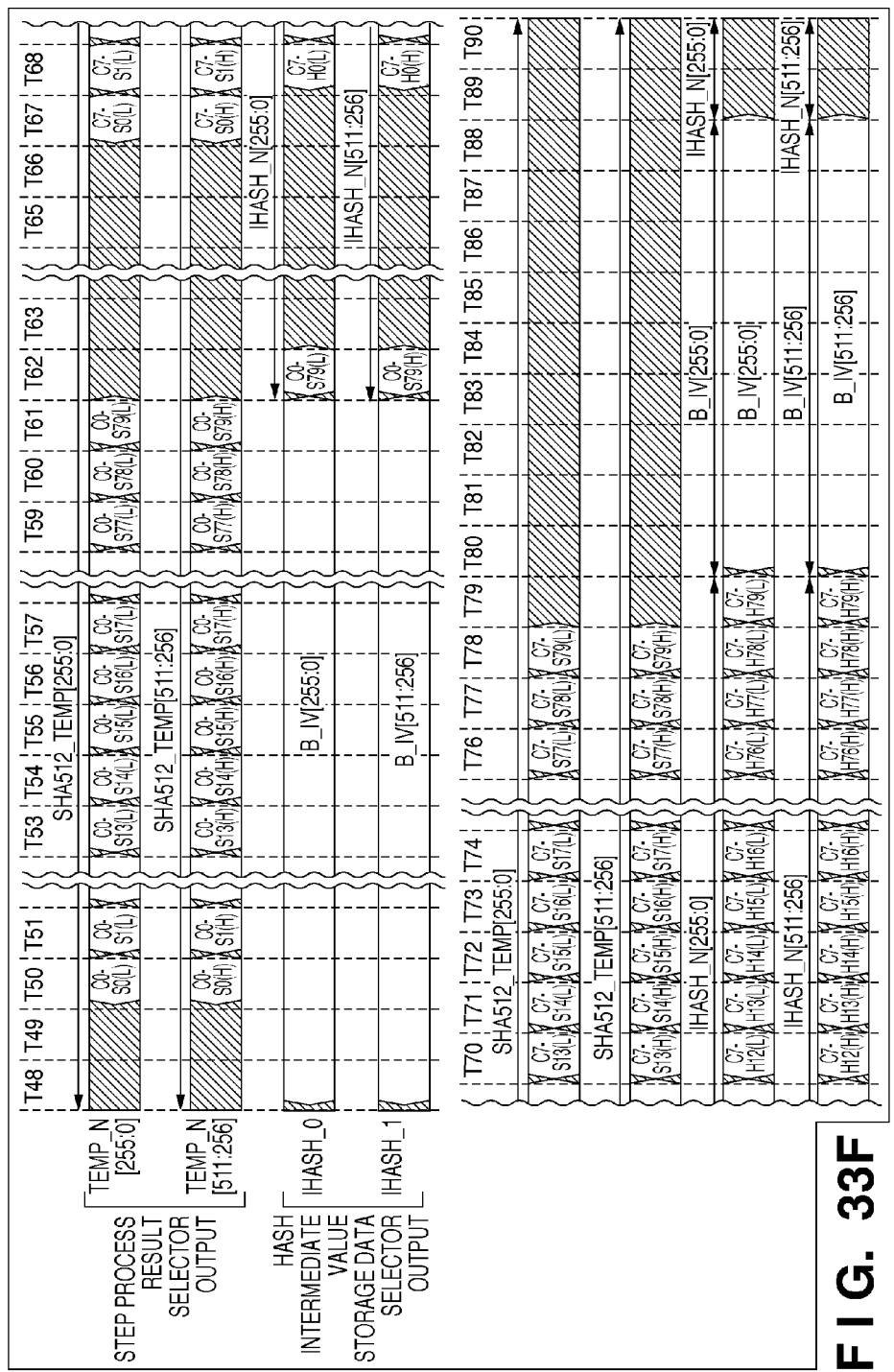
Figure 33H:
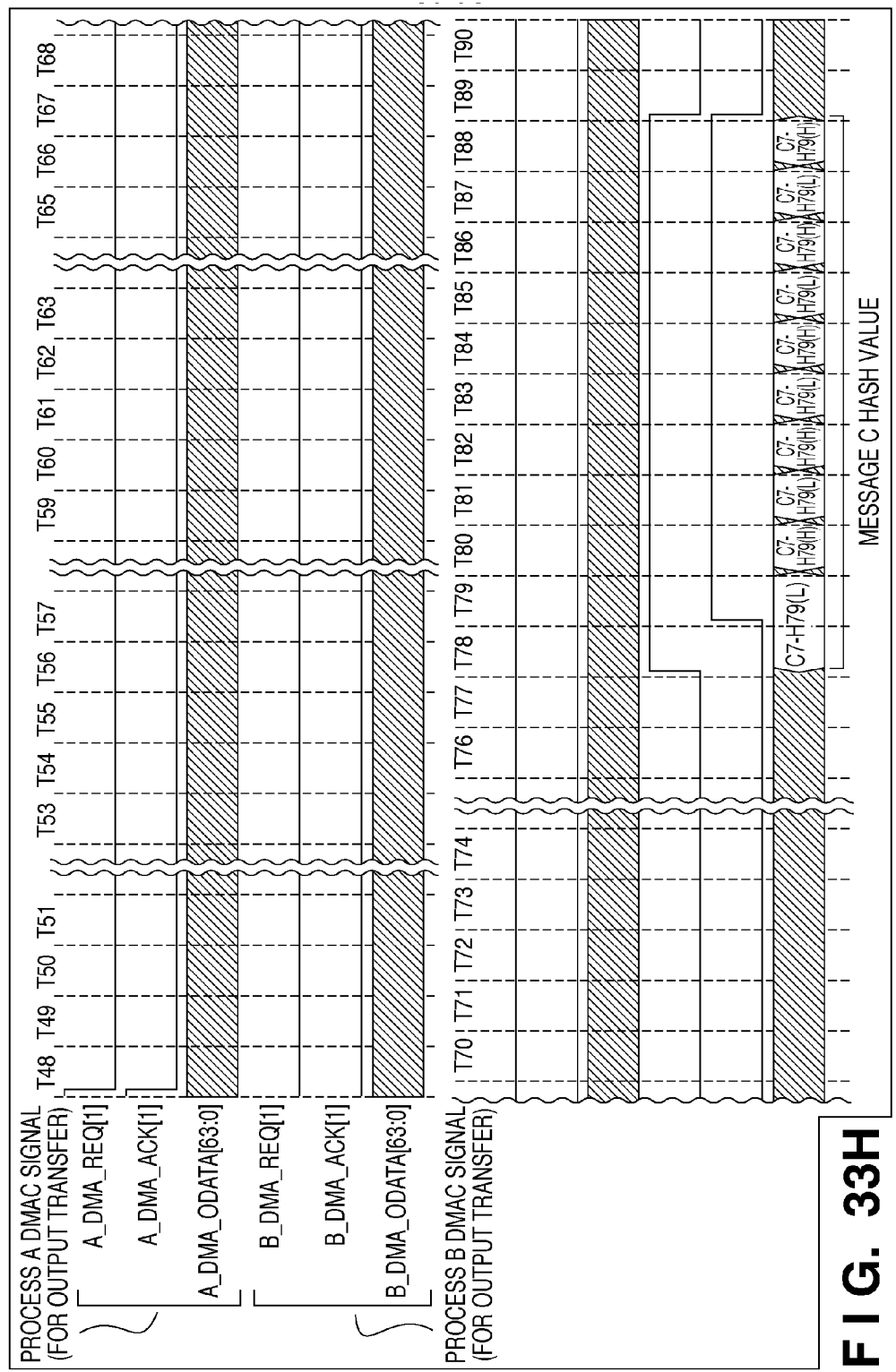

FIG. 31 is a view showing examples of messages A, B, and C as three messages, which are to undergo hash value calculations in this embodiment. Assume that message A includes a request to execute the hash value calculations using the hash algorithm MD5. Message A includes a total of two blocks each including 16 words (512 bits). Message B includes a request to execute the hash value calculations using the hash algorithm SHA1. Message B includes a total of one block including 16 words (512 bits). Message C includes a request to execute the hash value calculations using the hash algorithm SHA512. Message C includes a total of eight blocks each including 16 words (1024 bits).

(Processing Details)

FIGS. 32A to 33H are timing charts when the CPU 401 receives messages A, B, and C in the order named.

Assume that message A was received before T00. Upon reception of message A, the CPU 401 operates according to the CPU operation sequences shown in FIGS. 29A, 29B, and 29C, and decides process A to be used in hash value calculations in ST001. In ST005, the CPU 401 sets the process A register group of the hash value calculation circuit 100. The CPU 401 sets "00" indicating MD5 in the register A_ALG (302), "1" in the register A_BLK (303), a value prescribed in the MD5 algorithm in the register A_IV (304), and "1" in the register A_ENG (301), and issues a hash value calculation start request. Upon reception of the process A start request, the hash value calculation circuit 100 operates according to the operation sequence of the hash value calculation circuit shown in FIG. 30A, and it (or the controller 101) issues, to the shared resource manager 209:

a use request of area 0 of the extended message storage unit 107;

a use request of area 0 of the internal state value storage unit 111; and a use request of the MD5 process engines which are required in the MD5 hash value calculations in ST101-A. Since process B does not use these resources, the shared resource manager 209 grants use permissions A_ExMSG_ACK, A_TEMP_ACK, and A_ENG_ACK, thus starting processing. When the permissions A_ExMSG_ACK, A_TEMP_ACK, and A_ENG_ACK are granted, A_EXE=1 is set (T00).

At T00, A_EXE="1" and A_ALG=MD5. For this reason, the message extension process result selector 109 selects a process result MD5 ExMSG[31:0] of the MD5 message extension processor 108-1 as the output ExMSG_N[31:0]. Then, the step process result selector 113 selects a process result MD5 TEMP[127:0] of the MD5 step processor 112-1 as the output TEMP_N[127:0]. Also, the addition process result selector 117 selects a process result MD5_IHASH[127:0] of the MD5 addition processor 116-1 as the output IHASH_N[127:0]. The controller 101 issues a data input transfer request A_DMA_REQ[0] to the DMAC A.

At T01, when a signal A_DMA_ACK[0] is asserted, the controller 101 starts to update the step counter A_STP_CNT from the leading edge of the next clock. The counter A_STP_CNT is updated by +1 for each clock cycle, and is cleared to zero when it counts up to 65.

In an interval T01-T06, 16 words of input messages of the first block are transferred, and the DMA IF unit 103 outputs data A_DMA_IDATA[63:0] as data A_MSG[63:0]. The extended message storage data selector 106 selects the input message data A_MSG[31:0] as the output ExMSG_0[31:0].

In an interval T01-T06, the MD5 message extension processor 108-1 executes processing using area 0 of the extended message storage unit 107 as data to be processed. However, since the extended message storage data selector 106 does not select a process result ExMSG_N[31:0], it does not store any data in the extended message storage unit 107. The extended message storage unit 107 stores first to 16th extended messages (input messages) in an interval T02-T07.

The MD5 step processor 112-1 executes processing using the first to 16th extended messages stored in the extended message storage unit 107 as data to be processed, and generates first to 16th internal state values in the interval T02-T07. The process results are stored in the internal state value storage unit 111 in an interval T03-T08. The internal state value storage data selector 110 outputs a hash initial value A_IV [255:0] as the output TEMP_0[255:0] in an interval T0-T1, and outputs a value TEMP_N[255:0] by selecting the MD5 step process result from T02. Therefore, the MD5 step processor 112-1 generates the first internal state value using the hash initial value and the first input message at T02. In an interval T03-T08, the MD5 step processor 112-1 generates the n-th internal state value using the (n−1)-th internal state value and the n-th input message (n=2 to 16).

The MD5 addition processor 116-1 executes addition processes for the first to 16th internal state values using the first to 16th step process data stored in the internal state value storage unit 111 as data to be processed in the interval T03-T08. However, since the hash intermediate value storage data selector 114 does not select a process result IHASH_N[255:0], it does not store any data in the hash intermediate value storage unit 115.

In an interval T07-T17, the extended message storage data selector 106 selects data ExMSG[31:0] as the process result of the MD5 message extension processor 108-1 as the output ExMSG_0[31:0].

The MD5 message extension processor 108-1 generates the 17th to 64th extended messages using data of 16 words stored in area 0 of the extended message storage unit 107 as data to be processed in the interval T07-T17. The process results are stored in the extended message storage unit 107 in an interval T08-T20. The extended message storage data selector 106 outputs data ExMSG_N[31:0] by selecting the MD5 extension process result. Then, the MD5 message extension processor 108-1 generates the n-th extended message using the (n−16)-th to (n−1)-th extended messages of 16 words (n=17 to 64).

The MD5 step processor 112-1 executes processing using the 17th to 64th extended messages stored in the extended message storage unit 107 as data to be processed, and generates the 17th to 64th internal state values in an interval T08-T18. The process results are stored in the internal state value storage unit 111 in an interval T09-T19. The internal state value storage data selector 110 outputs a value TEMP_N

[255:0] by selecting the MD5 step process result. Therefore, the MD5 step processor 112-1 generates the n-th internal state value using the (n−1)-th internal state value and the n-th input message in the interval T08-T18 (n=17 to 64).

The MD5 addition processor 116-1 executes addition processes for the 17th to 64th internal state values using the 17th to 64th step process data stored in the internal state value storage unit 111 as data to be processed in an interval T09-T19. The addition process result for the 64th internal state value generated at T19 is a hash intermediate value of the first block. The hash intermediate value storage data selector 114 outputs the hash initial value A_IV[255:0] in an interval T0-T18, and outputs a value IHASH_N[255:0] from T19. Therefore, the MD5 addition processor 116-1 executes an addition process of the hash initial value and the 64th internal state value at T19, and stores the process result in the hash intermediate value storage unit 115 at T20.

At T20, the step counter A_STP_CNT is cleared to zero, and the block counter A_BLK_CNT is counted up to 1. Since A_BLK_CNT does not exceed the A_BLK value "1", the controller 101 issues a data input transfer request A_DMA_REQ[0] of the next block to the DMAC A.

When a signal A_DMA_ACK[0] is asserted at T21, the controller 101 starts to update the step counter A_STP_CNT from the leading edge of the next clock. The counter A_STP_CNT is updated by +1 for each clock cycle, and is cleared to zero when it counts up to 65.

In an interval T21 to T26, 16 words of input messages of the second block are transferred, and the DMA IF unit 103 outputs data A_DMA_IDATA[63:0] as data A_MSG[63:0]. The extended message storage data selector 106 selects the input message data A_MSG[31:0] as the output ExMSG_0[31:0].

In the interval T21-T26, the MD5 message extension processor 108-1 executes processing using area 0 of the extended message storage unit 107 as data to be processed. However, since the extended message storage data selector 106 does not select a process result ExMSG_N[31:0], it does not store any data in the extended message storage unit 107. The extended message storage unit 107 stores first to 16th extended messages (input messages) in an interval T22-T27.

The MD5 step processor 112-1 executes processing using the first to 16th extended messages stored in the extended message storage unit 107 as data to be processed, and generates first to 16th internal state values in the interval T22-T27. The process results are stored in the internal state value storage unit 111 in an interval T23-T28. The internal state value storage data selector 110 outputs a value IHASH[255:0] as the output TEMP_0[255:0] in an interval T20-T21, and outputs a value TEMP_N[255:0] by selecting the MD5 step process result from T22. Therefore, the MD5 step processor 112-1 generates the first internal state value using the hash intermediate value of the previous block and the first input message at T22. In an interval T23-T28, the MD5 step processor 112-1 generates the n-th internal state value using the (n−1)-th internal state value and the n-th input message (n=2 to 16).

The MD5 addition processor 116-1 executes addition processes for the first to 16th internal state values using the first to 16th step process data stored in the internal state value storage unit 111 as data to be processed in an interval T23-T28. However, the process results are not stored since the storage conditions of the hash intermediate value storage unit 115 are not satisfied.

In an interval T27-T42, the extended message storage data selector 106 selects data ExMSG[31:0] as the process result of the MD5 message extension processor 108-1 as the output ExMSG_0[31:0].

The MD5 message extension processor 108-1 generates the 17th to 64th extended messages using data of 16 words stored in area 0 of the extended message storage unit 107 as data to be processed in the interval T27-T42. The process results are stored in the extended message storage unit 107 in an interval T28-T43. The extended message storage data selector 106 outputs data ExMSG_N[31:0] by selecting the MD5 extension process result. Then, the MD5 message extension processor 108-1 generates the n-th extended message using the (n−16)-th to (n−1)-th extended messages of 16 words (n=17 to 64).

The MD5 step processor 112-1 executes processing using the 17th to 64th extended messages stored in the extended message storage unit 107 as data to be processed, and generates the 17th to 64th internal state values in the interval T28-T43. The process results are stored in the internal state value storage unit 111 in an interval T29-T44. The internal state value storage data selector 110 outputs a value TEMP_N[255:0] by selecting the MD5 step process result. Therefore, the MD5 step processor 112-1 generates the n-th internal state value using the (n−1)-th internal state value and the n-th input message in the interval T28-T43 (n=17 to 64).

The MD5 addition processor 116-1 executes addition processes for the 17th to 64th internal state values using the 17th to 64th step process data stored in the internal state value storage unit 111 as data to be processed in the interval T29-T44. The addition process result for the 64th internal state value generated at T44 is a hash intermediate value of the second block. Since the hash intermediate value storage unit 115 stores the hash intermediate value of the previous block, the addition process of the hash intermediate value of the previous block and the 64th internal state value is executed, and the process result is stored in the hash intermediate value storage unit 115 at T45.

At T45, the step counter A_STP_CNT is cleared to zero, and the block counter A_BLK_CNT is counted up to 2. Since A_BLK_CNT exceeds the A_BLK value "1", the controller 101 clears the block counter A_BLK_CNT and issues a data output transfer request A_DMA_REQ[1] of a hash value to the DMAC A.

In an interval T46-T47, a signal A_DMA_ACK[1] is asserted, and the output transfer of a 128-bit MD5 hash value is made.

The hash value calculation circuit 100 operates according to the operation sequence of the hash value calculation circuit 100 in FIG. 30A, and turns down, in ST116-A:
  the use request of area 0 of the extended message storage unit 107;
  the use request of area 0 of the internal state value storage unit 111; and
  the use request of the MD5 process engines 108-1, 112-1, and 116-1
which are required to execute the MD5 hash value calculations. The hash value calculation circuit 100 then completes the hash value calculations of message A. Since the use requests are turned down, the use permissions A_ExMSG_ACK, A_TEMP_ACK, and A_ENG_ACK are also turned down, thus setting A_EXE=0 (T48).

On the other hand, assume that message B is received at T05. Upon reception of message B, the CPU 401 operates according to the CPU operation sequences shown in FIGS. 29A, 29B, and 29C. The CPU decides process B to be used in hash value calculations in ST001, since process A is processing the message. In ST011, the CPU 401 sets the process B register group of the hash value calculation circuit 100. The CPU 401 sets "01" indicating SHA1 in the register B_ALG (306), "0" in the register B_BLK (307), a value prescribed in the SHA1 algorithm in the register B_IV (308), and "1" in the register B_ENB (305), and issues a hash value calculation start request. Upon reception of the process B start request, the hash value calculation circuit 100 operates according to the operation sequence of the hash value calculation circuit shown in FIG. 30B, and it (or the controller 101) issues, to the shared resource manager 209:

a use request of area 1 of the extended message storage unit 107;

a use request of area 1 of the internal state value storage unit 111; and a use request of the SHA1 process engines which are required in the SHA1 hash value calculations in ST101-B. Since process A does not use these resources, the shared resource manager 209 grants use permissions B_ExMSG_ACK, B_TEMP_ACK, and B_ENG_ACK, thus starting processing. When the permissions B_ExMSG_ACK, B_TEMP_ACK, and B_ENG_ACK are granted, B_EXE=1 is set (T06).

At T06, B_EXE="1" and B_ALG=SHA1. In response to this, the message extension process result selector 109 selects a process result SHA1_ExMSG[31:0] of the SHA1 message extension processor 108-2 as the output ExMSG_N[63:32]. Then, the step process result selector 113 selects a process result SHA1_TEMP[127:0] of the SHA1 step processor 112-2 as the output TEMP_N[255:128]. Also, the addition process result selector 117 selects a process result SHA1_IHASH[159:0] of the SHA1 addition processor 116-2 as the output IHASH_N[511:256]. The controller 101 issues a data input transfer request B_DMA_REQ[0] to the DMAC B.

At T07, when a signal B_DMA_ACK[0] is asserted, the controller 101 starts to update the step counter B_STP_CNT from the leading edge of the next clock. The counter B_STP_CNT is updated by +1 for each clock cycle, and is cleared to zero when it counts up to 81.

In an interval T06-T12, 16 words of input messages of the first block are transferred, and the DMA IF unit 103 outputs data B_DMA_IDATA[63:0] as data B_MSG[63:0]. The extended message storage data selector 106 selects the input message data B_MSG[31:0] as the output ExMSG_1[31:0].

In the interval T06-T12, the SHA1 message extension processor 108-2 executes processing using area 1 of the extended message storage unit 107 as data to be processed. However, since the extended message storage data selector 106 does not select a process result ExMSG_N[63:32], it does not store any data in the extended message storage unit 107. The extended message storage unit 107 stores first to 16th extended messages (input messages) in an interval T07-T13.

The SHA1 step processor 112-2 executes processing using the first to 16th extended messages stored in the extended message storage unit 107 as data to be processed, and generates first to 16th internal state values in the interval T07-T13. The process results are stored in the internal state value storage unit 111 in an interval T08-T14. The internal state value storage data selector 110 outputs a hash initial value B_IV[255:0] as the output TEMP_1[255:0] in an interval T06-T07, and outputs a value TEMP_N[511:256] by selecting the SHA1 step process result from T08. Therefore, the SHA1 step processor 112-2 generates the first internal state value using the hash initial value and the first input message at T08. In an interval T09-T13, the SHA1 step processor 112-2 generates the n-th internal state value using the (n−1)-th internal state value and the n-th input message (n=2 to 16).

The SHA1 addition processor 116-2 executes addition processes for the first to 16th internal state values using the first to 16th step process data stored in the internal state value storage unit 111 as data to be processed in an interval T08-T14. However, since the hash intermediate value storage data selector 114 does not select a process result IHASH_N[511:256], it does not store any data in the hash intermediate value storage unit 115.

In an interval T13-T32, the extended message storage data selector 106 selects data ExMSG[63:32] as the process result of the SHA1 message extension processor 108-2 as the output ExMSG_1[31:0].

The SHA1 message extension processor 108-2 generates the 17th to 80th extended messages using data of 16 words stored in area 1 of the extended message storage unit 107 as data to be processed in the interval T13-T32. The process results are stored in the extended message storage unit 107 in an interval T14-T33. The extended message storage data selector 106 outputs data ExMSG_N[31:0] by selecting the SHA1 extension process result. Then, the SHA1 message extension processor 108-2 generates the n-th extended message using the (n−16)-th to (n−1)-th extended messages of 16 words (n=17 to 80).

The SHA1 step processor 112-2 executes processing using the 17th to 80th extended messages stored in the extended message storage unit 107 as data to be processed, and generates the 17th to 80th internal state values in the interval T14-T33. The process results are stored in the internal state value storage unit 111 in an interval T15-T34. The internal state value storage data selector 110 outputs a value TEMP_N[511:256] by selecting the SHA1 step process result. Therefore, the SHA1 step processor 112-2 generates the n-th internal state value using the (n−1)-th internal state value and the n-th input message in the interval T14-T33 (n=17 to 80).

The SHA1 addition processor 116-2 executes addition processes for the 17th to 80th internal state values using the 17th to 80th step process data stored in the internal state value storage unit 111 as data to be processed in an interval T15-T34. The addition process result for the 80th internal state value generated at T34 is a hash intermediate value of the first block. The hash intermediate value storage data selector 114 outputs the hash initial value B_IV[255:0] in an interval T06-T33, and outputs a value IHASH_N[255:0] from T34. Therefore, the SHA1 addition processor 116-2 executes an addition process of the hash initial value and the 80th internal state value at T34, and stores the process result in the hash intermediate value storage unit 115 at T35.

At T35, the step counter B_STP_CNT is cleared to zero, and the block counter B_BLK_CNT is counted up to 1. Since B_BLK_CNT exceeds the B_BLK value "0", the controller 101 clears the block counter B_BLK_CNT, and issues a data output transfer request B_DMA_REQ[1] of a hash value to the DMAC B.

In an interval T36-T38, a signal B_DMA_ACK[1] is asserted, and the output transfer of a 160-bit SHA1 hash value is made. The hash value calculation circuit 100 operates according to the operation sequence of the hash value calculation circuit 100 in FIG. 30B, and turns down, in ST116-B:

the use request of area 1 of the extended message storage unit 107;

the use request of area 1 of the internal state value storage unit 111; and the use request of the SHA1 process engines 108-2, 112-2, and 116-2 which are required to execute the SHA1 hash value calculations. The hash value calculation circuit 100 then completes the hash value calculations of message B. When the use permissions B_ExMSG_ACK, B_TEMP_ACK, and B_ENG_ ACK are turned down, B_EXE=0 is set (T39).

Furthermore, assume that message C is received after completion of the hash value calculations of message B, and before completion of the hash value calculations of message A. Upon reception of message C, the CPU 401 operates according to the CPU operation sequences shown in FIGS. 29A, 29B, and 29C. The CPU 401 decides process B to be used in hash value calculations in ST001, since process A is processing the message. In ST011, the CPU 401 sets the process B register group of the hash value calculation circuit 100. The CPU 401 sets "10" indicating SHA512 in the register B_ALG (306), "7" in the register B_BLK (307), a value prescribed in the SHA512 algorithm in the register B_IV (308), and "1" in the register B_ENB (305), and issues a hash value calculation start request.

Upon reception of the process B start request, the hash value calculation circuit 100 operates according to the operation sequence of the hash value calculation circuit shown in FIG. 30B, and it (or the controller 101) issues, to the shared resource manager 209:

- a use request of areas 0 and 1 of the extended message storage unit 107;
- a use request of areas 0 and 1 of the internal state value storage unit 111; and
- a use request of the SHA512 process engines which are required in the SHA512 hash value calculations in ST101-B. Since process A uses area 0 of the extended message storage unit 107 and area 0 of the internal state value storage unit 111, the shared resource manager 209 does not grant use permissions B_ExMSG_ACK and B_TEMP_ACK. Also, since process A does not use the engines 108-3, 112-3, and 116-3, the shared resource manager 209 grants a permission B_ENG_ACK. The controller 101 does not start processing until the shared resource manager 209 grants the permissions B_ExMSG_ACK and B_TEMP_ACK.

At T48, when process A completes the hash value calculations of message A and turns down the use request of area 0 of the extended message storage unit 107 and that of area 0 of the internal state value storage unit 111, the permissions B_ExMSG_ACK and B_TEMP_ACK are granted, and B_EXE=1 is set.

At T48, B_EXE="1" and B_ALG=SHA512. Hence, the message extension process result selector 109 selects a process result SHA512_ExMSG[63:0] of the SHA512 message extension processor 108-3 as the output ExMSG_N[63:0]. Then, the step process result selector 113 selects a process result SHA512_TEMP[511:0] of the SHA512 step processor 112-3 as the output TEMP_N[511:0]. Also, the addition process result selector 117 selects a process result SHA512_IHASH[511:0] of the SHA512 addition processor 116-3 as the output IHASH_N[511:0]. At T48, the controller 101 issues a data input transfer request B_DMA_REQ[0] to the DMAC B.

At T49, when a signal B_DMA_ACK[0] is asserted, the controller 101 starts to update the step counter B_STP_CNT from the leading edge of the next clock. The counter B_STP_CNT is updated by +1 for each clock cycle, and is cleared to zero when it counts up to 81.

In an interval T49-T54, 16 words of input messages of the first block are transferred, and the DMA IF unit 103 outputs data B_DMA_IDATA[63:0] as data B_MSG[63:0]. The extended message storage data selector 106 selects the input message data B_MSG[31:0] as the output ExMSG_0[31:0] and the input message data B_MSG[63:32] as the output ExMSG_1[31:0].

In the interval T49-T54, the SHA512 message extension processor 108-3 executes processing using areas 0 and 1 of the extended message storage unit 107 as data to be processed. However, since the extended message storage data selector 106 does not select a process result ExMSG_N[63:0], it does not store any data in the extended message storage unit 107. The extended message storage unit 107 stores first to 16th extended messages (input messages) in an interval T50-T55.

The SHA512 step processor 112-3 executes processing using the first to 16th extended messages stored in the extended message storage unit 107 as data to be processed, and generates first to 16th internal state values in the interval T50-T55. The process results are stored in the internal state value storage unit 111 in an interval T51-T56. The internal state value storage data selector 110 outputs lower 256 bits B_IV[255:0] of a hash initial value as the output TEMP_0[255:0] in an interval T48-T49. Also, the internal state value storage data selector 110 outputs upper 256 bits B_IV[511:256] as the output TEMP_1[255:0]. From T50, the initial state value storage data selector 110 outputs a value TEMP_N[255:0] as the output TEMP_0[255:0] by selecting the lower 256 bits of the SHA512 step process result. Also, the initial state value storage data selector 110 outputs a value TEMP_N[511:256] as the output TEMP_1[255:0] by selecting the upper 256 bits of the SHA512 step process result. Therefore, the SHA512 step processor 112-3 generates the first internal state value using the hash initial value and the first input message at T50. In an interval T51-T55, the SHA512 step processor 112-3 generates the n-th internal state value using the (n−1)-th internal state value and the n-th input message (n=2 to 16).

The SHA512 addition processor 116-3 executes addition processes for the first to 16th internal state values using the first to 16th step process data stored in the internal state value storage unit 111 as data to be processed in an interval T51-T56. However, since the hash intermediate value storage data selector 114 does not select a process result IHASH_N[511:0], it does not store any data in the hash intermediate value storage unit 115.

In an interval T55-T60, the extended message storage data selector 106 outputs data ExMSG_N[31:0] as the upper bits of the process result of the SHA512 message extension processor 108-3 as the output ExMSG_0[31:0]. Also, the extended message storage data selector 106 outputs data ExMSG_N[63:32] as the lower bits of the process result of the SHA512 message extension processor 108-3 as the output ExMSG_1[31:0].

The SHA512 message extension processor 108-3 generates the 17th to 80th extended messages using data of 16 words stored in areas 0 and 1 of the extended message storage unit 107 as data to be processed in the interval T55-T60. The process results are stored in the extended message storage unit 107 in an interval T56-T61. The extended message storage data selector 106 outputs data ExMSG_N[31:0] as the upper bits of the process result of the SHA512 message extension processor 108-3 as the output ExMSG_0[31:0]. Also, the extended message storage data selector 106 outputs data ExMSG_N[63:32] as the lower bits of the process result of the SHA512 message extension processor 108-3 as the output ExMSG_1[31:0]. Then, the SHA512 message extension processor 108-3 generates the n-th extended message using the (n−16)-th to (n−1)-th extended messages of 16 words (n=17 to 80).

The SHA512 step processor 112-3 executes processing using the 17th to 80th extended messages stored in the extended message storage unit 107 as data to be processed, and generates the 17th to 80th internal state values in the interval T56-T61. The process results are stored in the internal state value storage unit 111 in an interval T57-T62. The internal state value storage data selector 110 outputs lower 256 bits TEMP_N[255:0] of a value TEMP_N[511:0] as the output TEMP_0[255:0] by selecting the SHA512 step process result. Also, the internal state value storage data selector 110 outputs upper 256 bits TEMP_N[511:256] as the output TEMP_1[255:0]. Therefore, the SHA512 step processor 112-3 generates the n-th internal state value using the (n−1)-th internal state value and the n-th input message in the interval T56-T61 (n=17 to 80).

The SHA512 addition processor 116-3 executes addition processes for the 17th to 80th internal state values using the 17th to 80th step process data stored in the internal state value storage unit 111 as data to be processed in the interval T57-T62. The addition process result for the 80th internal state value generated at T62 is a hash intermediate value of the first block. In an interval T48-T61, the hash intermediate value storage data selector 114 outputs lower 256 bits B_IV[255:0] of the hash initial value as the output IHASH_0[255:0], and selects upper 256 bits B_IV[511:256] as the output IHASH_1[511:256]. From T62, the hash intermediate value storage data selector 114 outputs a value IHASH_N[255:0] as the output IHASH_0[255:0] and a value IHASH_N[511:256] as the output IHASH_1[511:256]. Therefore, the SHA512 addition processor 116-3 executes an addition process of the hash initial value and the 80th internal state value at T62, and stores the process result in the hash intermediate value storage unit 115 at T63.

At T63, the step counter B_STP_CNT is cleared to zero, and the block counter B_BLK_CNT is counted up to 1. Since B_BLK_CNT does not exceed the B_BLK value "7", the controller 101 issues a data input transfer request B_DMA_REQ[0] of the next block to the DMAC B.

The controller 101 similarly repeats the processes for the number of blocks or more.

At T66, the addition process result for the 80th internal state value of the last block is obtained. At T67, the process result is stored in the hash intermediate value storage unit 115.

At T67, the step counter B_STP_CNT is cleared to zero, and the block counter B_BLK_CNT is counted up to 8. Since B_BLK_CNT exceeds the B_BLK value "7", the controller 101 clears the block counter B_BLK_CNT, and issues a data output transfer request B_DMA_REQ[1] of a hash value to the DMAC B.

In an interval T81-T88, a signal B_DMA_ACK[1] is asserted, and the output transfer of a 512-bit SHA512 hash value is made. The hash value calculation circuit 100 operates according to the operation sequence of the hash value calculation circuit 100 in FIG. 30B, and turns down, in ST116-B:
the use request of areas 0 and 1 of the extended message storage unit 107;
the use request of areas 0 and 1 of the internal state value storage unit 111; and
the use request of the SHA512 process engines 108-3, 112-3, and 116-3
which are required to execute the SHA512 hash value calculations. The hash value calculation circuit 100 then completes the hash value calculations of message C. When the use permissions B_ExMSG_ACK, B_TEMP_ACK, and B_ENG_ACK are turned down, B_EXE=0 is set (T89).

As described above, the above arrangement can process messages of a plurality of hash algorithms, that is, MD5, SHA1, and SHA512. Since the extended message storage unit, internal state value storage unit, and hash intermediate value storage unit are not occupied by each hash algorithm when they are used, an increase in circuit scale can be suppressed.

Furthermore, the processes of messages A and B can be parallelly operated, and the hash value calculations of message C, which cannot be parallelly processed since the shared resources are used by another process, can be started and executed when the process of message A whose process is in progress before message C is complete.

Even when no message process is executed, the process engines always execute processes for areas of data to be processed, and always update the areas of data to be processed. For this reason, when a specific hash algorithm process is requested and executed, a hash value calculation apparatus which can suppress variations of consumption power, and can assure high tamper resistance and high security can be provided.

According to the aforementioned arrangement, hash value calculations of a plurality of different hash algorithms can be executed while suppressing an increase in circuit scale, and the hash value calculations for a plurality of messages can be simultaneously executed under fewer restrict conditions. Furthermore, a hash value calculation apparatus which can suppress variations of consumption power independently of a hash algorithm to be selected, and can assure high tamper resistance and high security can be provided.

The intermediate value storage unit can store output data having the largest bit width of those from a plurality of hash value calculation units. That is, the above arrangement is implemented based on the maximum bit width. For this reason, the processed hash algorithm can be made to be difficult to specify. Also, at the time of processing of a hash algorithm that does not require the maximum bit width, an overhead at the interrupt and resume timings of the hash value calculations can be reduced, and processing can be speeded up by look-ahead storing an input block using an unused bit area.

According to the present invention, a hash value calculation technique, which can switch hash value calculations for a plurality of messages in the middle of the processing without any processing performance drop, and can assure high security can be provided. Also, according to the present invention, a hash value calculation technique, which can execute a plurality of hash algorithms at the same time, and can assure a small circuit scale and high security can be provided.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-305624, filed on Nov. 28, 2008, which is hereby incorporated by reference herein in its entirety.

What is claimed is:

1. A hash value calculation apparatus, which calculates a hash value of a message, comprising:
   an input unit configured to input an extended block obtained from a message to be processed;
   a hash value calculation unit configured to execute a hash value calculation of the input block and to output a hash intermediate value;
   a plurality of intermediate value storage units configured to store the hash intermediate value output by said hash value calculation unit for the message to be processed;
   an output unit configured to output a hash value obtained by executing the hash value calculation for blocks of the message to be processed; and
   a switching unit configured to switch said plurality of intermediate value storage units used to store the hash intermediate value output from said hash value calculation unit to control the hash value calculation for a plurality of messages,
   wherein a first intermediate value storage unit of the plurality of intermediate value storage units is used for calculating a hash value of a first message among the plurality of messages, and
   a second intermediate value storage unit is used for holding a hash intermediate value for a second message when calculating the hash value of the first message using the hash value calculation unit.

2. The apparatus according to claim 1, wherein when a second message which has higher priority than a first message is input during execution of a process using a first intermediate value storage unit for the first message, said hash value calculation control unit controls to interrupt the process for the first message, to start a process for the second message using a second intermediate value storage unit, and to resume the process for the first message using an intermediate value stored in the first intermediate value storage unit after completion of the process for the second message.

3. The apparatus according to claim 2, further comprising an extension process unit configured to execute an extension process for a block of a message to be processed, and a step process unit configured to execute a step process for input data, and to output the input data that has undergone the step process as an internal state value, a plurality of said extension process units and a plurality of said step process units being arranged in correspondence with different hash algorithms,
   wherein said input unit inputs a block which has undergone the extension process by said extension process unit as the extended block,
   said hash value calculation unit executes the hash value calculation using the internal state value, and
   said apparatus further comprises a switching unit adapted to switch said extension process unit and said step process unit to be activated based on a hash algorithm to be used.

4. The apparatus according to claim 3, wherein the first intermediate value storage unit and the second intermediate value storage unit are configured to store output data having a largest bit width of output data from said plurality of step process units.

5. The apparatus according to claim 1, comprising a plurality of the hash value calculation units, each of which is for each of a plurality of hash algorithms.

6. A hash value calculation method for a hash value calculation apparatus, which calculates a hash value of a message, comprising:
   an input step of inputting an extended block obtained from a message to be processed;
   a hash value calculation step of executing a hash value calculation of the input block and outputting a hash intermediate value;
   a storage step of storing the hash intermediate value output in the hash value calculation step for the message to be processed in one of a plurality of intermediate value storage units;
   an output step of outputting a hash value obtained by executing the hash value calculation for blocks of the message to be processed; and
   a switching step of switching the plurality of intermediate value storage units used to store the hash intermediate value output in the hash value calculation step to control the hash value calculation for a plurality of messages,
   wherein a first intermediate value storage unit of the plurality of intermediate value storage units is used for calculating a hash value of a first message among the plurality of messages, and
   a second intermediate value storage unit is used for holding a hash intermediate value for a second message when calculating the hash value of the first message using the hash value calculation step.

7. The method according to claim 6, wherein when a second message which has higher priority than a first message is input during execution of a process using a first intermediate value storage unit for the first message, said hash value calculation control step controls to interrupt the process for the first message, to start a process for the second message using a second intermediate value storage unit, and to resume the process for the first message using an intermediate value stored in the first intermediate value storage unit after completion of the process for the second message.

8. The method according to claim 7, further comprising an extension process step of executing an extension process for a block of a message to be processed, and a step process step of executing a step process for input data, and outputting the input data that has undergone the step process as an internal state value, a plurality of said extension process steps and a plurality of said step process steps being arranged in correspondence with different hash algorithms,
   wherein said input step inputs a block which has undergone the extension process by said extension process step as the extended block,
   said hash value calculation step executes the hash value calculation using the internal state value, and
   said method further comprises a switching step of switching said extension process step and said step process step to be activated based on a hash algorithm to be used.

9. The method according to claim 8, wherein the first intermediate value storage unit and the second intermediate value storage unit are configured to store output data having a largest bit width of output data from said plurality of step process steps.

10. The method according to claim 6, comprising a plurality of the hash value calculation steps, each of which is for each of a plurality of hash algorithms.

* * * * *